United States Patent [19]

Steadham, Jr. et al.

[11] Patent Number: 5,634,016
[45] Date of Patent: May 27, 1997

[54] EVENT MANAGEMENT SYSTEM

[75] Inventors: Charles V. Steadham, Jr., Micanopy; Daniel D. Boccabella, Jr., Gainesville; Bradley C. Jones, Jacksonville; Matthew A. Fuller, Gainesville; Jeffrey A. Lyons, West Palm Beach, all of Fla.

[73] Assignee: Blade Software, Inc., Gainesville, Fla.

[21] Appl. No.: 2,359

[22] Filed: Jan. 21, 1993

[51] Int. Cl.⁶ .................................................. G06F 17/30
[52] U.S. Cl. ................... 395/329; 395/779; 395/205; 395/613; 395/355
[58] Field of Search .................... 395/600, 919–923, 395/141; 364/512, 474.24, 401, 403, 407, 474.26

[56] References Cited

U.S. PATENT DOCUMENTS

| | | | |
|---|---|---|---|
| 4,530,051 | 7/1985 | Johnson et al. | 395/200 |
| 4,546,434 | 10/1985 | Gioello et al. | 364/400 |
| 4,642,780 | 2/1987 | Thomson | 364/512 |
| 4,674,043 | 6/1987 | Hernandez et al. | 364/401 |
| 4,703,412 | 10/1987 | Cunningham et al. | 364/140 |
| 4,772,206 | 9/1988 | Kerr et al. | 434/118 |
| 4,809,170 | 2/1989 | Leblang et al. | 395/700 |
| 4,835,683 | 5/1989 | Phillips et al. | 395/11 |
| 4,877,404 | 10/1989 | Warren et al. | 434/118 |
| 4,885,694 | 12/1989 | Pray et al. | 364/464.01 |
| 5,091,849 | 2/1992 | Davis et al. | 395/100 |
| 5,111,392 | 5/1992 | Malin | 364/401 |
| 5,164,911 | 11/1992 | Juran et al. | 364/578 |
| 5,251,315 | 10/1993 | Wang | 395/600 |
| 5,255,207 | 10/1993 | Cornwell | 364/512 |
| 5,262,938 | 11/1993 | Rapoport et al. | 364/401 |
| 5,333,257 | 7/1994 | Merrill et al. | 395/161 |
| 5,404,291 | 4/1995 | Kerr et al. | 364/407 |

*Primary Examiner*—Thomas G. Black
*Assistant Examiner*—Hosain T. Alam
*Attorney, Agent, or Firm*—Wigman, Cohen, Leitner & Myers, P.C.

[57] ABSTRACT

A computer integrated event management system is disclosed that coordinates the entire process of event planning and implementation using specialized software combined with a microcomputer network which includes a network file server, CAD/DATA station and DATA stations where facility personnel are able to efficiently plan and implement events. The system includes a fully relational database and a CAD module which are connected together using a third module such that, whenever a piece of information is changed in one place, it is automatically changed everywhere it is stored in the database. The connecting module permits the database and the CAD module to communicate by translating information from a database format into a graphic format readable by CAD software packages as well as translating the graphic information back into the database information stored in the database.

20 Claims, 143 Drawing Sheets

EM/DATA™ AND DATABOND™ MENU DESCRIPTIONS

```
EVENT                        ;SETUP AND/OR MODIFY EVENT DATA
  GROUP                      ;GROUP INFORMATION
  EVENT                      ;EVENT INFORMATION
  FOOD/BEVERAGE              ;FOOD AND BEVERAGE INFORMATION
  DECOR                      ;DECOR INFORMATION
  ENTERTAINMENT              ;ENTERTAINMENT INFORMATION
  ACCOUNTING                 ;ACCOUNTING INFORMATION
  PRODUCTION                 ;PRODUCTION SCHEDULE
DRAWING                      ;CREATE AND/OR MODIFY EVENT DRAWING
  CREATE                     ;CREATE A NEW EVENT DRAWING
  VIEW/EDIT                  ;START EVENT/CAD WITH DRAWING
  INVENTORY                  ;VIEW/ALLOCATE INVENTORY TO EVENT
  SEATING                    ;EDIT SEATING ASSIGNMENTS
  SLIDES/ANIM                ;SLIDE/ANIMATION MENU
    SLIDES                   ;VIEW SLIDES
    ANIMATIONS               ;VIEW ANIMATIONS
    CATALOG                  ;ASSIGN SLIDES/ANIMATIONS TO EVENT
REPORTS                      ;REPORTS MENU
  BEO                        ;PRINT A BANQUET EVENT ORDER
  GROUP BEO                  ;PRINT SELECT BEOS FOR A BOOKING #
  PROPOSAL                   ;PROPOSAL MENU
    PROMO                    ;PRINT A THEME AND FACILITY COVER PAGES
    PROPOSAL                 ;PRINT A PROPOSAL
  PRODUCTION                 ;PRINT A PRODUCTION SCHEDULE
  RESUME                     ;PRINT A RESUME FOR A BOOKING #
  FACILITY                   ;FACILITY REPORTS MENU
    ROOM BY GUEST            ;ROOM SECTION USAGE BY GUEST
    ROOM BY SECTION          ;ROOM SECTION USAGE BY SECTION
  INVENTORY                  ;INVENTORY REPORTS MENU
  SEATING                    ;SEATING ASSIGNMENTS
  FOOD/BEV                   ;FOOD AND BEVERAGE REPORTS MENU
    WATER LIST               ;PRINT A DAILY WATER LIST
    CART SCHEDULE            ;FOOD CART SCHEDULE
UTILITIES                    ;UTILITIES MENU
  SET FACILITY               ;UPDATE CAD/EM SETTINGS
  DAILY EVENTS               ;VIEW/EDIT A DAY'S EVENTS
  EVENT COPY                 ;COPY AN EVENT
    TEXT                     ;COPY TEXT PORTION OF EVENT
    DRAWING                  ;COPY DRAWING PORTION OF EVENT
    ALL                      ;COPY ALL EVENT INFORMATION
  EVENT DELETE               ;DELETE AN EVENT
    DRAWING                  ;ERASE AN EVENT'S DRAWING
    ENTIRE                   ;COMPLETELY ERASE AN EVENT
  GROUP DELETE               ;DELETE A GROUP AND ASSOCIATED EVENTS
  DRAWING DEFAULTS           ;CREATE/EDIT DEFAULT STAGE OR LAYOUT
    EXTRACT TEMPLATE         ;CREATE LAYOUT OR STAGING TEMPLATES
    EDIT STAGING             ;EDIT STAGING TEMPLATE DESCRIPTION
```

FIG. 2A

```
      | EDIT LAYOUT              ;EDIT LAYOUT TEMPLATE DESCRIPTION
      | EXTRACT THEME            ;CREATE THEME FROM AN EVENT MENU
MAINTENANCE                      ;MAINTENANCE MENU
   |  GUEST                      ;ENTER/EDIT GUEST INFORMATION
   |  FACILITY                   ;FACILITY INFORMATION
   |     FACILITY                ;FACILITY INFORMATION
   |     SECTION                 ;SECTION INFORMATION
   |     TOLERANCE               ;ROOM TOLERANCE INFORMATION
   |     EMPLOYEE                ;EMPLOYEE INFORMATION
   |  VENDOR                     ;ENTER/EDIT VENDOR INFORMATION
   |  FOOD/BEV                   ;FOOD AND BEVERAGE ITEM INFORMATION
   |  THEME                      ;THEME FOOD INFORMATION
   |  PROMO                      ;THEME OR FACILITY COVER PAGE
   |  INVENTORY                  ;INVENTORY ON-HAND
   |  COMMENTS                   ;DEFAULT COMMENTS FOR REPORTS
APPLICATIONS                     ;APPLICATIONS MENU
   |  ENTER EMAIL MESSAGE        ;ENTER/EDIT EMAIL MESSAGES
   |  CHECK MESSAGES             ;CHECK/READ EMAIL MESSAGES
   |  WORDPERFECT                ;RUN WORDPERFECT 5.1
   |  PRINT CONSOLE              ;ACCESS PRINT QUEUE CONTROL
EXIT                             ;LEAVE CADEM
```

===GROUP ENTRY===

Booking#: 00000001  Fac#: F0024  Name: MARRIOTT'S ORLANDO WORLD CENTER
Guest#: 0000003  Guest: Florida National Dental Congre  Booked By: DAN
Post As: Florida National Dental Congress
Start Date: 05/01/92 Day: Friday    Entered On: 01/15/92    Rooms: No
End Date:   05/04/92 Day: Monday    Entered By: DAN         Status: B Contact Name: Ms. Betty          Waggener          Phone: (813) 877-7597
    Title:                                         Extension:

| Event No | Date | Beg Time | End Time | Description/Meal |
|---|---|---|---|---|
| 00000012 | 05/01/92 | 07:00AM | 08:00AM | Breakfast |
| 00000003 | 05/01/92 | 08:00AM | 09:00AM | Early Morning Lunch Meeting |
| 00000002 | 05/01/92 | 12:00PM | 01:00PM | Meeting |

| Post As | Sections | Room | Guar. | Expect |
|---|---|---|---|---|
| Blade Productions | I to VIII | GRAND BALLROOM | 200 | 300 |
| Florida National Dental C | VII VIII | GRAND BALLROOM | 200 | 234 |
| "A Passport to Paradise" | I VIII | GRAND BALLROOM | 20 | 25 |

FIG. 3B1

=====EVENT ENTRY=====

```
Event No: 00000001  Booking#: 00000001         Date Entered: 01/15/92
   Guest: Florida National Dental Congress      Entered By: DAN
Division:                                         Expected: 350
 Contact: Ms.    Betty     Waggener              Guarantee: 350
   Title: Title                                     Set Up:
   Phone: (813) 877-7597 Ext:                      Status: NC Date: 05/01/92 Begin: 07:00PM End: 10:30PM on 05/01/92
Post Event As: Florida National Dental Congress
Meal/Description: Reception
         Section: VII                 thru VIII
            Room: GRAND BALLROOM      Include Foyers: No
```

FIG. 3B2

Event Agenda

Start: End: Description:
07:00PM 10:30PM RECEPTION

Post:
Yes

Water Service Times:
07:00PM  08:00PM  08:30PM  09:30PM

EVENT ENTRY

FIG. 3B3

EVENT ENTRY

Turn Time: 07:00PM
Turn Desc:

Abbreviation: Title: COMMENTS
WEATHER   WEATHER POLICY FOR OUTDOOR FUNCTION:

Misc:

FIG. 3C1

```
[■]═══════════════════════FOOD/BEVERAGE ENTRY═══════════════════════════

Meal Information              Page 1 of 5

Event No: 00000001        Booking#: 00000001
            Menu#: 1                Event Date: 05/01/92

Guest Name: Florida National Dental Congress
          Post As: Florida National Dental Congress
 Meal Description: Reception
         Expected: 350              Guarantee: 350

Meal Start Time: 05:00PM     Meal End Time: 07:00PM
    Menu Theme No: 165            Post Theme:
  Menu Theme Name: THE "GOURMET" BUFFET
            Price: $25.95     Price Comments: per person
```
└Default value is No

FIG. 3C2

```
[■]═══════════════════════FOOD/BEVERAGE ENTRY═══════════════════════════

Food Information              Page 2 of 5

Item#: BIU: Item Description:                  Qty: Price:  Unit:
  001637      Potage du Jour
  001640      Marinated Artichoke Hearts
  001366      Freshly Brewed Coffee, Decaffeinated C   4  $20.00 gallon
  001643      Fresh Garden Salad
  001646      Freshly Sliced Display of Seasonal Mel
  001649      Tomato Stars
  001652      Roasted Sirloin of Beef
  001655      Bouquetiere of Fresh Garden Vegetables
  001658      Sliced Lyonnaise Potatoes
  001661      Displays of Freshly Baked
  001664      Displays of Assorted International Tor
```

FIG. 3C3

```
[■]═══════════════════════════FOOD/BEVERAGE ENTRY═══════════════════════════
    ┌─────────────────────────────────────────────────────────────────────┐
    │              Cart Service Information              Page 3 of 5      │
    ├─────────────────────────────────────────────────────────────────────┤
    │ No In:     Out:     Contents:        Cart Comments:                 │
    │ 2  05:00PM 07:00PM  C,D,T,J,K                                       │
    │                                                                     │
    └─────────────────────────────────────────────────────────────────────┘
```

FIG. 3C4

```
[■]═══════════════════════════FOOD/BEVERAGE ENTRY═══════════════════════════
    ┌─────────────────────────────────────────────────────────────────────┐
    │         Beverage Information for Bar Type 1        Page 4 of 5      │
    ├─────────────────────────────────────────────────────────────────────┤
    │ No of Bars:   2                          Start Time: 05:00PM        │
    │ Bar Summary: (2) HOSTED BARS SERVING     End Time:   07:00PM        │
    ├─────────────────────────────────────────────────────────────────────┤
    │ Item#: Item Description:                 Qty: Price:  Unit:         │
    │ 005002 Domestic Beer                          $3.00   bottle        │
    │ 005007 Jack Daniels                           $4.25   drink         │
    │                                                                     │
    │                                                                     │
    │ Beverage Comments:                                                  │
    │ BEVTAX91      * * * EFFECTIVE JULY 1, 1991:                         │
    │                                                                     │
    └─────────────────────────────────────────────────────────────────────┘
```

FIG. 3C5

```
[■]═══════════════════════════FOOD/BEVERAGE ENTRY═══════════════════════════
    ┌─────────────────────────────────────────────────────────────────────┐
    │         Beverage Information for Bar Type 2        Page 5 of 5      │
    ├─────────────────────────────────────────────────────────────────────┤
    │ No of Bars:                              Start Time:                │
    │ Bar Summary:                             End Time:                  │
    ├─────────────────────────────────────────────────────────────────────┤
    │ Item#: Item Description:                 Qty: Price:  Unit:         │
    │                                                                     │
    │                                                                     │
    │                                                                     │
    │ Beverage Comments:                                                  │
    │                                                                     │
    │                                                                     │
    └─────────────────────────────────────────────────────────────────────┘
```

FIG. 3D

```
[■]────────────────────Decor Entry────────────────────┐
│                    Decor Information                │
│   Event No: 00000001      Booking No: 00000001      │
│ Guest Name: Florida National Dental Congress        │
│    Post As: Florida National Dental Congress        │
│Description: Reception                               │
│ Event Date: 01/01/68      Event Time:  07:00PM      │
│─────────────────────────────────────────────────────│
│ Category:      Description:                  Price: │
│ Flowers           To be provided by hotel at no cost│
│                                                     │
│                                                     │
│─────────────────────────────────────────────────────│
│ Comments:                                           │
│                                                     │
└─────────────────────────────────────────────────────┘
```

FIG. 3E

```
[■]────────────────ENTERTAINMENT ENTRY────────────────

Entertainment Information

Event No: 00000001      Booking No: 00000001
  Guest Name: Florida National Dental Congress
     Post As: Florida National Dental Congress
 Description: Reception
  Event Date: 01/01/68      Event Time:  07:00PM Name of Act:    Description:                     Price:
 The Malones     Versatile Dance Band          $3,500.00

Comments:
```

FIG. 3F

```
[■]────────────────────────ACCOUNTING ENTRY────────────────────────
    ┌─────────────────────────────────────────────────────────┐
    │                  Accounting Information                 │
    │                                                         │
    │   Event No.: 00000001      Booking No: 00000001         │
    │  Guest Name: Florida National Dental Congress           │
    │     Post As: Florida National Dental Congress           │
    │ Description: Reception                                  │
    │  Event Date: 01/01/68      Event Time:  07:00PM         │
    ├─────────────────────────────────────────────────────────┤
    │  Summary: Bill to Master Account                        │
    │     Food:                                               │
    │ Beverage: See above for charges                         │
    │    Labor: See above for charges                         │
    │   Set-Up:                                               │
    │ Special Arrangements:                                   │
    │                                                         │
    └─────────────────────────────────────────────────────────┘
```

FIG. 3G

```
=======================PRODUCTION SCHEDULE ENTRY=======================
Event No: 00000001    Guest: Florida National Dental Congress
Event Date: 05/01/92 Time: 07:00PM    Desc: Reception Date:     Start:    End:       Contact:
02/13/92  08:50PM              Charles Steadham
02/13/92  09:15PM              Charles Steadham
02/13/92  10:00PM              Charles Steadham
02/13/92  11:00PM              Charles Steadham
02/14/92  09:00AM   10:00AM    Charles Steadham
02/14/92  10:30AM   10:45AM    Charles Steadham Detail:                                              Location:
Arrives on Delta Flight #209                         SNA Airport
Transfer to Hotel Via Airport Coach                  SNA Red Curb
Arrives at Hotel                                     Anaheim Marriott
Notify Client of Arrival                             Anaheim Marriott
Reconfirm details with Artists and Productio         By Phone
Production Meeting with Mr. Gunther                  Executive Offices
```

FIG. 3H

```
[■]═══════════════════════════DRAWING INFORMATION═══════════════════════════
    ┌─────────────────────────────────────────────────────────────────────┐
    │    Event No: 00000001      Booking No: 00000001   Event Date: 05/01/92│
    │       Guest: Reception                            Start Time:  07:00PM│
    │     Post As: Florida National Dental Congress     End Time:    10:30PM│
    │ Description: Reception                            End Date:   05/01/92│
    ├─────────────────────────────────────────────────────────────────────┤
    │   Facility Name: MARRIOTT'S ORLANDO WORLD CENTER                     │
    │      Room Name: GRAND BALLROOM                                       │
    │       Sections: VII                    to VIII                       │
    ├──────────────────────────────────────────┬──────────────────────────┤
    │ Description of Inventory Used    Amount  │    DRAWING STATS:        │
    │ 72" Round Table(s)                 32    │                          │
    │ Chair(s)                          322 ·  │  Drawing: Yes            │
    │ 6' X 8' X 32" Stage Module(s)      17    │  Created: 01/02/93       │
    │ Dance Floor Tile(s)                76    │  Updated: 01/02/93       │
    │                                          │                          │
    │                                          │  Fast Access:   No       │
    │                                          │  File Size(K):  N/A      │
    │                                          │                          │
    └──────────────────────────────────────────┴──────────────────────────┘
```

FIG. 31

```
[■]════════════════════EVENT ANIMATION AND SLIDE MANAGEENT════════════════
   ┌─────────────────────────────────────────────────────────────────────┐
   │  Event No: 00000011      Booking No: 1000      Event Date: 09/09/90 │
   │     Guest: MARRIOTT HOSTED RECEPTION           Start Time:          │
   │   Post As: G.M.D.C                               End Time:          │
   │Description: MARRIOTT HOSTED RECEPTION                               │
   ├─────────────────────────────────────────────────────────────────────┤
   │ Facility Name: MARRIOTT'S ORLANDO WORLD CENTER                      │
   │    Room Name: CRYSTAL BALLROOM              Sections: G    to H    │
   ├─────────────────────────────────────────────────────────────────────┤
   │                        Stored Animations:                           │
   │ Filename Description                                                │
   │ GRAND1   Walktrough Animation of room                               │
   │                                                                     │
   ├─────────────────────────────────────────────────────────────────────┤
   │                          Stored Slides:                             │
   │ Filename Description                                                │
   │ TESTSTAG 3-Dimensional Looking at stage                             │
   │ STGT   2 View from stage                                            │
   └─────────────────────────────────────────────────────────────────────┘
```

FIG. 3K

[■] PRINT ECs FOR A GROUP

Print ECs For:

Booking No: 00000001
Menu No: 1

FIG. 3M

```
[■]====PRINT PROPOSAL====

Print Proposal For:

Booking No: 00000001
     Menu No: 1
```

FIG. 3N

```
[■]====PRINT SCHEDULE====

Print Production
     Schedule for:

Booking No: 00000001
```

FIG. 30

```
[■]═══CAD/EM SETTINGS═══

System Mode:
     CAD/EM

Facility No: F0024
       Event No:
       Group No:
     Data Drive: K:
```

FIG. 3P

```
[■]════════════════PRINT INVENTORY REPORT═══════════════

Inventory Report For: MARRIOTT'S ORLANDO WORLD CENTER

Date to Report: 01/04/93      Sort Option: EVENT
   Starting Time: 6:00A          Event Type: BOTH
     Ending Time: 11:00P          Output To: SCREEN
```

FIG. 3Q

```
[■]════════════════EXTRACT TEMPLATE════════════════

Extract Template from Event No: 00000001

Type: TABLE
         Name: CONFERENCE
  Description: CONFERENCE ROOM SEATING FOR 45
     Location:
```

FIG. 3R

```
[■]=======STAGING TEMPLATE INFORMATION=======
            ID: 42
          Name: DANCE FLOOR 3
   Description: 3 STAGES WITH DFLOOR
      Location: BC
```

FIG. 3S

```
[■]==========LAYOUT TEMPLATE INFORMATION==========
           ID: 5
         Name: NRCA 1991
  Description: DIAMOND SHAPED
```

FIG. 3U1
```
[■]════════════════════════════GUEST ENTRY════════════════════════════
    ┌─────────────────────────────────────────────────────────────┐
    │              Guest Name Information          Page 1 of 4    │
    │  Guest#: 000001              Client List: Y   Reference List: Y │
    │    Name: Blade Software, Inc.                               │
    │Division: CAD/EM Development Division                         │
    │ Post As: Blade Software, Inc.                               │
    │  Street: 227 S.W. 4th Avenue                                │
    │                                                             │
    │ Mailing: P.O. Box 1556                                      │
    │                                                             │
    │    City: Gainesville              ST: FL                    │
    │Zip Code: 32602-2266          Country: USA                   │
    │   Phone: (904) 372-8158                                     │
    │     Fax: (904) 372-1700        Modem: (904) 372-1700        │
    └─────────────────────────────────────────────────────────────┘
```

FIG. 3U2
```
[■]════════════════════════════GUEST ENTRY════════════════════════════
    ┌─────────────────────────────────────────────────────────────┐
    │              Guest Contact Information       Page 2 of 4    │
    │ Pre: First:      Last:            Title:                    │
    │ Mr.  Charles     Steadham         President                 │
    │ Mr.  Daniel      Boccabella       Project Manager           │
    │ Mr.  Matthew     Fuller           Systems Analyst           │
    │ Mr.  Tim         Manion           Systems Analyst           │
    │                                                             │
    │ Office Phone: Office Location/Ext: Home Phone:  Salutation: │
    │ (904) 372-8158                                   Last       │
    │ (904) 372-5233                     (904) 375-1290 Dan       │
    │ (904) 372-8158                     (904) 373-0518 First     │
    │ (904) 372-5233                     (903) 375-3501 First     │
    └─────────────────────────────────────────────────────────────┘
```

FIG. 3U3

```
[■]════════════════════════════GUEST ENTRY════════════════════════════
    ┌─────────────────────────────────────────────────────────────┐
    │              Correspondence Information      Page 3 of 4    │
    │                                                             │
    │  Date:     Time:    With Who:          Regarding:           │
    │  05/10/92  05:10AM  CHARLES STEADHAM   CAD/EM INSTALLATION AND LUAU │
    │                                                             │
    │                                                             │
    │                                                             │
    │  Comment:                                                   │
    │  JUST A FRIENDLY CHAT                                       │
    │                                                             │
    │                                                             │
    └─────────────────────────────────────────────────────────────┘
```

FIG. 3U4

```
[■]════════════════════════════GUEST ENTRY════════════════════════════
    ┌─────────────────────────────────────────────────────────────┐
    │              Guest Name Information           Page 4 of 4   │
    │  Guest List:                                                │
    │  Dan Boccabella                                             │
    │  Harold Fethe                                               │
    │  Matthew Fuller                                             │
    │  Tim Manion                                                 │
    │  Allen McCollum                                             │
    │  Chris Myers                                                │
    │  Charles Steadham                                           │
    │  Mary Thomas                                                │
    │                                                             │
    │                                                             │
    └─────────────────────────────────────────────────────────────┘
```

FIG. 3V1

```
[■]========================================FACILITY ENTRY=====================
            ┌─────────────────────────────────────────────────────────┐
            │         Facility Information        Page 1 of 3         │
            ├─────────────────────────────────────────────────────────┤
  Facility #: F0024
        Name: MARRIOTT'S ORLANDO WORLD CENTER
    Division:
      Street: 8701 WORLD CENTER DRIVE
              STATE ROAD 536 (EXIT 26A/EAST) AT I-4
        City: LAKE BUENA VISTA         State: FL
    Zip Code: 32830                  Country:
   Phone #'s: 407/239-4200
```

FIG. 3V2

```
[■]========================================FACILITY ENTRY=====================
            ┌─────────────────────────────────────────────────────────┐
            │          Contact Information        Page 2 of 3         │
            ├─────────────────────────────────────────────────────────┤
   Contact Name:         Contact Title:         Contact Phone:
   MR. B. J. KNAPP       CONVENTION SERVICE FL  407/239-4200
   MR. BILL ELGAN        DIRECTOR OF CONVENTIO Guest Room Information Number of Rooms: 1502    Number of Floors: 28 FLOORS 1 TOWERS, 2
  Suites/Parlors:  101     Tariff Plan:      EUROPEAN
  Double Doubles:  820     Check-in Time:    4:00 P.M.
  Kings:           569     Check-out-time:   11:00 A.M.
```

FIG. 3V3

```
[■]========================================FACILITY ENTRY=====================
            ┌─────────────────────────────────────────────────────────┐
            │       Facility Rooms Information    Page 3 of 3         │
            ├─────────────────────────────────────────────────────────┤
   Facility Rooms: GRAND BALLROOM
                   CRYSTAL BALLROOM
                   ROYAL PALMS BALLROOM
                   BALLROOM FOYER
                   POOLSIDE (OUTDOORS)
```

FIG. 3W

```
═══════SECTION ENTRY═══════

Fac No: F0024      Fac Name: MARRIOTT'S ORLANDO WORLD CENTER
Section No: 1      Section Name: I
   Room No: 1         Room Name: GRAND BALLROOM
  Drawing: Yes        Continous: Y LL X: 383    inches    LL Y: 2459    inches
     UR X: 893    inches    UR Y: 2715    inches
    Width: 43     feet     Depth: 21      feet
```

FIG. 3X

```
[■]===============ROOM LAYOUT SETTINGS===============
    ┌─────────────────────────────────────────────────┐
    │  Room No: 1      GRAND BALLROOM                 │
    ├─────────────────────────────────────────────────┤
    │  Wall to Center of Table:        120   inches   │
    │  Wall to Edge of Stage:           60   inches   │
    │  Edge of Stage to Dance Floor:    48   inches   │
    │  Dance Floor to Center Table:    130   inches   │
    └─────────────────────────────────────────────────┘
```

FIG. 3Y

```
═══════════════════════════EMPLOYEE ENTRY═══════════════════════════

Employee Information For: MARRIOTT'S ORLANDO WORLD CENTER

SSN #: 212-84-4412  Type: INT  Status: A         Updated: 01/04/93

Name: Dan Boccabella                     Interviewed:
Title: Systems Analyst                          Hired:
Phone: 375-1290              Initials: DAN Terminated:

Street: P.O. Box 1556                           Birthdate: 05/21/69

City: Gainesville           ST: FL    Zip: 32602

Contact(s):                      Relationship:    Phone:
Dan Boccabella, Sr.              Father           (813) 549-5526

Comments: He developed this 'incredible' system
```

FIG. 3Z
[■]

=====VENDOR ENTRY=====

Vendor#: 000006                              Type: S&L
Company: First Class Sound & Light
Division:
Street:  101 First Street
Mailing: PO Box 101
City:    Gainesville                         ST: FL
Zip:     32601                               Country: USA
Phone:   (904) 336-6237
Fax:     (904) 225-5144

Pre:     First:       Last:         Suf:     Title:
Mr.      Jonathon     Thomason               Production Engineer

FIG. 3Z1

```
[■]═══════════════════════FOOD AND BEVERAGE ENTRY═══════════════════
   Item No: 0000153   Course: "LITE" LUNCHEONS
   Item Name: "Pineapple Ring Tropicana"
   Default Price:         Default Unit:

Item Detail:
   A Fresh Pineapple filled with Chicken Salad
   garnished with Fresh Tomato wedges and White
   Asparagus. Served with Banana Nut Bread.

Ingredients:                   Amount/Serving   Order Unit
```

FIG. 3Z2

```
═══════════════════════════════ THEME ENTRY ═══════════════════════════════

Theme Information

Theme No: 00000011
    Theme Name: "1ST TEA"
    Promo No: 00000001      Desc: ORLANDO WORLD CENTER COVER Price:              Comments:

Item#: BUI: Item Name:                              Qty:    Price:
    001066      Displays of Herbal Teas to include:
    001069      Freshly Baked Tea Rings
    001072      Freshly Brewed Coffee
    001075      Honey Butter and Berried Preserves
```

FIG. 3Z3

──────PROMO ENTRY──────

Promo No: 1
Promo Description: ORLANDO WORLD CENTER COVER

Verbage:
≤MARG 1,7.5≥ ≤VMAR .5,10≥ ≤LEAD 20/72≥ ≤FONT TIME≥ ≤POINTS 18≥ ≤POS @LEFT, 2≥ ≤WEIG BO≥ ≤CENT @RIGHT, "Marriott's Orlando World Center"≥ ≤CENT @RIGHT, "Receives Four"≥ ≤CENT @RIGHT, "Prestigious Meeting Industry Awards"≥ ≤SKIP 1.5≥≤POINTS 12≥≤WEIG NO≥≤LEAD 14/72≥ Marriott's Orlando World Center continues to receive the highest achievements of excellence awards in the meeting industry from four leading trade publications. The 1,503-room hotel captured the 1989 ≤UNDE ON≥Successful Meetings≤UNDE OFF≥ magazine's ≤ITAL ON≥"Pinnacle Award" ,≤ITAL OFF≥ ≤UNDE ON≥Meetings and Conventions≤UNDE OFF≥ magazine's ≤ITAL ON≥"Gold Key Award"≤ITAL OFF≥, and ≤UNDE ON≥Corporate & Incentive Travel ≤UNDE OFF≥ magazine's ≤ITAL ON≥"Award of Excellence"≤ITAL OFF≥, and ≤UNDE ON≥Medical Meetings≤UNDE OFF≥ magazine's, ≤ITAL ON≥"Merit of Distinction Award"≤ITAL OFF≥. ≤SKIP 2≥ The readers of ≤UNDE ON≥Successful Meetings≤UNDE OFF≥, 77,000 corporate association executives with meeting planning responsibilities, chose Marriott's Orlando World Center as a ≤ITAL ON≥Pinnacle Award≤ITAL OFF≥ recipient based on the hotel's service, meeting

FIG. 3Z4

```
[■]═══════════════════════════INVENTORY MAINTENANCE═══════════════════════════
        Name:      TOP72
  Description:     72" Round Table(s)
       Amount:     176
```

FIG. 3Z5

```
┌─────────────────────────COMMENT ENTRY─────────────────────────┐
│ Abbreviation: BEVTAX91                    Type: BEVERAGE      │
│       Title: * * EFFECTIVE JULY 1, 1991:   BIU: B             │
│     Comment: the State of Florida instituted an Alcoholic Beverage
│              Surcharge applicable at the following rates: 12.5 cents per 1
│              1/4 ounces of liquor, 15 cents per 6 ounces of wine, and 4
│              cents per 12 ounces of beer. The charge will be added to your
│              account.                                         │
└───────────────────────────────────────────────────────────────┘
```

FIG. 3Z6

```
[■]════════════════════════MESSAGE ENTRY══════════════════════════

Msg No: 00000135   Date: 01/04/93   Time: 07:07PM

To: CVS MAF JEF                 Status: REG
     From: DAN
  Company: BLADE AGENCY
 Phone No: 372-8158          City/State:
  Message: MEETING ON 1/5/93 RE TO PATENT
           APPLICATION Sent By: DAN            Read:
```

FIG. 3Z7

[■]══ASSIGN SEATING══

Assign Seating for:

Event No:

FIG. 3Z8
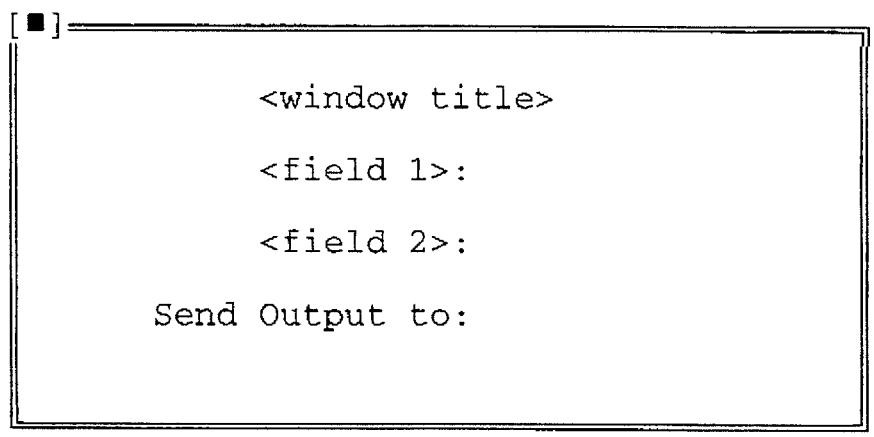

FIG. 4A

```
[■]===============ROOM INFORMATION===============

Table Information

Attendance: 500
  Layout    : STAGGER
  Table Type: 10TOP72

Staging Information

Staging Type: BC
  Stage Height:      24   Inches
  Stage Depth:       24   Feet
  Stage Width:       32   Feet
  Dance Floor Depth:     45 Feet
  Dance Floor Width:     15 Feet
```

FIG. 4B

```
[■]======VIEW DRAWING=========

View Drawing for:

Event No: 00000001
  Build Legend: Yes
```

FIG. 4C

```
[■]═══════════════════════GUEST SEATING ASSIGNMENT═══════════════════════

Event No: 00000001     Date: 05/01/92         Time: 07:00PM
     Guest: Florida National Dental Congress
 Meal/Desc: Reception
    Table#: 6             Room: GRAND BALLROOM Seating Arrangement: Dan Boccabella
                       Charles Steadham
                       Tim Manion
                       Not Assigned
                       Not Assigned
                       Not Assigned
                       Not Assigned
                       Not Assigned
                       Not Assigned
                       Not Assigned
```

FIG. 4D

```
[■]===============EXTRACT TEMPLATE================

Extract Template from Event No: 00000001

Type: TABLE
         Name: CONFERENCE
  Description: CONFERENCE ROOM SEATING FOR 45
     Location:
```

FIG. 4E

```
[■]====CREATE DRAWING=======

Create Drawing for:

Event No: 00000001

```

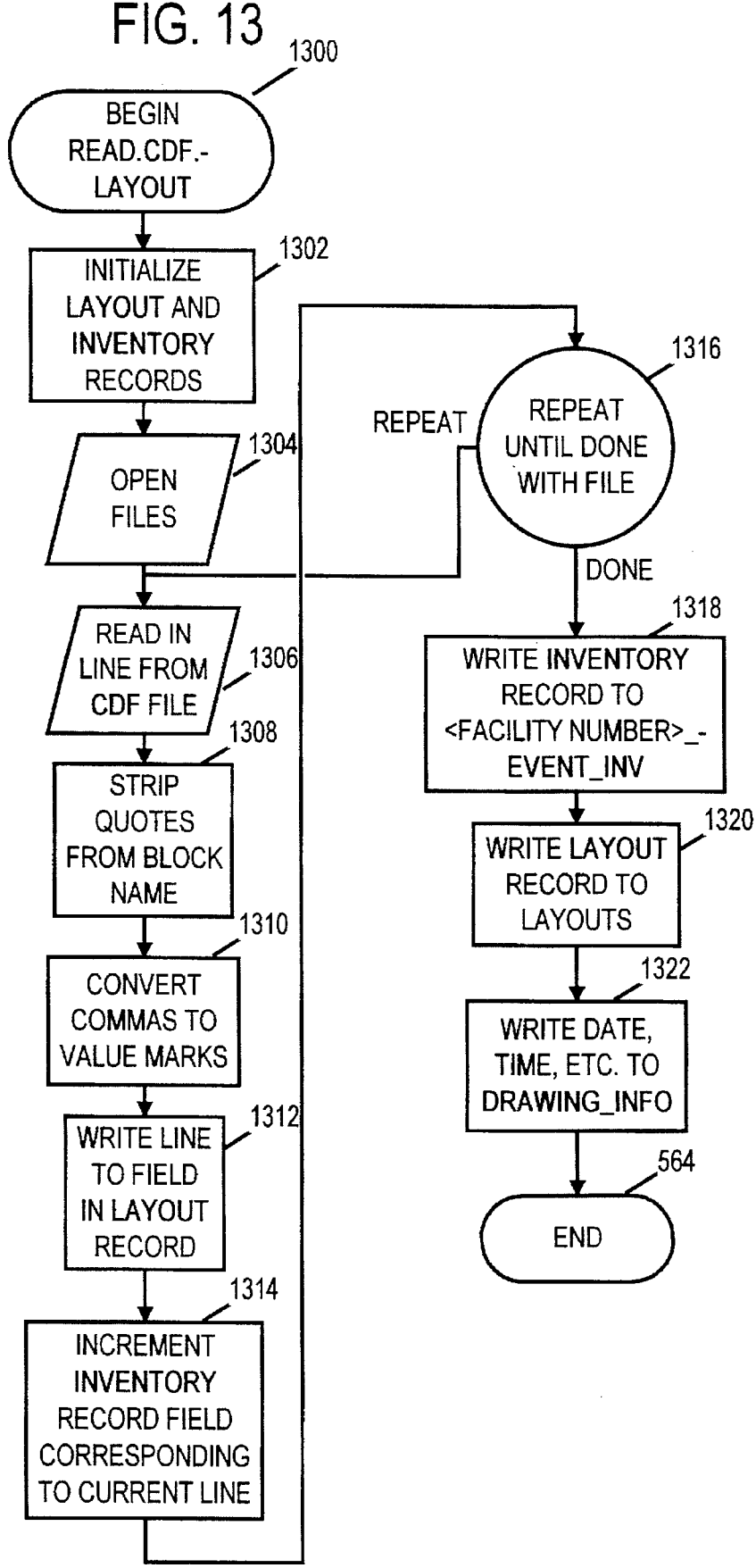

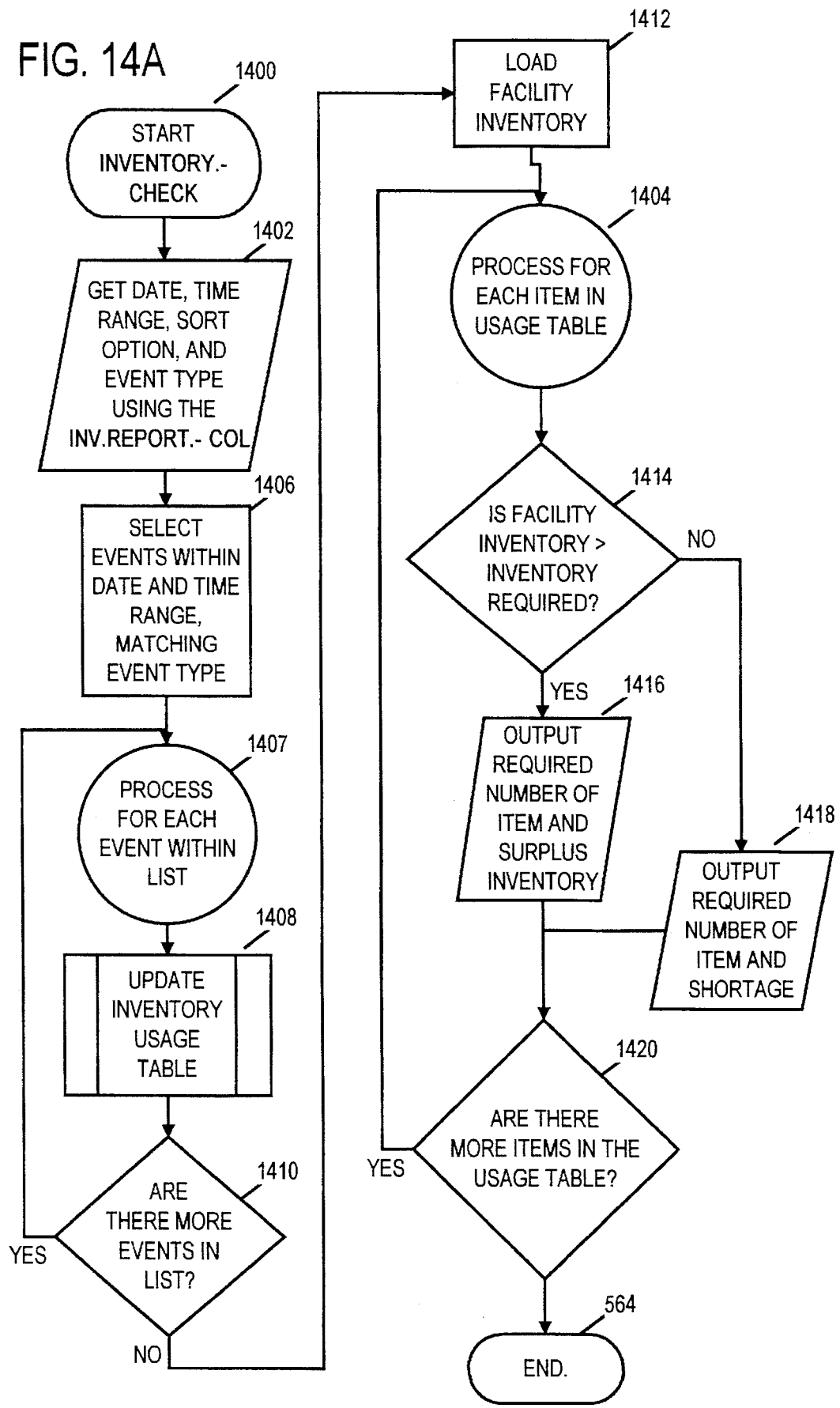

EVENT MANAGEMENT SYSTEM

BACKGROUND OF THE INVENTION

The present invention relates to a computer integrated event management system designed for use by hotels and entertainment producers in hotels and other facilities in which banquets, meetings, shows, and other programs are held. Providers of decor can also use the present invention.

In the meeting planning business, events, such as an annual meetings, are usually booked at hotels having conference and other meeting facilities. In addition, rooms for housing meeting attendees are also booked. Due to the many tens of thousands of such meetings which are held worldwide every year, hotels and other facilities having such meeting capabilities are often asked to prepare hundreds, if not thousands, of different proposals and bids every year. The preparation of such proposals and bids, up until now, has been a time-consuming and expensive process in terms of the cost and number of personnel to prepare such bids and proposals. Also, an extended lead time is often required within which to respond to such requests for bids and proposals from potential clients.

In addition, since in many instances the client requesting the bid or proposal is not certain as to the type of room within which to hold the event, nor the manner in which the room is to be laid out, it is also often desirable to provide the client with a number of different scenarios which would accommodate the client's planned meetings. The preparation of drawings depicting the different layouts possible for meeting the client's criteria for the planned meetings likewise requires a tremendous amount of manual work and, therefore, time and expense.

After a client has decided to book an event or meeting at a certain hotel or other facility, the final layout of each of the rooms which will be utilized for the client's event must be finalized. Based upon the layout of each of the rooms, which is, of course, dependent upon, among other things, the number of attendees, the type of meals, if any, to be served, the type and number of speakers or entertainment to be present at various times during each of the meetings, etc., various inventory requirements must be met. Such inventory requirements include, among other items, the number and type of chairs, the number and type of tables, the size of any dance floor, the size of any stage, the number and types of podiums, stage modules, and followspot towers needed, as well as, for example, any special requirements, such as a movie screen or overhead projector. Also, it is necessary to ensure that the facility at which the meetings are to be held will have an adequate number of each of the inventory items required for each of the meetings being held at that facility at that time, as well as an adequate number of waiters and housemen for setting up and resetting the rooms.

As discussed above, it should be apparent that the present process for event planning and the implementation of the event, from the sales proposal to the contract to selecting the appropriate space and allocating the required convention service inventory to generating the event contract (EC) and updating the room layout to finally providing for an efficiently generated and implemented menu together with labor management for food ordering, is primarily performed manually with great inefficiencies. For example, it is difficult to manage and keep track of how much lettuce needs to be ordered for salads which will be served during meals which occur during the planned meetings, as well as to efficiently order and control the costs for both the food to be consumed during such meals and the labor for producing and serving such meals.

The present invention overcomes the foregoing deficiencies and other problems by providing a computerized, fully integrated, networkable and relational database system which allows all members of the facility's team involved in the life cycle of an event to work together from a common system with a minimum amount of training. The present invention provides a complete event management system that encompasses the entire process of event planning and implementation. Beginning from the sales proposal, the present invention allows the easy generation of two-dimensional and three-dimensional layouts and animations, the issuance of the contract, selecting from the appropriate space and allocating the required convention service inventory in order to generate the event contract, as well as updating the room layout. The present invention also provides for the necessary functions for implementing the event, from efficient menu and labor management to improved food ordering and cost management and from the ordering of food to analyzing room usage.

The present invention also allows the user to automatically generate and print room layouts in less time than that required to make a simple hand sketch. Each of the layouts is drawn to an exact scale so that there is no guesswork regarding how much space is left in the room or how many tables can be added. Since every element in the drawings can be controlled by the user, changes can be made to each event drawing, which are instantaneously reflected in the fully relational database. That serves to automatically update the information stored in the system relating to other functions, such as updating ECs, the available inventory and guest seating arrangements.

The present invention also allows for the easy creation of ECs, and, since the data in the ECs is tied to a fully relational database, each EC can be totalled individually, checked for accuracy, totalled as a group, and managed collectively far more efficiently than known in the prior art. Any changes made to the original event proposal are automatically reflected in the ECs which are implemented to effectuate the proposal, thus reducing the possibility of clerical errors. Completely new ECs can be easily generated by the user and can be readily revised as required. Each update of an EC displays a dated notice in order to ensure proper communication and billing.

SUMMARY AND OBJECTS OF THE INVENTION

It is, therefore, an object of the present invention to provide an event management system that coordinates the entire process of event planning and implementation. The system consists of specialized software combined with a microcomputer network which includes a network fileserver, computer-aided-design/DATA (CAD/DATA) station and DATA stations where facility personnel are able to efficiently plan and implement events.

It is another object of the present invention to provide for an event management system which produces fast, cost-effective and accurate room layouts which are automatically drawn to scale using stored data from original architectural plans and actual room detail. Those layouts can be generated from within the database of the present invention or can be created and/or modified from within the CAD environment.

It is a further object of the present invention to provide for an event management system which makes more efficient use of human resources by providing pictorial layout diagrams which prevent communication errors when setting up rooms, thus reducing the frequency of costly resettings of meeting rooms.

It is an additional object of the present invention to provide an event management system which provides for electronic site inspections of the meeting rooms of a facility by means of a modem, diskette, or other transportable data storage device.

It is yet another object of the present invention to provide an event management system which utilizes a relational database in order to enable control of a convention services inventory.

It is a still further object of the present invention to provide for an event management system having an efficient and flexible format such that changes to the event planning or implementation of the planned event can be readily made.

It is a still further object of the present invention to provide an event management system which provides a realistic and compelling demonstration of an event room layout, as well as an animation of that layout.

It is yet an additional object of the present invention to provide for an event management system which allows for the viewing of a meeting room layout from any desired angle within the meeting room.

The hardware system of the present invention consists of a network fileserver through which a combination CAD/DATA workstation and a plurality of DATA workstations are connected via a Novell or other type network. All of the data entered by each of the workstations is stored on a storage device contained within the network fileserver. However, only the combination CAD/DATA workstation has the capabilities of generating and allowing manipulation of drawings of the room layouts. For that purpose, the CAD/DATA workstation is provided with a digitizer or mouse device as an input device, in addition to the standard keyboard.

The room layouts and animated three-dimensional drawings generated by the CAD/DATA workstation may be recorded on a videocassette recorder so that a standard videocassette can be given and/or sent to a client showing the proposed or actual room layouts. The CAD/DATA station may also include a standard modem device for transmitting generated drawings and animation to remote locations. All of the microcomputers utilized in the hardware system may be provided with an uninterruptible power supply, as well as with various monitors and printers.

The software of the event management system is organized into three main programs which are supported by numerous subroutines and functions. The EVENT MANAGEMENT/DATA (EM/DATA) module is designed to provide a complete facility and event management package for the meeting planning and hospitality industries. It manages all relevant event information, including that relating to facilities, guests, vendors, inventory, food and beverage, decor, entertainment, and production schedules. It is constructed as a fully relational database. Thus, whenever a piece of information is changed in one place, it is automatically changed everywhere it is stored in the database. In addition, any conceivable aspect of an event that could be affected by a change is updated to account for the change.

The EM/DATA module, in addition to tracking events that have already been scheduled, can be used to generate and print event proposals. Information such as proposed menus, themes, and entertainment, can be output and is completely editable, as is all other information managed by the EM/DATA module, by the user. In addition, the word processing needs associated with the EM/DATA module have been provided for by incorporating a standard, readily available word processing package into the event management system. Thus, major text editing is exported to a word processing package, then brought back to the EM/DATA module once editing is complete. Such a design allows the user to produce letters, memos, and facsimiles using information already stored in the database, such as addresses and contact names.

The second main program is known as the EVENT/CAD program. It provides two-dimensional and three-dimensional designs of an event layout, multiple perspective views and "walk-through" animation, as well as an efficient mechanism for making changes and adjustments to any drawing. All changes can be automatically exported back to the EM/DATA module.

The EVENT/CAD module uses a CAD-based system to create highly accurate, detailed drawings and complex three-dimensional representations of buildings and layouts. The EVENT/CAD program reduces the task of producing these models to a simple menu-driven process that can be performed by anyone, even those having little or no technical skill. The EVENT/CAD module enables users to produce and modify complex, accurate event simulations quickly and easily.

The third module or program provides the bridge or bond between the EM/DATA and EVENT/CAD environments or programs. It is called the DATABOND program. This bond enables the EM/DATA program to automatically generate three-dimensional models of an event in the EVENT/CAD environment. In addition to generating a graphical model from the EM/DATA program database, the DATABOND module provides the links between the model and data to ensure that changes to either the drawing or the data are reflected in both the EM/DATA and EVENT/CAD programs. Thus, even though the EM/DATA database environment alone can track and compute inventory requirements by itself, and the EVENT/CAD module is fully capable of creating a physical model, the DATABOND module bonds those two modules together such that they completely interact and are no longer isolated from each other. For example, the inventory removed from a drawing in the EVENT/CAD program is also removed from the inventory requirements stored in the database in the EM/DATA program.

The DATABOND module permits the two modules to communicate by translating information from a database format into a graphic format readable by computer-aided-design software packages. The DATABOND module also translates the graphical information back into the database information stored in the EM/DATA program. In that manner, the DATABOND program allows the user to utilize the EM/DATA module to create a drawing of an event from scratch. However, although the DATABOND program completely automates the drawing process, the user still has absolute control of the room layout. The user can change the drawing in the EVENT/CAD program which will also change the information stored in the EM/DATA program.

With these and other objects, advantages and features of the invention that may become hereinafter apparent, the nature of the invention may be more clearly understood by reference to the following detailed description of the invention, the appended claims, and to the several drawings attached herein.

BRIEF DESCRIPTION OF THE DRAWINGS

FIGS. 2A–2B are a chart of the menu description for the EM/DATA and DATABOND program modules;

FIGS. 4A–4E are drawings of additional window screens used in connection with the EM/DATA and/or DATABOND program modules of the present invention;

FIG. 13 is a diagram of the flowchart of the READ.CDF.LAYOUT subroutine;

FIGS. 14A–14B are diagrams of the flowchart of the INVENTORY.CHECK subroutine;

FIGS. 55–56, 57A–57B and 58–69 are diagrams of flowcharts of additional subroutines which are used in connection with the EVENT/CAD program module of the present invention;

DETAILED DESCRIPTION OF THE PREFERRED EMBODIMENT

I. THE HARDWARE

Figure 1:
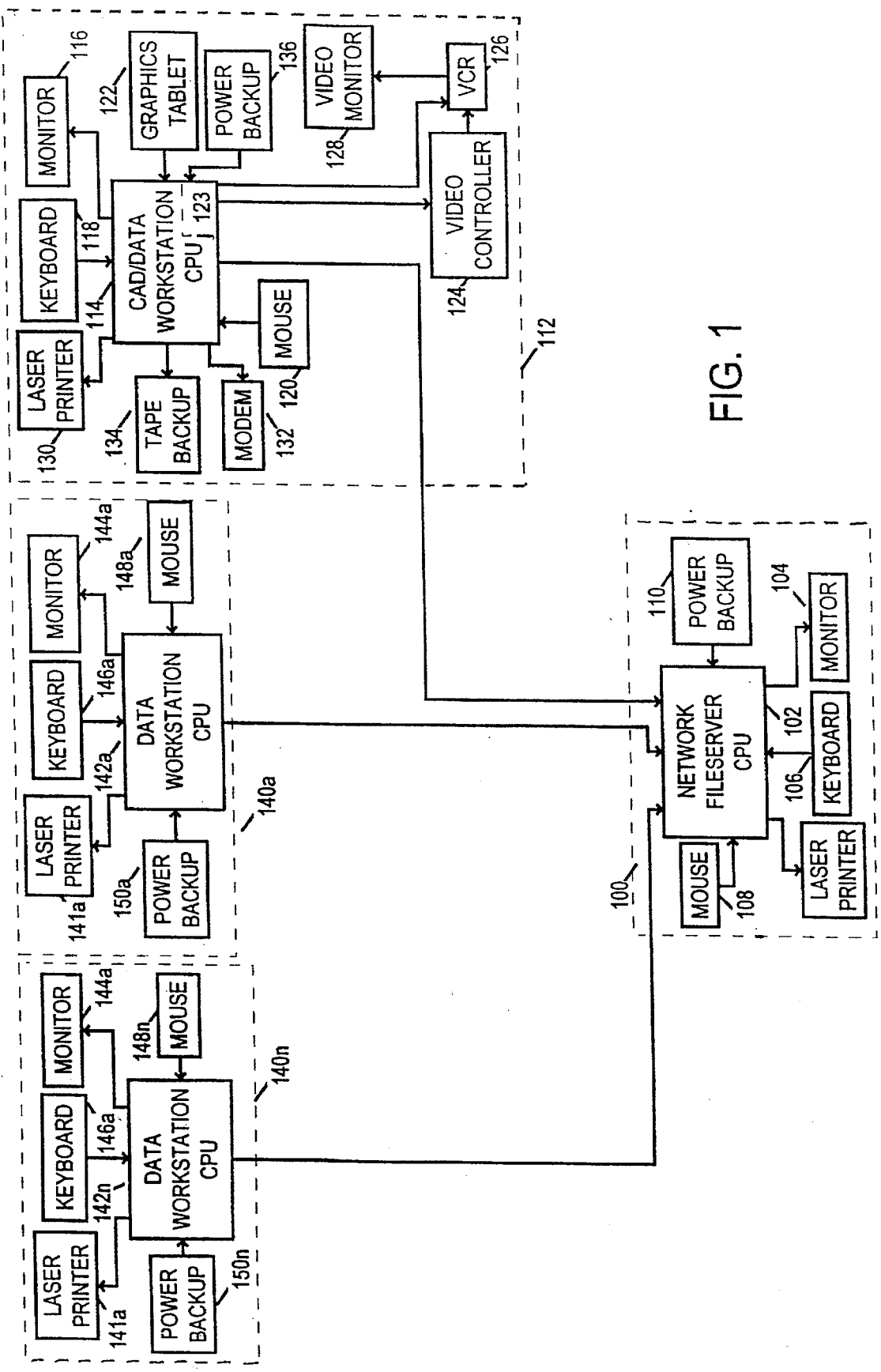
FIG. 1 is a schematic block diagram of the hardware of the event management system of the present invention.

Referring now in detail to the drawings wherein like parts are designated by like reference numerals throughout, there is illustrated in FIG. 1 the hardware system 10 of the present invention. The system uses microcomputer-based devices which are connected together into a network. Each of the computers is fully MS-DOS compatible and utilizes readily available software in addition to that developed as part of the invention herein. Obviously, other software products in the MS-DOS or Windows operating environment can be used. In addition, since the software described herein is written in a fourth generation language, it is portable to other operating systems, such as OS/2 and UNIX. Obviously, the invention disclosed herein can be utilized with other operating systems as well.

As described in this application, the event management system of the present invention is used in connection with the dedicated hardware system 10. However, as will be readily apparent to those of ordinary skill in the art, the hardware system 10 of the present invention may also be utilized to perform other functions at its host facility, in addition to those performed by the instant event management system.

Turning now to FIG. 1, a basic preferred hardware system is shown. More particularly, the hardware system 10 consists of a network fileserver 100 to which is connected, preferably using RG85 coaxial cable, a CAD/DATA station 112 and one or more DATA stations 140a–140n. Obviously, other types of connecting media can be utilized, such as optical fibers, infrared, or RF. At a minimum, the system of the present invention requires a network fileserver 100 and a CAD/DATA station 112 and appropriate peripheral devices in order to perform all of the functions described herein.

A. THE NETWORK FILESERVER

The network fileserver 100 consists of a network fileserver CPU which is supported by an uninterruptible power supply (UPS) 110. The network fileserver CPU 102 may preferably be either an IBM Model 95 PS/2 equipped with an Intel 80486DX 33-MHz processor with one serial and two parallel ports, a single 3.5-inch 1.44 Mb floppy drive, a hard drive having a storage capacity of at least 600 Mb and an access time of 13 ms or less, at least 64K of cache memory, at least 16 Mb RAM and a Novell Certified NE/2 16-bit ethernet card, or an IBM-compatible microcomputer of the 486 class having a 25-MHz-based microprocessor with one serial and two parallel ports, the same floppy drive, hard drive, cache and RAM memory as described above, a monochrome graphics card and a Novell Certified NE2000 16-bit ethernet card. A VGA monitor 104 is connected to the network fileserver, as is a standard keyboard 106 and an MS-DOS-compatible mouse 108.

The uninterruptible power supply 110 is preferably an American Power Corporation Novell Certified 600 watt UPS.

The network fileserver CPU 102 preferably has stored on its hard drive the following software:

Advanced Netware 386, Version 3.11, available from Novell, Inc., or other compatible network operating system;

Advanced Revelation 3.01, available from Revelation Technologies Inc., of Stamford, Conn., which is an advanced relational database used to store the data used by the EM/DATA and DATABOND modules;

R/Laser 3.2, available from Blackhawk Data, Inc., of Chicago, Ill., which is used for publishing information stored in the database set up by the Advanced Revelation 3.01 software; and WordPerfect 5.1, available from WordPerfect, Inc., of Orem, Utah, which is word processing software used by the EM/DATA module.

B. THE DATA WORKSTATIONS

The DATA workstations 140a–140n each consist of a DATA workstation CPU 142a–142n which in turn is supported by an uninterruptible power supply 150a–150n which may be the same UPS as the UPS 110 used with the network fileserver CPU 102. Each DATA workstation CPU 142a–142n may be an IBM Model 95 PS/2 with an Intel 80486DX 33-MHz-based processor with at least 32K of cache and at least 4 Mb RAM memory, a hard drive of at least 80 Mb storage capacity, a 5.25-inch 1.2 Mb floppy drive and a Novell Certified NE2 16-bit ethernet card.

Alternatively, each data workstation CPU may be an IBM-compatible microcomputer based upon an Intel 80486DX 33-MHZ-based processor having the same cache and RAM memory, hard and floppy drive characteristics described above and which also includes a Novell certified NE2000 16-bit ethernet card and a VGA graphics card.

A VGA color monitor 144a–144n is connected to each of the DATA workstation CPUs 142a–142n and may preferably be an NEC MultiSync Model 3DS VGA color monitor or equivalent. A keyboard 146a–146n is likewise connected to each DATA workstation CPU 142a–142n, as is a mouse 148a–148n. A laser printer 141a–141n is connected to each of the DATA workstation CPUs 142a–142n. Each laser printer 141a–141n may preferably be a Hewlett-Packard LaserJet Series 4 printer.

Each DATA workstation 140a–140n is designed and equipped to facilitate the entry of data into the database operated using the Advanced Revelation software for storage of all data and information used for operating the event management system of the present invention and all reports relating thereto. Only the functions relating to the drawings produced by the event management system of the present invention which utilize computer-aided-design software are not performed using the DATA workstations.

Residing on the hard drive of each of the DATA workstations 140a–140n are the EM/DATA and DATABOND modules, as well as the Autoflix Movie Compiler, available from Autodesk, Inc., of Sausalito, Calif., which is used by the EVENT/CAD module to provide walk-through animation that can operate on a microcomputer which is not running CAD software and Vslide 1.0, available from Mountain Software, of Charleston, W. Va., which is used along side of the AutoCAD software used by the EVENT/CAD module for viewing "slides" or drawings generated using the AutoCAD software used in the EVENT/CAD module.

C. THE CAD/DATA WORKSTATION

The CAD/DATA workstation CPU 114 of the CAD/DATA workstation 112 is connected to the network fileserver CPU 102, as previously described. The function of the CAD/DATA workstation 112 is to generate two-dimensional and three-dimensional designs of an event layout, multiple perspective views of an event layout, and "walk-through" animations of event layouts. It also provides an efficient means for making changes and adjustments to any drawing.

The CAD/DATA workstation 112 consists of a CAD/DATA workstation CPU 114 which is supported by a UPS 136. The CAD/DATA workstation CPU 114 may preferably be an IBM Model 95 PS/2 having an Intel 80486DX 33-MHz processor with two serial and one parallel ports, both 3.5-inch 1.44 Mb and 5.25-inch 1.2 Mb floppy drives, a hard disk drive having an access time of 13 ms or less and a storage capacity of 200 or more Mb, at least 64K cache memory and at least 8 Mb RAM memory and a Novell Certified NE/2 16-bit ethernet card.

Alternatively, the CAD/DATA workstation CPU 114 may consist of an IBM-compatible 486 class microcomputer using an 80486DX 33-MHz processor having the floppy drives, hard drive and memory specifications of the IBM Model 95 PS/2 computer described above, together with a Novell Certified NE2000 16-bit ethernet card and an Orchid Pro-Designer II graphics card with 1 Mb of RAM on the card. Either of foregoing two computers may be used since they are essentially interchangeable with each other and either will perform the necessary functions described herein.

A number of input devices are utilized with the CAD/DATA workstation CPU 114 in order to facilitate its function. They include a keyboard 118, a MicroSoft-compatible mouse 120, or a graphics tablet 122, which may preferably be a Summagraphics Summasketch II professional 12-inch× 18-inch digitizer with 16-button cursor, available from Summagraphics, of Seymour, Conn. A monitor 116 is also connected to the CAD/DATA workstation CPU 114. The monitor may preferably be an NEC MultiSync 4FG SVGA color monitor.

The CAD/DATA workstation CPU 114 may also be preferably provided with a tape backup 134, such as a Maynard MaynStream 600 tape backup unit, a modem 132, such as a 9600 Baud Hayes-compatible v.42bis modem, a laser printer 130, which may be the same laser printer as described in connection with elements 141a–141n and a video controller 124, together with a videocassette recorder/editor 126, and a television monitor 128. The video elements connected to the CAD/DATA workstation CPU 114 allow the output of the CAD/DATA workstation CPU 114 to be in a video format such that it can be shown on a television monitor, as well as recorded on a standard videocassette recorder/player tape cartridge for remote viewing.

The hardware provided with the CAD/DATA workstation 112 for adding video capability includes a video board 123 which may preferably be a Truevision Targa+/64 video board which is located inside the CPU 114. That video board is available from Truevision of Indianapolis, Ind. The videocontroller 124 may preferably be a BCD-5000 dual machine videocontroller, available from BCD Associates, of Oklahoma City, Okla., while the VCR 126 may preferably be a Panasonic AG-7750 videocassette recorder/editor. In addition, a Panasonic AG-7650 videocassette player (not shown) may also be utilized as part of the video capability of the CAD/DATA workstation 112. One or more televisions 128 may be connected to both the videocontroller 124 and the VCR 126 for displaying the drawings generated by the CAD/DATA workstation 112 in video format. Each of those televisions may be, for example, a Panasonic CT-1382Y color monitor.

Figure 54:
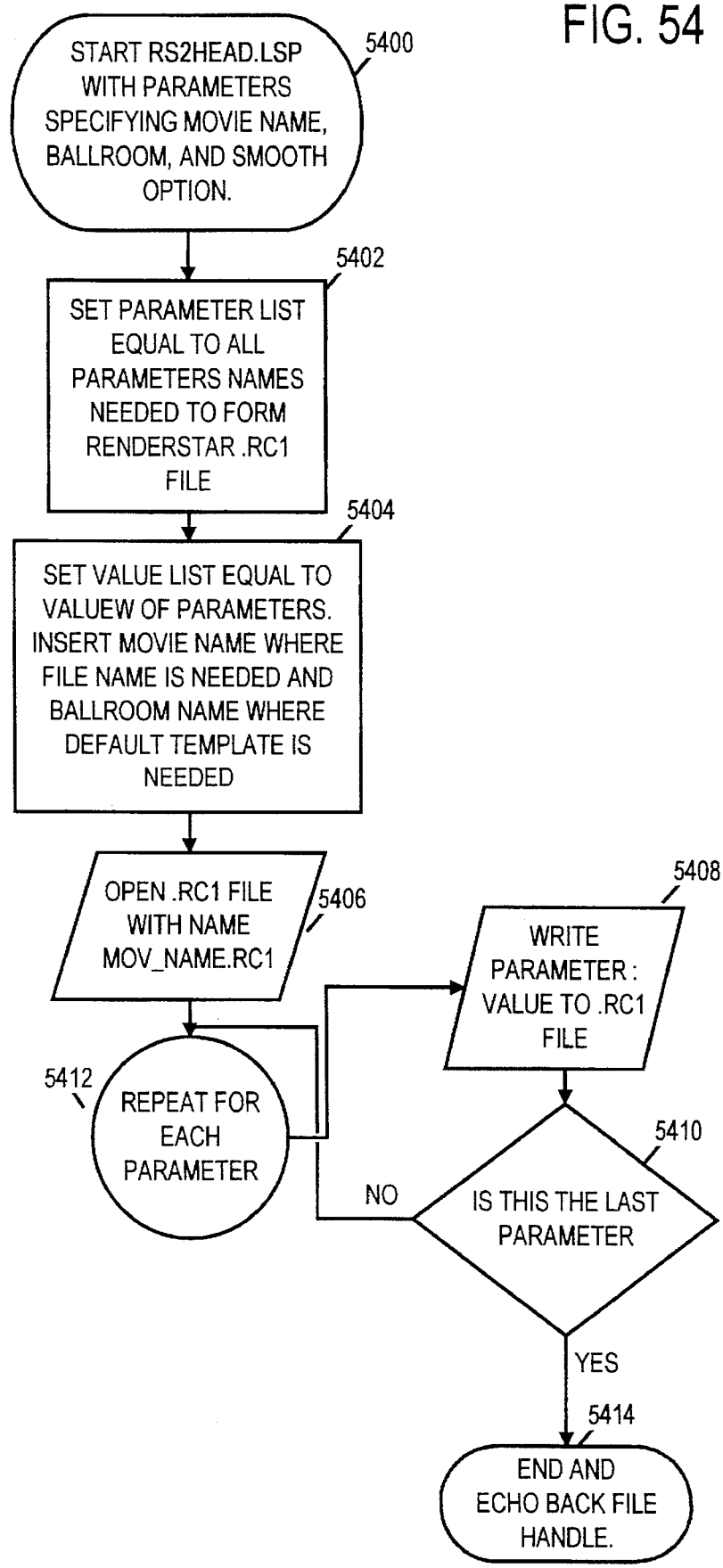
FIG. 54 is a diagram of the flowchart used in connection with the RS2TARGA software used in connection with the EVENT/CAD program module of the present invention.
Figure 70A:
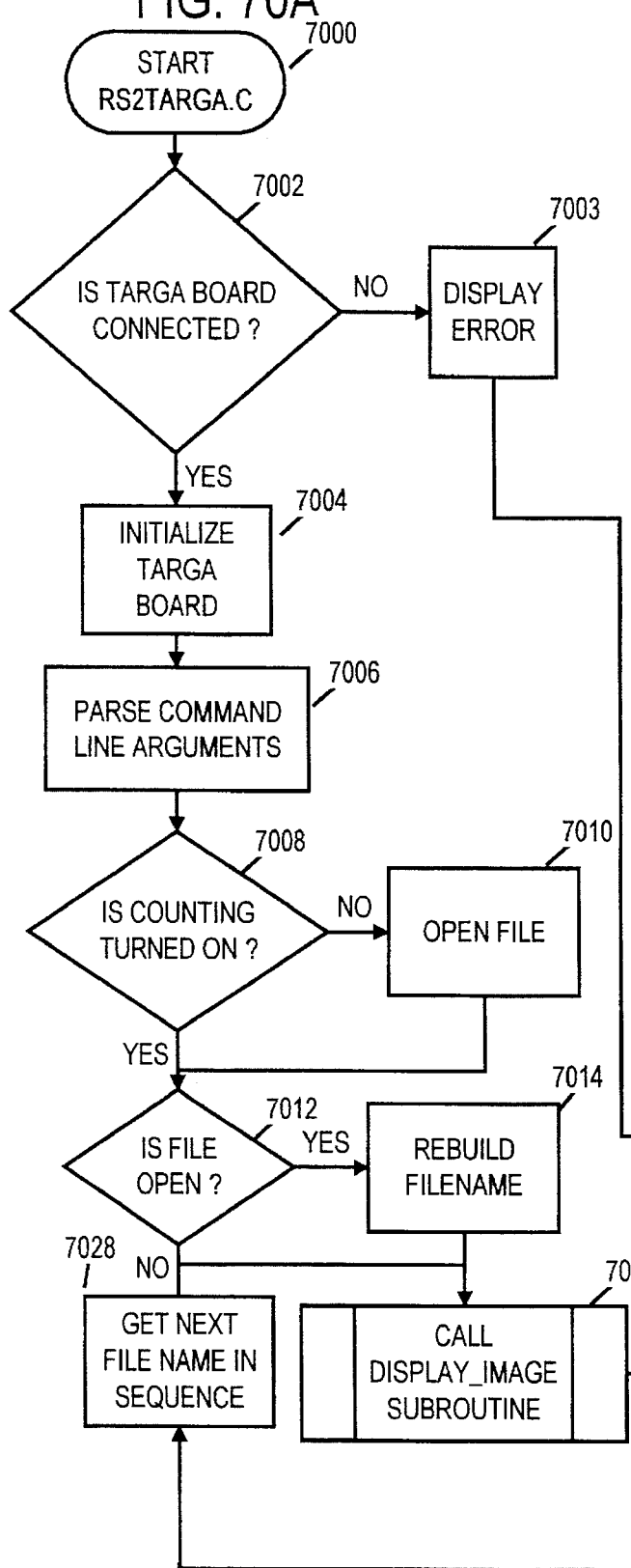
FIGS. 70A–70B are flowcharts of an additional program which forms a part of the RS2TARGA video software used in connection with the EVENT/CAD program module of the present invention.
Figure 70B:
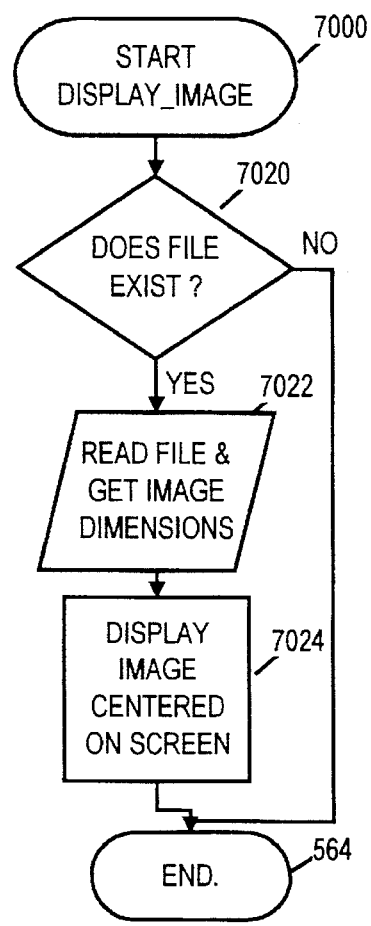

The CAD/DATA workstation 114 includes the following software in addition to the EVENT/CAD module of the present invention resident on the hard drive of the CPU 114:

AutoCAD 386, Release 12, from Autodesk, Inc., of Sausalito, Calif.; Autoflix Movie Compiler from Autodesk, Inc.; RenderStar 2, Extension 24, by Modern Medium, Inc., of Portland, Oreg., which is used in connection with the video output capabilities of the CAD/DATA workstation 114; and RS2Targa v1.2 software, which is also used with the video module connected to the CAD/DATA workstation CPU 114 for displaying the output from the CPU 114 in video format. That video display software forms a part of this invention. Flowcharts of that software are shown in FIGS. 54 and 70A-70B, and are described later in this application in connection with those figures.

II. THE DATABASE

Although the database for the EM/DATA program module is not shown in the figures, a description of its composition and organization is important to an understanding of the invention. The database is maintained on the hard drive of the network fileserver CPU 102, using the Advanced Revelation 3.01 software. Reports are printed using the R/Laser 3.2 software. The data and programs used by both the EM/DATA and DATABOND program modules are stored in the network fileserver CPU 102. Thus, the data entered in the EM/DATA module using the DATA workstations is stored in the network fileserver CPU 102. The data accessed by the CAD/DATA workstation 114 for use with the EVENT/CAD program module is also obtained from the data stored in the network fileserver CPU 102. Whenever any change to the stored data is made, either by means of a DATA workstation or the CAD/DATA workstation, any corresponding change that is to be made to any other data consistent with that initial change is also made to the appropriate data stored in the network fileserver CPU 102.

The data is stored in the database in two different applications, the EM/DATA application table and the DATABOND application table.

A. THE EM/DATA PROGRAM TABLE

The EM/DATA application is divided into a number of volumes, each of which includes a number of tables. The first volume is called the EMDATA volume. Each of those tables is described as follows: the EM FACILITY table contains general information concerning all facilities such as the name of the facility, the location, the address, the contact names at the facility, and the telephone numbers of those contact names, as well as the facility. The EVENT table is used to drive the CAD/EM program module. This table combines information from the GUEST, FACILITY, SECTION, and ROOM tables together to make an actual event. That is accomplished by using Symbolics to link data to different files. For example, in the EVENT file, there is a Symbolic for FACILITY_NAME that links EVENT to the EM_FACILITY table. Based on the event number, the correct name of the facility is returned from the EM_FACILITY file.

The GROUP table groups together events that occur during the same convention or meeting functions. There must be at least one group row for each event. There may be, and usually are, many events tied to this single group. The LAYOUTS table contains the room layouts in database form. Each row consists of an entire drawing. The columns in each row are the elements which make up the drawing. The layout rows are created initially by the INIT.LAYOUT subroutine of the DATABOND program. After a drawing is brought back from the EVENT/CAD program module, the row is updated with the READ.CDF.LAYOUT subroutine of the DATABOND program module.

The SECTION table contains information pertaining to the sections of each room of the facility. A section is the smallest portion of the room that can be separately allocated. For each section, the associated room and actual X and Y coordinates from architectural drawings are stored. The INIT.LAYOUT subroutine uses this table to determine where to position the elements to be located within the room, such as the staging, tables, and chairs.

The final table contained within the EMDATA volume is the VENDOR table which stores the names and addresses of support companies such as the sound and lighting providers, who are often used in connection with an event or convention.

Figure 14B:
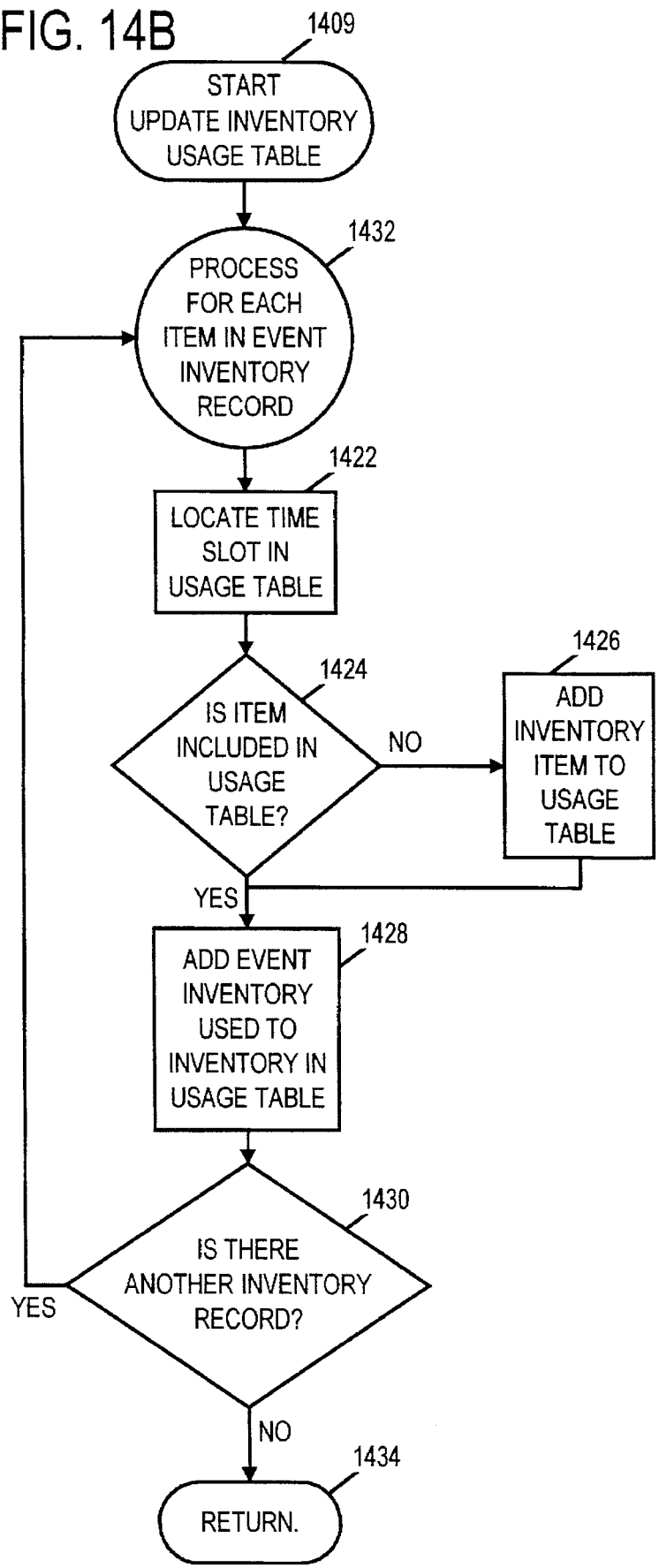
Figure 15:
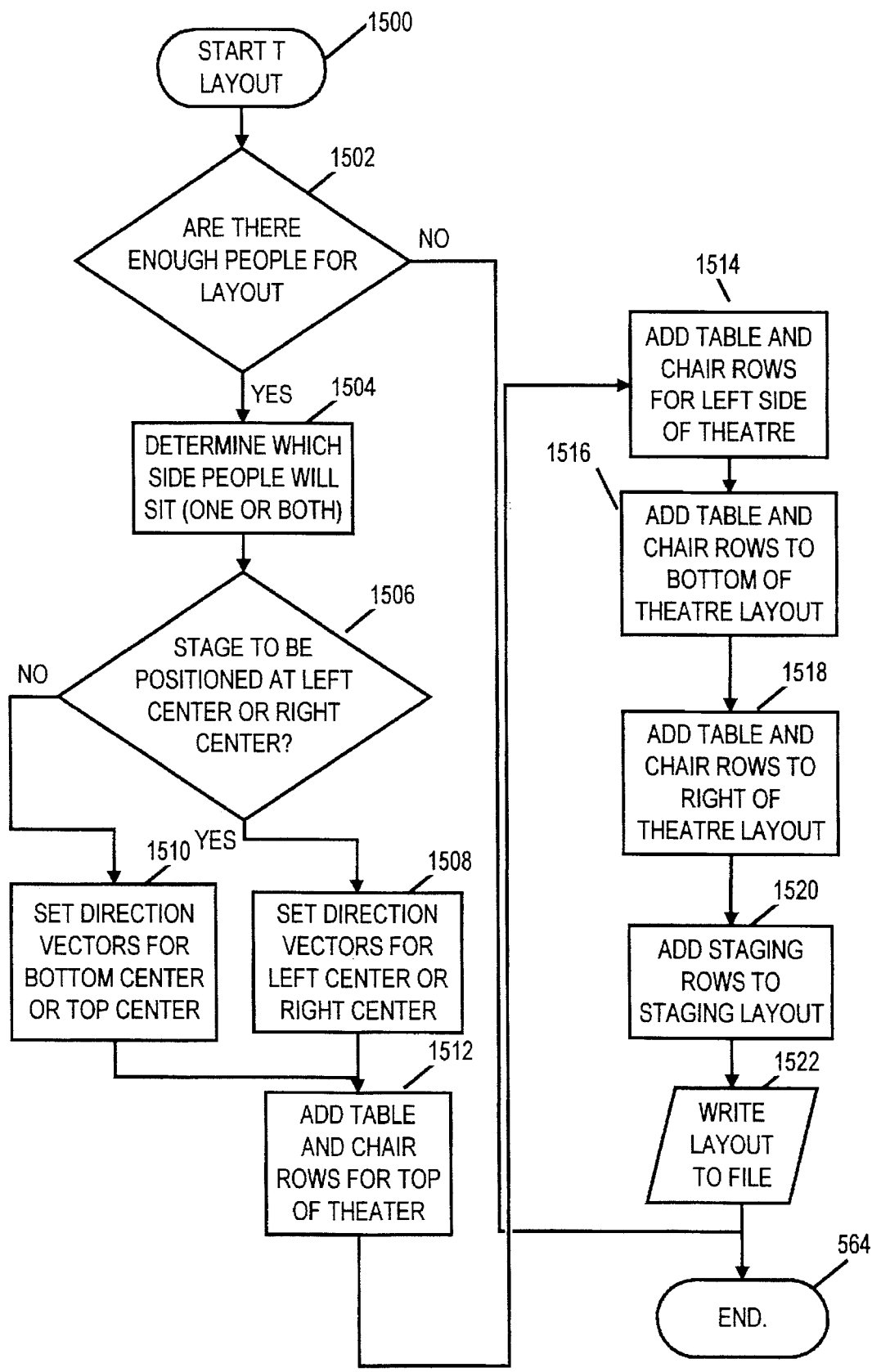
FIG. 15 is a diagram of the flowchart of the TLAYOUT subroutine.

The second volume contained within the EM/DATA application is the EMPROG volume. The first table of the EMPROG volume is the EMCAL_BP table which contains programs for tracking inventory usage by facility. Programs in this table are generally called to check room availability. The INVENTORY.CHECK subroutine, a diagram of the flowchart of which is shown in FIGS. 14A-14B, is contained in this table.

Another table located within the EMPROG volume is the EM_COMMON table. That table contains the global variables and definitions used in all other programs. Examples of global variables are FAC.NO$—the name of the current facility, DATA.DRIVE$—the physical letter of the hard drive that the data is stored on, and EVENT.NO$—the current event number that the user is working on. These are variables that are shared among several programs and windows.

The final table which forms a part of the EMPROG volume is the INV_BP table which contains programs for tracking inventory usage by event based upon the room layout. These programs collect data from the <FACILITY NUMBER>_EVENT_INV table. That table is one of the tables of the DATABOND program module. The programs in INV_BP are short routines for assigning inventory to an event for which a drawing has not been created. For example, if a user wants to create a schoolroom layout for 25 people, there is a program in INV-BP that is basically identical to SRLAYOUT, except that it just returns the total number of tables, chairs, etc., that is needed, not their locations.

The third volume of the EM/DATA program tables is the EMREPORT volume. The first table in that volume is the EC table which contains all of the necessary programs to print out an event contract. The second table is the EM_REPORTS table, which contains programs for printing out all of the miscellaneous reports, such as the water lists and turn schedules. The third and final table contained in the EMREPORT volume is the PROPOSAL table which contains all of the necessary programs for printing out the event proposal.

The fourth volume is called the EMUTIL volume and contains data and programs relating to various utilities used with the EM/DATA program module. The first table in the EMUTIL volume is the EM_MENU table, which contains all the menus for both the EM/DATA and DATABOND program modules. The next table in the EMUTIL volume is the EM_POPUPS table, which contains all the popup screen data for the EM/DATA program module. Most of these popups are called as options from windows in the EM/DATA program module.

The next table in the EMUTIL volume is the EM_POP_BP table, which contains all the support programs for the popups. The EM_POP_DATA table is where the data for the popups is stored.

The next table in the EMUTIL volume is the EM_SCR_BP table, which stores programs which support the windows. These programs include the default answers, input validation, output conversion, and other routines which are necessary to support the windows used in the EM/DATA program module.

Another table contained in the EMUTIL volume is the EM_UTIL table, which contains general utility programs for use with the EM/DATA program module, such as capitalization, printing, and file-opening routines. These routines are used throughout the EM/DATA program. The final table in the EMUTIL volume is the EM_WINDOW table. That table is where all of the windows for the EM/DATA and DATABOND programs are stored.

The fifth volume of tables used with the EM/DATA program module is the FOODDATA volume. That volume contains four tables, each of which stores information relating to the food used in connection with an event. The first table is called the <FACILITY NUMBER>_FOOD table. This table stores all the food and beverage selections which are available to the user of the EM/DATA program. The name, description, category, and price charged for such items are also stored in this table. The FOODDATA volume also contains a table entitled <FACILITY NUMBER>_THEME. A theme is a grouping of food items that constitute anything from a snack break to a six-course meal. This table stores those food items which are grouped together to constitute a theme.

The next table in the FOODDATA volume is called the FOOD_BEV table. That table stores information concerning the food requirements for each event. The final table in the FOODDATA volume is entitled MENU_BP. That table stores programs used to format and print out food and beverage menus.

The next volume of tables for the EM/DATA program is the MISCDATA volume. The first table of the MISCDATA volume is called <FACILITY NUMBER>_COMMENTS. That table stores comments and clauses which are to be used in reports. For example, a facility may have a standard footer concerning sales tax that the facility wishes to include on their reports. Such language would be entered into this table and would be referenced by the report programs. The next table of the MISCDATA volume is called the <FACILITY NUMBER>_EMPLOYEE table. This table stores information about the facility's employees. This table is referenced by messaging programs, letter-writing programs, and window programs.

The third table contained within the MISCDATA volume is called the PROD_DATA table. That table stores production scheduling information for each event. The next table is called the GUEST table. That table stores guest information such as the names, addresses, contacts, and phone numbers of the guests. The final two tables contained within the MISCDATA volume are the EMAIL and EMAIL_DATA tables. The EMAIL table contains electronic mail programs, while the EMAIL_DATA table is used for storing messages used by the programs stored in the EMAIL table.

The last volume of tables of the EM/DATA program is called the SHOWDATA volume. This volume contains three tables. The first table is called the ACCOUNTING table. That table contains the billing and accounting instructions for each event. The next table is called the DECOR table. That table stores information concerning the decor and lighting to be used for each event. The final table is termed the ENTERTAINMENT table, which is used to store entertainment selections for the events.

B. DATABOND PROGRAM TABLE DESCRIPTION

Like the EM/DATA program, the DATABOND program also utilizes a number of tables in order to facilitate the efficient operation of the event management system of the present invention. Each of those tables is described below.

The first table utilized by the DATABOND program is the DBOND table. That table contains all of the programs or subroutines that make up the DATABOND program module, such as INIT.LAYOUT, WRITE.DXF AND READ.CD-F.LAYOUT. The next table is called the DIVIDERS table and contains the coordinates and descriptions of the airwalls for each room. The third table is called the DRAWING_INFO table. It contains information concerning the physical drawing of the event, such as the last update, the creator's name, the file size, file data, etc. The next table is called the ERROR_CHECK_BP table. It contains programs that validate a user's input. For example, the ERROR_CHECK_BP table contains a program that makes sure that the dance floor size was specified as a multiple of 3 ft. because the dance floor pieces are each 3 ft.×3 ft. in size.

The next table contained within the DATABOND program is called the <FACILITY NUMBER>_EVENT_INV. That table contains the amounts of inventory allocated to a specific event and is usually collected from the drawing of the event. However, a user may assign inventory to a drawing without having created a drawing. The next table is the <FACILITY NUMBER>_FAC_INV table, which contains the physical inventory for the facility specified by <FACILITY NUMBER>. This table has a row for each inventory item that specifies the description and number on hand. For example, the row labelled "CHAIRS" might have a description of "standard mauve banquet chairs" and a total on-hand inventory of 3,500.

The next table is called the <FACILITY NUMBER>_ROOM table. It contains a row for each room in the facility that indicates if a drawing is on-line for that room. If the drawing is available, it will indicate the file name of the drawing. The next table is the <FACILITY NUMBER>_TOLERANCE table. That table contains the default parameters to be used for constructing a room. For each room in the facility, there is a row that contains parameters such as the wall-to-stage distance and the stage-to-dance-floor distance. That is used by programs in the DBOND table that layout the room.

The next table which forms a part of the DATABOND program is the LAYOUT_PROGS table. That table contains programs used by the INIT.LAYOUT subroutine to create special case room layouts that are not staggered or aligned. There is a separate program for each room layout specification or algorithm, such as for schoolroom layouts, U-shaped layouts, conference table layouts, etc. These programs are fed the coordinates of the room and the number of seats desired and use that information to generate the location and types of tables and chair needed to create the room.

The next table is the TEMPLATES_DXF table. That table contains the DXF representation of every graphic item needed to create a complete drawing. It contains templates which are read by the WRITE.DXF subroutine and combined with coordinates and data from the LAYOUTS table to create an actual DXF file to be brought into the EVENT/CAD program module. The next table is the TEMPLATES_STAGING table. It contains previously staged layouts that a user can "cut and paste" into their layout. It also contains information on the staging required and its relative placement.

The final table in the DATABOND program module is called TEMPLATES_TABLE. That table contains previously staged layouts that a user can "cut and paste" into their layout. It contains placement information and relative positions. The templates are divided into two files: TEMPLATES_STAGING and TEMPLATES_TABLE for two reasons. The first is manageability. When a user wants a list of staging templates, it is a lot easier to display all the rows in the TEMPLATES_STAGING table than to pick out which ones are stages, and which ones are chairs. The other reason is that scaling is different for tables and stages. When a user scales a table layout, he can "tighten up" or "space out" the layout. Staging is fixed and cannot be "spaced out" or gaps will be created between the stage modules.

III. THE SOFTWARE

A. THE EM/DATA PROGRAM

The EM/DATA program module is a complete facility and event management package for the meeting planning, hospitality and entertainment industries. It manages all relevant event information, including information about facilities, guests, vendors, inventory, food and beverage service, room decor, event entertainment, and production schedules. The EM/DATA program is a fully relational database based upon the Advanced Revelation 3.01 software. Therefore, whenever a piece of information is changed in one place, it is automatically changed everywhere it is stored in the database. In addition, any conceivable aspect of an event that could be affected by a change is updated to account for the change. The structure of the EM/DATA program module also makes it efficient in terms of data storage. Since it calculates information on-the-fly based on event parameters, the need for the entry of redundant data is eliminated. By eliminating the duplication of data, the design of the EM/DATA module reduces the possibility of errors made during data entry.

In addition to efficiently managing the data used with the instant event management system, the EM/DATA program module presents the data in a clear and usable fashion. The information screens in the EM/DATA module are logically organized in order to make the data easily available. Information is cross-referenced so that it can be accessed from throughout the event management system. For example, in order to locate information on a banquet, the user could reference the event by the name of the band, the room in which it was held, a guest's name, etc.

The EM/DATA program module also presents the data in the form of printed reports. In that manner, information from many different areas, such as inventory control, food services, and guest tables, can be brought together in an easy-to-read, standardized format. All standard reports used in the hotel industry are automatically printed by the EM/DATA program module, including event contracts, room turn schedules, event "water lists" and cart schedules, room seating assignments, inventory usage reports, facility utilization reports, and convention resumes. The EM/DATA program module automatically gathers and correlates this information and performs all of the calculations necessary for these reports.

In addition to its ability to track events that have already been scheduled, the EM/DATA program module can be used to generate and print event proposals. It can output such information as proposed menus, themes, decor, and entertainment. As with all information managed by the EM/DATA program module, the menus, themes, decor, and entertainment information is completely editable by the user.

In addition, word processing software has been incorporated into the event management system of the present invention. Major text editing is exported to word processing software, such as WordPerfect 5.1, and then brought back to the EM/DATA program module once the user has completed the editing. That structure also makes it possible for letters, memos and FAXes to be produced using information already stored in the EM/DATA program module database, such as addresses and contact names.

The EM/DATA and DATABOND program modules utilize the same set of menu functions and descriptions. Those menu descriptions are shown in FIGS. 2A and 2B. As shown in those figures, there are seven main menu items from which the user can select, namely, Event, Drawing, Reports, Utilities, Maintenance, Applications, and Exit. Within each main menu selection, there are various selections which enable the user to operate the event management system of the present invention. For example, in order to reach the EVENT/CAD program module of the present invention, the Drawing menu is selected. The user may then select either the Create or View/Edit submenu item, depending upon whether a new event drawing is to be made or an existing event drawing is to be edited. The EVENT/CAD program module is started upon selecting a View/Edit submenu item.

It is believed that one of ordinary skill in the art will readily understand the organization of both the EM/DATA and DATABOND program module descriptions by reference to FIGS. 2A and 2B.

The following is a description of the menu functions which are shared by both the EM/DATA and DATA BOND program modules. Appropriate references to diagrams of windows which are displayed for the user are made, as well as references to subroutines which form part of the EM/DATA and DATABOND program modules.

Figure 3J:
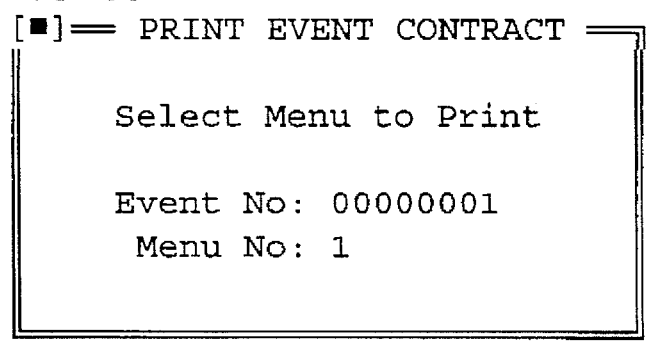
FIGS. 3A–3HH are drawings of window screens used in connection with the EM/DATA and/or DATABOND program modules of the present invention.

Referring both to FIGS. 2A and 2B and to FIGS. 3A–HH, when the user selects the Event menu item, several submenu items, all of which serve to gather information from the user, can be accessed. The first submenu item to be selected is a Group item which displays the group entry window shown in FIG. 3A. That screen is used to enter information regarding the group which is booking the event with which the user will be working as far as preparing a proposal and for ultimately implementing the event.

Figure 3L:
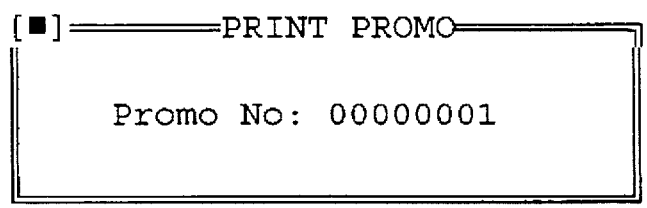

After the data requested in the group entry screen or window is entered, the user closes that window and then may open the event entry window. As can be seen in FIGS. 3B1–3B3, the data already inputted in the group entry screen is carried forward in each succeeding screen so that there is no need to enter that data again. That is the case throughout the entire event management system software (which is termed CAD/EM in the drawings).

After the various event entry items are completed by the user, the event entry windows are closed and then the Food/Beverage submenu item is selected, which opens the Food/Beverage entry windows shown in FIGS. 3C1 and 3C2. Using those windows, the user may enter information regarding the food and beverages to be provided in connection with the banquet event order indicated. In the event that a menu theme is selected, the food item already stored in the EM/DATA program database would appear in the food information window of FIG. 3C2. The remaining information is entered in the remaining food/beverage entry screens shown in FIGS. 3C3–3C5.

After the food/beverage entry windows are closed, the user may select the Decor submenu item which opens the decor entry window shown in FIG. 3D, which is used to enter the description of the decor for the indicated EC. After completing the necessary information, the user closes the decor entry screen and then may select the Entertainment submenu item. The selection of the Entertainment submenu item opens the entertainment entry window shown in FIG. 3E.

Once the entertainment entry window data has been completed by the user, that window is closed and the user may select the Accounting submenu item, which opens the accounting entry window shown in FIG. 3F. The user completes the accounting information requested by the accounting entry window for the indicated EC, and then closes that window.

The user may then select the last submenu item under the Event menu, the Production item. That opens the production entry window shown in FIG. 3G, which allows the user to store various information regarding the production schedule for the EC being scheduled. When the user is finished entering production schedule information, the production entry window of FIG. 3G is closed.

It should be understood that, while the user can select any of the submenu items at will under any of the menu items provided for use with the EM/DATA and DATABOND program modules, such submenu items have been laid out in a logical order in order to provide the user with an efficient means for performing the facility and event management functions of the event management system of the present invention. In addition, the menu items themselves have been set up such that the user logically progresses from one menu item to the next in the course of efficiently using the event management system of the present invention to both plan and manage meetings and other hospitality events.

The second menu item is the Drawing entry, which allows the user to create and/or modify an event drawing. Once the Drawing selection has been made, the user would then normally select the create submenu item if a new event drawing is to be created or the View/Edit submenu item if an existing drawing is to be viewed or edited. Selecting the Create submenu item calls the ROOM.INFO.BP subroutine of the DATABOND program module, a diagram of the flowchart of which is shown in FIG. 13 and described in connection therewith. Selecting the View/Edit submenu item calls the WRITE.DXF subroutine of the DATABOND program module, a flowchart of which is shown and described in connection with FIG. 6.

Selecting the Inventory submenu item results in the opening of the drawing information screen of FIG. 3H, which allows the user to view or allocate inventory to the event. That item can be selected before Create and inventory can be assigned to the room, using the programs in INV-BP, but no drawing is created. If it is selected after a drawing is created, drawing statistics and information on the inventory requirements of the drawing are created. After the user has closed the drawing information window of FIG. 3H, the user may then select the Seating submenu item, which calls the SET.GUEST.BP subroutine of the DATABOND program module, a diagram of the flowchart of which is shown and described in connection with FIG. 8.

The user may also select the Slide/Animation submenu which provides three items, namely, for the viewing of slides or animations of the drawings already created, or for assigning the slides or animations to an event. If the user selects the Slides or Animations items, then the GET.SLD.MOV subroutine of the DATABOND program is called. The GET.SLD.MOV subroutine displays associated slides or animations of an event from within the EM/DATA program module. A diagram of the flowchart of that subroutine is shown and described in connection with FIG. 9. If the user selects the Catalog item, then the catalog window shown in FIG. 3I is displayed for the user so that event animation and slide management functions can be performed as shown in FIG. 3I. A walk-through animation of the room in connection with the indicated EC, which has already been created, can be accessed from the catalog window of FIG. 3I, as well as stored slides, in both two-dimensional and three-dimensional configurations. When the user is finished with the catalog window, it is closed.

The next main menu item which can be selected is the Reports menu which allows the user to print out a variety of reports. The EC submenu item prints a event contract order. The Group EC selection prints selected ECs for a specific booking number. The Proposal submenu item displays a Proposal menu which allows the user to select the Promo entry to print a theme and facility cover pages or the Proposal entry to print a proposal. FIGS. 3J–3M show respectively the windows which are displayed in connection with printing the group EC, EC, promo, and proposal reports. As will be obvious to those of ordinary skill in the art familiar with database development environments, the printing of specific reports within the Report entry of the main menu will be obvious.

Other items which can be printed under the Reports menu item include the printing of a production schedule (FIG. 3N), the printing of a resume for a booking number, various facility reports such as room by guest and room by section, which shows room section usage by guest and by section, inventory reports, seating assignments and, under food and beverage reports, a daily water list and a food cart schedule.

The fourth main menu selection, Utilities, displays a menu of several items which facilitate the operation of the EM/DATA and DATABOND program modules. The first subitem under the Utilities menu is the Set Facility item which updates the settings of the event management software of the present invention (FIG. 3O). The next item is that of Daily Events which allows the user to view and/or edit a day's events. An example of a window associated with that item is shown in FIGS. 3B1–3B3.

A submenu within the Utilities item is the Event Copy menu which allows the user to copy an event. The text, drawing, and all entries under the Event Copy menu allow the user to copy the text portion of an event, copy the drawing portion of an event, or copy all event information, respectively, from one file to another. That function is performed by a database copy routine for copying records of one file to another, and is believed to be within the ordinary skill of a programmer familiar with a database development environment.

The next submenu item under the Utilities menu selection is the Event Delete item, which deletes an event. The two items under that menu are the Drawing item, which erases an event's drawing or the Entire item, which completely erases an event. The selection of either of those two items under the Event Delete submenu item calls a database delete program which deletes records from a file, the creation of which is believed to be well within the skill of a programmer familiar with a database development environment.

The next submenu item under the Utilities main menu selection is the Group Delete function which deletes a group and associated events. The program for performing that function is, again, believed to be well within the ordinary skill of a programmer familiar with a database development environment.

The next item under the Utilities menu selection is the Drawing Defaults menu which allows the creation and/or editing of the default staging or layout information. When the Extract Template item is selected, a window, as shown in FIG. 3Q, is displayed through which a layout or staging template may be created. FIGS. 3R and 3S show the windows which are displayed when the Edit Staging and Edit Layout items are selected. Those items show the editing respectively of the staging template description and layout template description created using the Extract Template item.

Figure 3T:
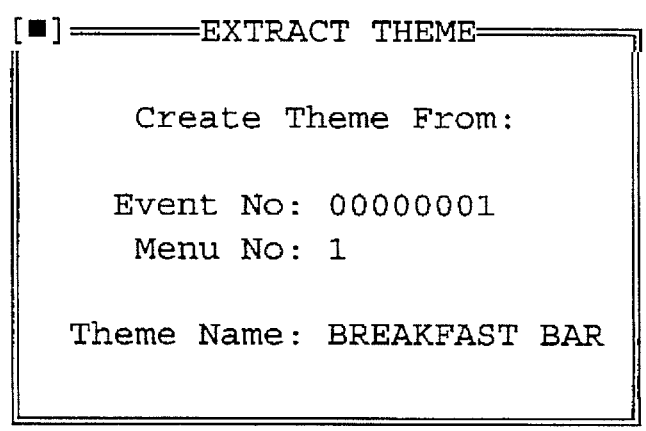

The final item that can be selected under the Utilities main menu selection is the Extract Theme item which creates a theme from a menu event. FIG. 3T shows a window which facilitates the creation of a theme from an event menu. A program which collects the menu from a previous event into a template file that can be used to create future menus is called in conjunction with the Extract Theme item for creating themes using the window of FIG. 3T.

The next main menu selection is the Maintenance menu. Once the Maintenance menu has been selected, the first submenu item that can be selected is the Guest item which allows the user to enter and/or edit guest information. The windows which allow the user to accomplish the task of entering and/or editing guest information are shown in FIGS. 3U1–3U4.

The second item which can be selected under the Maintenance menu is the Facility menu, which allows the input of various types of information regarding the facility using the event management system of the present invention. The first item under the Facility menu for data entry is the Facility item which allows the entry of facility information such as the name, address, telephone number, contacts, guest room information, and facility rooms information of the facility. Such information is entered using the windows shown in FIGS. 3V1–3V3.

The next item available under the Facility menu is the Section item which allows the user to enter information regarding each section of each facility room into the database. The window for entering such information is shown in FIG. 3W.

The Tolerance item under the Facility menu allows the user to enter the room tolerance information for each of the facility rooms, such as the distance from the wall to the center of a table, from the wall to the edge of the stage, etc. That information is used in preparing the various drawings in connection with the CAD/EVENT program module. The window for inputting the room layout settings is shown in FIG. 3X.

The last item under the Facility menu is the Employee item which allows the entry of employee information into the database. The window used for entering employee information is shown in FIG. 3Y.

The next item available under the Maintenance menu is the Vendor selection which allows the user to enter and/or edit vendor information. The drawing of a window for accomplishing that task is shown in FIG. 3Z.

Under the Maintenance menu selection of the main menu, the user can also enter Food and Beverage item information. That information can be used for the purpose of calculating order quantities and costing food allocation. Such food and beverage information can be entered using the window shown in FIG. 3AA. The user can also enter theme food information using the Theme submenu item, a depiction of which is shown in FIG. 3BB. In a similar manner, the language for a theme or facility cover page can be entered using the Promo submenu item of the Maintenance menu (shown in FIG. 3CC) and the inventory of tables, chairs, stage, and dance floor pieces, etc., can be entered using the Inventory submenu item, a depiction of the window of which is shown in FIG. 3DD. Default comments for reports can also be entered into the event management system database using the Comments submenu item. FIG. 3EE depicts a window which is suitable for the entry of such comments.

The next main menu selection item is Applications, which displays an applications menu. The first selection under the applications menu is Enter Email Message. FIG. 3FF is a depiction of a suitable window for entering and/or editing Email messages. The user can also check and/or read Email messages using the Check Messages selection under the Applications menu. In addition, the user can run a word processing software, such as WordPerfect 5.1, by selecting the WordPerfect submenu item under the Applications menu and can access print queue control function of the event management system of the present invention by selecting the Print Console submenu item.

When the user desires to exit from the event management system program of the present invention, the user selects the Exit main menu item.

When the user desires to check Email messages, an EMAIL.CHECK subroutine is called which checks to see if there are any messages waiting in the Email data file.

In order to facilitate an efficient operation of the EM/DATA program module, various function keys have been assigned to immediately initiate certain action. Table 1 shows the keystroke and resulting action of such function key assignments within the EM/DATA program module.

TABLE 1

EM/DATA FUNCTION KEY ASSIGNMENTS

| Keystroke | Action |
| --- | --- |
| F1 | Help |
| F2 | Popup default choices or allow cross reference search |
| F6 | List Soft Keys |
| ALT-F1 | Switch to related Event entry window |
| ALT-F2 | Switch to related Group entry window |
| ALT-F3 | Switch to related Facility entry window |
| ALT-F4 | Switch to related Guest entry window |
| ALT-F5 | Switch to related Food item entry window |
| ALT-F6 | Switch to related Beverage item entry window |
| ALT-F7 | Switch to related Theme window |
| ALT-F8 | Switch to related Comment entry |
| ALT-F10 | View stored slides/animations |
| SHIFT-F3 | Check room availability |
| SHIFT-F4 | Start WordPerfect Letter formatted with guest name and address |
| SHIFT-F10 | Add/Subtract items from event inventory |

B. THE DATABOND PROGRAM MODULE

The EM/DATA program module is a database environment which can track and compute inventory requirements by itself. The EVENT/CAD program module, which is described hereinafter, is capable of creating a physical model or representation of the event. However, the EM/DATA program module and the EVENT/CAD program module representations of an event are totally isolated from each other.

The function of the DATABOND program module of the event management system of the present invention is to provide for the connection of the EM/DATA database environment with the EVENT/CAD drawing environment. The DATABOND program module links the EM/DATA and EVENT/CAD program modules so that they completely interact. For example, any inventory removed from a drawing generated by the EVENT/CAD program module is also removed from the inventory requirements stored in the database maintained by the EM/DATA program module. The DATABOND program module permits the other two modules to communicate with each other. It translates information from a database format into a graphic format which is readable by computer-aided-design (CAD) packages, such as AutoCAD. The DATABOND program module can also translate the graphical information back into the database format of the EM/DATA program module.

In addition to enabling the EM/DATA program module to read drawing information, the DATABOND program module allows the EM/DATA program module to control the drawing. Everything that can be created in the drawing can be completely generated by the database of the EM/DATA program module, including the physical positioning of the inventory shown in the drawing. In that way, the DATABOND program module lets the EM/DATA program module create a drawing of an event from scratch. The user can enter the EVENT/CAD program module and obtain a plot of the event layout without adding a single table. Although the DATABOND program module completely automates the drawing process, the user still has absolute control of the room layout. The user can change the drawing in the EVENT/CAD program module, which will result in changing the information stored in the EM/DATA program module database.

Inasmuch as the DATABOND program module utilizes the same menu functions as the EM/DATA program module, which functions have already been described in connection with FIGS. 2A–2B and 3A–3HH, those functions will not be described again. Further, the descriptions of the tables used in connection with the DATABOND program module have also been previously described and therefore will not be described again.

In the course of describing the menu functions available for both the EM/DATA and DATABOND program modules, reference was made to various subroutines utilized in connection with the DATABOND program module. A description of those subroutines will now appropriately be made.

Figure 79:
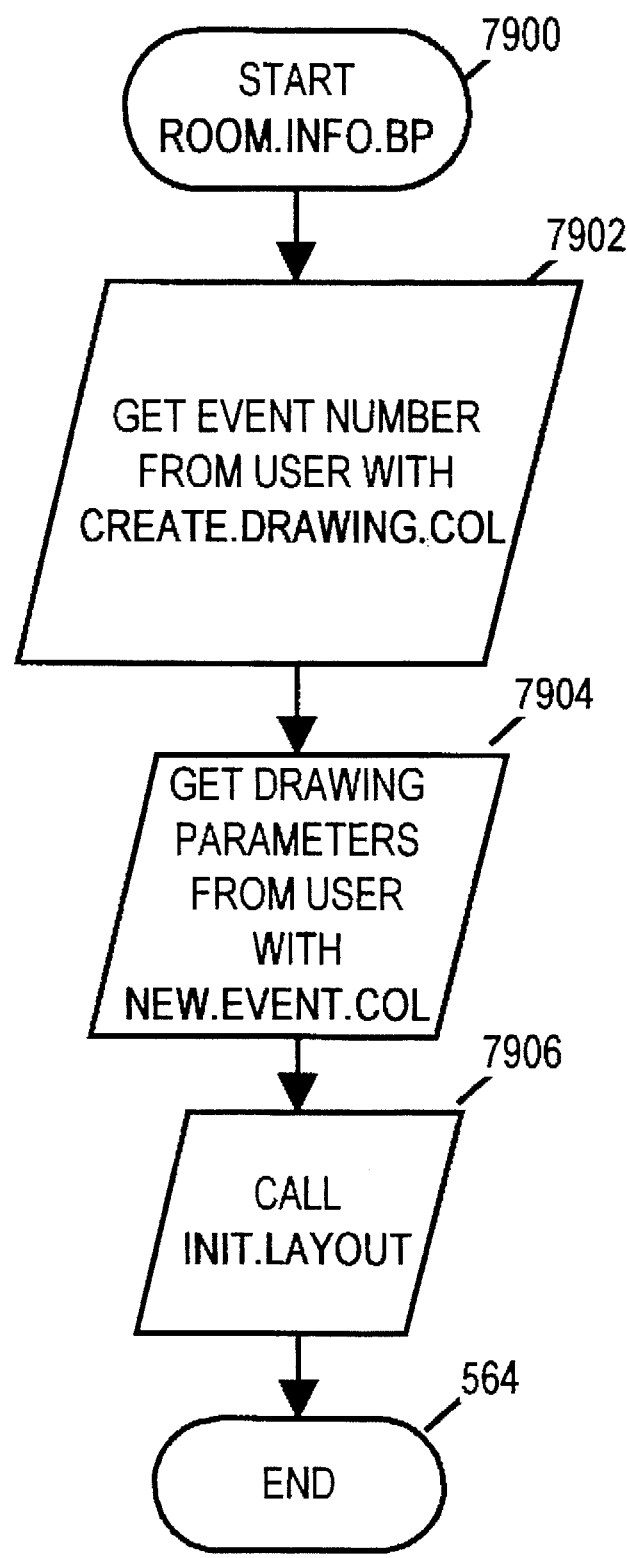
FIG. 79 is a diagram of a flowchart of the ROOM.INFO.BP subroutine which is used in connection with the DATABOND program module of the present invention.

Flowcharts of the subroutines which form the DATABOND program module are shown in diagram form in FIGS. 5–18 and 79. The first subroutine called from the main menu, under the Drawing menu selection, is the ROOM.INFO.BP subroutine, a diagram of the flow chart of which is shown in FIG. 79. When the ROOM.INFO.BP subroutine is called it starts at step 7900 and then presents the user with the create drawing window screen shown in FIG. 4E, from which it obtains the event number from the user at step 7902. At step 7904, the ROOM.INFO.BP subroutine gets the drawing parameters from the user using the room information screen shown in FIG. 4A in order to collect information on how many people to set tables for, the stage size, and the dance floor size.

Figure 5A:
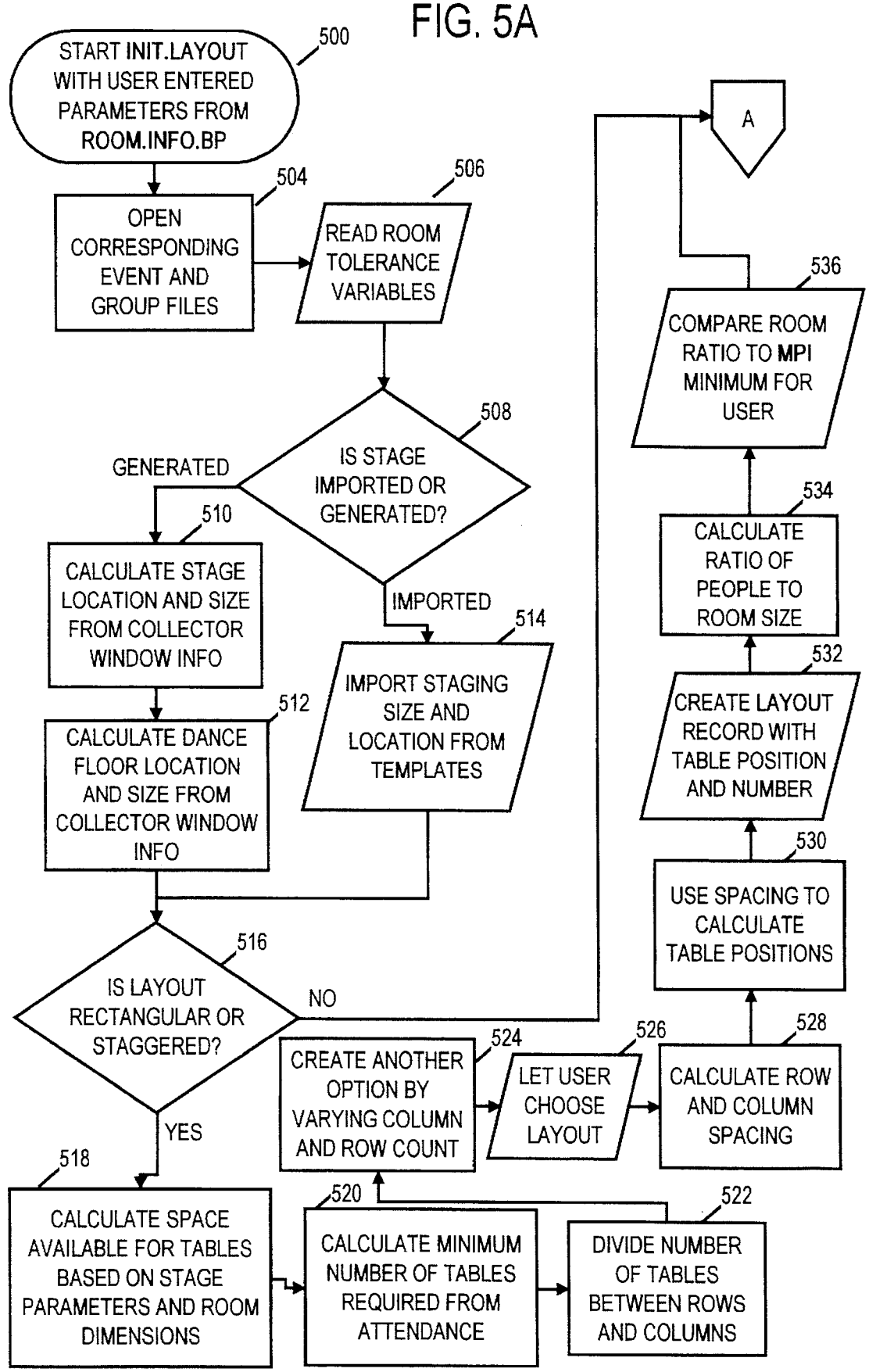
FIGS. 5A–5B are diagrams of the flowchart of the INIT.LAYOUT subroutine.
Figure 5B:
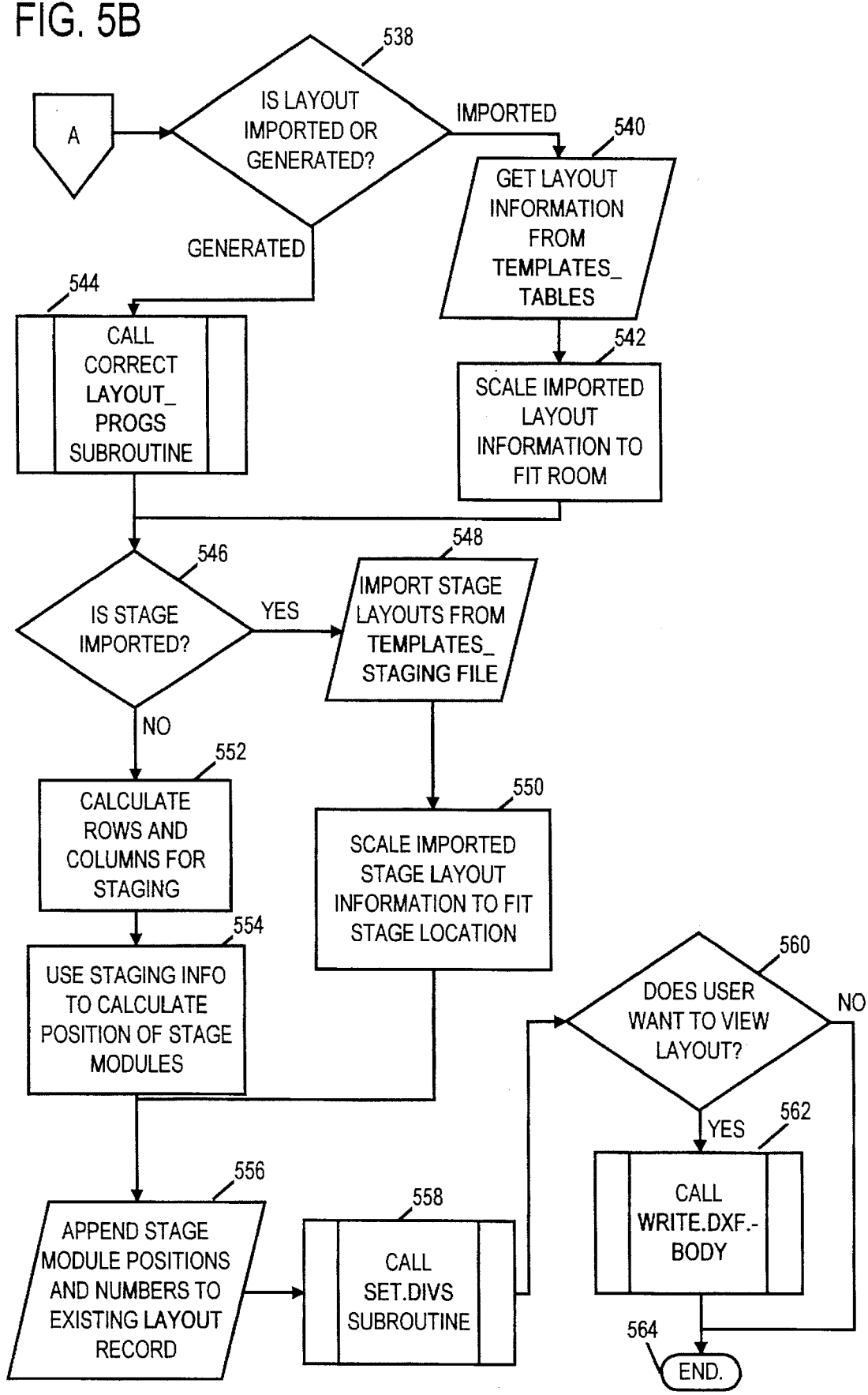

Once that information is collected, the ROOM.INFO.BP subroutine calls the INIT.LAYOUT subroutine, a diagram of the flow chart of which is shown in FIGS. 5A–5B. As will be described shortly hereafter, the INIT.LAYOUT subroutine determines the coordinates of tables to be placed in a room by determining the correct room and sections within the room from the EVENT file, by determining coordinates from the SECTION file, by determining tolerances from the <FACILITY NUMBER>_TOLERANCE file. The INIT.LAYOUT subroutine then allocates space for the stage based on the coordinates, tolerance, and the user's input from the ROOM.INFO.BP subroutine. Space for the dance floor is allocated in the same manner.

The INIT.LAYOUT subroutine then creates a layout record with the coordinates for each stage module and dance floor tile evenly spaced within their allocated areas. In the event that a staggered or aligned room layout is requested, a similar record is then generated for the tables. If not, a separate subroutine is called from the LAYOUT_PROGS table, which contains specialized programs that returns the coordinates for different layout types such as schoolroom, conference, etc. The completed layout record is then written to the LAYOUTS file.

If the user specified that a previous staging or room layout is to be used in the ROOM.INFO.BP subroutine, then the allocation of the space for the dance floor and the last step described above, that of generating a staggered or aligned room layout or the calling of the LAYOUT_PROGS table is performed differently. First, the layout will be retrieved from the TEMPLATES_STAGING file or the TEMPLATES_TABLE file and then scaled to fit within the allocated areas. Otherwise, the tables and/or staging will be evenly spaced in the available area.

The INIT.LAYOUT subroutine is started at step 500 with the user entered parameters from the ROOM.INFO.BP subroutine. Corresponding EVENT and GROUP files for the information obtained from the collector window are then opened at step 504, and the room tolerance variables are read at step 506. A determination is then made at step 508 of whether the stage is to be imported from another drawing or newly generated.

If the stage is to be generated by the INIT.LAYOUT subroutine, then the stage location and size are calculated from the collector window information at step 510, and then the dance floor location and size are calculated from the collector window information at step 512. In the event that it is determined at step 508 that the stage is to be imported from another file, then the staging size and location are imported from the appropriate template at step 514.

After steps 512 and 514, a determination is made at step 516 of whether the requested layout is rectangular or staggered. If an affirmative determination is made at step 516, then the INIT.LAYOUT subroutine calculates the space available for tables based on the stage parameters and room dimensions at step 518, calculates the minimum number of tables required from the attendance data at step 520, divides the number of tables between the rows and columns of such tables to be used in the room at step 522, and then creates another option by varying the column and row count at step 524. The user is then asked to choose which layout is preferred at step 526. After receiving a response from the user, the INIT.LAYOUT subroutine calculates the final row and column spacing at step 528, uses that spacing to calculate table positions at step 530, and then creates a LAYOUT record with table and position number information at step 532.

Next, the INIT.LAYOUT subroutine calculates the ratio of people to room size at step 534 and then compares the calculated room ratio to that of the Meeting Planners International minimum standards at step 536.

After step 536 or if a negative determination is made at step 516, the INIT.LAYOUT subroutine then determines whether the layout is to be imported or generated at step 538. If the layout is determined to be imported at step 538, then the INIT.LAYOUT subroutine gets the layout information from the TEMPLATE_TABLES file at step 540 and then scales the imported layout information to fit the room at step 542. If it is determined at step 538 that the layout is to be generated, then the INIT.LAYOUT subroutine calls the correct subroutine of the LAYOUT_PROGS table at step 544. After steps 542 and 544, a determination is then made at step 546 of whether the stage is imported. If an affirmative determination is made at step 546, then the stage layouts are imported from the TEMPLATES_STAGING file at step 548, and then the imported stage layout information is scaled to fit the stage location at step 550.

If a negative determination is made at step 546, then the rows and columns are calculated for the staging at step 552, and the staging information is then used to calculate the position of each of the stage modules at step 554.

After steps 550 and 554, the stage module positions and numbers are appended to the existing LAYOUT record at step 556 and then the SET.DIVS subroutine is called at step 558. At step 560, a determination is made of whether the user wants to view the layout. If an affirmative determination is made at step 560, then the WRITE.DXF.BODY subroutine is called at step 562.

In the event that a negative determination is made at step 560 or after the WRITE.DXF.BODY subroutine returns at step 562, the INIT.LAYOUT subroutine ends at step 564 and returns to the calling program.

Figure 6:
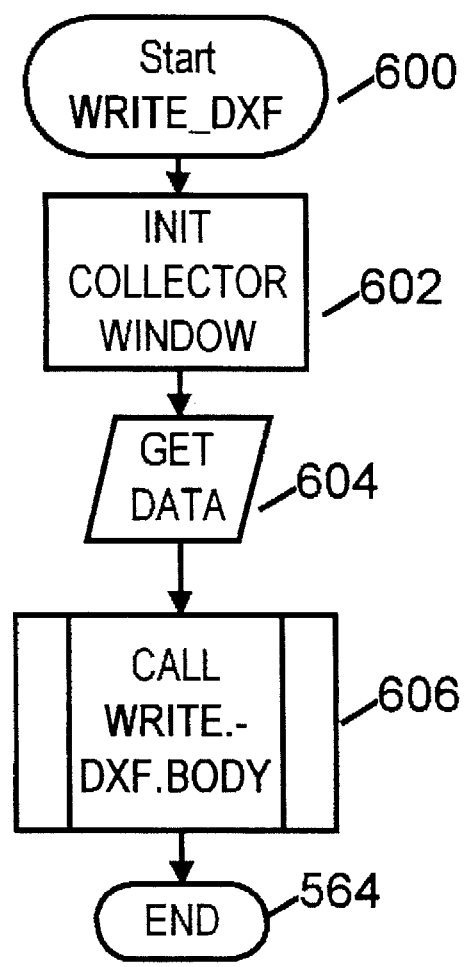
FIG. 6 is a diagram of the flowchart of the WRITE.DXF subroutine.

If the user elects to view and/or edit an existing drawing from the Drawing selection of the main menu, the WRITE.DXF subroutine, a diagram of the flow chart of which is shown in FIG. 6, is called. When called, the WRITE.DXF subroutine starts at step 600 and then initiates a collector window for viewing the drawing, such as the window shown in FIG. 4B, at step 602. The data entered in the view drawing window of FIG. 4B is obtained at step 604, and then the WRITE.DXF.BODY subroutine is called at step 606. The WRITE.DXF subroutine then ends at step 564 and returns to the calling program.

Figure 7:
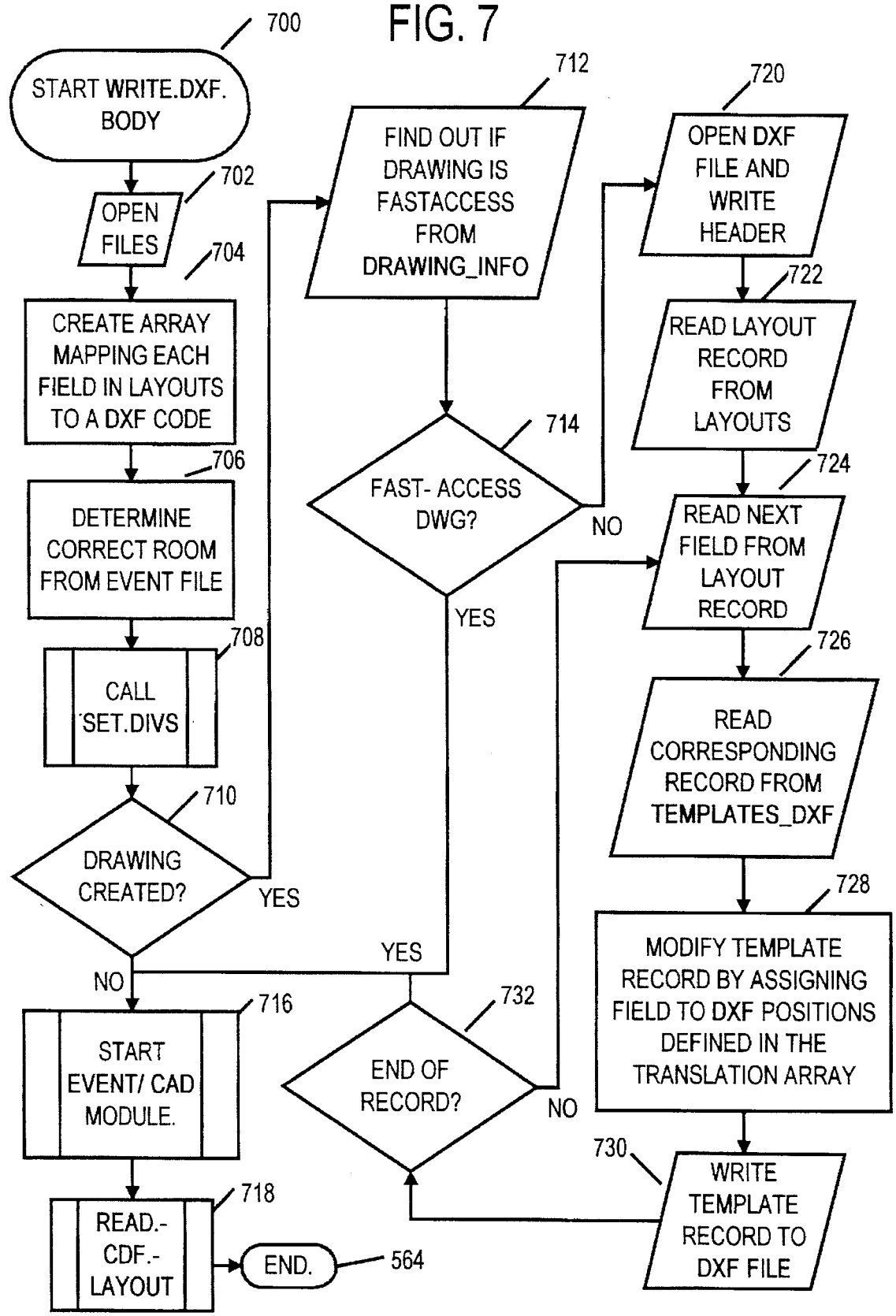
FIG. 7 is a diagram of the flowchart of the WRITE.DFX.BODY subroutine.

The WRITE.DXF.BODY subroutine is shown in flowchart form in FIG. 7. The function of the WRITE.DXF-.BODY subroutine is twofold. First, if the user has not created a drawing, the EVENT/CAD program module is started with a blank drawing. Second, if a drawing has been created, the LAYOUT record is read from the LAYOUTS file. Then, an array is created which maps the locations within each field in the LAYOUTS file to the correct DXF code. Then, the WRITE.DXF.BODY subroutine goes through the layout, field by field. For each field, the subroutine determines the correct DXF template and then reads it from the TEMPLATES_DXF file. The read TEMPLATE record is then modified by mapping the field to the TEMPLATE record by using the array as a translation table. The modified TEMPLATE record is then written to a DXF file and, after all the modified records are written, the EVENT/CAD program module is started.

Once the WRITE.DXF.BODY subroutine is called, it starts at step 700, opens the appropriate files at step 702, and then creates an array mapping each field in the LAYOUTS file to a DXF code at step 704. A determination of the correct room is then made from the EVENT file at step 706, and then the SET.DIVS subroutine is called at step 708. The diagram of the flow chart at the SET.DIVS subroutine is shown and described in connection with FIG. 12.

At step 710, a determination is made of whether a drawing has already been created. If an affirmative determination is made at step 710, then the subroutine finds out whether the drawing is FastAccess from the DRAWING_INFO file at step 712. Normally, the drawing file is created every time the user enters the EVENT/CAD module. However, to speed things up, two copies of the drawing can be kept; one in the database format, and the other in an Auto/CAD format. The disadvantage of a 'FastAccess' drawing is it takes almost 10 times as much room to store. That is why there are utilities for switching drawings back to normal access and archiving them after the event has passed.

A determination is then made at step 714 of whether there is a FastAccess drawing. If a negative determination is made at step 714, then a DXF file is opened and a header written at step 722, and then the next field from the LAYOUT record is read at step 724.

The WRITE.DXF.BODY subroutine then reads the corresponding record from the TEMPLATE_DXF file at step 726, and then modifies that TEMPLATE record by assigning a field to the DXF positions to find in the translation array at step 728. The modified TEMPLATE record is then written to the DXF file at step 730, and a determination is then made at step 732 of whether the end of the record has been reached. If a negative determination is made at step 732, then the subroutine returns to begin executing steps 724–732 again.

If an affirmative determination is made at steps 732 or 714 or if a negative determination is made at step 710, then the EVENT/CAD program module is started at step 716, and the READ.CDF LAYOUT subroutine is called at step 718. The WRITE.DXF.BODY subroutine then ends at step 564, and returns to the calling program.

A DXF file is an ASCII DOS file that is a graphical description of a drawing. This file is created by the DATABOND program module and enables the event management system software of the present invention to create a drawing from the EM/DATA program module database. An example of part of a DXF file is shown in Table 2.

TABLE 2

| SAMPLE DXF FILE |
|---|
| 0 |
| SECTION |
| 2 |
| ENTITIES |
| 0 |
| INSERT |
| 2 |
| TILE |
| 8 |
| STAGING-DANCEFLOOR |
| 10 |
| 1746 |
| 20 |
| 2136 |
| 30 |
| 0 |
| 50 |
| 0 |
| 70 |
| 15 |
| 71 |
| 5 |
| 44 |
| 36 |
| 45 |
| 36 |
| 0 |
| INSERT |
| 2 |

TABLE 2-continued

SAMPLE DXF FILE

```
10TOP72
8
TABLES
10
1014
20
2006
30
0
50
0
```
This file has been truncated for purposes of this example.

Figure 8:
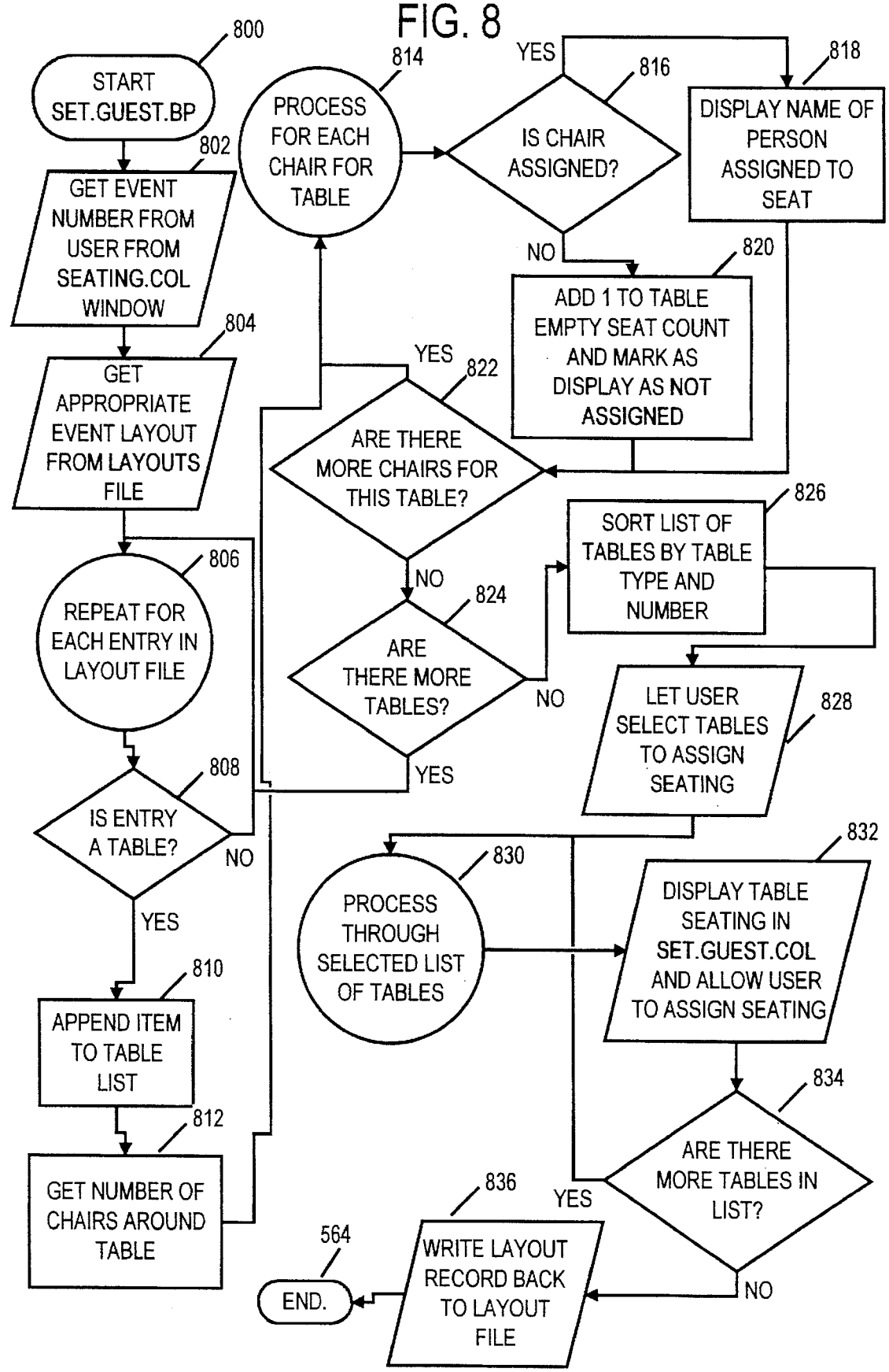
FIG. 8 is a diagram of the flowchart of the SET.GUEST.BP subroutine.

If the user selects the Seating item under the Drawing main menu selection, then the SET.GUEST.BP subroutine, a diagram of the flowchart of which is shown in FIG. 8, is called. The SET.GUEST.BP subroutine is a program that displays the guest seating assignment information in a window for the user to enter and/or edit which individuals are assigned to what tables. Once the SET.GUEST.BP subroutine is called, it starts at step 800 and then gets an event from the user at step 802 by using the assign seating assignment window shown in FIG. 3GG. The SET.GUEST.BP subroutine then gets the appropriate event layout from the LAYOUTS file at step 804. A determination is then made at step 808 of whether the information entered in the window of FIG. 4C is a table. If an affirmative determination is made at step 808, then the item is appended to the table list at step 810, and then the number of chairs needed around the table is gotten at step 812.

A determination is made of whether there is a seating assignment for each chair. If an affirmative determination is made at step 816, then the name of the person assigned to the seat is displayed at step 818.

If a negative determination is made at step 816, then one is added to the table empty seat count, and that chair is marked to be displayed as "NOT ASSIGNED" on the drawing at step 820.

After steps 818 and 820, a determination is made at step 822 of whether there are more chairs for which seating information is needed for this particular table. If an affirmative determination is made, then the subroutine returns to step 814 and processes the information for each chair around the table. If a negative determination is made at step 822, then a determination is made at step 824 of whether there are more tables for which information needs to be processed. If an affirmative determination is made at step 824, then the subroutine returns to step 806 and begins to process the next table.

If a negative determination is made at step 824, then the subroutine sorts the list of tables by table type and number at step 826 and then lets the user select the tables to assign seating at step 828. The subroutine then processes through the selected list of tables at step 830 and then displays the seating at each table and allows the user to assign the seating at step 832 using the guest seating assignment window shown in FIG. 4C.

At step 834, a determination is made of whether there are any more tables selected. If an affirmative determination is made at step 834, then the subroutine returns to step 830 and again processes through the selected list of tables.

If a negative determination is made at step 834, then the LAYOUT record is written back to the LAYOUT file at step 836 and then the subroutine ends at step 564.

Figure 9:
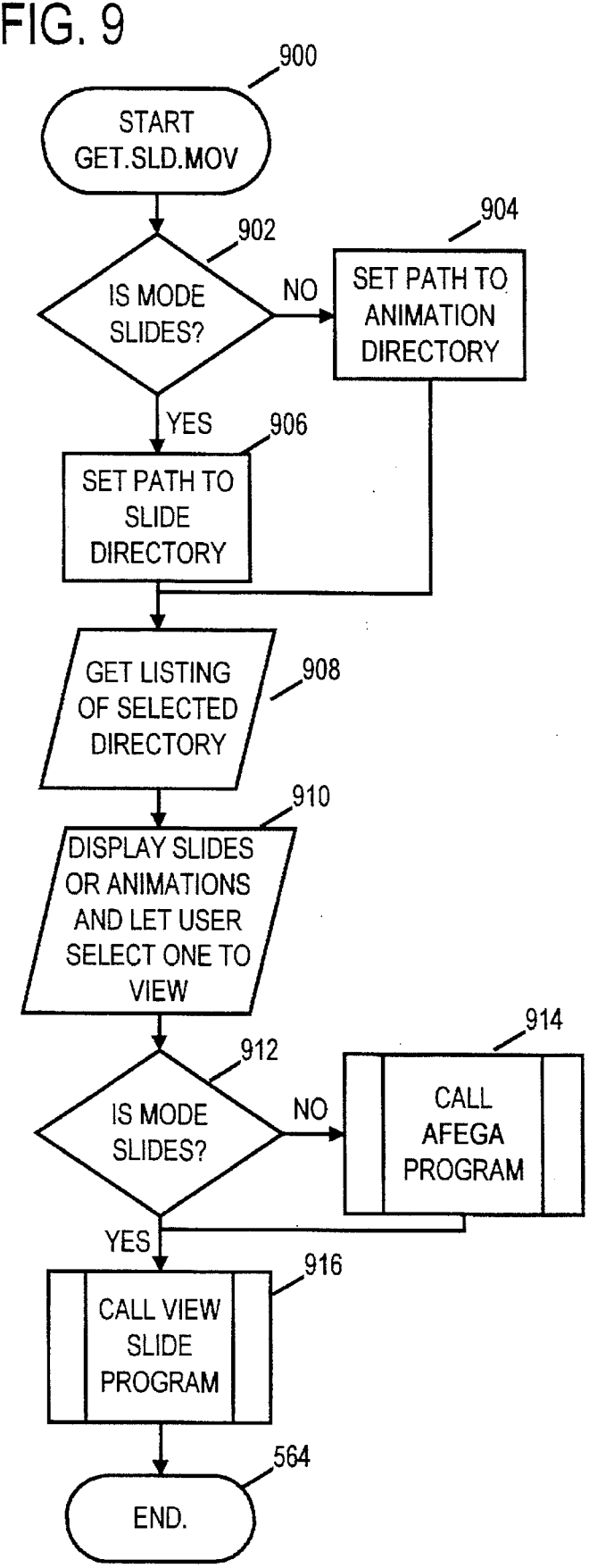
FIG. 9 is a diagram of the flowchart of the GET.SLD.MOV subroutine.

If the user selects the Slides/Animation submenu item of the Drawing menu selection and then selects the Slide or Animations submenu item of the Alides/Animation item, then the GET.SLD.MOV subroutine of the DATABOND program module is called. A diagram of the flowchart of that subroutine is shown in FIG. 9. Once the GET.SLD.MOV subroutine is called, it begins at step 900, and then a determination is made at step 902 of whether the selected mode is slides. If a negative determination is made at step 902, then the path of the subroutine is set to animation directory at step 904. If an affirmative determination is made at step 902, then the path of the subroutine is set to slide directory at step 906.

After steps 904 and 906, the subroutine gets a listing of the selected directory at step 908 and displays the slides or animations at step 910 and lets the user select one to view. At step 912, a determination is made of whether the mode selected by the user at step 910 is the slides mode. If a negative determination is made at step 912, then the AFEGA program is called at step 914. That program is the AutoFlix Movie Compiler software, which can also be used as a player to replay saved animations. After step 914 or if an affirmative determination is made at step 912, the view slide program Vslide 1.0 is called at step 916, and then the GET.SLD.MOV subroutine ends at step 564.

Figure 10:
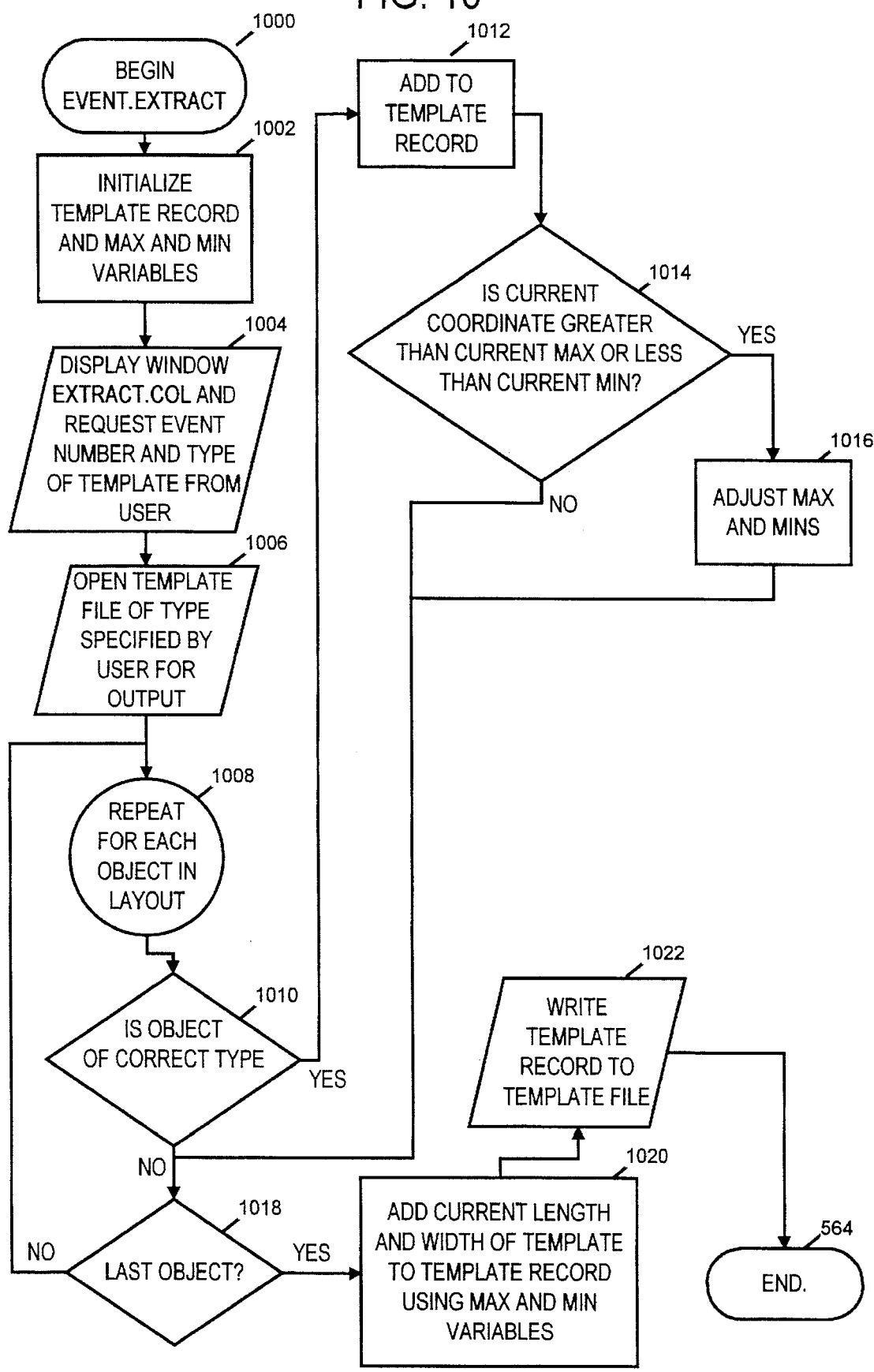
FIG. 10 is a diagram of the flowchart of the EVENT.EXTRACT subroutine.

If the user has selected the Utilities function under the main menu and has selected the Drawing Defaults submenu item menu thereunder, and then the Extracting Templates function, the EVENT.EXTRACT subroutine, a diagram of the flowchart of which is shown in FIG. 10, is called. That subroutine grabs all the tables and/or stage modules from a previous drawing and saves them as a template that can be used to layout future drawings.

Once the EVENT.EXTRACT subroutine is called, it begins at step 1000 and initializes the TEMPLATE record and maximum and minimum variables at step 1002. It then displays an extract template window for the user, as shown in FIG. 4D, at step 1004 and then requests the event number and type of template from the user. After receiving the input from the user, the EVENT.EXTRACT subroutine opens a TEMPLATE file of a type specified by the user for output at step 1006. A determination is then made of whether the object, such as staging or tables, specified by the user is of the correct type at step 1010. The subroutine loops through each object in the drawings and extracts the one indicated by the user. If an affirmative determination is made at step 1010, then that object is added to the TEMPLATE record at step 1012, and a determination is then made of whether the current coordinate is greater than the current maximum or less than the current minimum coordinates at step 1014. If an affirmative determination is made at step 1014, then the maximum and minimum coordinates are adjusted at step 1016.

After step 1016 and if a negative determination is made at step 1014, then a determination is made at step 1018 of whether the last object is being processed. If a negative determination is made at step 1018, then the EVENT.EXTRACT subroutine returns to step 1008 and repeats the above-described steps for each object in the layout.

If an affirmative determination is made at step 1018, then the current length and width of the template is added to the TEMPLATE record using the maximum and minimum variables at step 1020, and then the TEMPLATE record is written to the TEMPLATE file at step 1022. The EVENT.EXTRACT subroutine then ends at step 564.

Figure 11:
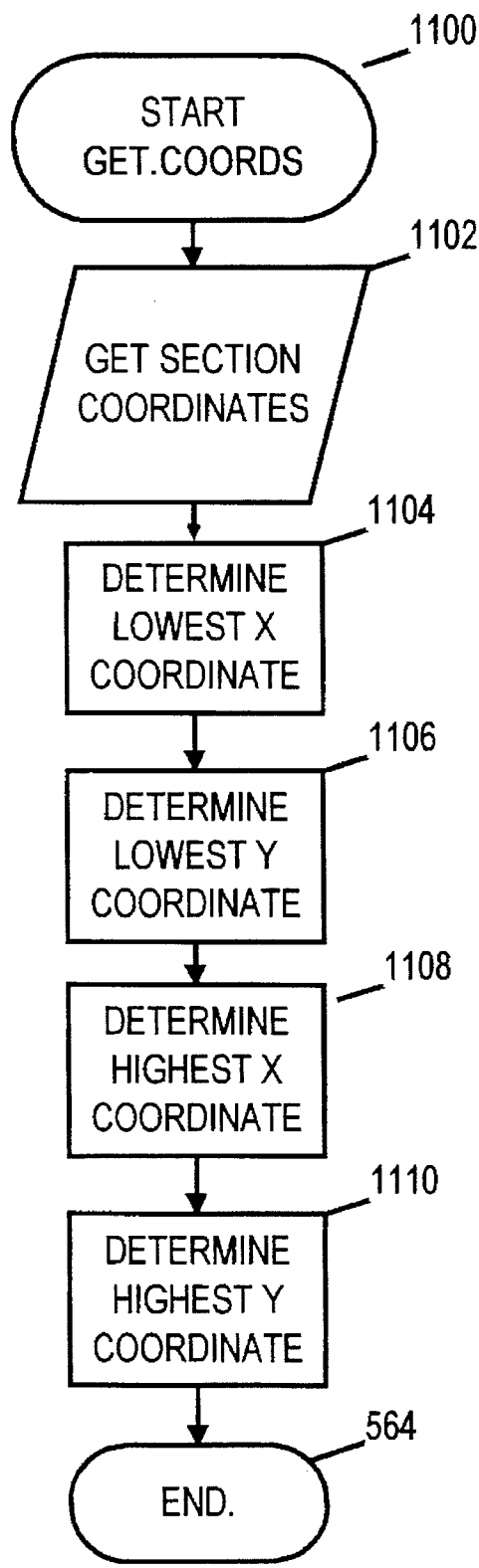
FIG. 11 is a diagram of the flowchart of the GET.COORDS subroutine.

A diagram of the flow chart of the GET.COORDS subroutine called from the INIT.LAYOUT and WRITE.DXF- .BODY subroutines is shown in FIG. 11. The function of the GET.COORDS subroutine is to determine the sections of the room in which the event is to be held. From the range of sections, the GET.COORDS returns the upper right and lower left coordinates of the range of sections. When the GET.COORDS subroutine is called, it starts at step 1100 and then gets the section coordinates at step 1102. The subroutine then determines the lowest X coordinate at step 1104 and the lowest Y coordinate at step 1106. The highest X coordinate is then determined at step 1108, and the highest Y coordinate is then determined at step 1110. The GET.COORDS subroutine then ends at step 564.

Figure 12:
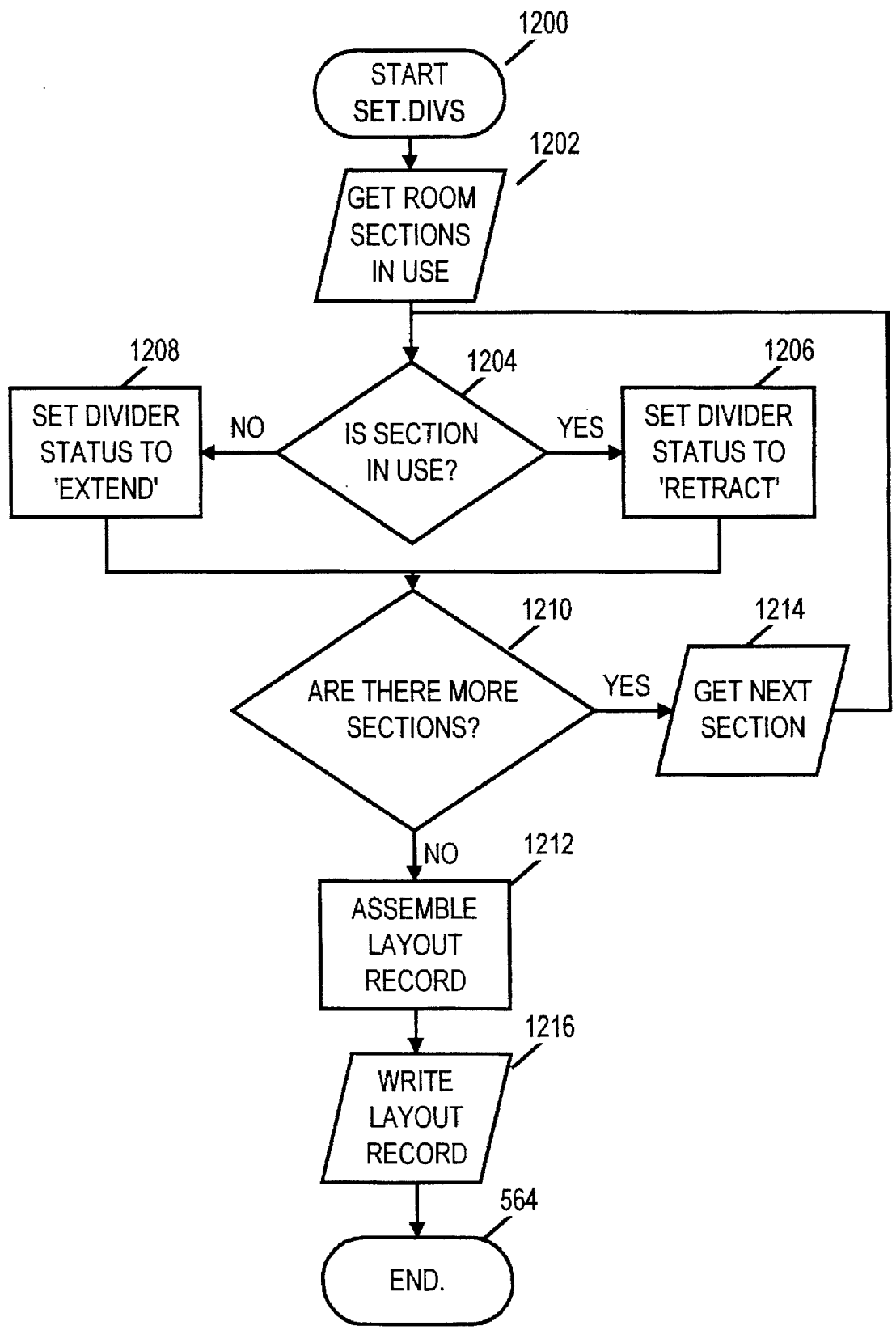
FIG. 12 is a diagram of the flowchart of the SET.DIVS subroutine.

A diagram of the flowchart of the SET.DIVS subroutine, which is called by the INIT.LAYOUT and WRITE.DXF-.BODY subroutines is shown in FIG. 12. The function of the SET.DIVS subroutine is to determine the section range in which the event is being held from the EVENT file. The SET.DIVS subroutine reads the divider records from the DIVIDERS file. If the room divider is within the correct range, then a DIVIDER-RETRACT-xx record is written to the LAYOUT record in the LAYOUTS file. If the room divider is outside the selected range, then a DIVIDER-EXTEND-xx message is written to the LAYOUT record in the LAYOUTS file.

Once called, the SET.DIVS subroutine starts at step 1200 and then gets the room sections in use at step 1202. A determination is then made of whether a section is in use at step 1204. If an affirmative determination is made at step 1204, then the divider status is set to "retract" at step 1206. If a negative determination is made at step 1204, then the divider status is set to "extend" at step 1208. After steps 1206 and 1208, a determination is then made at step 1210 of whether there are more sections to be considered. If it is determined that there are more sections, then the next section is obtained at step 1214, and step 1204 is again executed.

If a negative determination is made at step 1210, then the LAYOUT record is assembled at step 1212, and it is written to the LAYOUTS file at step 1216. The SET.DIVS subroutine then ends at step 564.

A diagram of the flowchart of the READ.CDF.LAYOUT subroutine, which is called by the WRITE.DXF.BODY subroutine is shown in FIG. 13. The purpose of that subroutine is to read a .CDF layout from the EVENT/CAD module into the EM/DATA module. It converts the .CDF format file into one which is in the standard database format. The record in the LAYOUTS file is also updated.

Once the READ.CDF.LAYOUT subroutine is called, it begins at step 1300 and initializes the LAYOUT and INVENTORY records at step 1302. It then opens the appropriate files at step 1304 and then reads in a line from the CDF file at step 1306. A CDF file is an ASCII DOS file that corresponds to a database description of the drawing. That file is read by the DATABOND program module to update the EM/DATA program module database with drawing changes. An example of a CDF file is shown in Table 3.

TABLE 3

APPENDIX N - SAMPLE CDF FILE

```
'TILE ', '3' SQUARE DANCE FLOOR TILES    ', 1746, 2136, 0, 0,","","","","","","","","","",""
'TILE', '3' SQUARE DANCE FLOOR TILES    ', 1782, 2136, 0, 0,","","","","","","","","","",""
'10TOP72', '72" ROUND TABLE(S WITH 12 CHARS', 1104, 2016, 0, 0,'1,'Not
    Assigned','Not Assigned','Not Assigned','Not Assigned','Not Assigned','Not
    Assigned','Not Assigned','Not Assigned','Not Assigned','Not Assigned',","
'10TOP72','72" ROUND TABLE(S) WITH 12 CHAIRS', 1317, 2016, 0, 0,'2','Not
Assigned','Not Assigned','Not Assigned','Not Assigned','Not Assigned','Not
Assigned','Not Assigned','Not Assigned','Not Assigned',","
'10TOP72','72" ROUND TABLE(S) WITH 12 CHAIRS', 1531, 2016, 0,0,'3','Not
Assigned','Not Assigned','Not Assigned','Not Assigned', ","
'10TOP72','72" ROUND TABLE(S) WITH 12 CHAIRS', 1531, 2016, 0, 0,'3','Not
Assigned','Not Assigned','Not Assigned','Not Assigned','Not Assigned','Not
Assigned','Not Assigned','Not Assigned','Not Assigned','Not Assigned',","
'HMOD32','6' × 8' × 32" STAGE MODULES    ', 1968, 2472,
0,0,'10',","","","","","","","","","",""
'HMOD32','6' × 8' × 32" STAGE MODULES       ', 2064, 2472, 0,
0,'11',","","","","","","","","",""
'HMOD32','6' × 8' × 32" STAGE MODULES       ', 2160, 2472, 0,
0,'12',","","","","","","","","","",""
'DIVIDER-RETRACT-1','AIR WALL', 317, 1375, 0,0,","","","","","","","","","",""
'DIVIDER-RETRACT-1','AIR WALL', 317, 1655, 0,0,","","","","","","","","","",""
'DIVIDER-RETRACT-1','AIR WALL', 317, 1935, 0,0,","","","","","","","","","",""
'08T6X30','6' × 30" TABLE(S) WITH 8 CHAIRS    ', 1302, 2452, 0, 90, '#', "Not
Assigned','Not Assigned','Not Assigned','Not Assigned','Not Assigned','Not
Assigned','Not Assigned','Not Assigned',",",","
'TILE', '3' SQUARE DANCE FLOOR TILES', 2502, 2358, 0, 0,","","","","","","","","","",""
'TILE', '3' SQUARE DANCE FLOOR TILES', 2538, 2358, 0, 0,","","","","","","","","","",""
'TILE', '3' SQUARE DANCE FLOOR TILES', 2574, 2358, 0, 0,","","","","","","","","","",""
'ST_3RL','3 STEP 24" STAIR WITH RAILING', 1824, 2436, 0,","","","","","","","","","",""
CHAIR','CHAIR(S)', 2953, 1218, 0, 280,","","","","","","","","",""
CHAIR','CHAIR(S)', 2940, 1240, 0, 320,","","","","","","","","",""
This file has been truncated for purposes of this example.
8458C
```

After a line is read from the CDF file, the READ.CDF.LAYOUT subroutine then strips the quotes from the block name at step 1308 and converts the commas to value marks at step 1310. The subroutine then writes the line to the field in the LAYOUT record at step 1312 and increments the INVENTORY record field responding to the current line at step 1314. The subroutine then repeats steps 1306–1314 for each line of the CDF file. After each line of the CDF file has been read and processed as described above in accordance with steps 1306–1314, an INVENTORY record is written to the <FACILITY NUMBER>_EVENT_INV file at step 1318, and a LAYOUT record is then written to the LAYOUT file at step 1320. The date, time, etc., of the drawing is then written to the DRAWING_INFO file at step 1322, and then the READ.CDF.LAYOUT subroutine ends at step 564.

The INVENTORY.CHECK subroutine which is used by the DATABOND program module to report the status of inventory at a specific point in time. A diagram of the flow chart of that subroutine is shown in FIGS. 14A and 14B. It can be called from the program which prints out reports. Once the INVENTORY.CHECK subroutine is called, it starts at step 1400 and gets the date, time range, sort option, and event type data from the user using the window screen at FIG. 3P at step 1402. At step 1404, all the events within the selected date and time range are selected and matched together. Then, for each event within the range assembled at step 1406, an inventory usage table is updated at step 1408, and a determination is made at step 1410 of whether there are any more events in the list to be processed. If an affirmative determination is made at step 1410, then the subroutine returns to step 1407 and processes each event within the list.

If a negative determination is made at step 1410, then the facility inventory is loaded at step 1412, each item in the usage table is processed at step 1404, and then a determination is made at step 1414 of whether the facility inventory is greater than the inventory that is required. If an affirmative determination is made at step 1414, then the INVENTORY.CHECK subroutine outputs the required number of items and the surplus inventory at step 1416. If a negative determination is made at step 1414, then the INVENTORY.CHECK subroutine outputs the required number of items and the shortage of such items at step 1418.

After steps 1416 and 1418, a determination is made of whether there are any more items in the usage table to be processed at step 1420. If an affirmative determination is made at step 1420, then the subroutine jumps to step 1404 and processes each item in the usage table, using steps 1414–1416. If a negative determination is made at step 1420, then the INVENTORY.CHECK subroutine ends at step 564.

The update of the inventory usage table requested at step 1408 requires the starting of the updated inventory usage table at step 1409 which results in the location of the appropriate time slot in the usage table at step 1422. A determination is then made at step 1424 if the item to be used is included in the usage table. If a negative determination is made at step 1424, the inventory item is added to the usage table at step 1426. After step 1426 or if an affirmative determination is made at step 1424, then the event inventory used is added to the inventory in the usage table at step 1428, and then a determination is made at step 1430 of whether there is another inventory record to be examined. If an affirmative determination is made at step 1430, then the subroutine Jumps to step 1432 and processes each additional item in the event inventory record using steps 1422–1428. If a negative determination is made at step 1430, then the start update inventory usage table portion of the INVENTORY.CHECK subroutine returns at step 1434 to step 1408.

The INVENTORY.CHECK subroutine is called when the user goes into the inventory checking window of FIG. 3H to check if the inventory is overbooked.

The DATABOND program module also utilizes four subroutines: TLAYOUT, ULAYOUT, SRLAYOUT, and HSLAYOUT, which are specialized room layout subroutines. Diagrams of flowcharts for each of those subroutines are shown in FIGS. 15–18.

The TLAYOUT subroutine takes the room coordinates in which the event is to take place and lays out tables in a theater-style layout. A stage is included in this layout. The entire setup can be centered along the left, right, top, or bottom of the room. Once the TLAYOUT subroutine is called, it starts at step 1500 and determines at step 1502 whether there are enough people to utilize this layout. If a negative determination is made in step 1502, the TLAYOUT subroutine ends at step 564.

If an affirmative determination is made at step 1502, then a determination is made at step 1504 of which side the guests will sit on, either one side or both. A determination is then made at step 1506 of whether the stage is to be positioned at the left center or right center of the room. If a negative determination is made at step 1506, then the direction vectors for the bottom center or top center are set at step 1510. If an affirmative determination is made at step 1506, then the direction vectors are set for the left center or right center at step 1508.

After steps 1508 and 1510, the table and chair rows for the top of the theater are set at step 1512, and then the table and chair rows for the left side of the theater are added at step 1514. At steps 1516 and 1518, the table and chair rows are added to the bottom of the theater layout and to the right of the theater layout, respectively. At step 1520, the staging rows are added to the staging layout. The layout is then written to the appropriate file at step 1522, and the TLAYOUT subroutine then ends at step 564.

Figure 16:
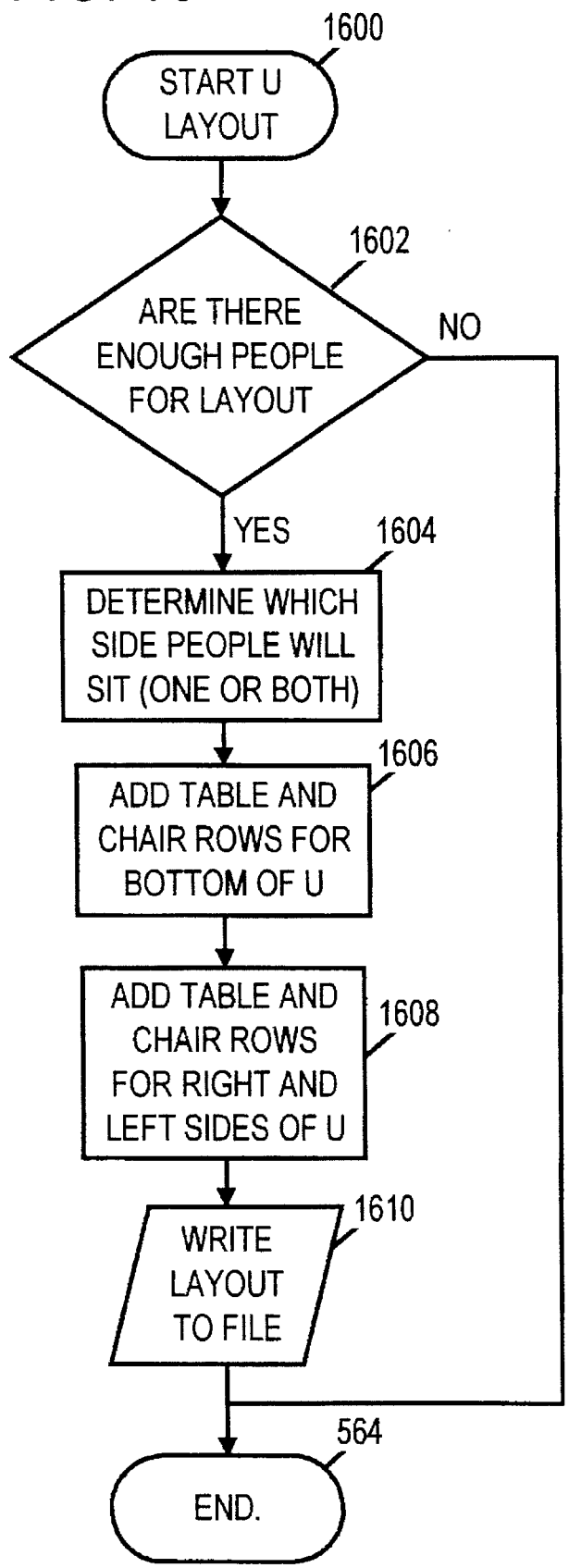
FIG. 16 is a diagram of the flowchart of the ULAYOUT subroutine.
Figure 17:
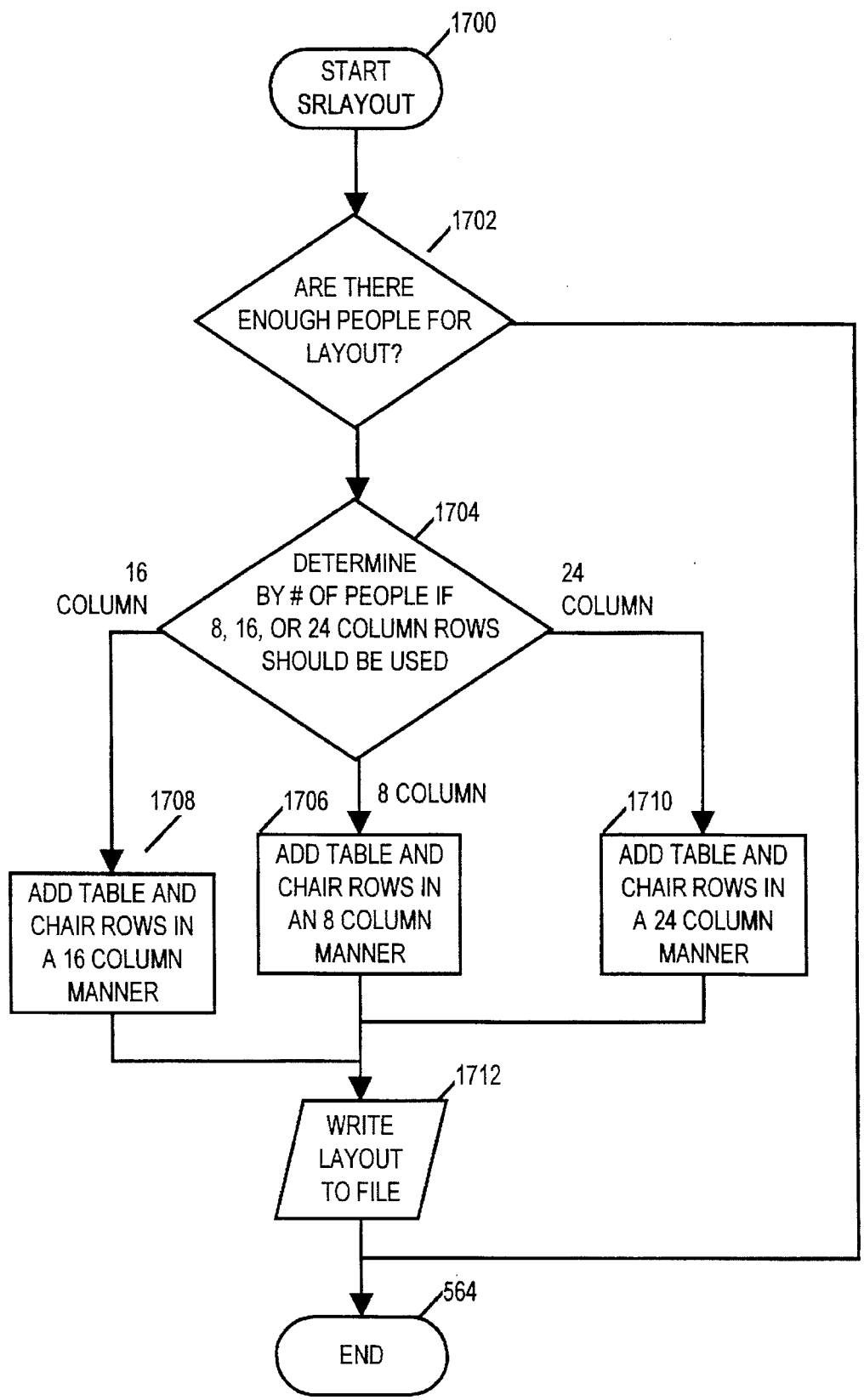
FIG. 17 is a diagram of the flowchart of the SRLAYOUT subroutine.

The ULAYOUT subroutine takes the room coordinates in which the event is to be held and lays out the tables in a U-style layout. A stage is not included in this layout. This layout is scaled automatically to the number of people and amount of space allowed. A diagram of the flowchart of the ULAYOUT subroutine is shown in FIG. 16. Once called, the ULAYOUT subroutine starts at step 1600, and then a determination is made at step 1602 of whether there are enough people for the layout. If there are not enough people for the layout, then the ULAYOUT subroutine ends at step 564.

If an affirmative determination is made at step 1602, then a determination is made at step 1604 of whether people will sit on one side or both. Table and chair rows are then added for the bottom of the U at step 1606 and for the right and left sides of the U at step 1608. The layout is written to the appropriate file at step 1610, and the ULAYOUT subroutine then ends at step 564.

The SRLAYOUT subroutine takes the room coordinates in which the event is to be held and lays out the tables in a schoolroom layout style. A stage is not included in this layout. The layout is automatically scaled to the number of people and amount of space allowed.

Once called, the SRLAYOUT subroutine starts at step 1700 and a determination is then made at step 1702 of whether there are enough people for the layout. If a negative determination is made at step 1702, then the subroutine ends at step 564.

If an affirmative determination is made at step 1702, then a determination of whether 8, 16 or 24 row columns should be used is made based upon the number of people at step 1704. If it is determined that 8 columns should be used, then table and chair rows are added in an 8-column manner at step 1706. If it is determined that 16 columns should be used, then table and chair rows are added in a 16-column manner at step 1708. If it is determined that 24 columns should be used, then table and chair rows are added in a 24-column manner at step 1710.

After steps 1706–1710, the layout is written to the appropriate file at step 1712, and the SRLAYOUT subroutine then ends at step 564.

Figure 18:
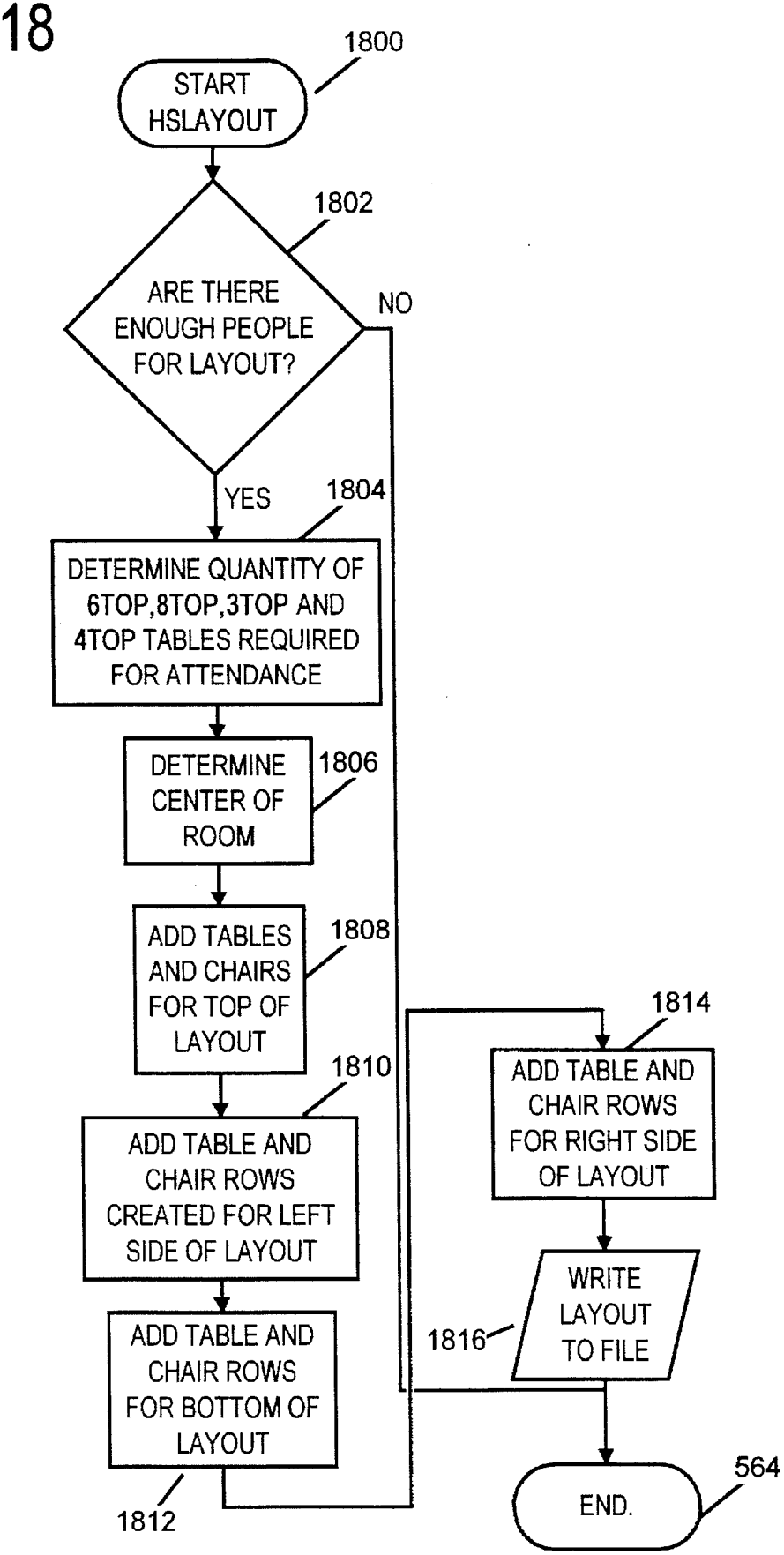
FIG. 18 is a diagram of the flowchart of the HSLAYOUT subroutine.

FIG. 18 is a diagram of the flowchart of the HSLAYOUT subroutine which takes the room coordinates in which the event is to be held and lays out the tables in a square layout style. A stage is not included in this layout. The layout is automatically scaled to the number of people and space allowed.

Once the HSLAYOUT subroutine is called at step 1800, a determination is made at step 1802 of whether there are enough people for the layout. If a negative determination is made at step 1802, then the HSLAYOUT subroutine ends at step 564.

After an affirmative determination is made at step 1802, then a determination of the quantity of 6TOP, 8TOP, 3TOP and 4TOP tables required for the number of persons attending is made at step 1804. A 6TOP table is a table with 6 chairs.

A determination is then made at step 1806 of the center of the room, and then tables and chairs for the top of the layout are added at step 1808. At step 1810, table and chair rows are created for the left side of the layout. At steps 1812 and 1814, table and chair rows for the bottom of the layout and for the right side of the layout are added. The layout is then written to the appropriate file at step 1816, and the HSLAYOUT subroutine then ends at step 564.

As will be obvious to those of ordinary skill in the art, flow charts of various printing routines which obtain user input and then print certain reports have not been provided since they are believed to be well within the general skill of programmers familiar with development on data base programming. Such printing routine called certain window which are displayed for the user to obtain instructions. One such subroutine is called PRINT.INV, which displays the window shown in FIG. 3P in order to print an inventory report. Another printing subroutine, called PRINT.GUEST.BP, calls the screen shown in FIG. 3GG which is used to assign seating. The remainder of the printing program, which are referenced from the EM/data Reports main menu selection display a generic window shown in FIG. 3HH to the user.

C. THE EVENT/CAD PROGRAM MODULE

The EVENT/CAD program module is a computer-aided-design-based system which is used to create highly accurate, detailed drawings. It can also be used to create complex 3-dimensional representations of buildings and room layouts. However, producing such models from scratch requires a great deal of specialized knowledge and familiarity with the CAD system and is at best an arduous task. The benefits gained by using a computer to set up and model events are many and obvious; however, this usually necessitates having a separate technical staff who are trained to operate the computer system. The EVENT/CAD program module, however, is designed to reduce the task of producing such drawings to an uncomplicated, menu-driven process that can be performed by users having little or no technical skill. It enables them to produce and modify complex, accurate event simulations quickly and easily.

The EVENT/CAD program module works with a set of standardized templates of a hotel's event facilities and inventory items (i.e., tables, staging, etc.). In addition to that, the EVENT/CAD program module facilitates the complex process of placing, scaling and manipulating those items, as well as editing room layouts once created, and producing hardcopy representations of the drawings for proposals, presentations and event production staff.

Figure 74:
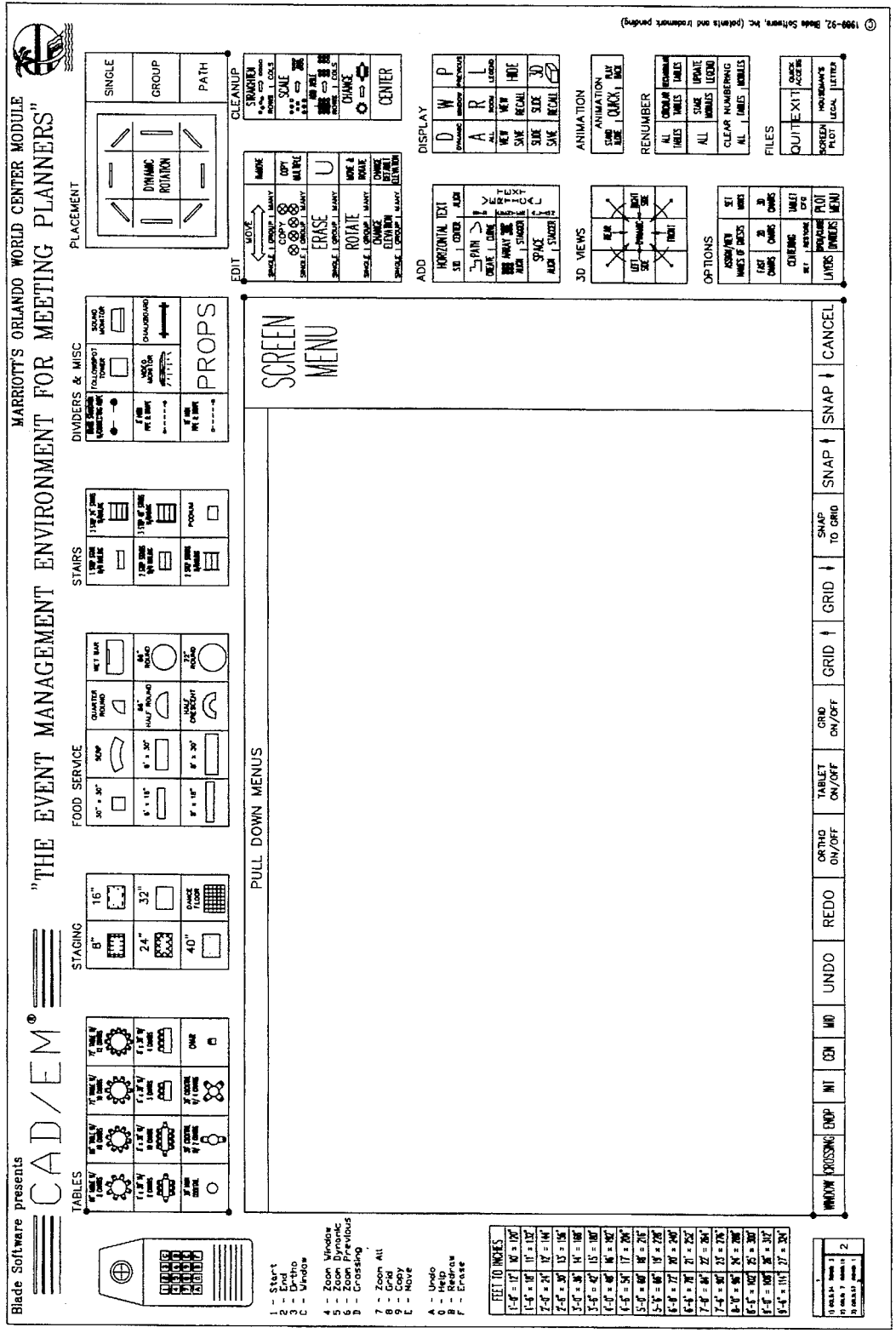
FIG. 74 is a diagram of a drawing template for use in connection with the EVENT/CAD program module of the present invention.

The EVENT/CAD program module works with three different command structures. Through the use of a digitizer tablet shown in FIG. 74, issuing commands and directing the computer are reduced to a systematic method of visually choosing and picking. An operator can perform operations by picking objects and commands on a custom digitizer template, without ever using the keyboard. In addition to the template command structure, operations can be selected from a clear, walk-through framework of screen messages or a comprehensive pull-down menu structure, complete with visual icons of inventory items. This control method eliminates the need for memorizing the thousands of command sequences, individual inventory items, and options available in the EVENT/CAD program module.

The EVENT/CAD program module accomplishes this command structure by implementing many different programs written in the Autolisp (Lisp) programming language and attaching them to the standard AutoCAD structure. Those programs eliminate the need for the operator to memorize hundreds of commands and their format, as well as the necessity of having to do lengthy calculations, by performing them all internally. Many of those programs make use of on-screen dialog boxes to allow interactive functions, so that, even though many processes are simplified, the program places complete control in the hands of the user. The EVENT/CAD program module, by providing unambiguous, menu-driven processing and a number of subroutines whose operation is transparent to the user, is very user-friendly while both avoiding trivialization and retaining the immense power of a CAD-based design system.

The menu structure of the EVENT/CAD program module is set forth in Table 4. In that table, [] denotes subroutines to be called which are described hereafter and () describes simple AutoCAD command sequences.

TABLE 4

EVENT/CAD MENU STRUCTURE
[] Denotes program in [] to be called
() Description of simple AutoCAD command sequence FILES
- o PLOT [emplot.lsp]
- o Make FastAccess [fast access]
- o Make Normal Access [normal_access]
  - o Animation file [delete_file "anim"]
  - o FastAccess file [delete_file "dwg"]
  - o Animation Settings file [delete_file "set"]
- o SAVE [cadsave.lsp]

TABLE 4-continued

EVENT/CAD MENU STRUCTURE
[] Denotes program in [] to be called
() Description of simple AutoCAD command sequence

```
                o EXIT                          [cadout.lsp]
                o QUIT                          [cadquit.lsp]
                o ABOUT                         [about.lsp]
ADD
                o TABLES                        [pldia.lsp "ctbl"]
                o Round Tables                  [pldia.lsp "ctbl"]
                o Rectangular Tables            [pldia.lsp "rtbl"]
                o STAGING                       [pldia.lsp "mods"]
                o Construct Stages              [Icon Menu--stgcon]
                o Construct Dancefloor          [dfloor.lsp]
                o Staging Equipment             [pldia.lsp "misc"]
                o CATERING                      [pldia.lsp "catr"]
                o PROPS                         [pldia.lsp "misc"]
                o TEXT                          [text.lsp]
                o Create Path                   (add a path on layer PATH)
                o Curve Path                    (spline-fit selected path)
DISPLAY
                o Zoom Window                   (zoom "w")
                o Zoom Dynamic                  (zoom "d")
                o Zoom Previous                 (zoom "p")
                o Zoom Extents                  (zoom "e")
                o Zoom Out Fast                 (zoom "vmax")
                o View Control Panel            [emview.lsp]
                o All                           (restore view "cadem_all")
                o Room                          (zoom "w" ll ur)
                o Legend                        (resotre view "legend")
                o REDRAW                        (redraw)
                o REGEN                         (regen)
3D/ANIMATION
                o 3DVIEW                        (Icon Menu--3dview)
                o CAMVIEW                       [camview 65 65]
                o SHADE                         (shade view)
                o HIDE                          (hide view)
                o Save Slide                    [makesld]
                o View Slide                    [playsld]
                o ANIMATION                     [emanim.lps]
                o Animate                       [emanim.lsp]
                o Playback                      [playmov]
EDIT
                o ERASE [single,group,many]     (erase)
                o MOVE [single,group,many]      (move)
                o Re-Move Previous Objects      (move "p")
                o COPY [single,group,many]      (copy)
                o Copy Multiple Times           (copy "m")
                o CHANGE ELEVATION              [elev.lsp]
                o ARRAY                         [array.lsp]
                o Space--Staggered              [space.lsp "s"]
                o Space--Aligned                [space.lsp "a"]
                o UNDO                          (undo)
                o REDO                          (redo)
CLEAN UP
                o Straighten Rows               [align.lsp "y"]
                o Straighten Columns            [align.lsp "x"]
                o Add an AISLE                  [aisle.lsp]
                o SCALE                         [scale.lsp]
                o CENTER                        [cntrdia.lsp]
                o CHANGE                        [change.lsp]
OPTIONS
                o LAYERS                        [colors.lsp]
                o LAYOUT                        [layout.lsp]
                o AIRWALLS                      [airwalls.lsp]
                o DISPLAY OPTIONS               [display.lsp]
                o 3D Chair Representation       [iblock3d.lsp]
                o Complex Chairs                [iblock2d.lsp]
                o Simple Chairs                 [iblock1d.lsp]
                o TOLERANCES                    [tol.lsp]
UTILITIES
                o NUMBERING CONTROL PANEL       [sort.lsp]
                o Renumber Everything           [dosort.lsp "b" 1 1 1 1 ur 1]
                o Renumber Tables               [dosort.lsp "b" 1 1 nil ll ur
1]
                o Renumber Circular Tables      [dosort.lsp "b" 1 nil nil ll
ur 1].
                o Renumber Rectangular Tables   [dosort.lsp "b" nil 1 nil ll
ur 1]
```

TABLE 4-continued

EVENT/CAD MENU STRUCTURE
[] Denotes program in [] to be called
() Description of simple AutoCAD command sequence

| | | |
|---|---|---|
| ur 1] | o Renumber Stage Modules | [dosort.lsp "b" nil nil 1 1l |
| | o UPDATE LEGEND | [legend.lsp] |
| | o ASSIGN NAMES | (ddatte) |
| | o MEASURE DISTANCE | [dist.lsp] |
| | o CHAIR MAINTENANCE | [chairs.lsp] |

Figure 19:
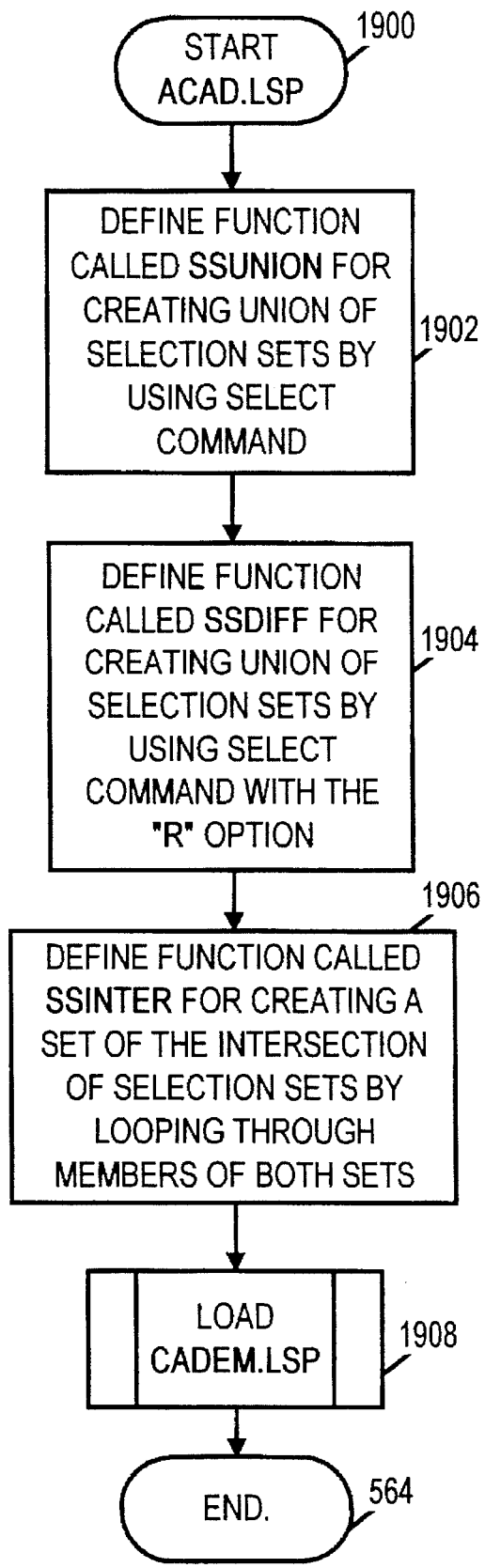
FIGS. 19–53 are diagrams of the flowcharts of subroutines used in connection with EVENT/CAD program module of the present invention.

When the Create or View/Exit options of the Drawing main menu selection are changed, the AutoCAD Portion of the EVENT/CAD Program module is called. That automatically executes the ACAD.LSP subroutine, the diagram of the flow chart which is shown in FIG. 19. That subroutine sets the global variables in the EVENT/CAD module to their default values. It also sets the initial snaps and grid spacing. The subroutine then displays the main screen menu, creates a legend, and updates the status line area. The ACAD.LSP subroutine also defines several Lisp functions as well as determining whether or not the drawing is a FastAccess drawing.

When called, the ACAD.LSP subroutine starts at step 1900 and then defines a function called SSUNION for creating the union of selection sets by using the select command at step 1902. It then defines a function called SSDIF at step 1904 for creating the union of selection sets by using the select command with the R option. The ACAD.LSP subroutine then defines a function called SSINTER at step 1906 for creating a set of the intersection of selection sets by looping through members of both sets. At step 1908, the CADEM.LSP subroutine is loaded. The ACAD.LSP then ends at step 564.

The CADEM.LSP subroutine is the second auto-executing AutoCAD function involved when the AutoCAD program is started. It defines Lisp functions to set global variables which store the plot-layout size (GETSIZE) and which reset the plot and title block size (SETSIZE). The CADEM.LSP subroutine also sets the global variables which are shown in Table 5.

TABLE 5

Global Variables set by CADEM.LSP Subroutine

ROT - default rotation angle
MSNAP - minimum snap distance
SNAP - current snap distance
GRID - current grid spacing
MODE - default insertion mode (single, group, path)
ATOL - alignment tolerance for ALIGN.LSP
STOL - sorting DOSORT.LSP
SFACTOR - drawing scale factor
ACAD_DRIVE - drive that AutoCAD is located on
DATA_DRIVE - current event data drive
EVENT_NO - current event number
FAC_NO - facility number that event is in
LCENTER - legend centering point
LL - lower-left corner of drawing
UR - upper-right corner of drawing The CADEM.LSP subroutine also loads frequently used Lisp subroutines, such as CADEM.INIT, UPDATE.LSP and LEGEND.LSP. Once loaded, the CADEM.LSP subroutine starts at step 2000, defines the GETSIZE subroutine at step 2004, the SETSIZE subroutine at step 2006 and the STARTUP subroutine at step 2008. The CADEM.LSP subroutine then ends at step 564.

Figure 58:
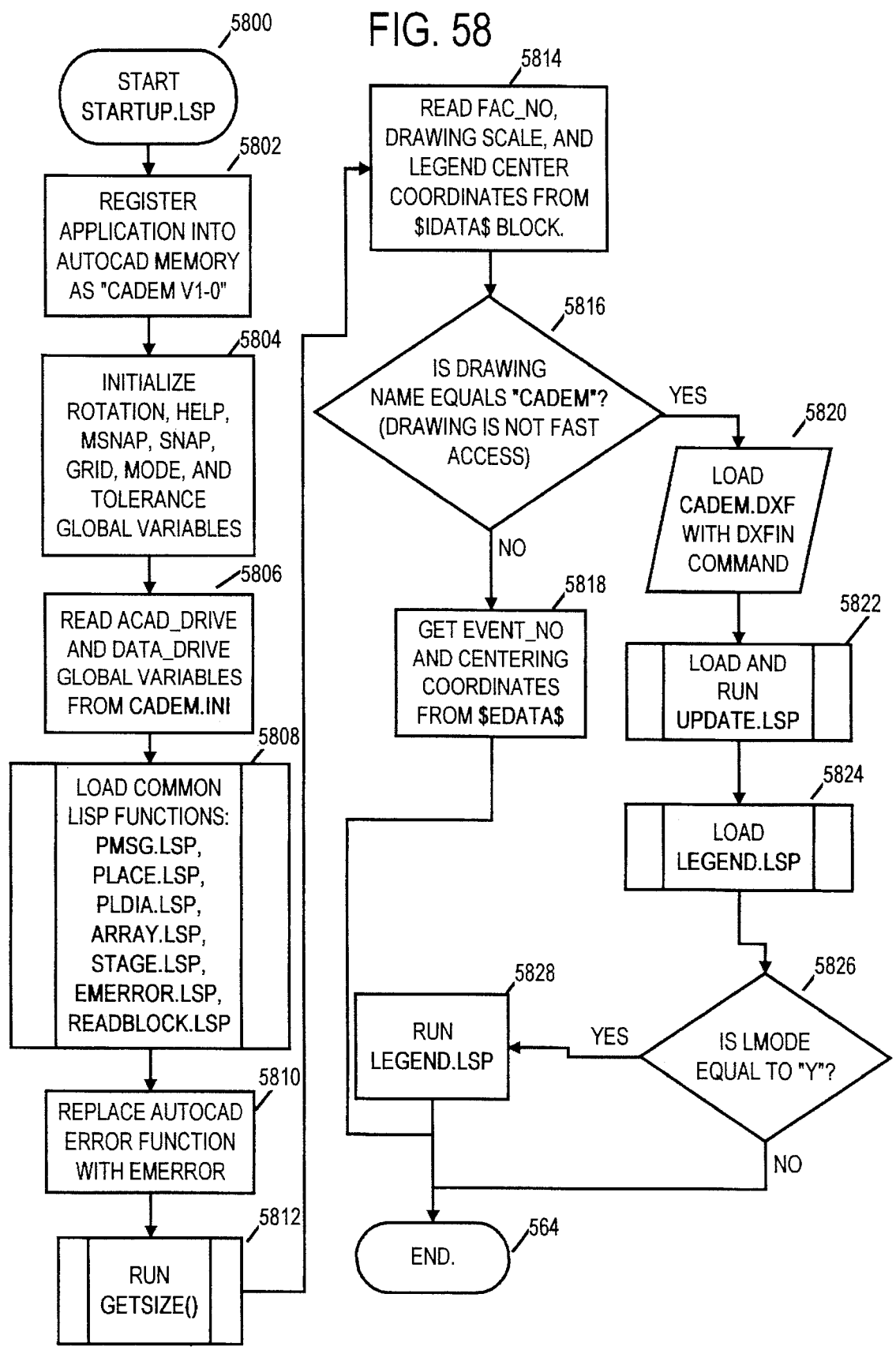

The third auto-executing AutoCAD function invoked when the AutoCAD program is started is the STARTUP() subroutine, a diagram of the flow chart of which is shown in FIG. 58. When called, the STARTUP.LSP subroutine starts at step 5800 and then registers the application into AutoCAD memory as "CADEM v1-0 at step 5802. At step 5804, the rotation, help, MSKPAP, snap, grid, mode and tolerance global variable are initialized.

Figure 59:
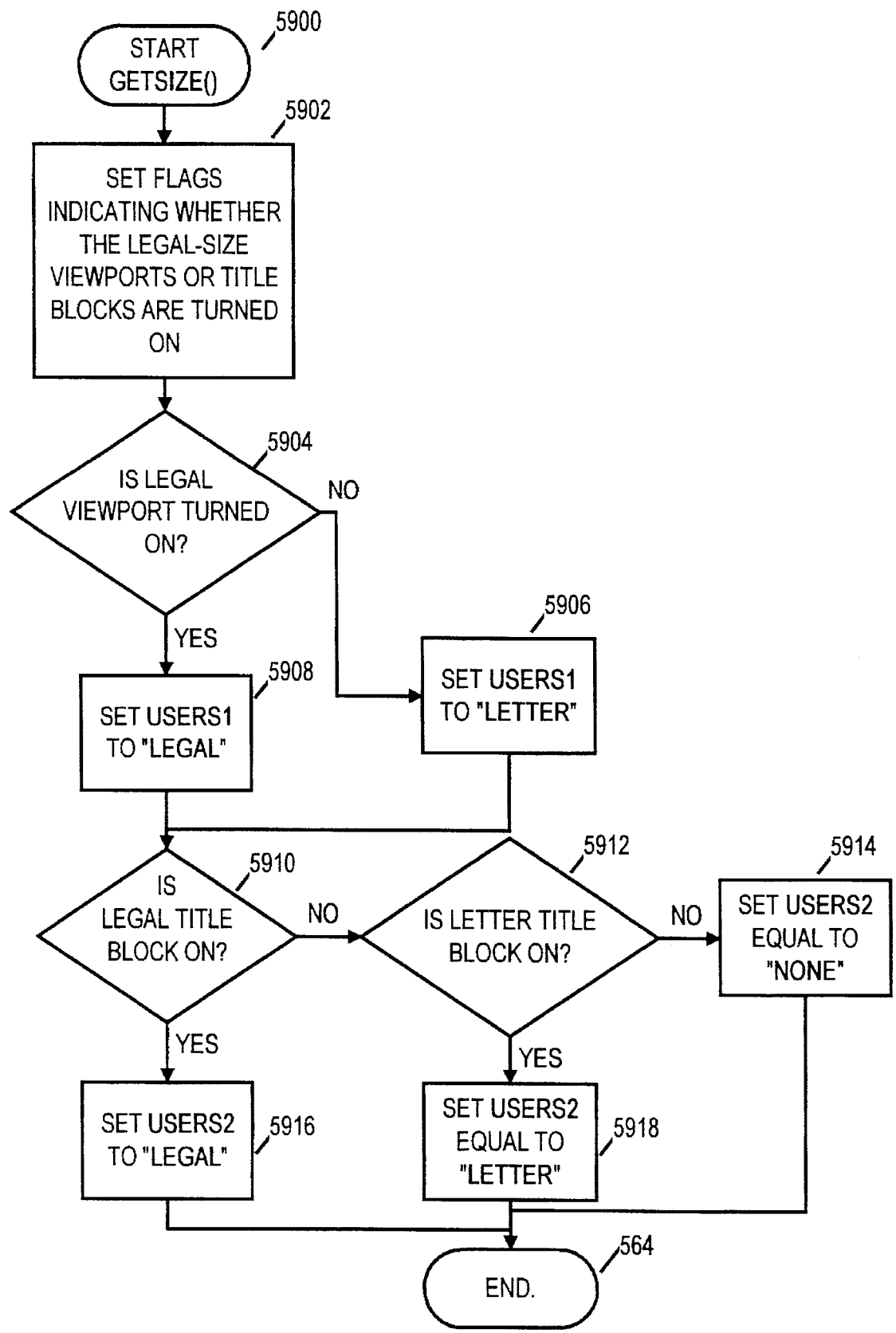

The subroutine then reads the acad_drive and data_drive global variables from the CADEM.INI file at step 5806 and then loads several common Lisp functions at step 5808. Such common functions include PMSG.LSP, PLACE.LSP, PLDIA.LSP, ARRAY.LSP, STAGE.LSP, EMERROR.LSP, and READBLCK.LSP. The AutoCAD error function is then replaced with the EMERROR value at step 5810 and then the GETSIZE() subroutine, a diagram of the flow chart which is shown in FIG. 59, is run.

The STARTUP.LSP subroutine then reads the facility, drawing scale and legend center coordinates from the $IDATA$ block at step 5814 and then determines whether the current drawing name is equal to "CADEM" at step 5816. If a negative determination is made at step 5816, then the event number and centering coordinates are obtained from the $EDATA$ file at step 5818 and the STARTUP.LSP subroutine ends at step 564.

Figure 60:
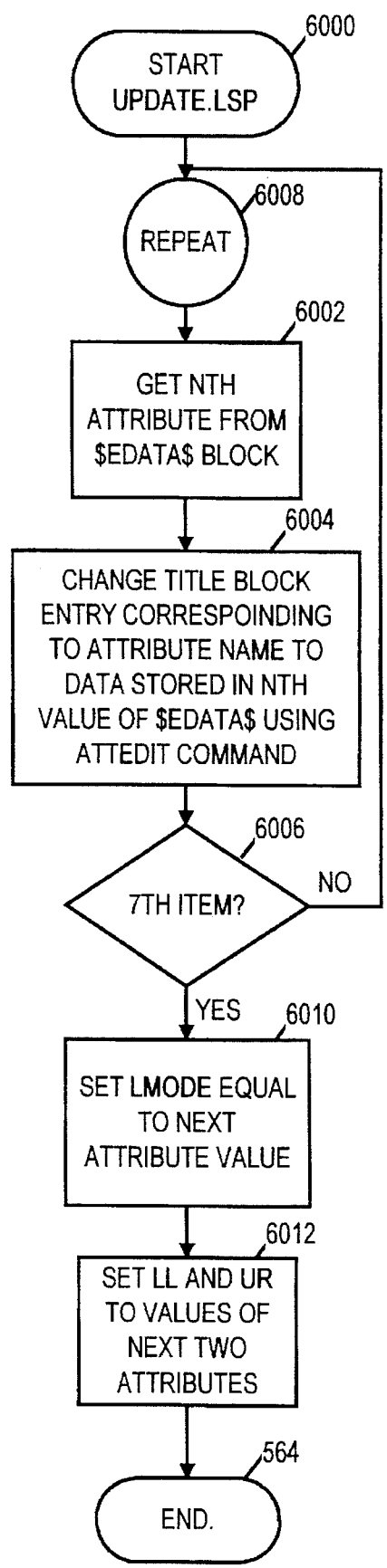

If an affirmative determination is made in step 5816, then the CADEM.DXF file with DXFIN command is loaded at step 5820 and then the UPDATE.LSP subroutine is loaded and run at step 5822. A diagram of the flow chart of the UPDATE.LSP subroutine is shown in FIG. 60.

Figure 61:
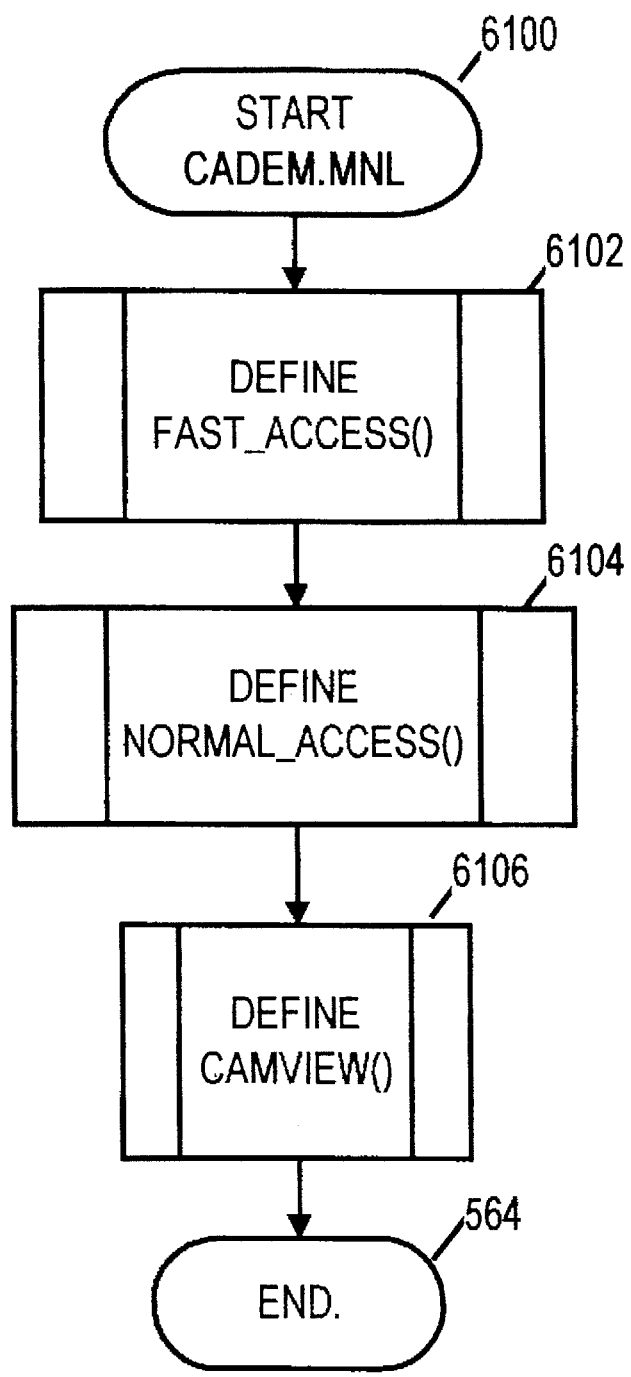

The STARTUP.LSP subroutine then loads the LEGEND.LSP subroutine at step 5824 and determines whether the lmode is equal to Y at step 5826. If an affirmative determination is made at step 5826, then the LEGEND.LSP subroutine, a diagram of the flowchart of which is shown and described in connection with FIG. 61, is run at step 5828. After step 5828 or if a negative determination is made at step 5826, the STARTUP.LSP subroutine ends at step 564.

Figure 20:
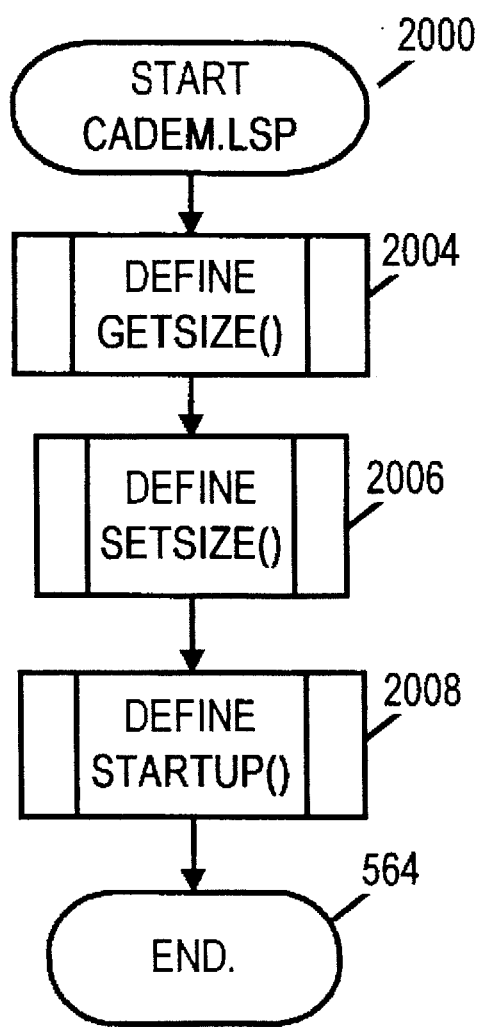

A diagram of the flow chart of the GETSIZE() function is shown in FIG. 59. This function returns the size currently selected for the title block and plots to the calling program. The title block size may be set to "NONE." The GETSIZE() function is defined in the CADEM.LSP subroutine, a diagram of the flowchart of which is shown in FIG. 20.

When called, the GETSIZE() subroutine starts at step 5900 and then sets flags indicating whether the legal-size viewports or title blocks are turned on at step 5902. A query is then made in step 5904 of whether the legal viewport is turned on. If it is determined that the legal viewport is turned on then the value of USERS1 is set to "LEGAL" at step 5908. If a negative determination is made at step 5904 then the value of USERS1 is set to "LETTER" at step 5906.

After steps 5906 and 5908, a determination is made at step 5910 of whether the letter title block is turned on. If a negative determination is made at step 5910 then a determination is made at step 5912 of whether the letter title block is off. If a negative determination is made in step 5912 then the value of USERS2 is set equal to "NONE" at step 5914.

If it is determined at step 5910 that the letter title block is on then the value of USERS2 is set to "LEGAL." If it is determined at step 5912 that the letter title block is set to off then the value of USERS2 is set equal to "LETTER" at step 5918. After steps 5914–5918, the GETSIZE() subroutine ends at step 564.

A diagram of the flowchart of the UPDATE.LSP subroutine called by the STARTUP.LSP is shown in FIG. 60. The update program is implemented when entering the EVENT/CAD environment and checks the $EDATA$ block in the legend block to determine if changes need to be made to the title block or legend before entering the drawing. If changes are necessary, they are made and the drawing is entered.

When called, the UPDATE.LSP subroutine starts at step 6000 and then gets the nth attribute from the $EDATA$ block at step 6002.

The title block entry is then changed to correspond to the attribute name to the data stored in the nth value of $EDATA$ using the ATTEDIT command at step 6004.

A determination is then made at step 6006 of whether the nth item is the seventh item. If a negative determination is made at step 6006, then the subroutine goes to step 6008 and repeats steps 6002–6006.

If an affirmative determination is made at step 6006 then the LMODE value is set to equal the next attribute value at step 6010 and the LL and UR values are set to the values of the next two attributes at step 6102. The UPDATE.LSP subroutine then ends at step 564.

Once the EVENT/CAD program module has been started up, a main menu is displayed for the user which has the following categories, as shown in Table 4: Files, Add, Display, 3D/Animation, Edit, Clean Up, Options, and Utilities. The display choices are used to navigate through the EVENT/CAD program module. When the EVENT/CAD menu is displayed, the CADEM.MNL subroutine, a diagram of the flowchart of which is shown in FIG. 61, is automatically called.

The CADEM.MNL subroutine provides support for the CADEM.MNU file that is automatically loaded when the EVENT/CAD menu is shown to the user. That file includes short routines that are referenced by the main EVENT/CAD menu. MNL files are searched for and loaded by AutoCAD whenever an associated .MNU file is accessed.

When called, the CADEM.MNL subroutine starts at step 6100, defines the FAST_ACCESS() subroutine at step 6102, the NORMAL_ACCESS() subroutine at step 6104 and the CAMVIEW() subroutine at step 6106. The CADEM.MNL subroutine then ends at step 564.

Figure 21:
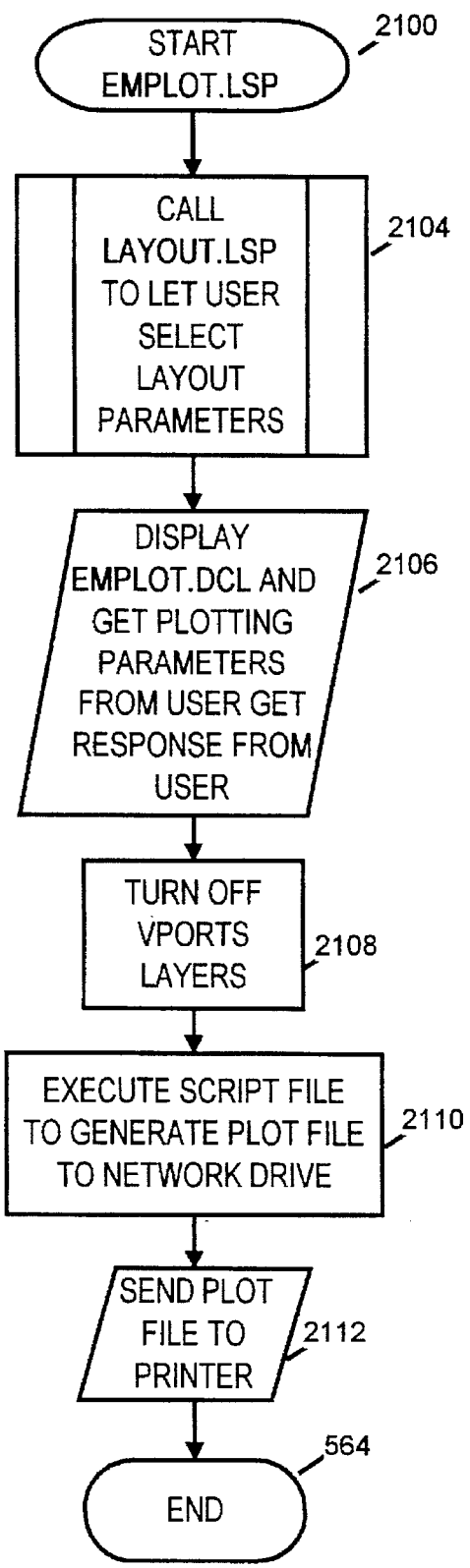
Figure 42:
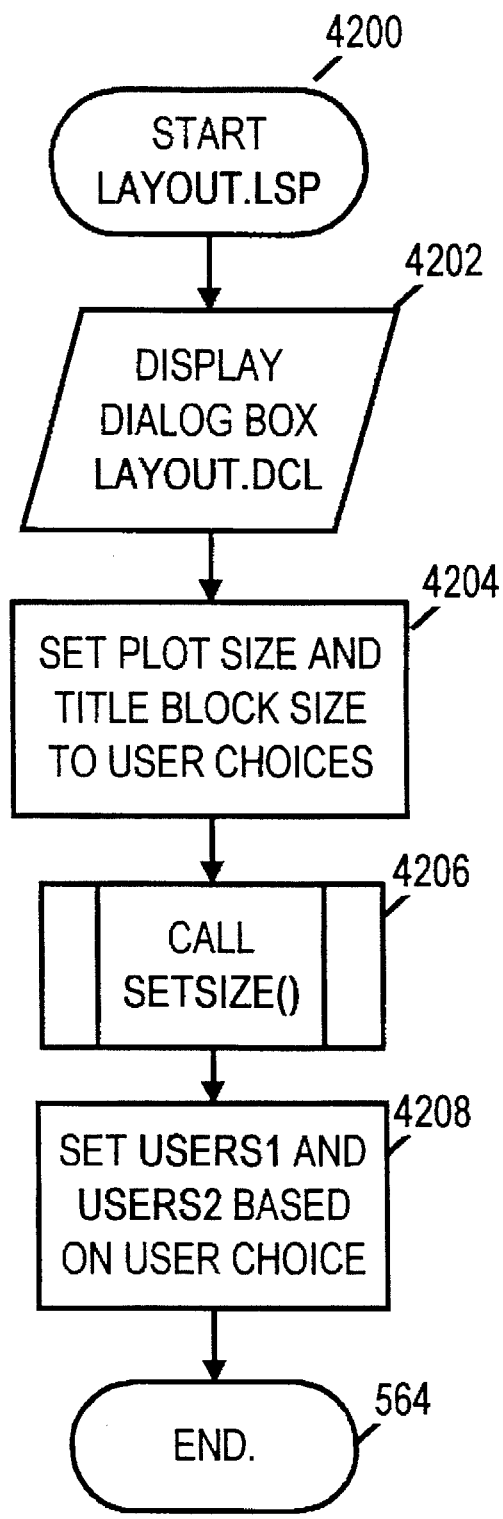

The first item under the Files menu choice is Plot. This item allows the user to produce plots in the EVENT/CAD environment. Using a dialog box, the user can specify the plot setting (show title block, plot with hidden lines, and plot size). The dialog box defaults are taken from the global variables USERS1 and USERS2. When this item is selected, the EMPLOT.LSP subroutine, a diagram of the flowchart of which is shown in FIG. 21. When the EMPLOT.LSP subroutine is called, it first starts at step 2100 and then calls the LAYOUT.LSP subroutine at step 2104, which lets the user select layout parameters. A diagram of the flowchart of the LAYOUT.LSP subroutine is shown in FIG. 42.

Figure 75A:
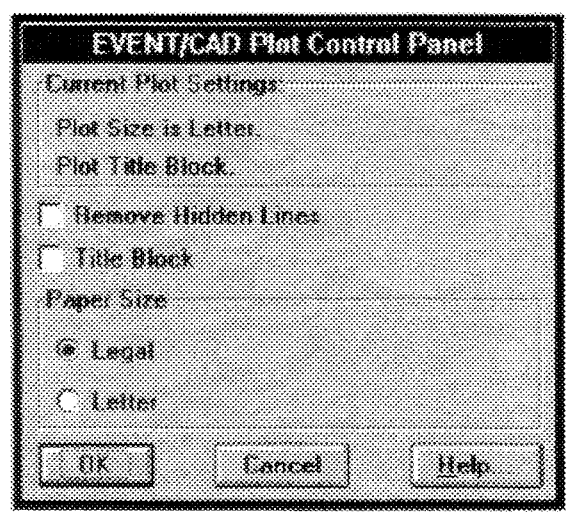
FIGS. 75A–75T are drawings of window screens used in connection with the operation of the EVENT/CAD program module of the present invention.

The EMPLOT.LSP subroutine then displays the CAD/EM Plot Control Panel shown in FIG. 75A which gets from the user certain plotting parameters, such as the size of the paper, whether hidden lines are to be removed, and other items shown in FIG. 1000A. The EMPLOT.LSP subroutine then turns off the vport layers at step 2108, executes a script file to generate the plot file to the network drive at step 2110, and then sends the PLOT file to the appropriate printer at step 2112.

Figure 22:
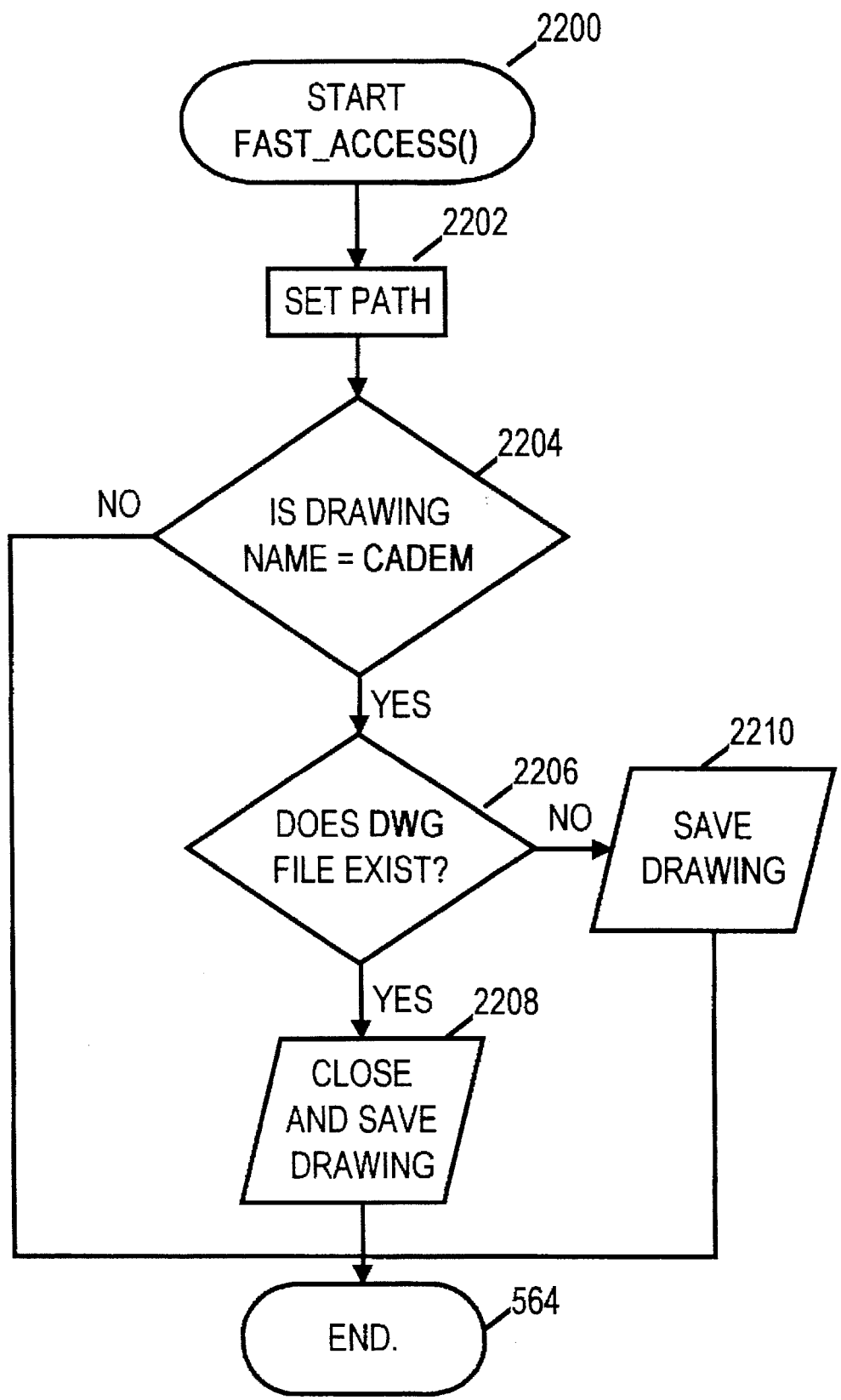

If the user selects the Make Fast Access item under the Files main menu selection, then the FAST_ACCESS() subroutine is called. A diagram of the flowchart of that subroutine is shown in FIG. 22. Once that subroutine is called, it starts at step 2200, sets the path at step 2202, and then determines at step 2204 whether the current drawing name is a Fast Access drawing. If an affirmative determination is made at step 2204, then a determination is made at step 2206 of whether a drawing file exists. If an affirmative determination is made at step 2206, then the current drawing is closed and saved. If a negative determination is made at step 2206, then the drawing is saved at step 2210. If a negative determination is made at step 2204 and after steps 2208 and 2210, the FAST_ACCESS() subroutine ends at step 564.

Figure 23:
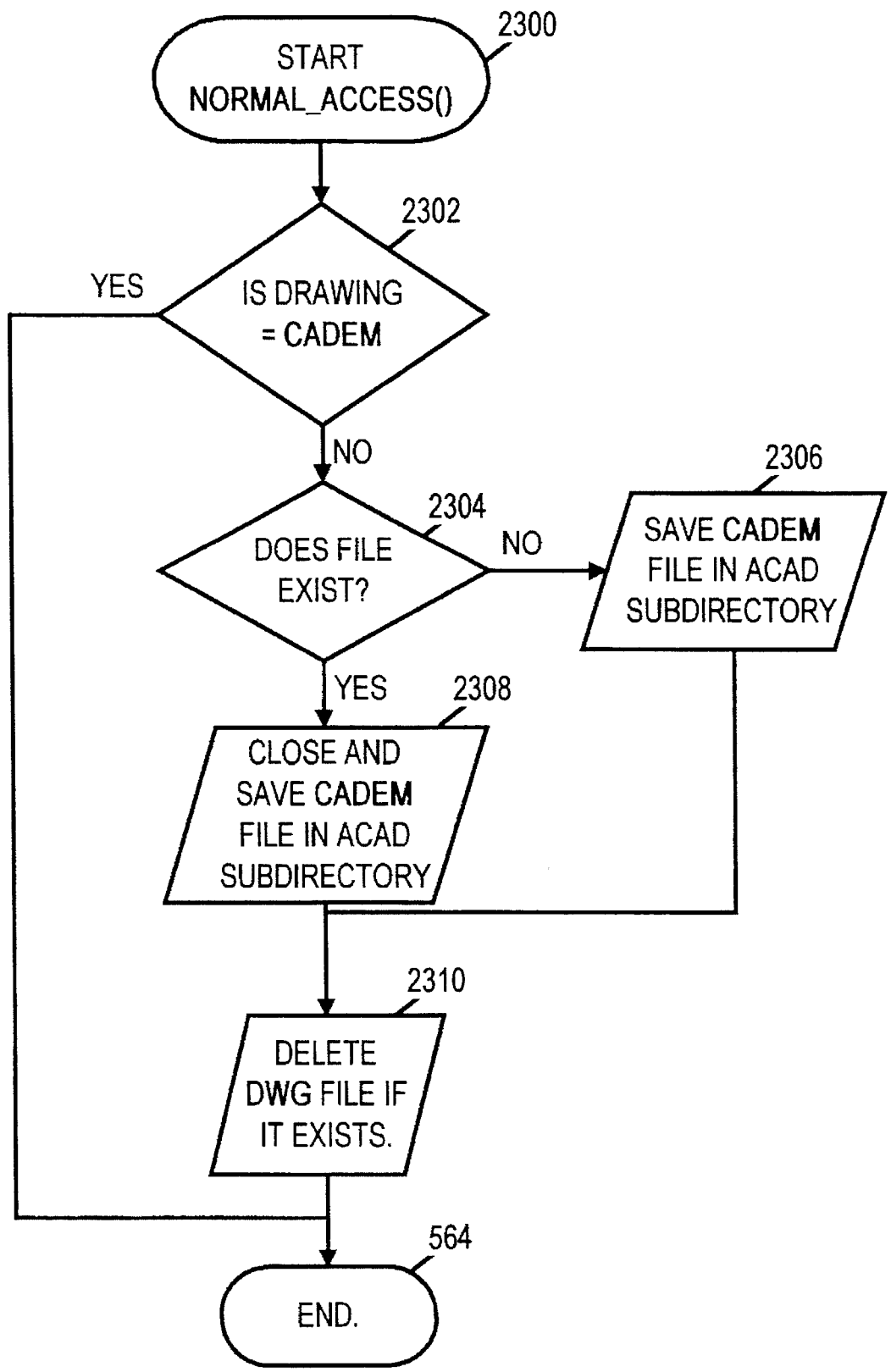

If the user desires to access a file in a normal manner, then the Make Normal Access item is selected, which calls the NORMAL_ACCESS() subroutine, a diagram of the flowchart of which is shown in FIG. 23. Once that subroutine is called, it starts at step 2300 and determines at step 2302 whether the drawing selected is equal to CADEM. If an affirmative determination is made at step 2302, the program ends at step 564. If a egative determination is made at step 2302, then a determination is made at step 2304 of whether the requested drawing file exists. If an affirmative determination is made at step 2304, then the file is closed, and the CADEM file is saved in the ACAD subdirectory, all at step 2308. If a negative determination is made at step 2304, then the CADEM file is saved in the ACAD subdirectory at step 2306.

After steps 2306 and 2308, the drawing file is deleted if it exists at step 2310, and the subroutine then ends at step 564.

The next option available under the Files menu selection item is the Delete option. Three types of files can be deleted using this option, either an animation file, a fast access file can be selected, or an animation settings file can be selected.

Figure 24:
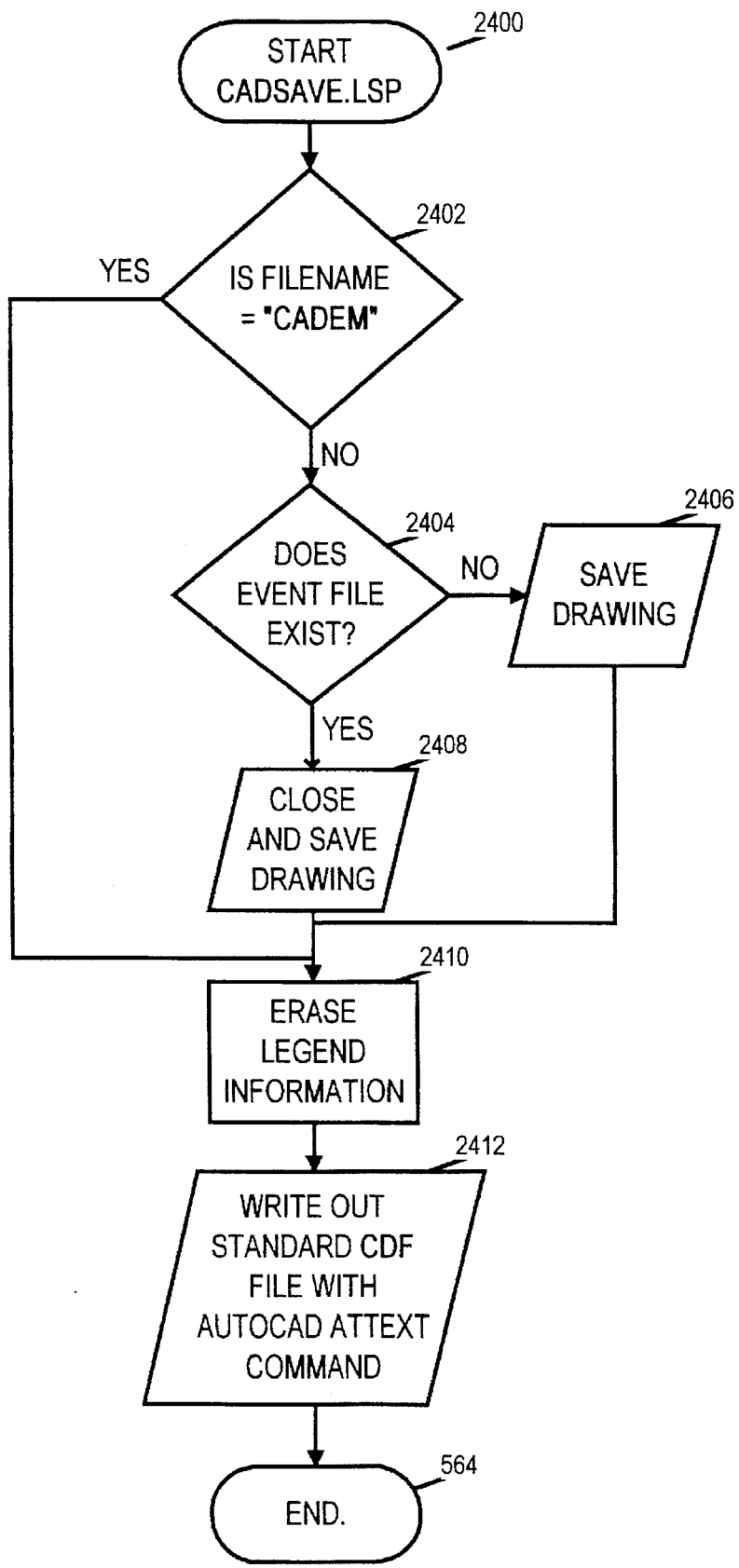

The next item which can be selected under the Files main menu selection is the Save option. This option saves any changes made to the current drawing. If the drawing is a fast access drawing, it saves the drawing as a fast access drawing. All information on the legend layer is erased before exiting. The selection of the Save option calls the CADSAVE.LSP program which, in addition to performing the foregoing functions, also creates a CADEM.TXT CDF file which stores all of the block information to be imported into the EM/DATA program module. A diagram of the flowchart of the CADSAVE.LSP subroutine is shown in FIG. 24.

Once called, the CADSAVE.LSP subroutine is started at step 2400 and then determines whether the current file name is equal to CADEM. If a negative determination is made, a determination is then made of whether an event file for the current drawing exists at step 2404. If a negative determination is made at step 2404, then the current drawing is saved at step 2406.

If an affirmative determination is made at step 2404, then the current event file is closed and the drawing is saved at step 2408. If an affirmative determination is made at step 2402 and after steps 2406 and 2408, the legend information is erased at step 2410. The CADSAVE.LSP subroutine then writes out a standard CDF file with AutoCAD ATTEXT command at step 2412, and then ends at step 564.

If the Exit option is selected under the File main menu selection, then the CADOUT.LSP subroutine is called. The CADOUT.LSP function is used when the user is finished designing the room and wants to return to the EM/DATA database. It saves the drawing changes and executes an exit script to return the user to the EM/DATA environment.

Figure 25:
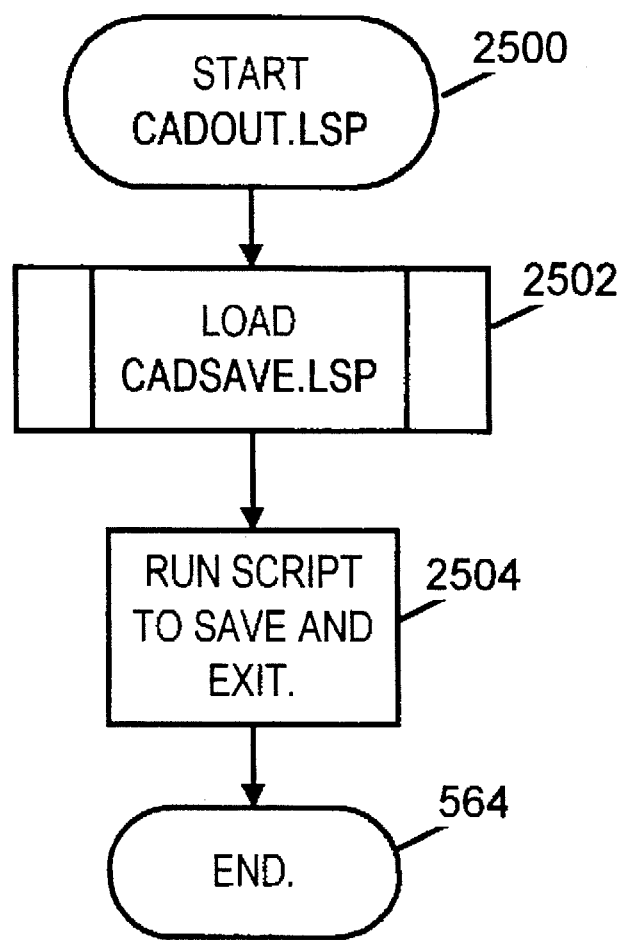

A diagram of the flowchart of the CADOUT.LSP subroutine is shown in FIG. 25. Once that subroutine is called, it starts at step 2500 and then loads the CADSAVE.LSP subroutine at step 2502. At step 2504, the CADOUT.LSP subroutine runs a Script file to save the drawing changes and then exits. The CADOUT.LSP subroutine ends at step 564.

Figure 26:
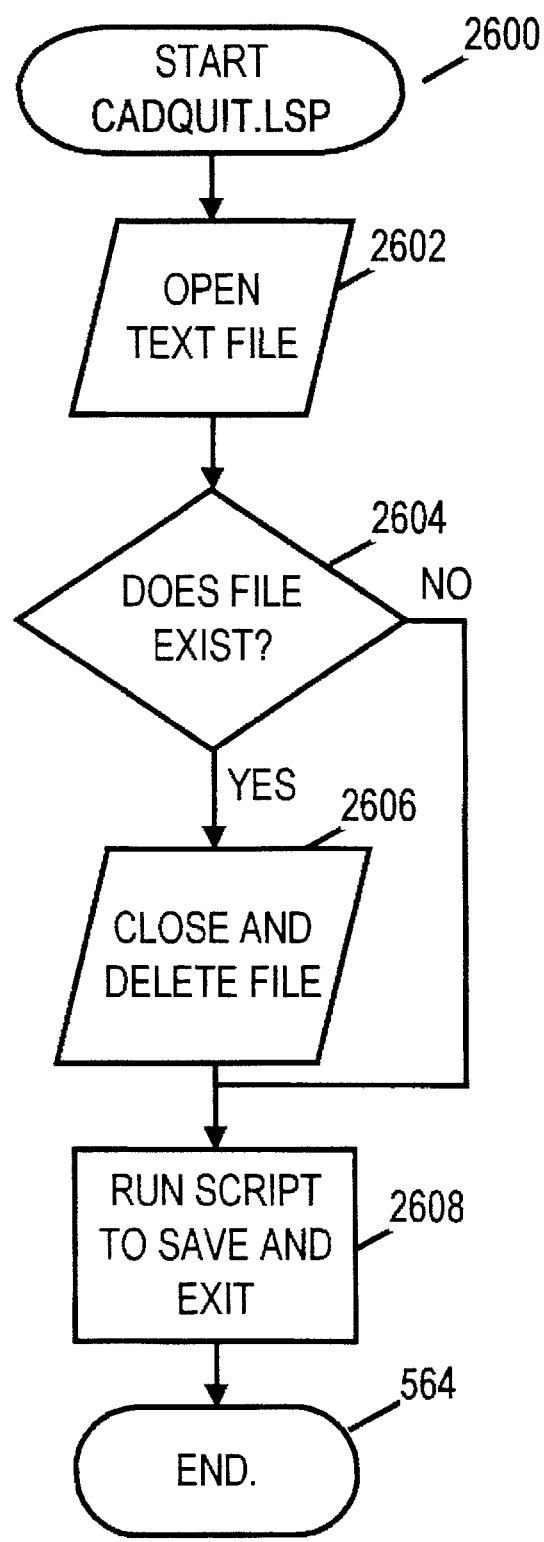
Figure 27:
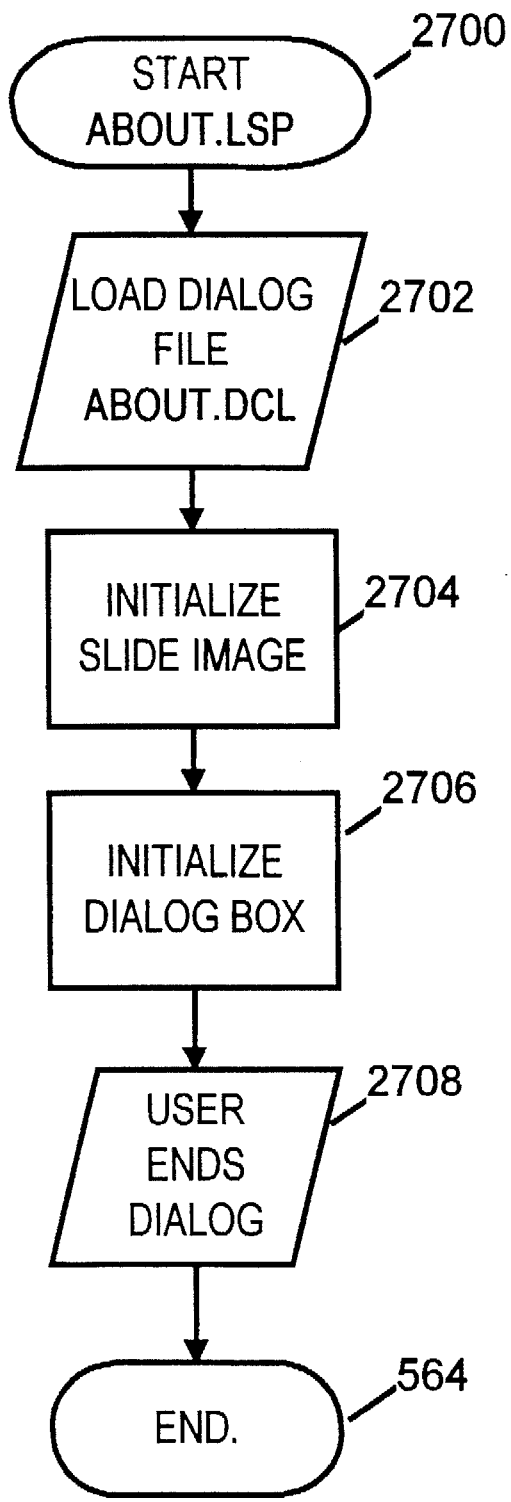
Figure 28:
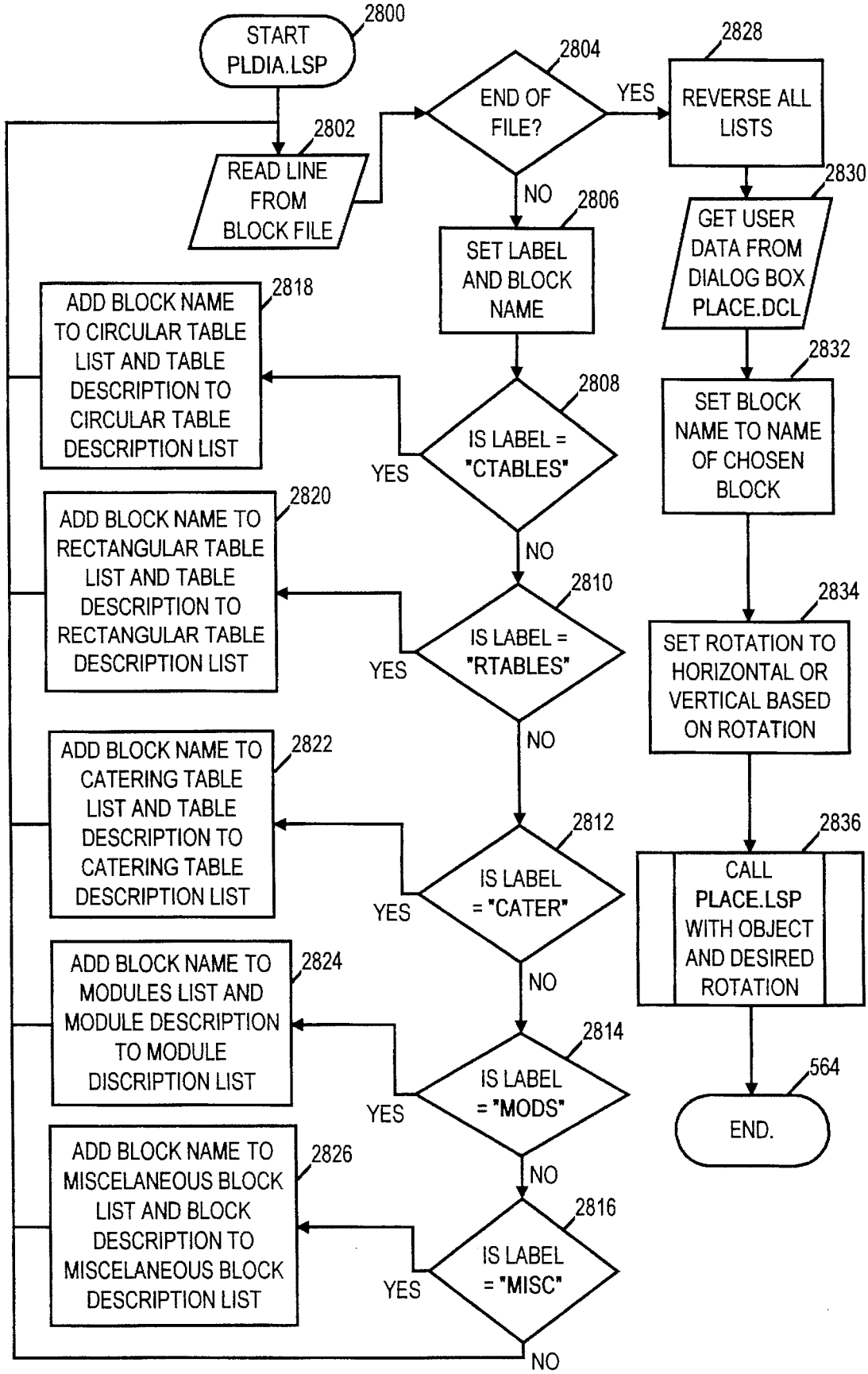

If the user desires to quit the EVENT/CAD environment and return to the EM/DATA environment without saving any drawing changes, the user selects the Quit item as the Files main menu selection. Selecting the Quit item calls the CADQUIT.LSP subroutine, a diagram of the flowchart of which is shown in FIG. 26. Before exiting, the CADQUIT.LSP subroutine checks to see if a CADEM.TXT file exists and, if it does, erases it.

Once called, the CADQUIT.LSP subroutine starts at step 2600 and then opens a TEXT file at step 2602. At step 2604, a determination is made of whether a TEXT file exists. The TEXT file is the CADEM.TXT CDF file. If the user is quitting without changing the drawing, the CDF file is deleted so that the DATABOND module does not update the record in the LAYOUT file. If the READ.CDF.LAYOUT subroutine cannot find a CDF file (because it has been deleted) the program exits and any change the user has made to the drawing in the EVENT/CAD module will be discarded.

If an affirmative determination is made at step 2604, then the TEXT file is closed and deleted at step 2606, and then a Script command is run to save the current drawing and then exit from the EVENT/CAD environment at step 2608. In the event that a negative determination is made at step 2604, the subroutine jumps to execute step 2608. After executing step 2608, the CADQUIT.LSP subroutine ends at step 564.

The final option under the File main menu selection is the About item. Selecting this item causes the display of a dialog box containing company, owner, and program license information.

Figure 75B:
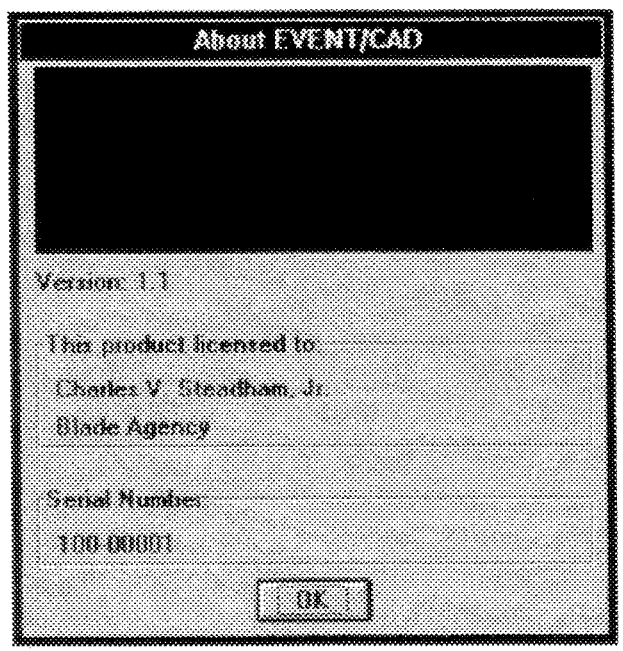

Once called, the ABOUT.LSP subroutine starts at step 2700 and then loads the dialog file ABOUT.DCL at step 2702. A drawing of the screen representation of that file is shown in FIG. 75B. The slide image is then initialized at step 2704, meaning that, where the picture is on the disk drive, the size of the image and the background color is specified by the user, and the dialog box is initialized at step 2706. After the user is finished entering any information at step 2708, the subroutine ends at step 564.

The second main menu selection is the Add selection which allows the user to modify an existing drawing by adding certain inventory or other items to the drawing.

The first option available under the Add main menu selection is Tables. Different types of tables, such as round tables and rectangular tables, can be selected. Under the Add main menu selection, staging and staging equipment can also be selected. These items all call the same subroutine, PLDIA.LSP, as does the selection of CATERING or PROPS under the Add main menu selection.

The PLDIA.LSP subroutine lets the user select a block from inventory lists and add it to the drawing. The inventory lists are read from the file BLOCKS.LST. Those lists are added to the PLACE.DCL dialog box (FIG. 75R) which is called by the PLDIA.LSP subroutine. The dialog box lets the user change the value of the MODE variable and the rotation angle. Thus, a rectangular table can have its long edge at a selected angle between 0° and 360° with respect to the top horizontal line defining the drawing. This subroutine also lets the user preview the block as a slide.

Figure 62:
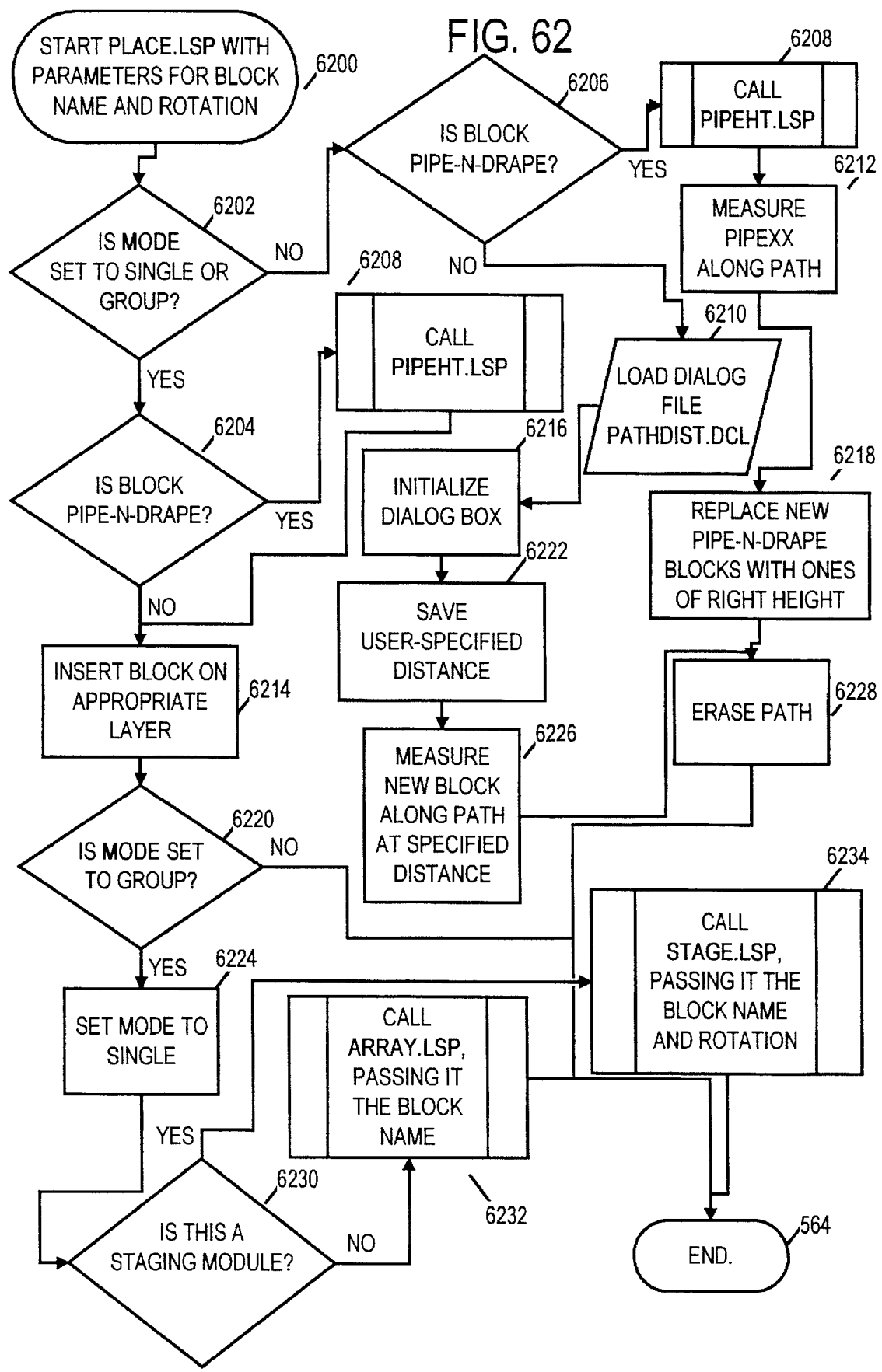

Once the block is selected and the settings are checked, the PLDIA.LSP subroutine calls the PLACE.LSP subroutine and passes to it the block name and rotation information. A diagram of the flowchart of the PLACE.LSP subroutine is shown in FIG. 62. Once called, the PLDIA.LSP subroutine starts at step 2800 and reads a line from the block file at step 2802. It then determines whether it is at the end of the file at step 2804. If a negative determination is made at step 2804, then the label and block name are set at step 2806, and a determination is made at step 2808 of whether the current label is equal to CTABLES. If an affirmative determination is made at step 2808, then a block name is added to the circular table list and a table description to the circular table description list.

If a negative determination is made at step 2808, then a determination is made at step 2810 of whether the current label is equal to RTABLES. If an affirmative determination is made at step 2810, then, at step 2820, a block name is added to the rectangular table list and a table description to the rectangular table description list.

If a negative determination is made at step 2810, then a determination is made at step 2812 of whether the current label is equal to CATER. If an affirmative determination is made at step 2812, then a block name is added to the catering table list and a table description to the catering table description list at step 2822.

If a negative determination is made at step 2812, then a determination is made at step 2814 of whether the current label is equal to MODES. If an affirmative determination is made at step 2814, then a block name is added to the modules list and a modules description to the module description list at step 2824.

If a negative determination is made at step 2814, then a determination is made at 2816 of whether the current label is equal to MISC. If an affirmative determination is made at step 2816, then a block name is added to the miscellaneous block list and a block description to the miscellaneous block description list at step 2826.

If a negative determination is made at step 2816 and after each of the steps 2818–2826, the PLDIA.LSP subroutine then goes to step 2802 and reads the next line from the block file.

Figure 75C:
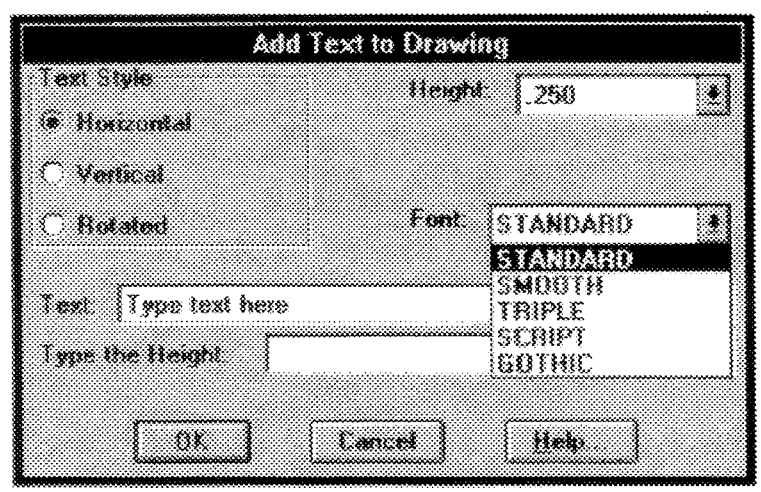
Figure 75D:
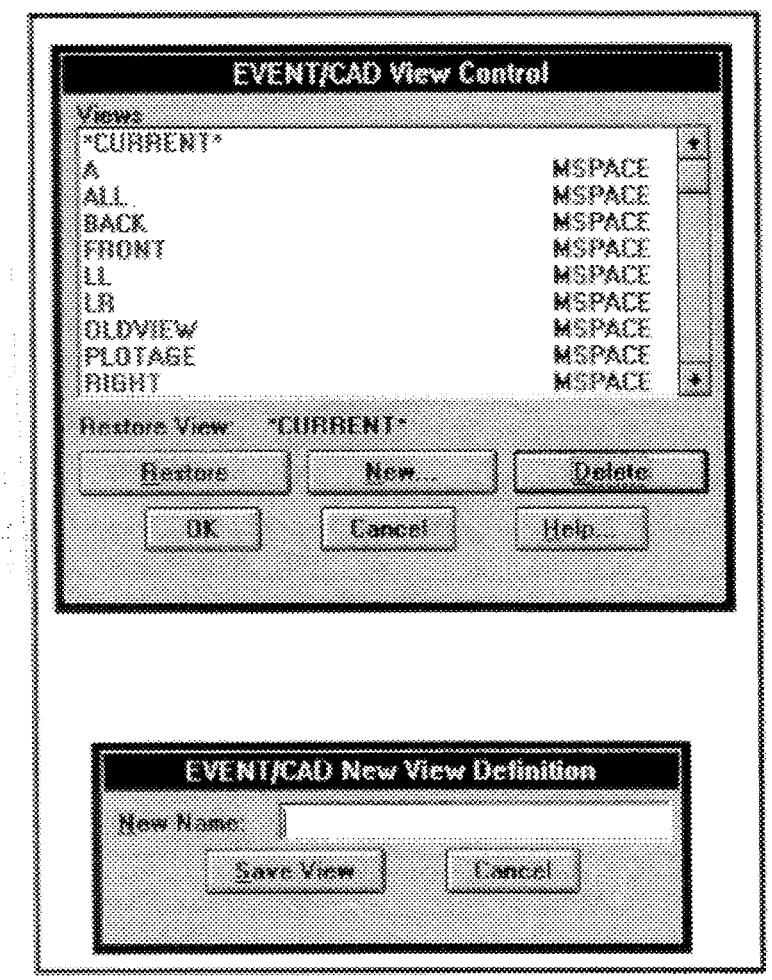
Figure 75E:
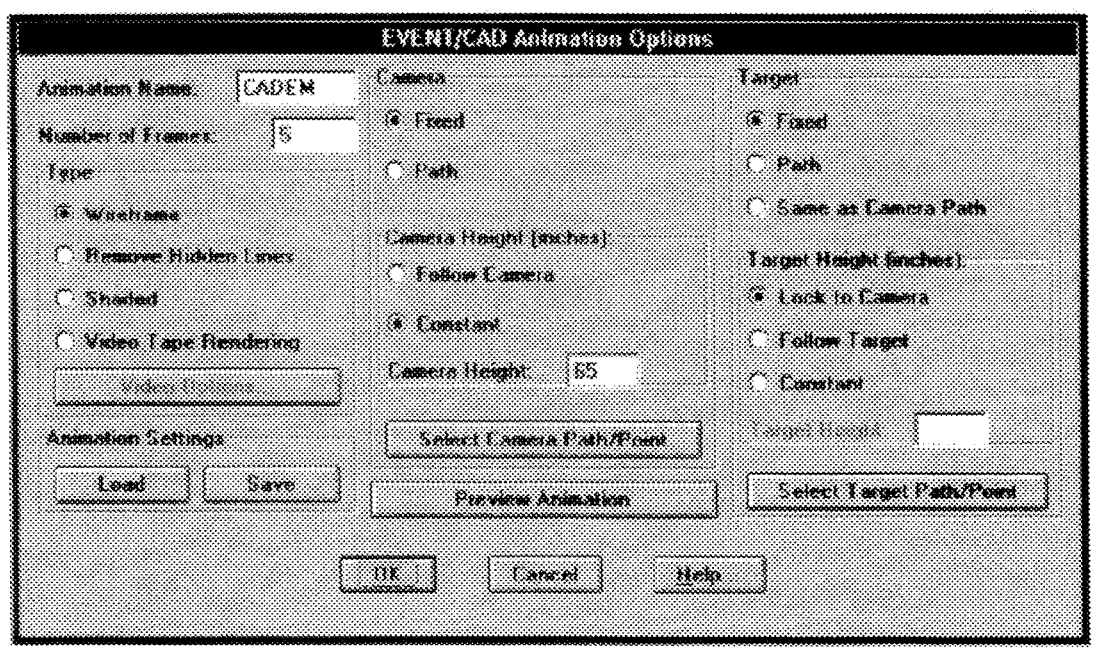
Figure 75F:
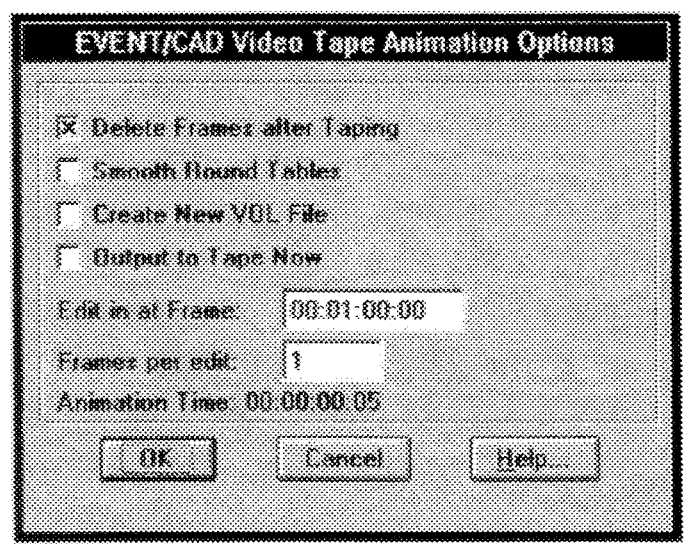
Figure 75G:
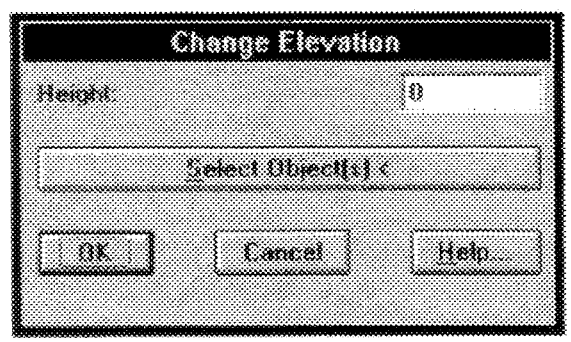
Figure 75H:
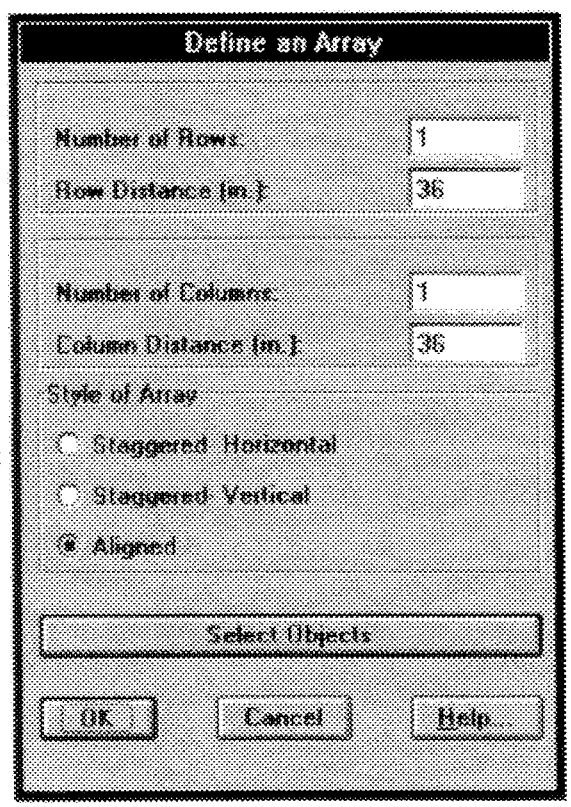
Figure 751:
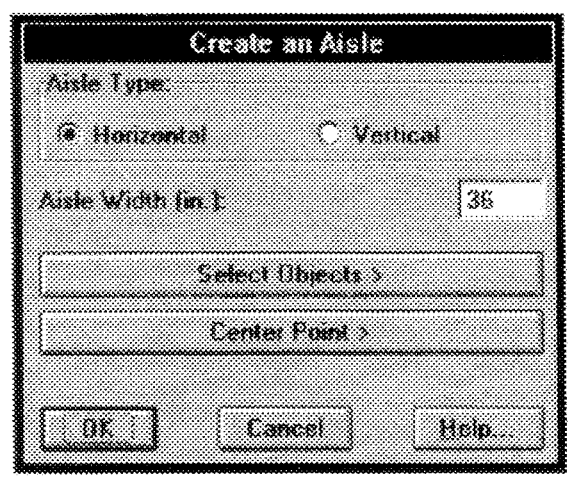
Figure 75J:
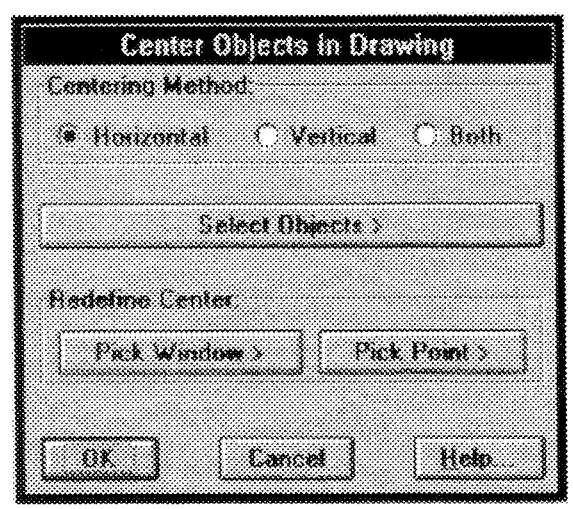
Figure 75K:
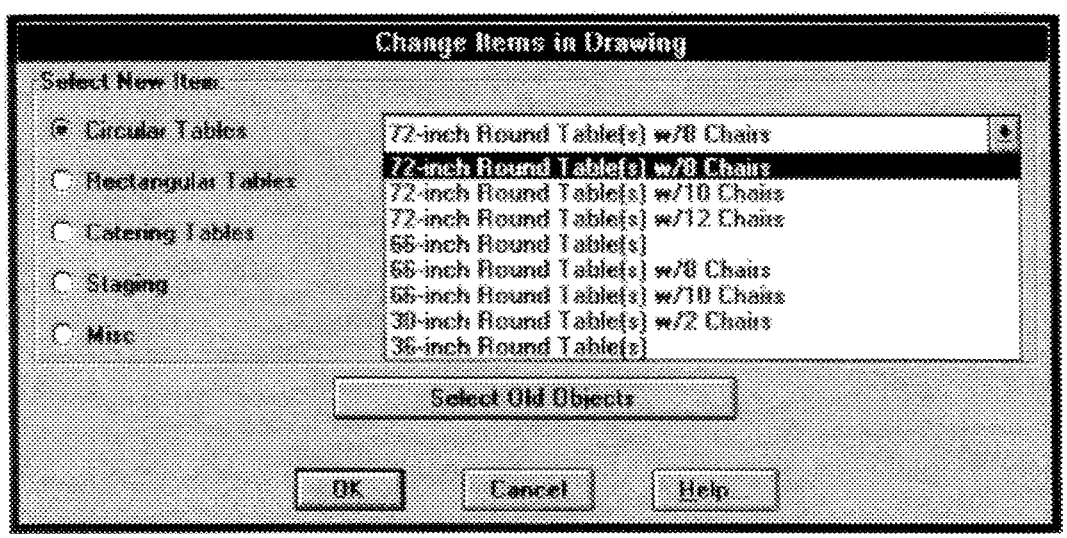
Figure 75L:
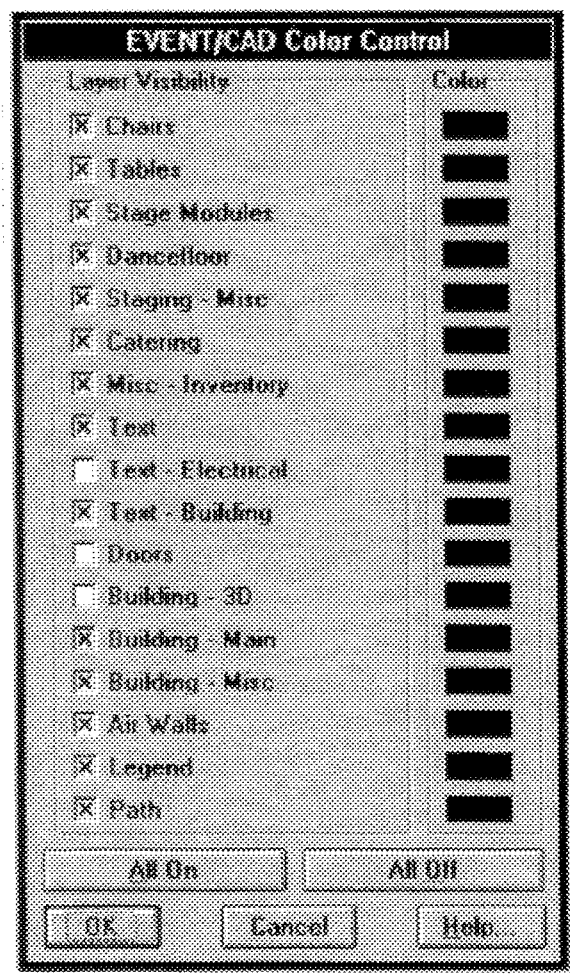
Figure 75M:
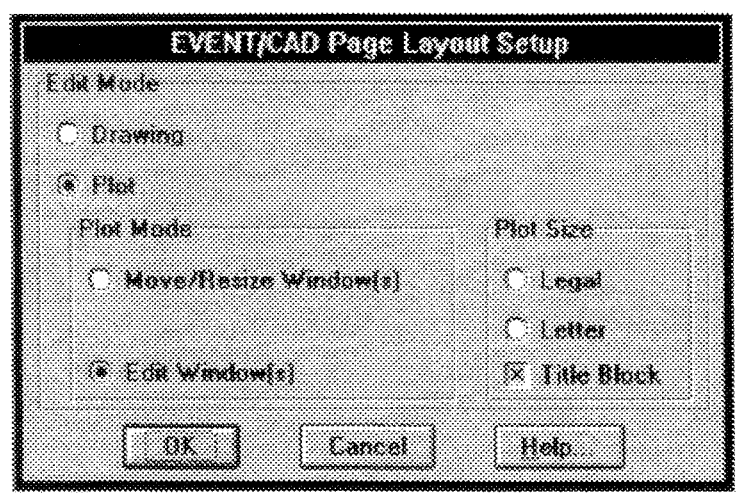
Figure 75N:
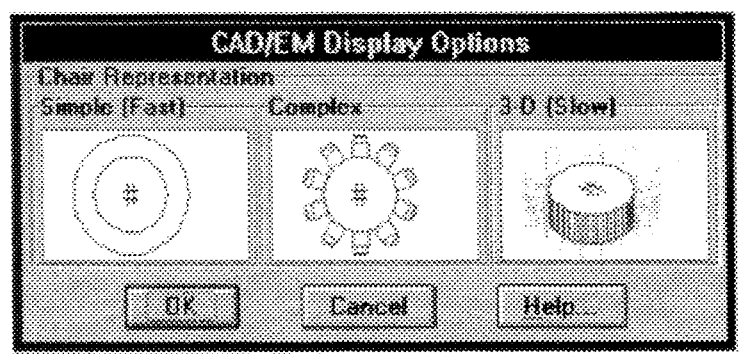
Figure 75O:
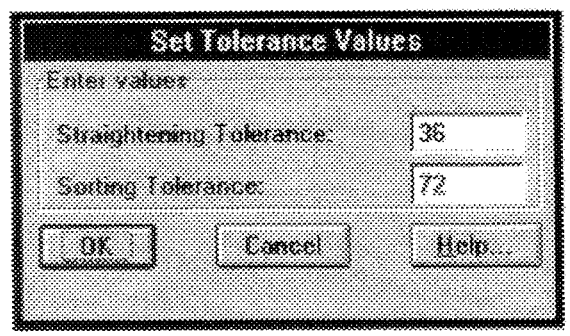
Figure 75P:
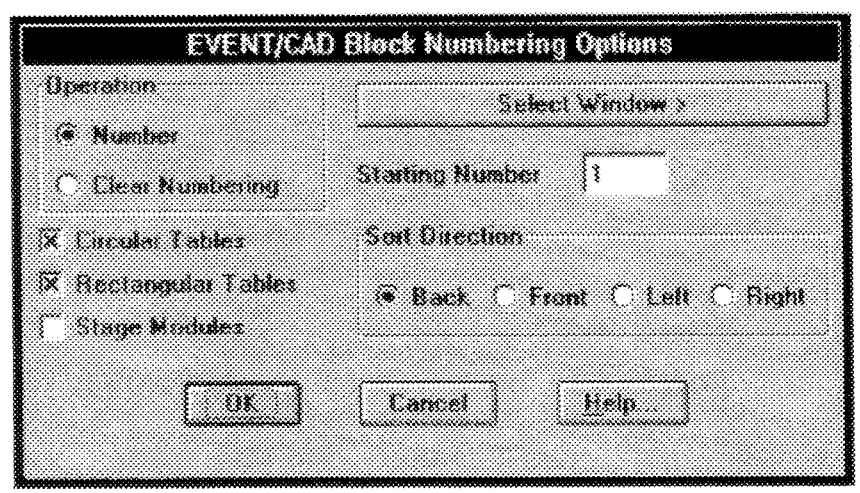
Figure 75Q:
Figure 75R:
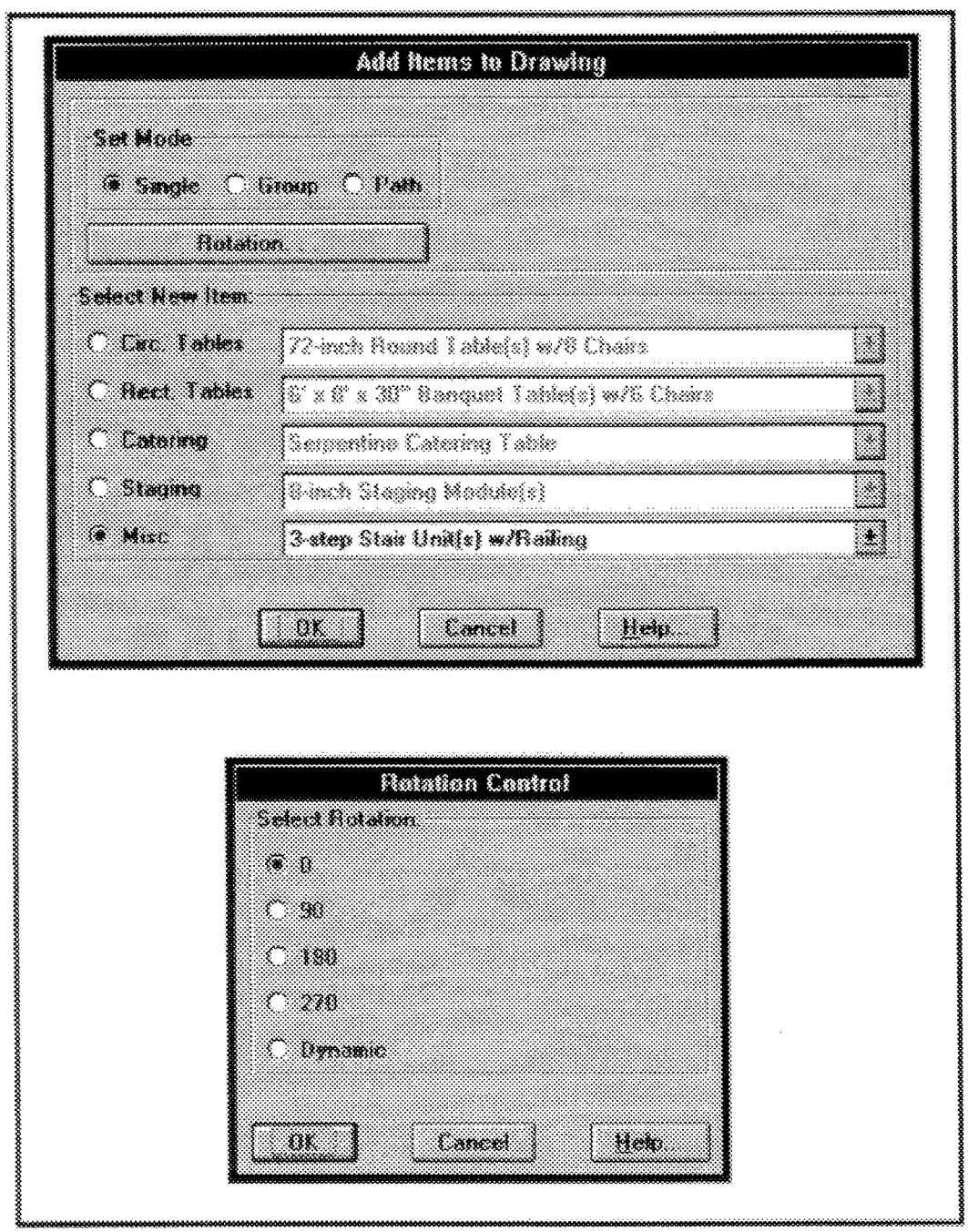

If an affirmative determination is made at step 2804, meaning that the end of the file has been reached, then all of the lists are reversed at step 2828, and then user data is gotten from the dialog box such as shown in FIG. 75R, at step 2830. The name of the block is set to the name chosen by the user at step 2832. The rotation is then set to horizontal or vertical, based on the rotation selection at step 2834. The PLACE.LSP subroutine is then called with the selected object and the desired rotation at step 2836. The PLDIA.LSP subroutine then ends at step 564.

Figure 29:
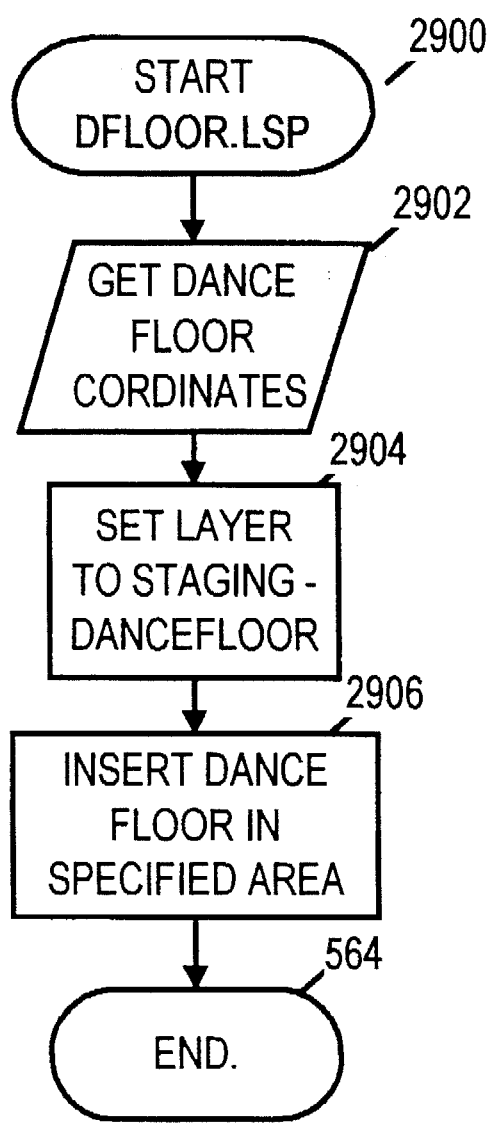

If the Construct Dancefloor option was selected from the Add main menu selection, then the DFLOOR.LSP subroutine is called. This subroutine is used to produce a dance floor. The user specifies the size and position of the dance floor by picking the window on screen. Before the user selects the window, the drawing snap is set to 3 feet. The subroutine computes the number of tile blocks needed to construct the dance floor. Finally, using the AutoCAD MINSERT command, the tiles are laid out in the room, making the dance floor. A diagram of the flowchart of that subroutine is shown in FIG. 29. Once that subroutine is called, it starts at step 2900 and then gets the dance floor coordinate selected by user using the mouse 120 at step 2902. The layer is then set to staging-dance floor at step 2904, and the dance floor is then inserted in the drawing in the specified area at step 2906. The DFLOOR.LSP subroutine then ends at step 564.

Figure 30:
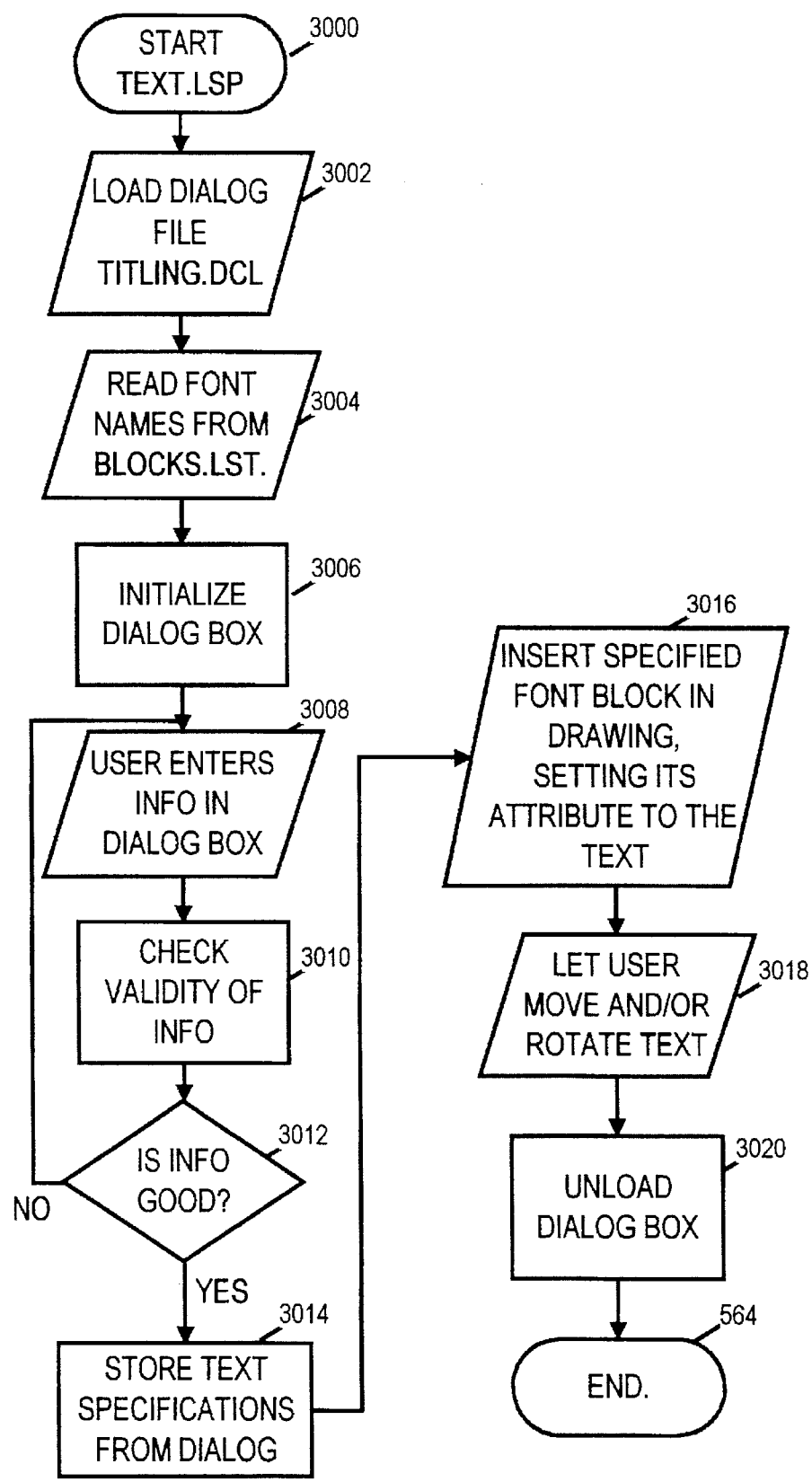

If the user selects the Text option under the Add main menu selection, then the TEXT.LSP subroutine, a diagram of the flowchart of which is shown in FIG. 30, is called. The function of this subroutine is to allow the user to write text on the drawing. As will be described later, this subroutine calls a dialog box for the user to describe the text. This subroutine scans the file BLOCKS.LST for existing font blocks and adds a list of their names to the dialog box. In the dialog box, the user can also select a standard text size or type in a custom one. The text and text style are also set in the dialog box.

The text inputted by the user is inserted as a visible attribute of a font block. The style (horizontal or vertical) is inherent in the block name. This subroutine also checks to see if the text is being inserted in a proper space. If it is not, the height parameter is multiplied by a factor so that the text is plotted in the correct size. After the font block is inserted, the user can position it on the drawing.

After the TEXT.LSP subroutine is called, it starts at step 3000 and then loads the dialog file TITLING.DCL at step 3002. That dialog box allows the user to add text to the drawing and is shown in FIG. 75C. The subroutine then reads the font names from the BLOCKS.LST file.

The dialog box shown in FIG. 75C is initialized at step 3006, and the user then enters the desired information in the dialog box at step 3008. The validity of the information is checked at step 3010, and a determination is made of whether that information is good at step 3012. If a negative determination is made at step 3012, then the user is prompted to again enter the desired information in the dialog box at step 3008.

If an affirmative determination is made at step 3012, then the text entered by the user is stored at step 3014, and then the specified font block is inserted into the drawing, and its attribute is set to the text at step 3016. At step 3018, the user is allowed to move and/or rotate the text. The dialog box is then unloaded at step 3020, and the TEXT.LSP subroutine then ends at step 564.

The Construct Stages, Create Path and Curve Path items under the Add main menu selection call AutoCAD command sequences which are believed to be obvious to those of ordinary skill in the programming art and, therefore, require no description herein.

The third main menu selection allows the user to zoom in and out of the drawing and to select various views of the current drawing. All of the items selectable under the Display main menu selection, with the exception of the View Control Panel, are performed by simple AutoCAD command sequences, and, thus, there is not believed to be any need to describe such sequences.

Figure 31:
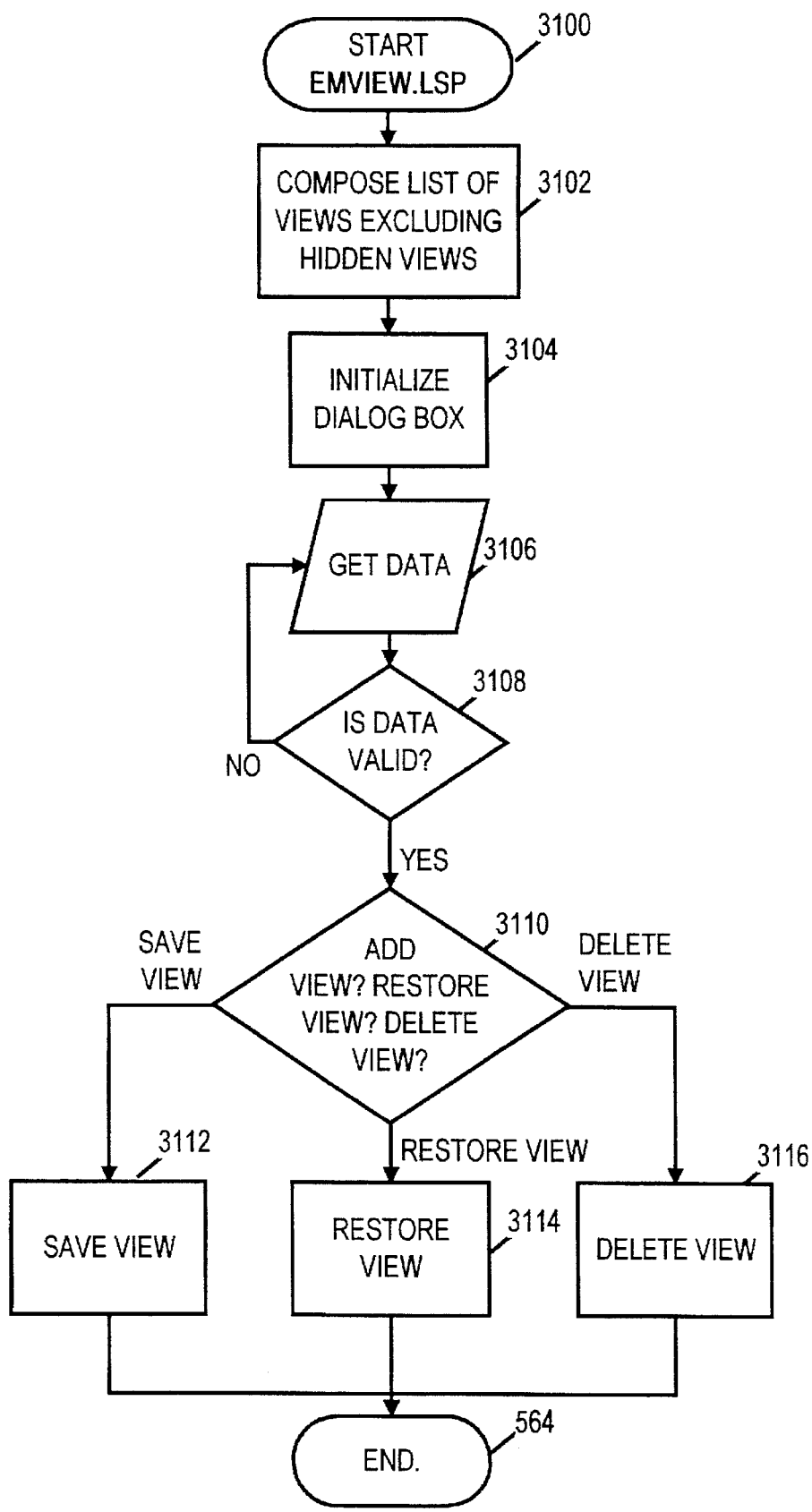

If the user selects the View Control Panel item, the EMVIEW.LSP subroutine, a diagram of the flowchart of which is shown in FIG. 31, is called. This subroutine is used to save and recall drawing views. It uses a dialog box (FIG. 75D) to display the available views. The user can select a previously saved view to restore, or can save the current view under a name. If a view exists with the new name, the user is prompted to type a different name.

Once the EMVIEW.LSP subroutine is called, it starts at step 3100 and then composes a list of views excluding hidden views at step 3102. The subroutine then displays the dialog box shown in FIG. 75D at step 3104, waits for the user to input data, and then gets that data at step 3106. At step 3108, a determination is made of whether the data is valid. If a negative determination is made at step 3108, then the subroutine informs the user that input data is invalid and then waits to get data at step 3106.

If an affirmative determination is made at step 3108, then a determination is made at step 3110 of whether the user wishes to add a view, restore a view, or delete a view. Depending upon the determination at step 3110, the EMVIEW.LSP subroutine then saves a selected view at step 3112, restores the selected view at step 3114, or deletes the selected view at step 3116. After each of the steps 3112–3116, the subroutine ends at step 564.

The fourth main menu selection available to the user is the 3D/Animation selection. The various options available to the user under that main menu selection are shown in Table 4. The 3DView, Shade, and Hide options all initiate a simple AutoCAD command sequence. The Saveslide, Viewslide, and Playback options are also simple AutoCAD sequences.

Figure 32:
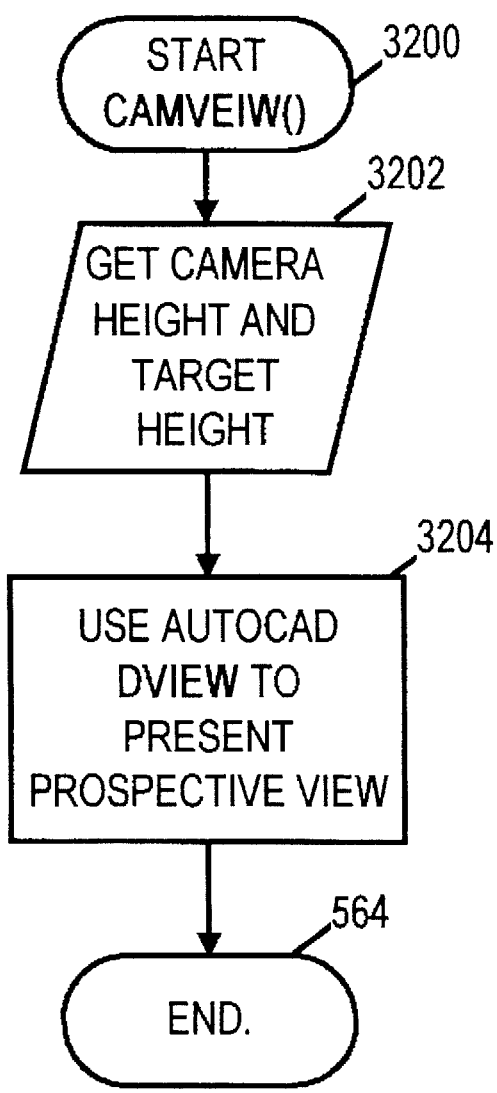

If the Camview option is selected, then the CAMVIEW() subroutine, a diagram of the flowchart of which is shown in FIG. 32, is called. Once called, the subroutine starts at step 3200 and then gets the camera height and target height from the user at step 3202. Next, the CAMVIEW() subroutine uses the AutoCAD DVIEW function to generate and present to the user a perspective view, at step 3204. The subroutine then ends at step 564.

Figure 33:
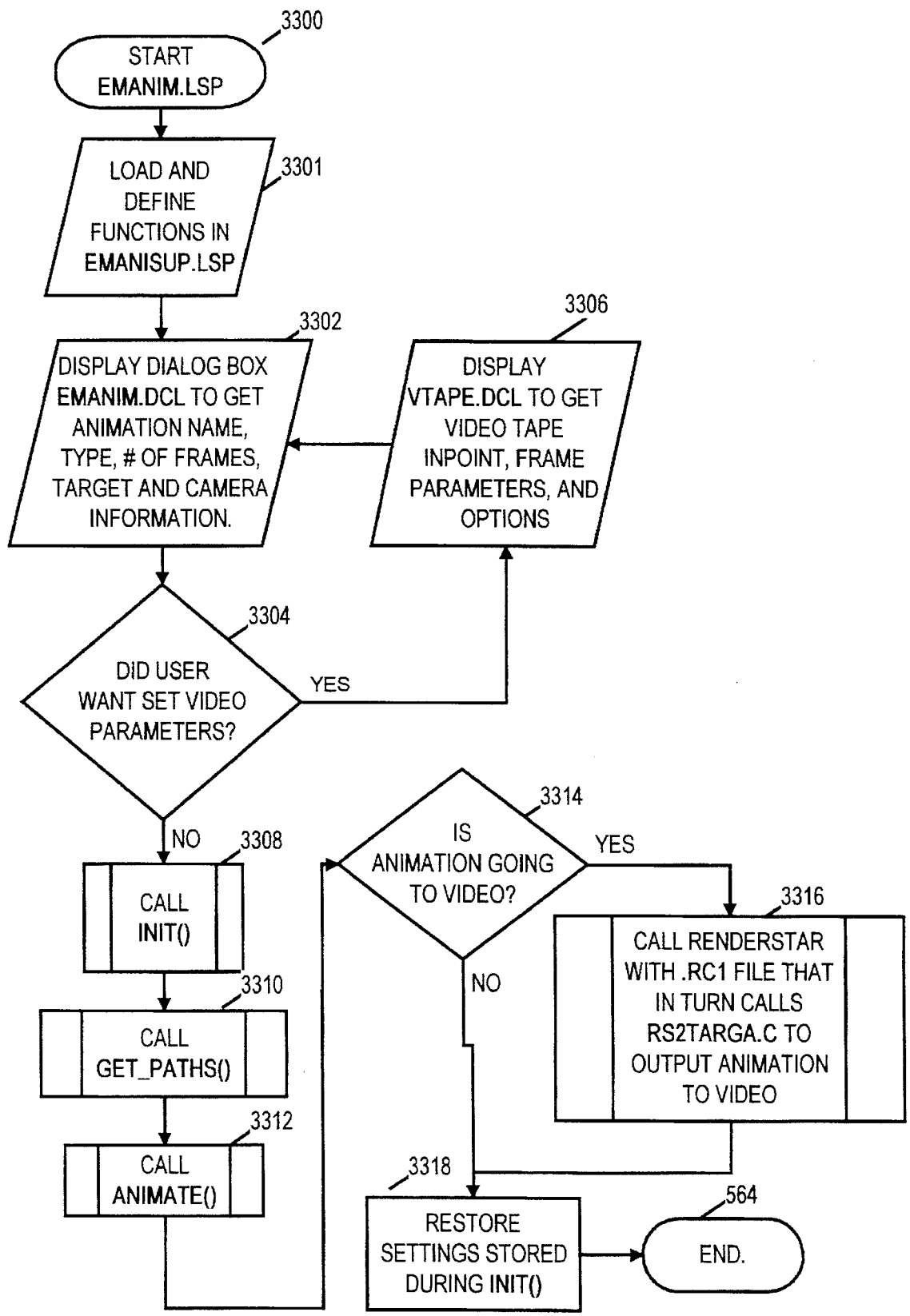

If the user selects the Animation option, the EMANIM.LSP subroutine, a diagram of the flowchart of which is shown in FIG. 33, is called. This subroutine is the main animation program and displays two dialog boxes (FIGS. 75E and 75F) and retrieves user information for preparing an animation.

Figure 63:
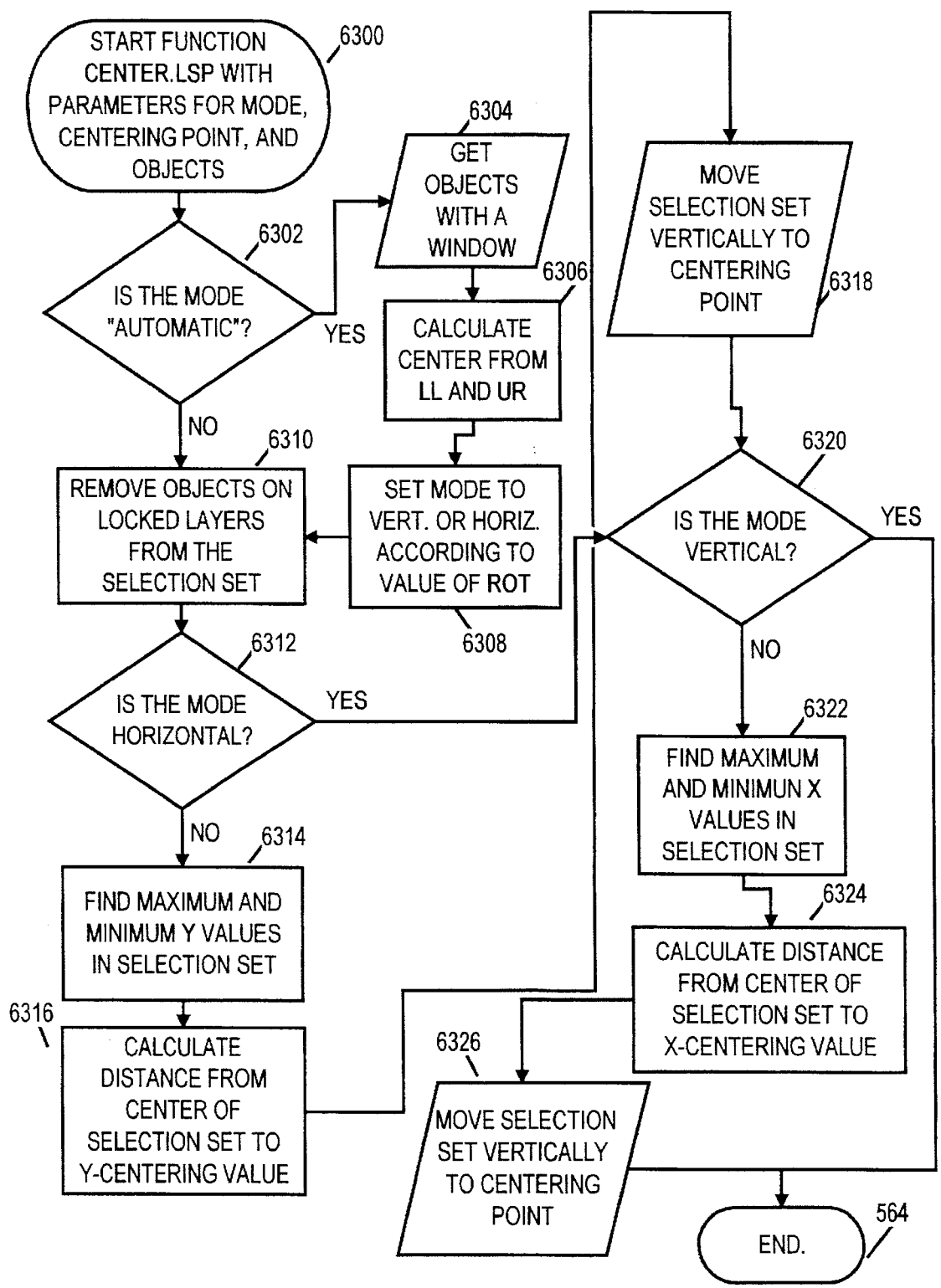

Once the EMANIM.LSP subroutine is called, it starts at step 3300, it loads and defines the functions in the EMANISUP.LSP subroutine, a diagram of the Place/Mat of which is shown in FIG. 63. It then displays for the user the dialog box shown in FIG. 75E in order to get the animation, name, type, number of frames, target and camera information, at step 3302. At step 3304, a determination is made of whether the user wanted to set video parameters. If an affirmative determination is made at step 3304, then the dialog box shown in FIG. 75F is displayed for the user in order to get the videotape inpoint, frame parameters, and options, at step 3306. After obtaining that information, the Videotape Animation options box is closed, and the subroutine then returns to step 3302.

Figure 53:
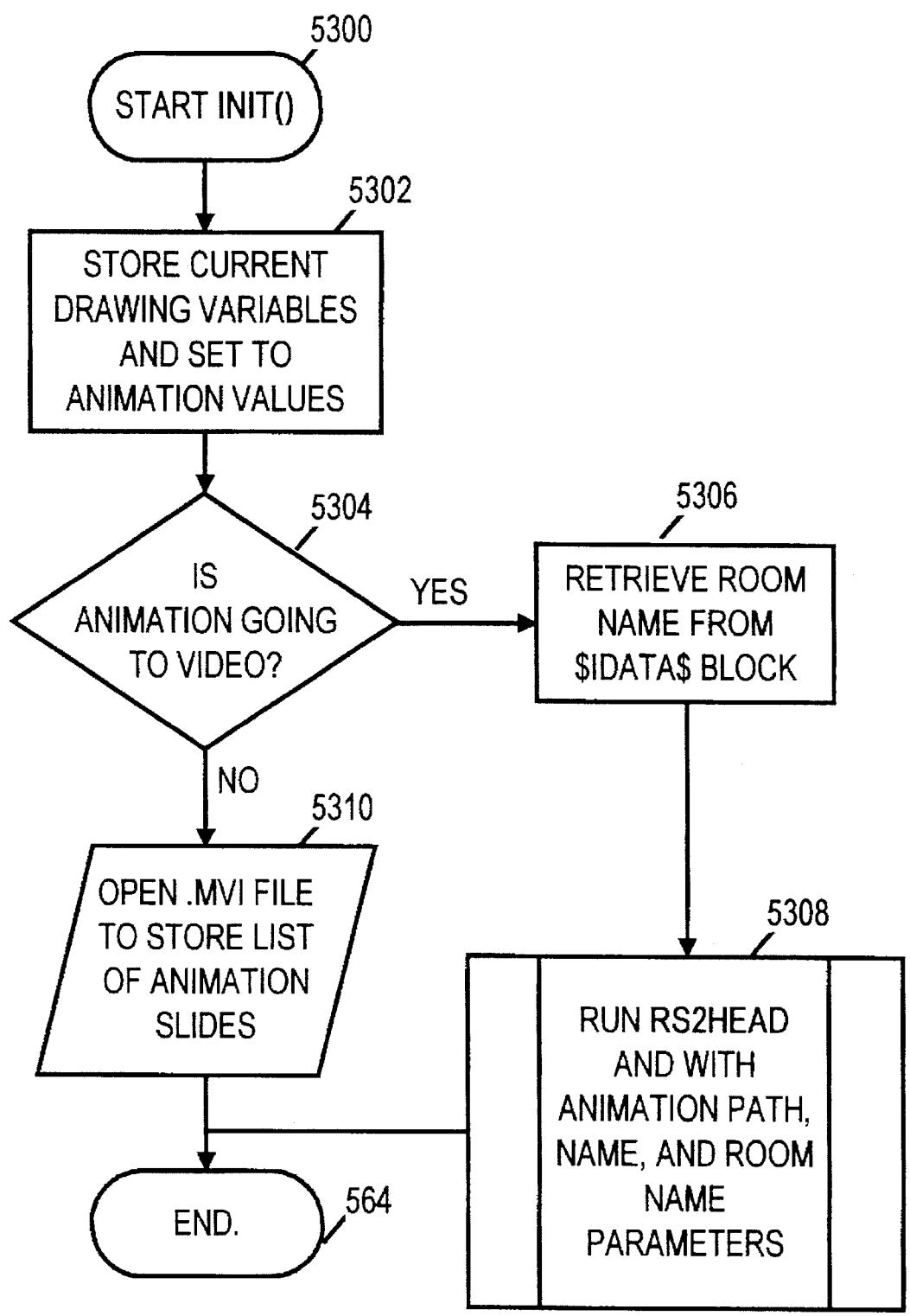
Figure 55:
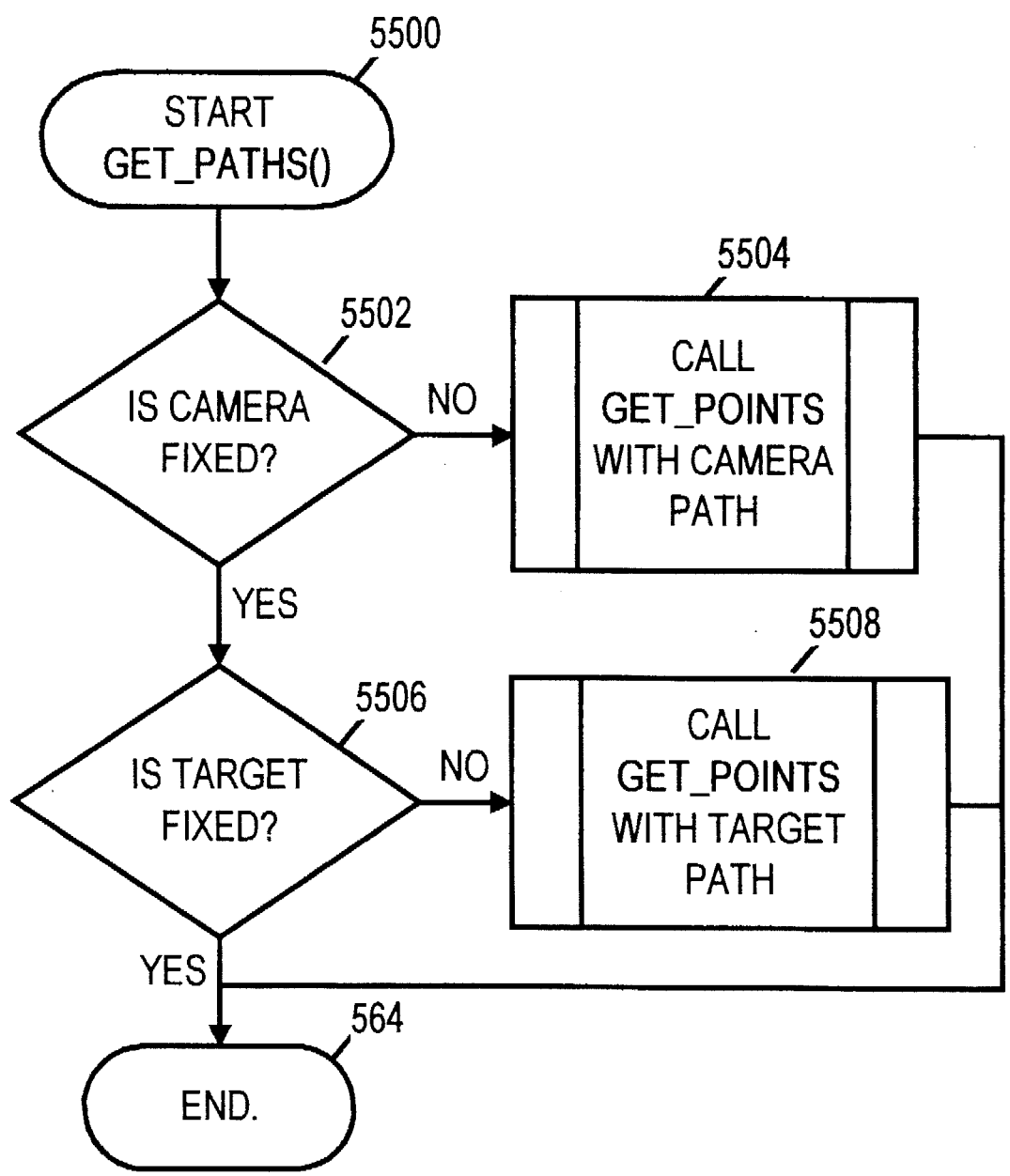
Figure 73:
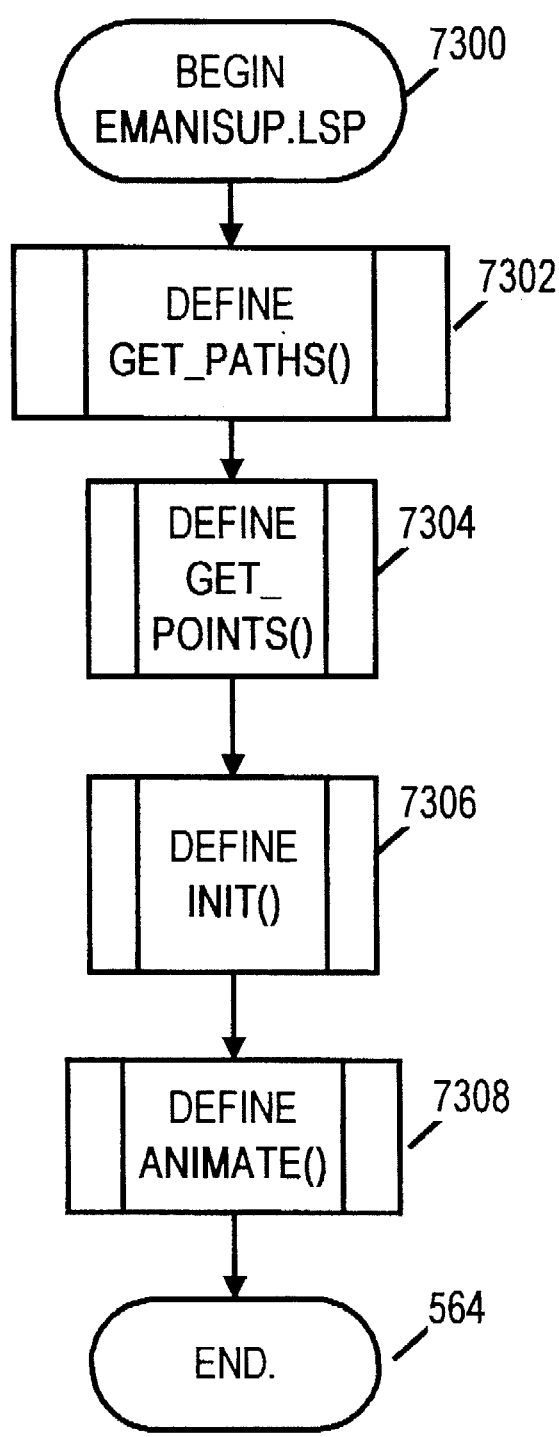

If a negative determination is made at step 3304, then the INIT() subroutine is called at step 3308. A diagram of the flowchart of the INIT() subroutine is shown in FIG. 53. At step 3310, the GETPATHS() subroutine is called. The purpose of that subroutine is to receive the path of a polyline or to determine the target and camera points, depending on the option, to be used in an animation. That function is defined in the EMANISUP.LSP subroutine, a diagram of the flowchart of which is shown in FIG. 73. A diagram of the flowchart of the GETPATHS() function is shown in FIG. 55.

Figure 57B:
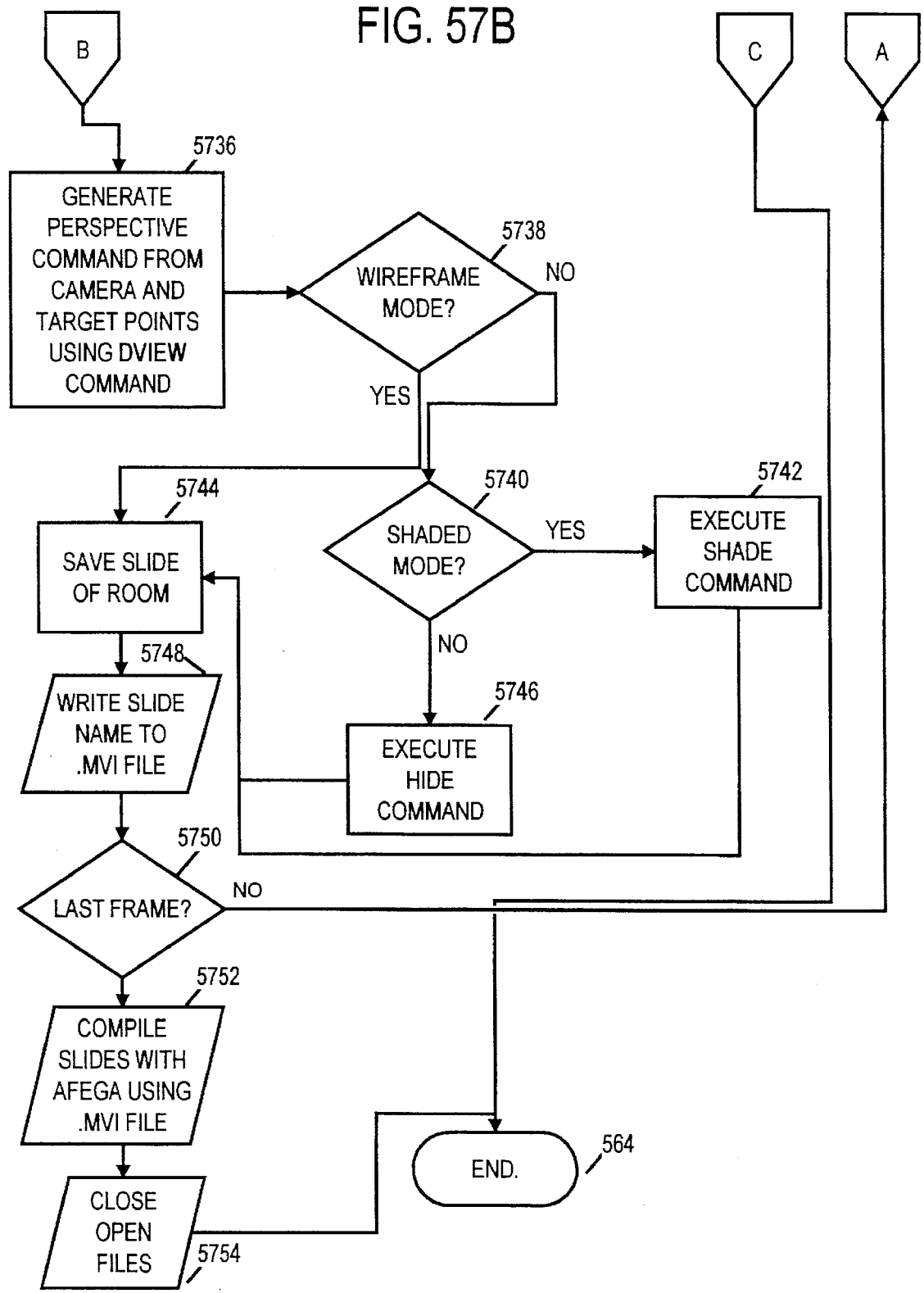

Next, the ANIMATE() function is called, at step 3312. This function is also defined in the EMANISUP.LSP subroutine. This function generates the coordinate information necessary for generating one frame of an animation. If the animation is to be generated to a disk, a view is first displayed onscreen. Hidden lines are removed from the view or the view may be shaded, depending upon the option selected. A slide is then made. If the view is generated to videotape, a control file (.RC1 file) is generated, and an ANIMATION.DXF file is also generated to be used by the RenderStar program to render the video to tape. A diagram of the flowchart of the ANIMATE() function is shown in FIGS. 57A–57B.

The settings stored during the INIT() function are restored at step 3314, and then the EMANIM.LSP subroutine ends at step 564.

The next main menu selection available to the user is the Edit selection. For performing the Erase, Move, Re-move Previous Object, Copy, Copy Multiple Times, Undo, and Redo options, various simple AutoCAD command sequences, which will be readily apparent to those of ordinary skill in the art, are utilized.

Figure 34:
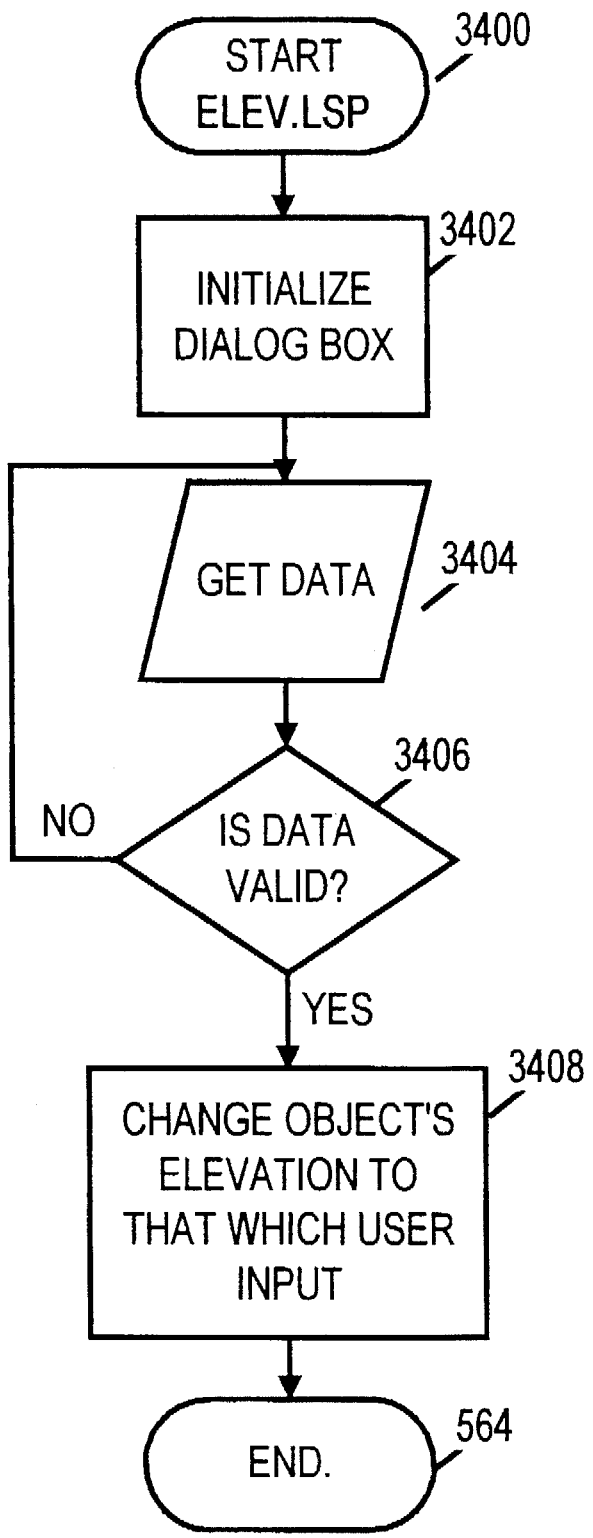

If the user desires to change the elevation of the drawing, then the ELEV.LSP subroutine is called. This subroutine is used to move objects to new elevations in 3D space. The user specifies the new elevation and the objects to be moved in a dialog box (FIG. 75G). The objects are then raised to the new elevation using the AutoCAD MOVE command. A diagram of the flowchart of the ELEV.LSP subroutine is shown in FIG. 34.

Once called, the ELEV.LSP subroutine starts at step 3400 and then initializes and displays the dialog box shown in FIG. 75G at step 3402. At step 3404, it obtains the data entered by the user and then queries whether the data is valid at step 3406. If the data is determined not to be valid at step 3406, a message is displayed to the user in the dialog box shown in FIG. 75G, and then the new data is obtained at step 3404.

If an affirmative determination is made at step 3406, then the object's elevation is changed to that specified by the user input at step 3408, and then the ELEV.LSP subroutine ends at step 564.

Figure 35:
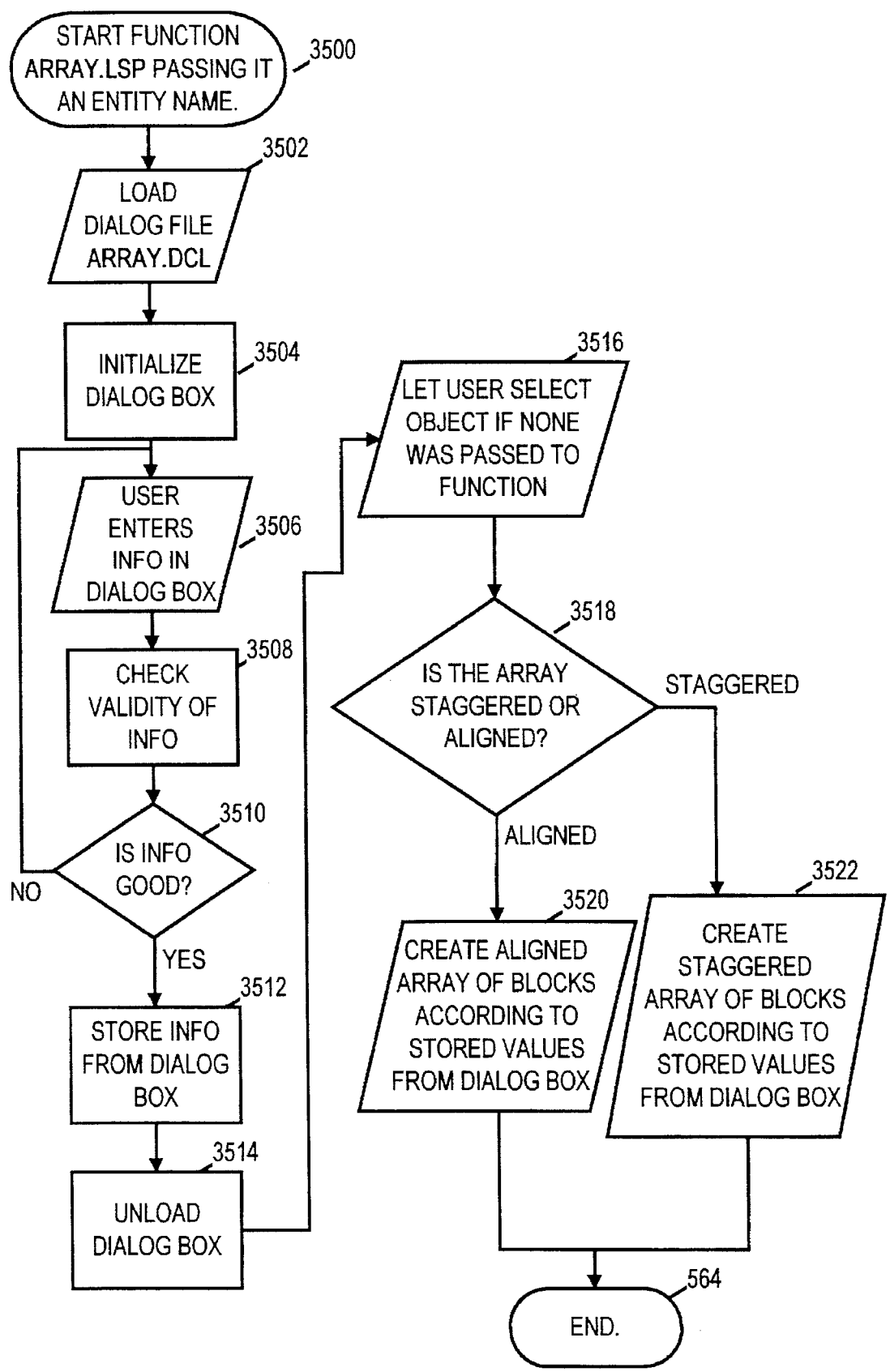

If the user selects the Array option under the Edit main menu selection, the ARRAY.LSP subroutine is called. This subroutine inserts a group of tables or other blocks into the drawing. The group of tables or other blocks may be arranged in a pattern, either staggered or aligned. The insert is passed to the AutoCAD entity name of the object which corresponds to the Array when it is called. If no ending name is passed, the user can select the object from the drawing. A dialog box (FIG. 75H) is used to obtain the spacing of the array and the number of objects to array. A diagram of the flowchart of the ARRAY.LSP subroutine is shown in FIG. 35.

Once the ARRAY.LSP subroutine is called, it starts at step 3500 by passing it an entity name. The dialog file corresponding to the dialog box of FIG. 75H is then loaded at step 3502 and initialized at step 3504. The user then enters the desired information in the dialog box of FIG. 75H at step 3506, and the ARRAY.LSP subroutine then checks the validity of that entered information at step 3508. At step 3510, a query of whether that entered information is good is made at step 3510. If a negative determination is made at step 3510, then the subroutine returns to step 3506, informs the user that the information is not good, and then awaits further input.

If the information is determined to be good at step 3510, then the information from the dialog box is stored at step 3512, and the dialog box is then unloaded at step 3514. If no object was passed to the ARRAY.LSP subroutine from the AutoCAD program, then the user is instructed to select an object at step 3516. A query is then made of whether the array has been staggered or aligned at step 3518. If it is determined that the array is aligned at step 3518, then an aligned array of blocks is created according to the stored values obtained from the user at step 3520. If the array is determined to be staggered at step 3518, then a staggered array of blocks according to the stored values from the dialog box of FIG. 75H is created at step 3522. After steps 3520 and 3522, the subroutine ends at step 564.

Figure 36:
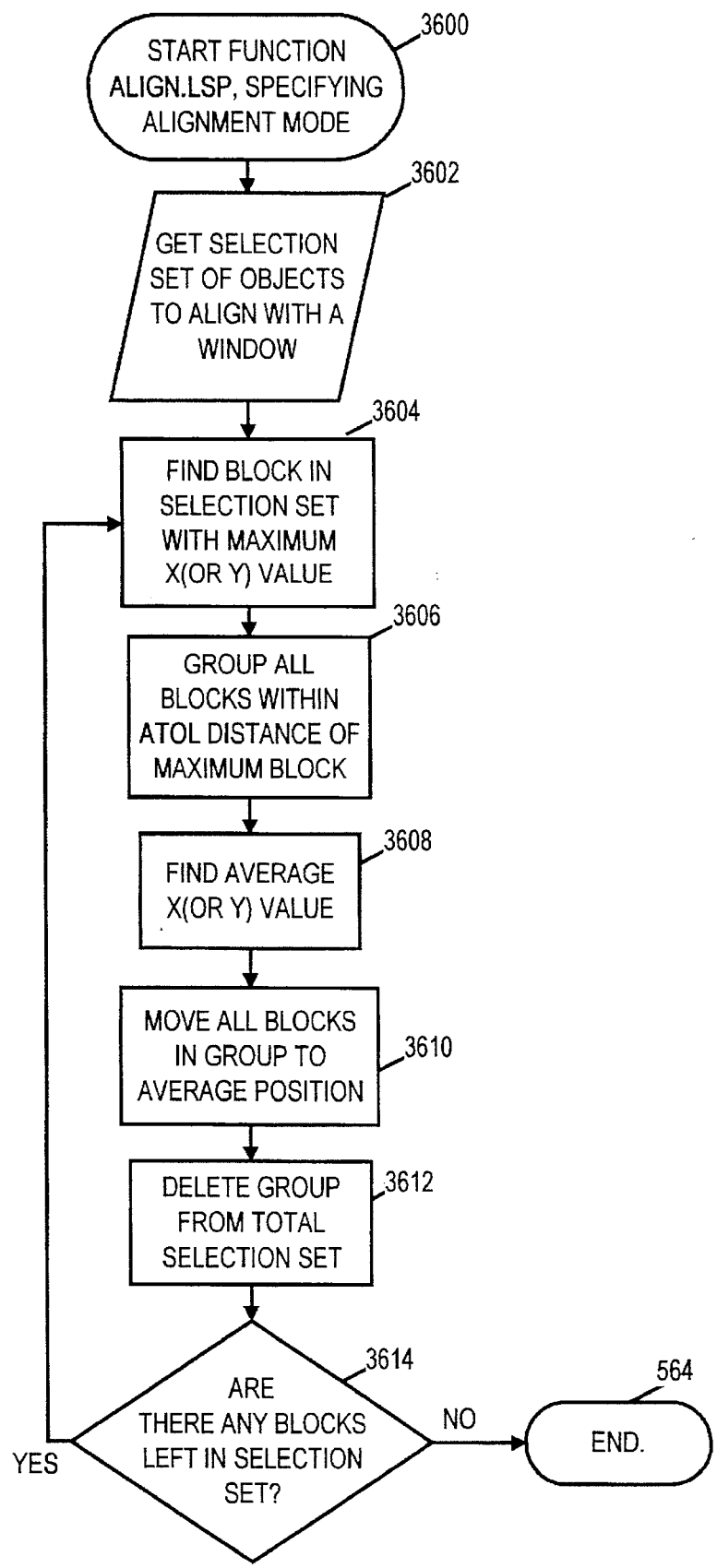

The sixth menu choice available to the user is the Clean Up selection. This allows the user to manipulate the drawing to make it more pleasing-looking. The first two items available under the Clean Up main menu selection are the Straighten Rows and Straighten Columns options. When either of those two options is selected, the ALIGN.LSP subroutine, a diagram of the flowchart of which is shown in FIG. 36, is called. The ALIGN.LSP subroutine is called with a parameter specifying that horizontal or vertical alignment is to be determined. The user specifies the blocks to be aligned by selecting a window on the screen. The ALIGN.LSP subroutine then picks a block within a default tolerance (the default tolerance is a global variable) of each other and aligns them either into columns or rows.

When the ALIGN.LSP subroutine is called, it starts at step 3600, specifying the alignment mode, either rows or columns. At step 3602, the subroutine gets a user selections set of the objects to align with a window. A block in the selection set is found with the maximum X (or Y) value at step 3604. The subroutine then groups all of the blocks within ATOL distance of the maximum block at step 3606, and then finds the average X (or Y) value at step 3608.

At step 3610, all blocks in the group are moved to the average position, and then the group is deleted from the total selection set at step 3612. A determination is then made at step 3614 of whether there are any blocks left in the selection set. If an affirmative determination is made at step 3614, then the ALIGN.LSP subroutine repeats steps 3604–3614. If a negative determination is made at step 3614, then the subroutine ends at step 564.

Figure 37:
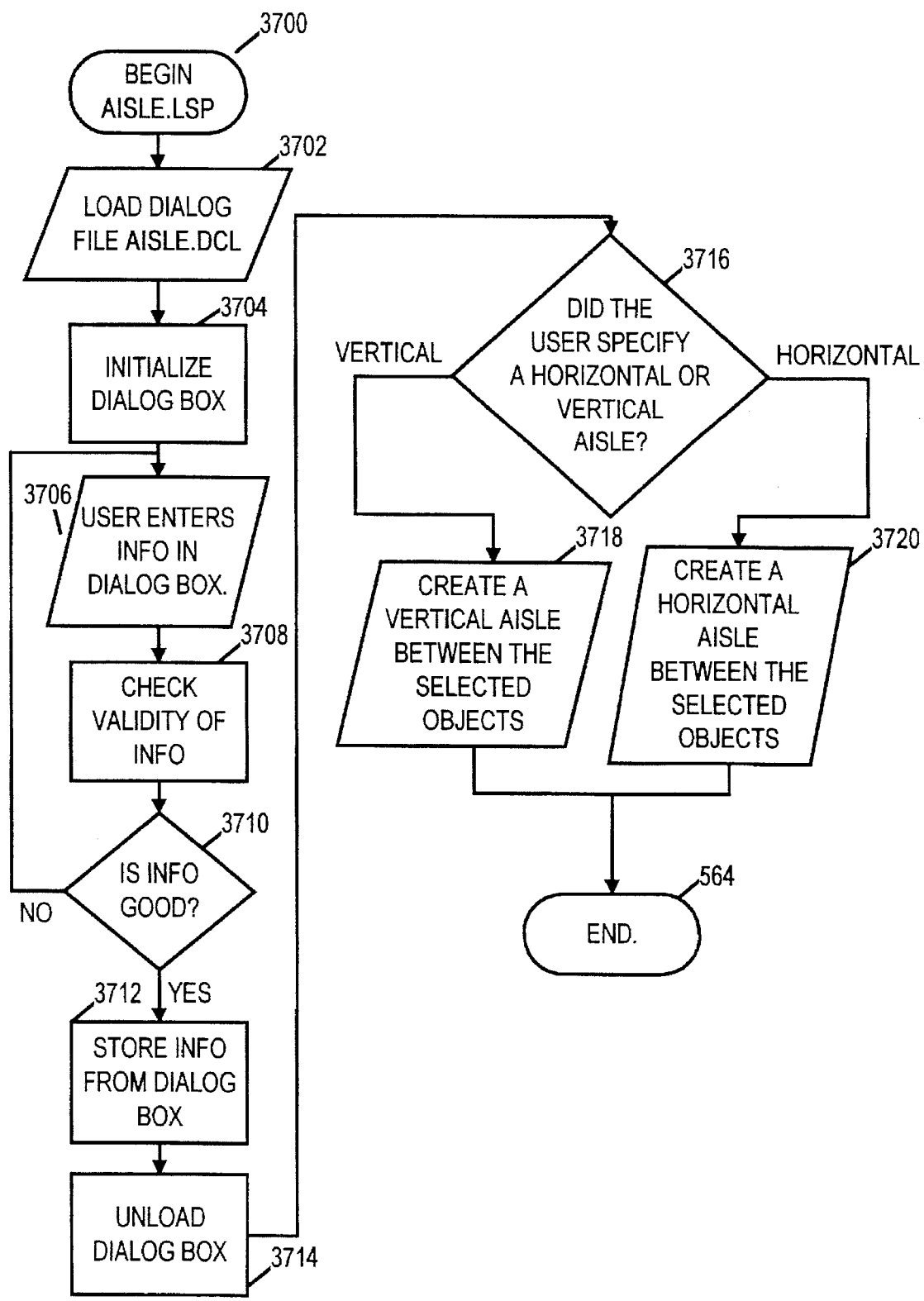

If the user selects the Add an Aisle option, the Aisle.LSP subroutine, a diagram of the flowchart of which is shown in FIG. 37, is called. This subroutine adds an aisle either horizontally or vertically between the tables. It uses a parameter to specify a horizontal or vertical aisle. The user supplies a window defining the area that the aisle will pass through and then supplies a point defining the center of the aisle. That information, along with the dimensions of the aisle, is input through a dialog box, a drawing of which is shown in FIG. 75I.

Once the AISLE.LSP subroutine is called, it begins at step 3700, and then loads a dialog file which displays the dialog box shown in FIG. 75I at step 3702. That dialog box is then initialized at step 3704, and the AISLE.LSP subroutine then waits for the user to enter information in that dialog box at step 3706.

At step 3708, the validity of the information entered by the user in the dialog box is checked, and then a determination is made at step 3710 of whether that information is good. If a negative determination is made at step 3710, then the subroutine returns to step 3706, informs the user of the invalidity of the information entered, and then waits for the user to again information in the dialog box.

If an affirmative determination is made at step 3710, then the entered information is stored at step 3712, and the dialog box is then unloaded at step 3714. A determination is then made at step 3716 of whether the user specified a horizontal or vertical aisle. If a vertical aisle was specified, then a vertical aisle is created between the selected objects at step 3718. If a horizontal aisle was specified, then a horizontal isle is created between the selected objects at step 3720. The AISLE.LSP subroutine then ends at step 564.

Figure 38:
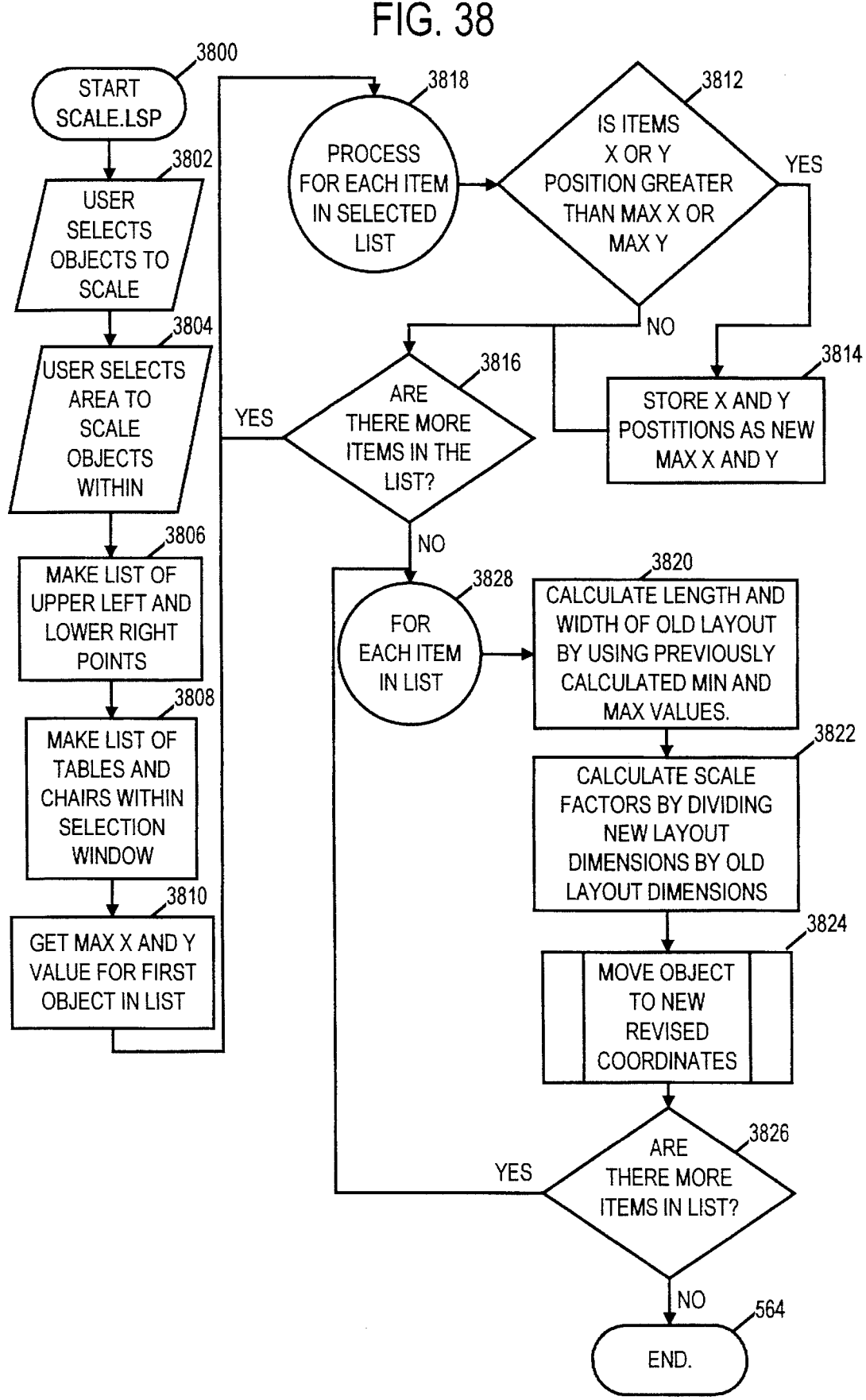

If the user selects the Scale option under the Clean Up main menu selection, the SCALE.LSP subroutine, a diagram of the flowchart of which is shown in FIG. 38, is called. The SCALE.LSP subroutine is a program that lets the user select a group of objects and specify an area to which they will be scaled. The objects are picked up with a window, and then another window outlines the new area. The subroutine then computes the distances each object in the window must be moved and then moves them. This subroutine does not change the size of the objects, only their positions in the drawing. The insert points of the objects into the drawing are used to determine their positions, so that the edges will extend past the window that specifies the new area.

Once the SCALE.LSP subroutine is called, it starts at step 3800, and then the user selects the objects to be scaled at step 3802, and the area within which to scale the objects at step 3804. The user may make those selections using, for example, a mouse 120. The SCALE.LSP subroutine then makes a list of the upper left and lower right points at step 3808, and then makes a list of the tables and chairs within the selection window at step 3808.

The subroutine then gets the maximum and values for the first object in the list at step 3810, and then determines whether the position of the items and values is greater than the maximum or of the selected window. If an affirmative determination is made, then the current and positions are stored as the new maximum and positions at step 3814. If a negative determination is made at step 3812 and after step 3814, a determination is next made at step 3816 of whether there are any more items to be processed in the list. If an affirmative determination is made at step 3816, then each item in the selected list is processed at step 3818, by repeating steps 3812 and 3814 as many times as necessary.

If a negative determination is made at step 3816, then the length and width of the old layout are calculated by using the previously calculated min and max values at step 3820, and then the scale factors are calculated by dividing the new layout dimensions by the old layout dimensions at step 3822. The subroutine then moves the object to the new, revised coordinates at step 3824, and then determines whether there are any more items in the list for scaling at step 3826. If there are, then each item in the list is processed, beginning at step 3828, by repeating steps 3820–3824. If there are no more items in the list to be processed, then the SCALE.LSP subroutine ends at step 564.

Figure 39:
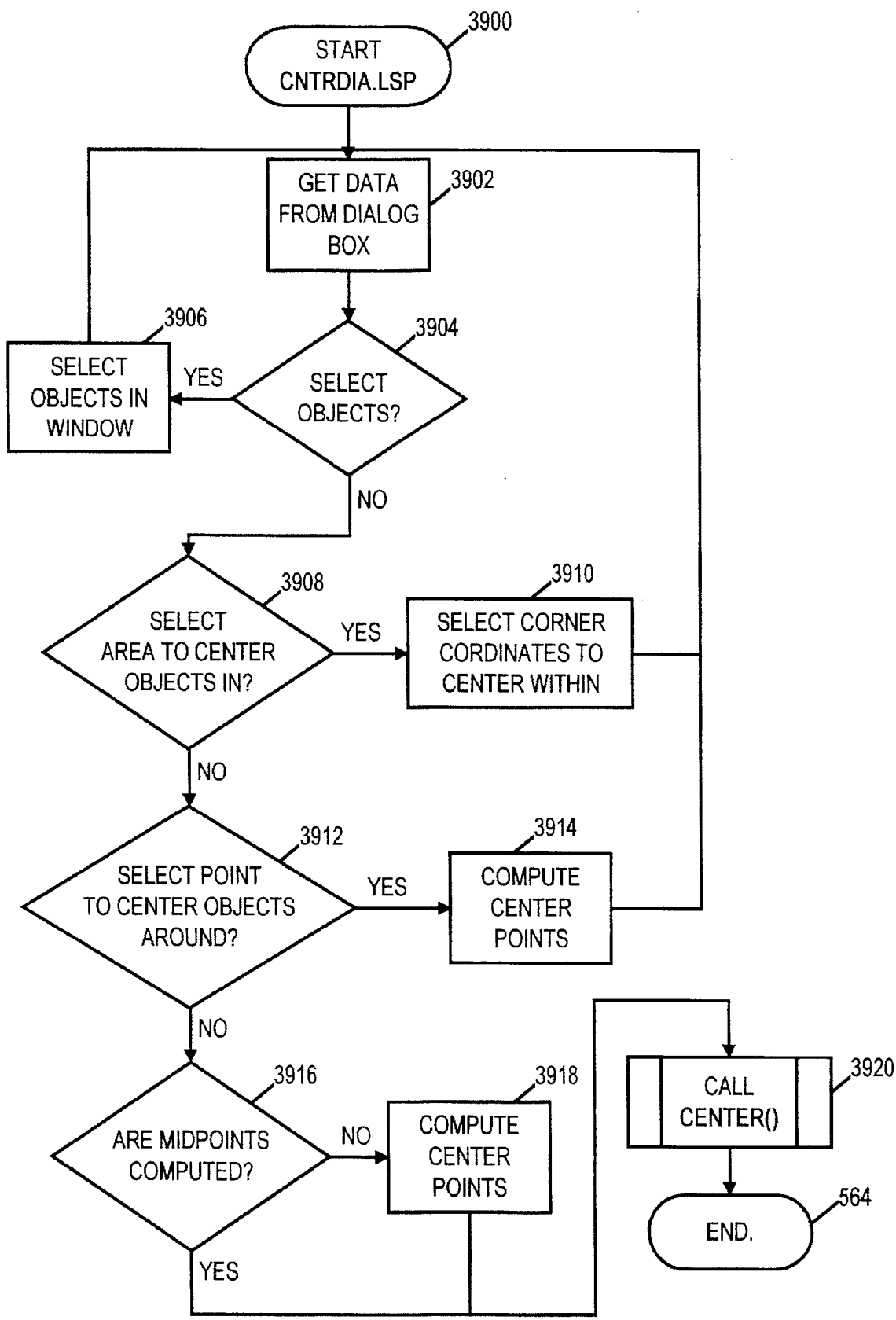

If the user selects the Center option from the Clean Up main menu selection, the CNTRDIA.LSP subroutine, a diagram of the flowchart of which is shown in FIG. 39, is called. That program allows the user to control the centering of objects within a dialog box. It calls the dialog box shown in FIG. 75J. The user selects the objects to be centered and the centering mode, either horizontal, vertical, or both. The user is also given the option of designating a new point to be the center of the drawing for this operating session. After the information is specified and the dialog box is exited, this subroutine calls the CENTER.LSP subroutine and passes to it the user's choices.

Once called, the CNTRDIA.LSP subroutine starts at step 3900 and displays for the user the dialog box shown in FIG. 75J. It then gets the data input by the user from the dialog box at step 3902, and then determines whether the user has selected any objects to be centered at step 3904. If an affirmative determination has been made at step 3904, then the objects in the window are selected at step 3906, and the subroutine then gets additional data from the dialog box at step 3902.

If a negative determination is made at step 3904, then a determination is made at step 3908 of whether the user has selected an area in which to center the objects. If an affirmative determination is made at step 3908, then the subroutine selects the corner coordinates within which to center the objects, and then jumps to step 3902.

If a negative determination is made at step 3908, then a determination is made at step 3912 of whether the user has selected a point around which to center the objects. If an affirmative determination is made at step 3912, then the center points are computed at step 3914, and then the subroutine jumps to step 3902.

If a negative determination is made at step 3912, then a determination is made at step 3916 of whether the appropriate points have been computed. If they have not, then the subroutine computes the center points at step 3918.

If an affirmative determination is made at step 3916 or after step 3918, the CNTRDIA.LSP subroutine calls the CENTER() program at step 3920. The CENTER() program, a diagram of the flowchart of which is shown in FIG. 63, is used to center objects in the drawing. It is called with parameters specifying the method of centering (horizontal, vertical, both, or automatic), the point to center around, and the objects to center. If the centering is automatic, the program centers either horizontally or vertically, based on the current value of the system variable ROT. If the mode is automatic, it will also use the global variables LL and UR to calculate the center of the room and will let the user pick the objects to be centered. The automatic mode allows the user to bypass the centering dialog box of FIG. 75J called in the CNTRDIA.LSP subroutine.

After calling the CENTER() program at step 3920, the CNTRDIA.LSP subroutine ends at step 564.

Figure 40:
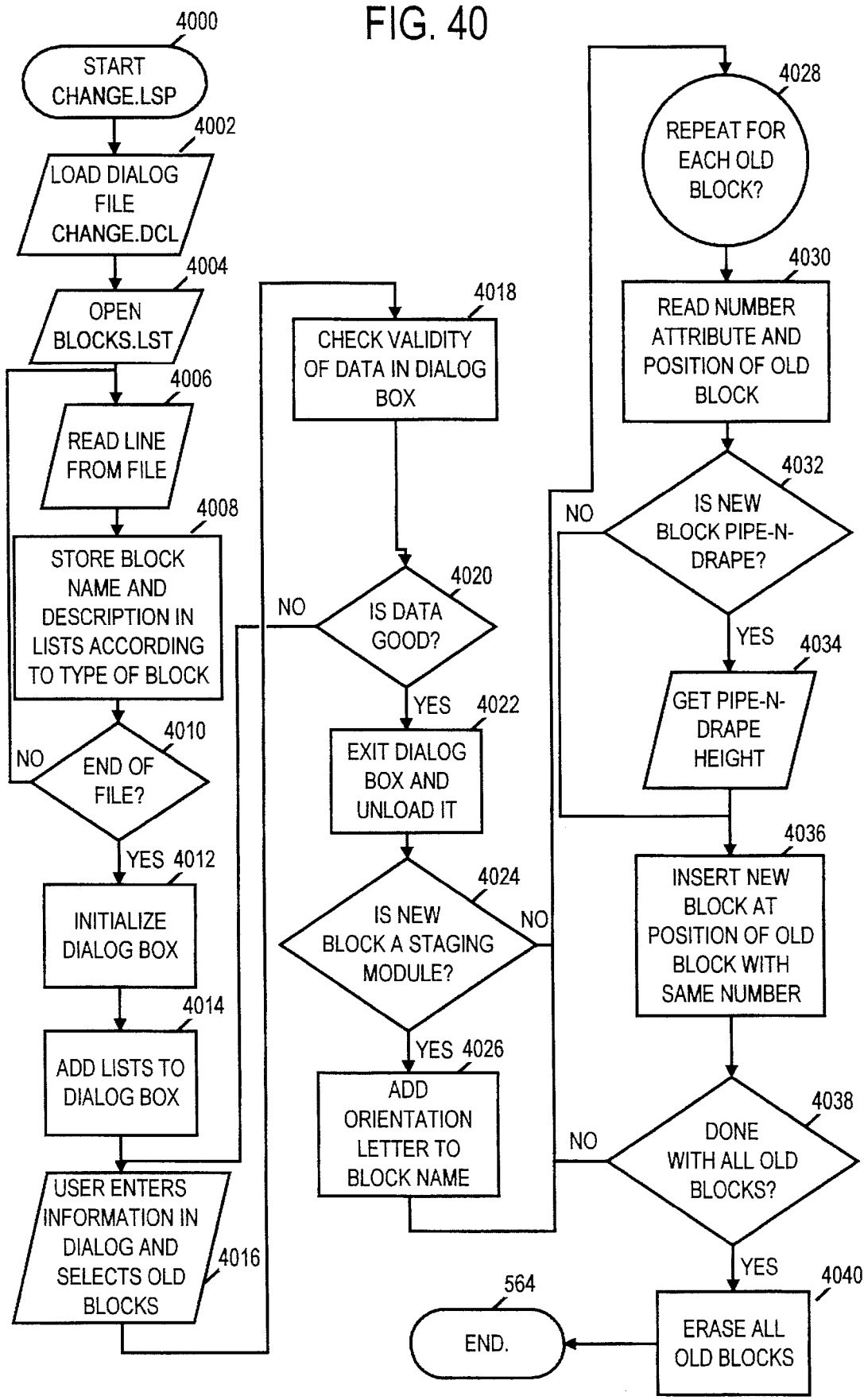
Figure 41:
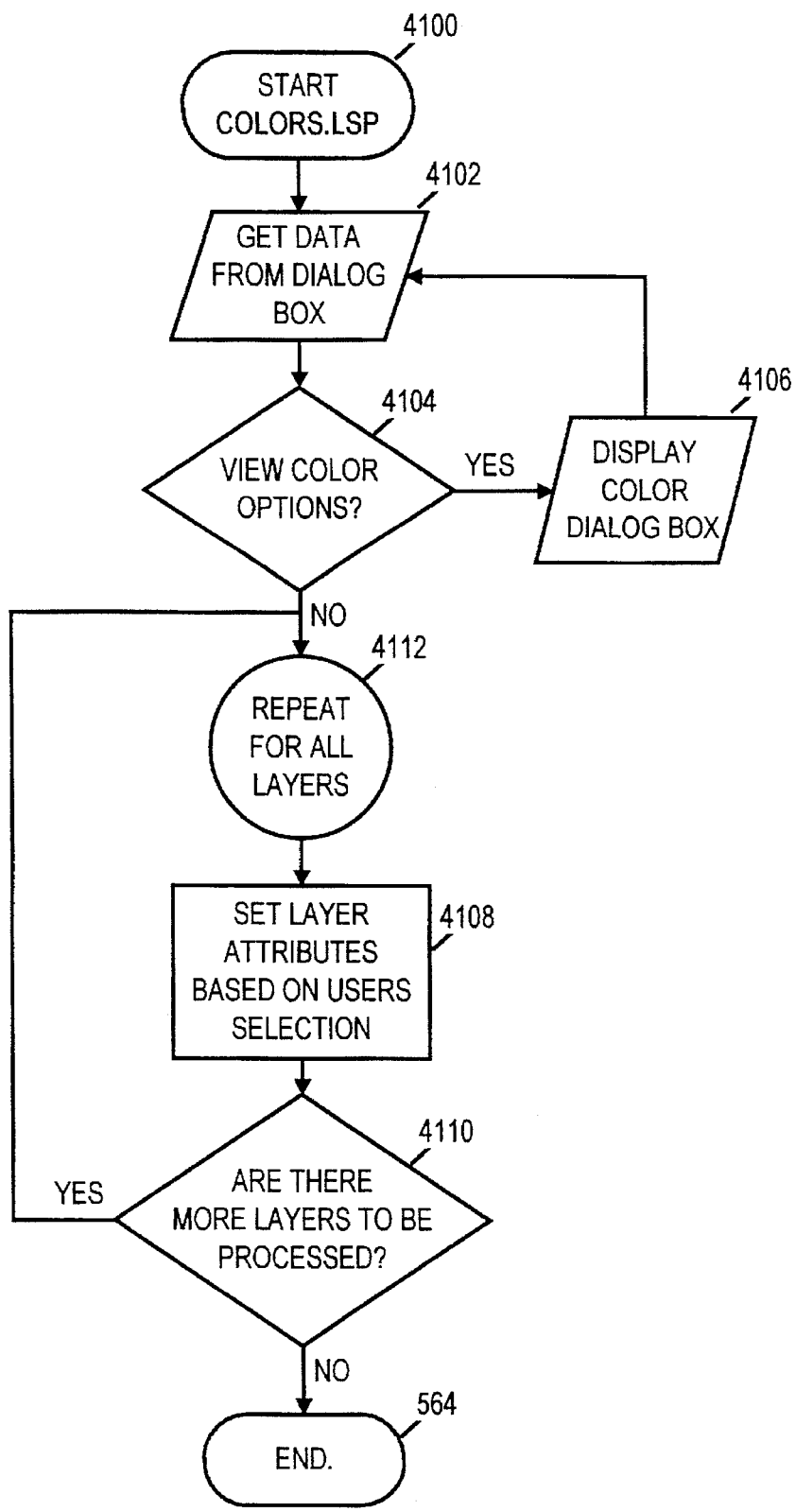

If the user selects the Change option under the Clean up main menu selection, the CHANGE.LSP subroutine, a diagram of the flowchart of which is shown in FIG. 40, is called. That subroutine allows the user to change a block in the drawing into another block. It calls a dialog box shown, for example, in FIG. 75K, which displays available blocks listed by category. The lists are built from the master block list BLOCKS.LST. The user uses a window to specify the object or objects to be changed into another block.

Once the CHANGE.LSP subroutine is called, it starts at step 4000, and then loads the dialog file which displays a dialog window for changing items in the drawing as shown in FIG. 75K, at step 4002. The BLOCKS.LST file is opened at step 4004, and then a line is read from that file at step 4006. The subroutine then stores the block name and description in various lists according to the type of block at step 4008, and then determines whether the end of the file has been reached at step 4010. If the end of the file has not been reached at step 4010, the next line is read from the file at step 4006, and then steps 4008 and 4010 are repeated.

If it is determined at step 4010 that the end of the file has been reached, then the dialog box is initialized at step 4012, and the lists are added to the dialog box at step 4014. The user then enters the desired information in the dialog box and selects the old blocks at step 4016. The validity of the data in the dialog box is then checked at step 4018, and a determination is made of whether that data is good at step 4020. If the data is determined to be good at step 4020, then the dialog box is exited and unloaded at step 4022.

A determination is then made of whether the new block is a staging module at step 4024. If the new block is determined to be a staging module at step 4024, then an orientation is added to the block name at step 4026. After step 4026 or if a negative determination is made at step 4024, then the number attribute and position of the old block is read at step 4030. A determination of whether the new block is a pipe and drape drawing is determined at step 4032. If an affirmative determination is made at step 4032, then the pipe and drape height is obtained at step 4034. After step 4034 or if a negative determination is made at step 4032, then the new block is inserted at the position of the old block with the same number at step 4036. A determination is then made at step 4038 of whether all the old blocks have been processed. If a negative determination is made at step 4038, then steps 4030–4038 are repeated for each old block, beginning at step 4028. If an affirmative determination is made at step 4038, then all the old blocks are erased at step 4040, and the CHANGE.LSP subroutine ends at step 564.

The seventh main menu selection is the Options selection, which allows the user to change the visibility and appearance of objects and to adjust global variables. From this menu, the user can change drawing parameters affecting everything from the color of a table to the alignment tolerances.

The first item available to the user under the Options main menu selection is the Layers item. That item calls the COLORS.LSP subroutine which lets the user control the color and visibility of layers through a dialog box, an example of which is shown in FIG. 75L. Before the dialog box is called, the subroutine stores the present color and status (either on or off) of each user-controllable layer. The color and status of each user-controllable layer are displayed in the dialog box. A layer is, for example, the chairs, tables, stage modules, dance floor, staging, and other items and their equivalents shown in FIG. 75L. After the dialog box is exited, the user's changes are made to the drawing.

Once the Layers item is selected, the COLORS.LSP subroutine is started at step 4100 and the dialog box shown, for example, in FIG. 75L, is displayed. The subroutine then gets the data input by the user from the dialog box of FIG. 75L at step 4102. At step 4104, a determination is made of whether the user wishes to view the color options. If an affirmative determination is made at step 4104, then the color dialog box corresponding to each selected layer is filled in with the appropriate color at step 4106, and then the subroutine goes to step 4102 to await further data input from the dialog box.

If a negative determination is made at step 4104, then the layer attributes are set based on the user's selection at step 4108, and a determination is then made of whether there are any more layers to be processed at step 4110. If an affirmative determination is made at step 4110, then the subroutine jumps to step 4112 and repeats steps 4108–4110 until a negative determination is made at step 4110. After a negative determination is made at step 4110, the COLORS.LSP subroutine ends at step 564.

If the user selects the Layout item, the LAYOUT.LSP subroutine is called, which allows the user to change the current drawing layout and plot settings. A diagram of the flowchart of the LAYOUT.LSP subroutine is shown in FIG. 42.

Figure 64:
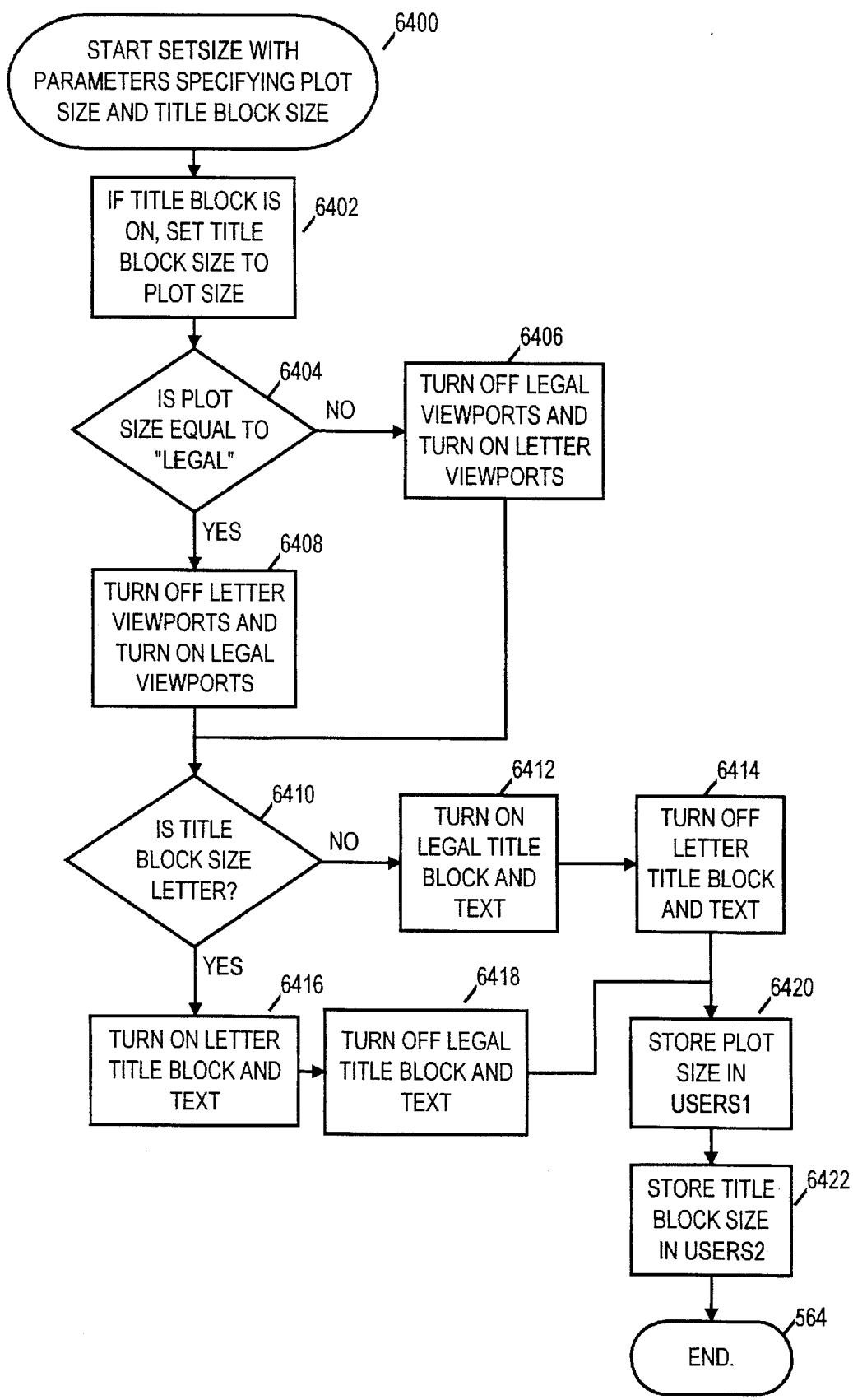

Once called, the LAYOUT.LSP subroutine starts at step 4200 and then displays the dialog box shown, for example, in FIG. 75M, at step 4202. At step 4204, the subroutine sets the plot size and title block size to the choices selected by the user using the dialog box of FIG. 75M. The SETSIZE() function is then called at step 4206. That function sets the current title block size and plot size to either "legal", "letter", or "none" size. The SETSIZE() function turns on or off all associated layers. The SETSIZE() function is defined in the CADEM.LSP subroutine, a diagram of the flowchart of which is shown and which is described in connection with FIG. 20. A diagram of the flowchart of the SETSIZE() function is shown in FIG. 64.

Based on the choice of the user, the USERS1 and USERS2 values are set at step 4208, and then the LAYOUT.LSP subroutine ends at step 564.

Figure 43:
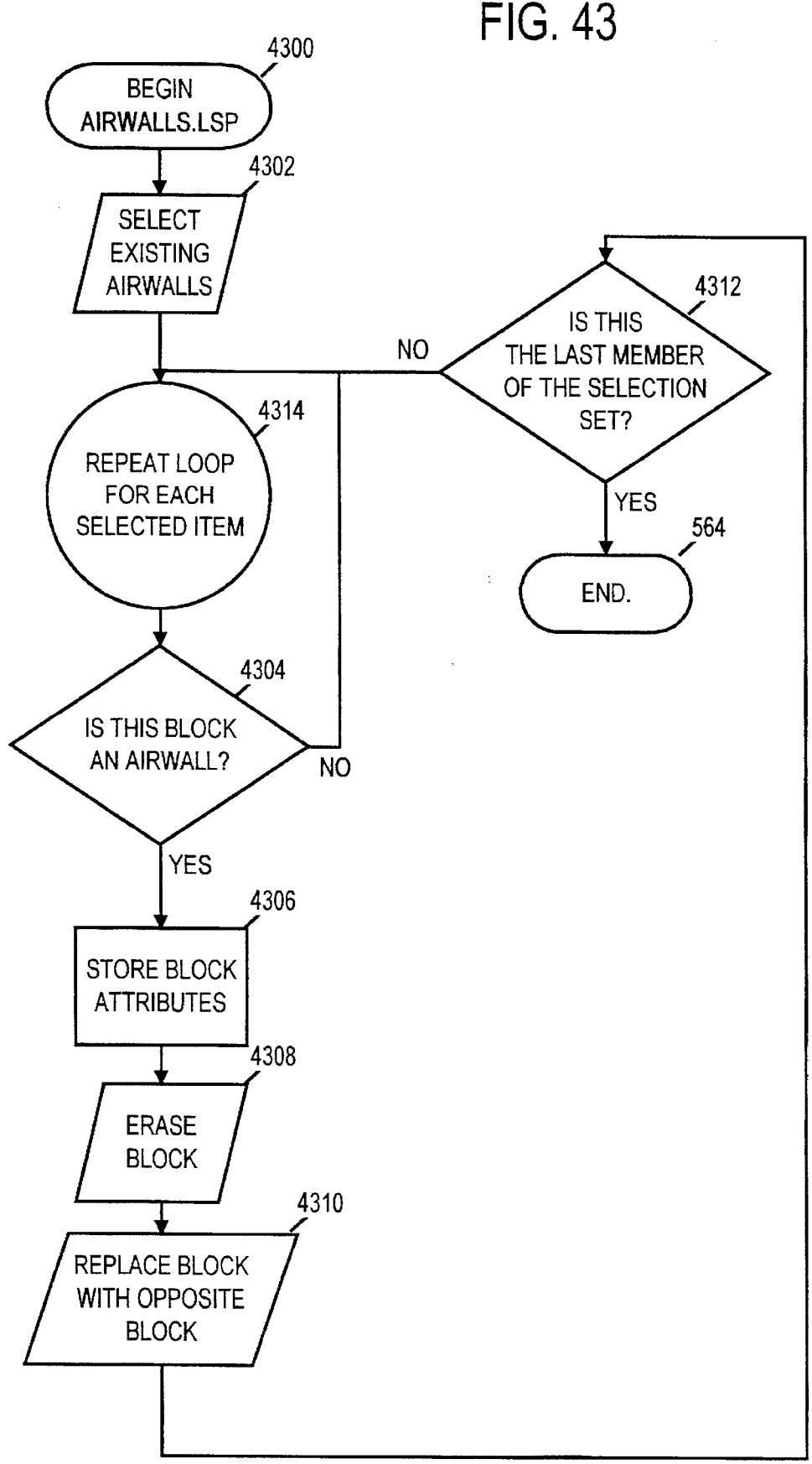

If the user desires to work with the airwalls between various sections of an event room, then the Airwalls item is selected under the Options main menu selection. Selecting the Airwalls option calls the AIRWALLS.LSP subroutine, a diagram of the flowchart of which is shown in FIG. 43. That subroutine lets the user select airwalls in the drawing and toggles them between open and closed by switching the block definition of each airwall.

When called, the AIRWALLS.LSP subroutine begins at step 4300 and then selects the existing airwalls at step 4302. A determination is then made at step 4304 of whether the selected block is an airwall. If the selected block is determined to be an airwall at step 4304, then the block attributes are stored at step 4306, the block is erased at step 4308, and the block is replaced with the opposite block at step 4310. A determination is then made at step 4312 of whether the current block is the last member of the selection set. If it is determined to be the last member of the selection set, then the AIRWALLS.LSP subroutine ends at step 564.

If a negative determination is made at steps 4304 or 4312, the subroutine then jumps to step 4314 and repeats the foregoing described processing loop for each selected item.

Figure 44:
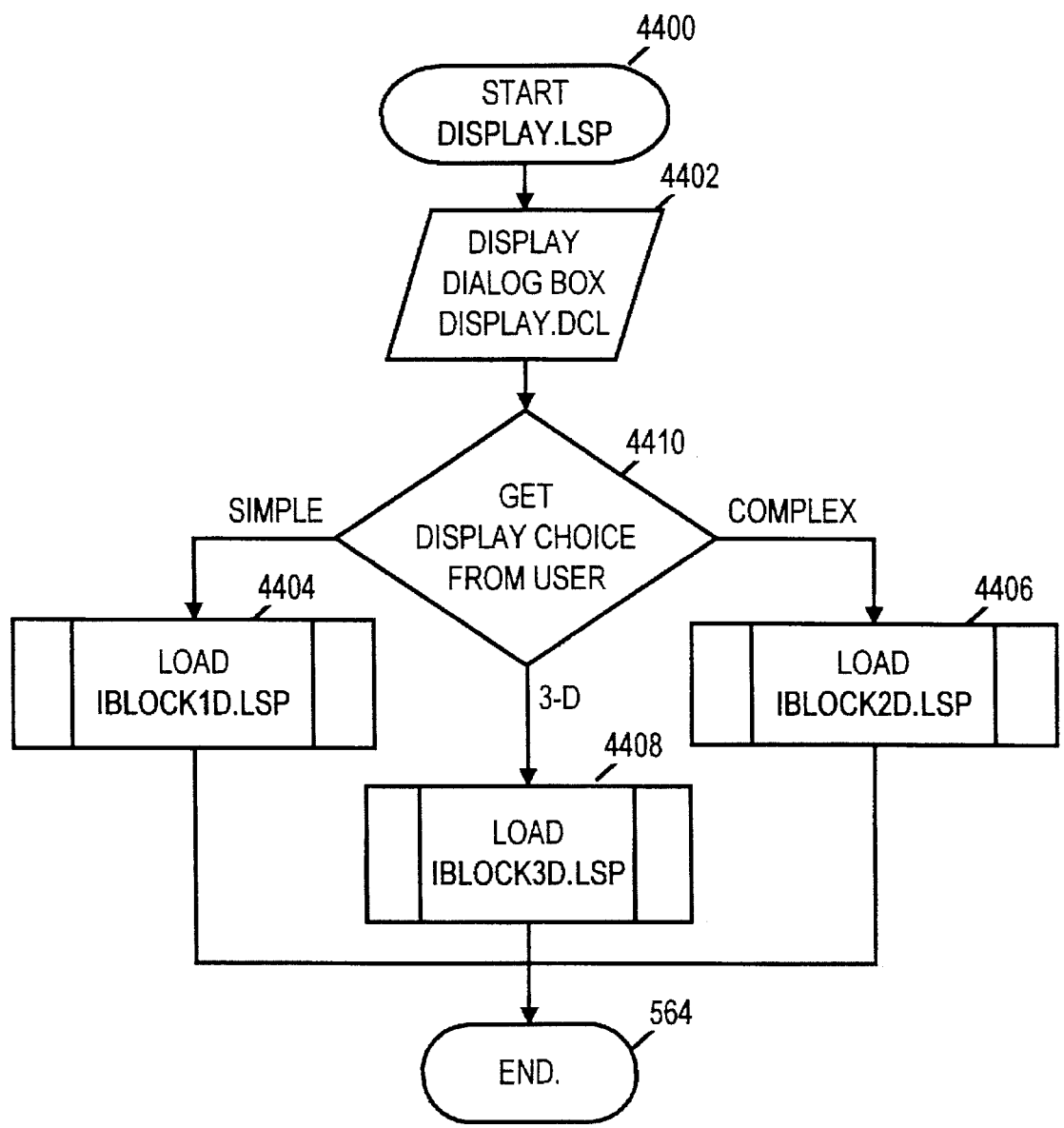

If the user selects the Display Options item under the Options main menu selection, then the DISPLAY.LSP subroutine, a diagram of the flowchart of which is shown in FIG. 44, is called. That subroutine calls a dialog box, an example of which is shown in FIG. 75N, so that the user can specify the resolution for displaying tables. As shown in FIG. 75N, the user can specify a simple, complex, or 3D display of tables. After the dialog box is exited, this subroutine calls the appropriate routine to redefine the complex blocks in the drawing.

Figure 47:
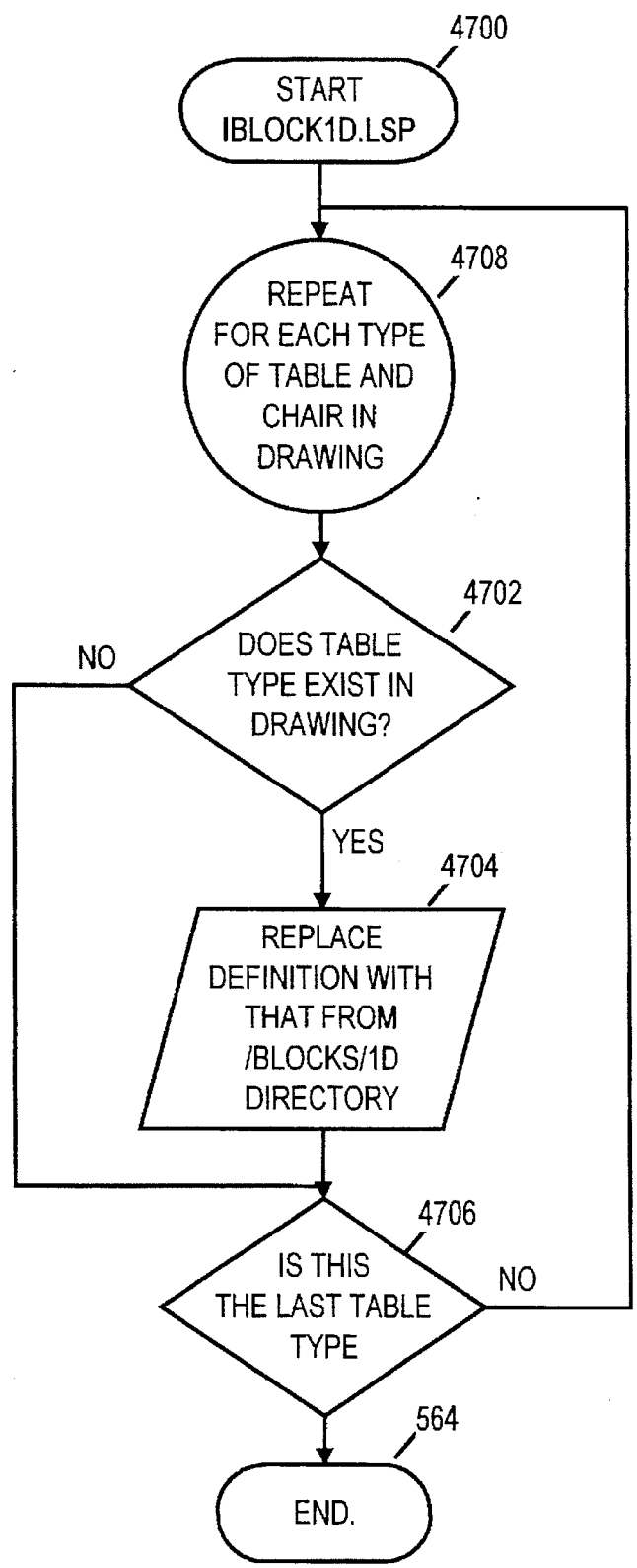

Once the DISPLAY.LSP subroutine is called, it starts at step 4400 and then displays the dialog box shown, for example, in FIG. 75N. It then gets the display choice input by the user at step 4410. If the user has selected a simple representation, then the subroutine loads the IBLOCK1D.LSP subroutine at step 4404. A diagram of the flowchart of that subroutine is shown and described in connection with FIG. 47.

Figure 46:
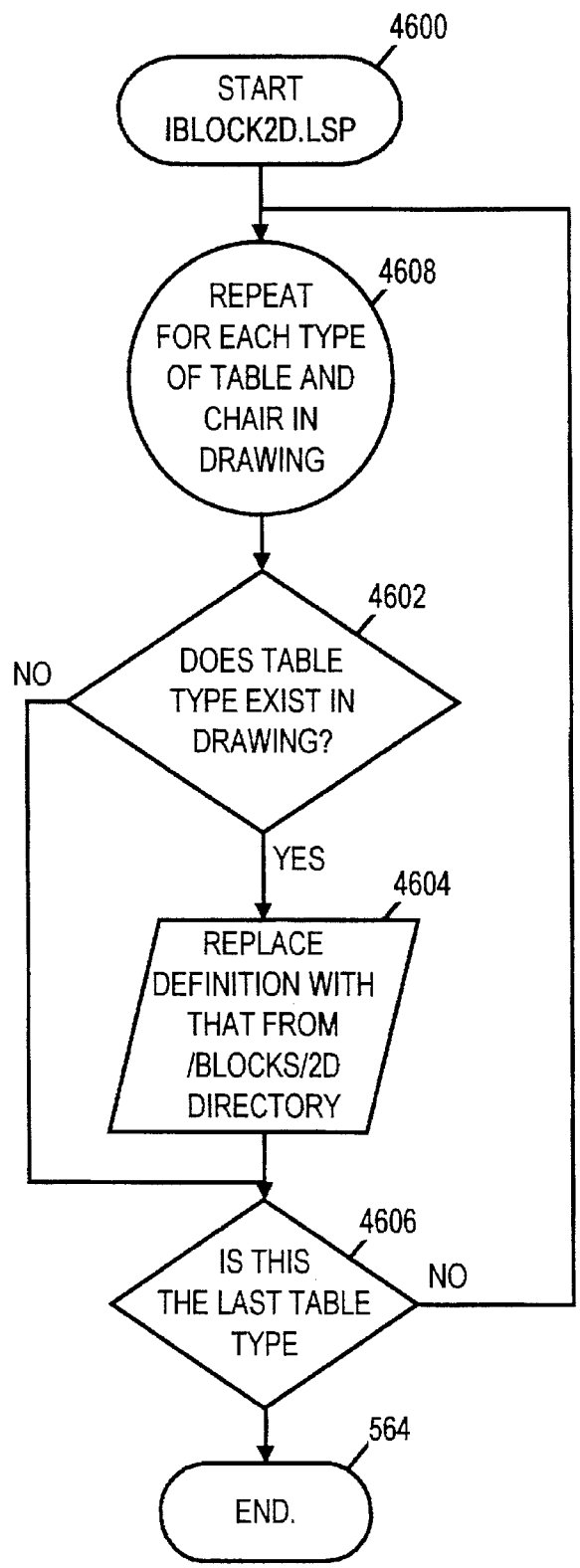

If it is determined at step 4410 that the user has selected a complex representation, then the DISPLAY.LSP subroutine loads the IBLOCK2D.LSP subroutine at step 4406. A diagram of the flowchart of that subroutine is shown and described in connection with FIG. 46.

Figure 45:
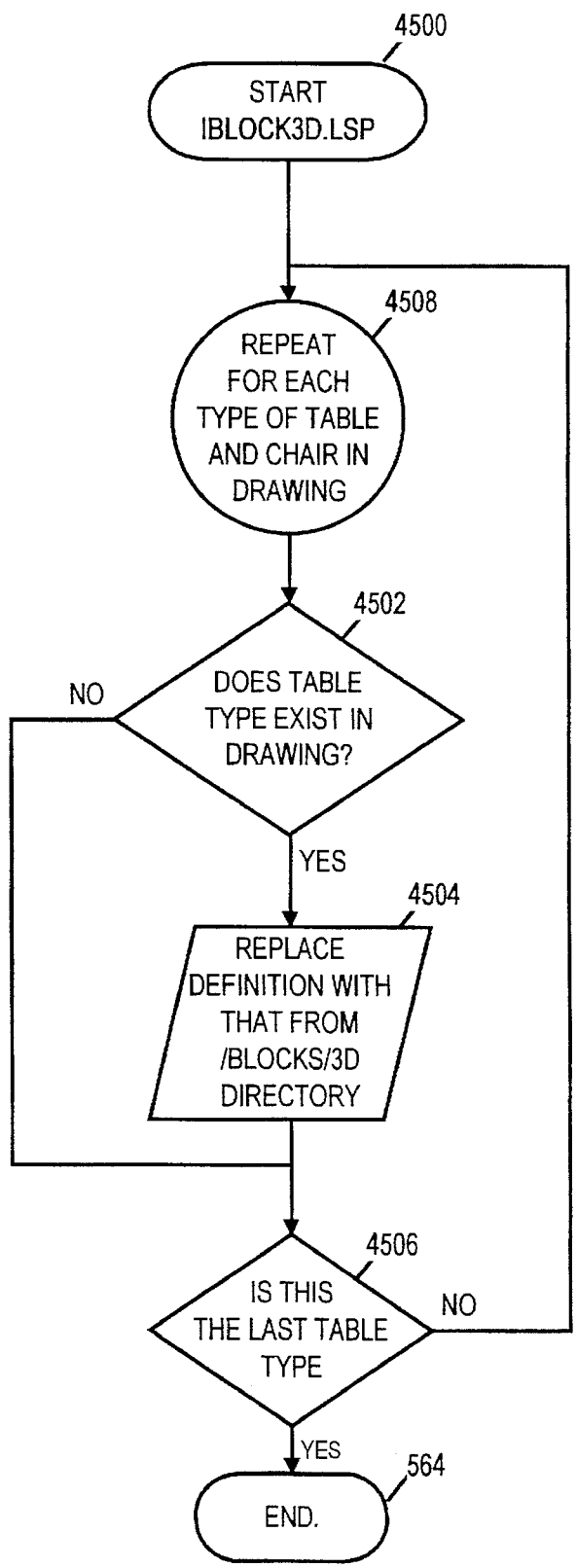

If it is determined at step 4410 that the user has selected a 3D representation, then the DISPLAY.LSP subroutine loads the IBLOCK3D.LSP subroutine at step 4408. A diagram of the flowchart of the IBLOCK3D.LSP subroutine is shown and described in connection with FIG. 45.

After steps 4404–4408, the DISPLAY.LSP subroutine ends at step 564.

If the user has selected a 3D chair representation under the Display Options item of the Options main menu selection, then the IBLOCK3D.LSP subroutine is called. Once that subroutine is called, it is started at step 4500, and then a determination is made of whether the table type exists in the drawing at step 4502. If an affirmative determination is made at step 4502, then the specified table type definition is replaced with that from the directory holding the 3D variables. If a negative determination is made at step 4502 and after step 4504, a determination is made at step 4506 of whether the current table is the last table type. If a negative determination is made at step 4506, then the IBLOCK3D.LSP subroutine repeats steps 4502–4506 for each type of table and chair in the drawing. If an affirmative determination is made in step 4506, then the IBLOCK3D.LSP subroutine ends at step 564.

Each of the IBLOCK2D.LSP and IBLOCK1D.LSP subroutines works in the same manner as the IBLOCK3D.LSP subroutine except that the definition of the table type is replaced by either a complex or simple depiction of the table and chairs, as shown in FIG. 75N and steps 4604 and 4704, respectively. In all other respects, when called, each of those two subroutines starts at steps 4600 and 4700, respectively, and operates in the same manner as the IBLOCK3D.LSP subroutine of FIG. 45.

Figure 48:
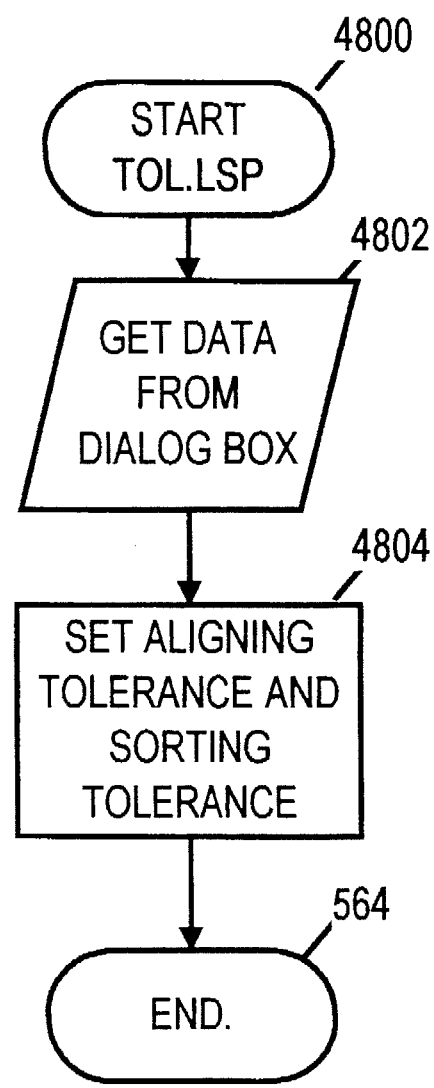

The final item which may be selected under the Options main menu selection is the Tolerances item. The Tolerances item calls the TOL.LSP subroutine, a drawing of the flowchart of which is shown in FIG. 48. That subroutine lets the user set the global tolerances of the EVENT/CAD program module. It uses a dialog box such as that shown in FIG. 75O to let the user specify the new values for STOL and ATOL. This subroutine reads the new values input by the user and resets those tolerances.

When called, the TOL.LSP subroutine starts at step 4800 and then displays the dialog box shown, for example, in FIG. 75O. The user inputs information through the FIG. 75O dialog box which is then obtained by the subroutine at step 4802. The subroutine then sets the aligning and sorting tolerances at step 4804. These tolerances are the global tolerance variables STOL and ATOL that are used for sorting and alignment, respectively.

The final main menu selection available to the user in the EVENT/CAD program module is the Utilities selection.

Figure 49:
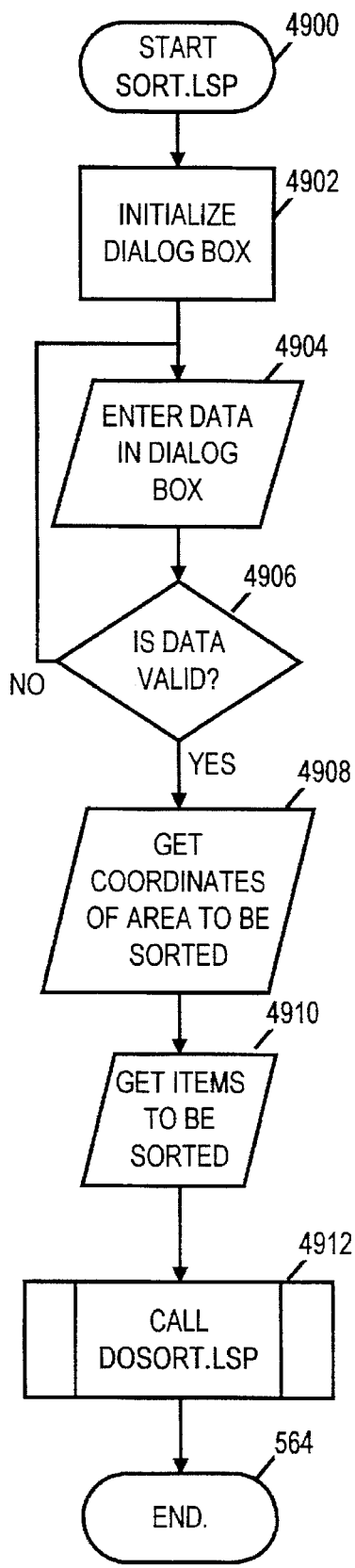

The first item available under the Utilities main menu selection is the Numbering Control Panel item. Under that item, the user can select to Renumber Everything, to Renumber all the Tables, to Renumber the Circular Tables, to Renumber the Rectangular Tables, or to Renumber the Stage Modules. When the Numbering Control Panel item is selected, the SORT.LSP subroutine, a diagram of the flowchart of which is shown in FIG. 49, is called. That program is used to control the numbering of objects in the drawing. The user uses a dialog box, an example of which is shown in FIG. 75P, to specify which of the objects are to be numbered and how to number them. The SORT.LSP subroutine then sets variables for storing the sorting method, which types of blocks to sort, a window within which to number, and a starting number for the sequencing. Those variables are then passed to the DOSORT.LSP subroutine which performs the actual numbering of those blocks. A diagram of the flowchart of the DOSORT.LSP subroutine is shown and described in connection with FIG. 65.

When the Numbering Control Panel is selected by the user, the SORT.LSP subroutine is called. That subroutine starts at step 4900 and then initializes the dialog box, an example of which is shown in FIG. 75P, at step 4902. The user then enters data in the dialog box which is obtained by the SORT.LSP subroutine at step 4904 and checked for its validity at step 4906. If the data input by the user is determined not to be valid at step 4906, the subroutine goes to step 4904, informs the user, and then waits for the user to enter new data in the dialog box.

If the data is determined to be valid at step 4906, then the SORT.LSP subroutine gets the coordinates of the area to be sorted at step 4908, gets the items to be sorted at step 4910, and then calls the DOSORT.LSP subroutine at step 4912. Then, the SORT.LSP subroutine ends at step 564.

Figure 50:
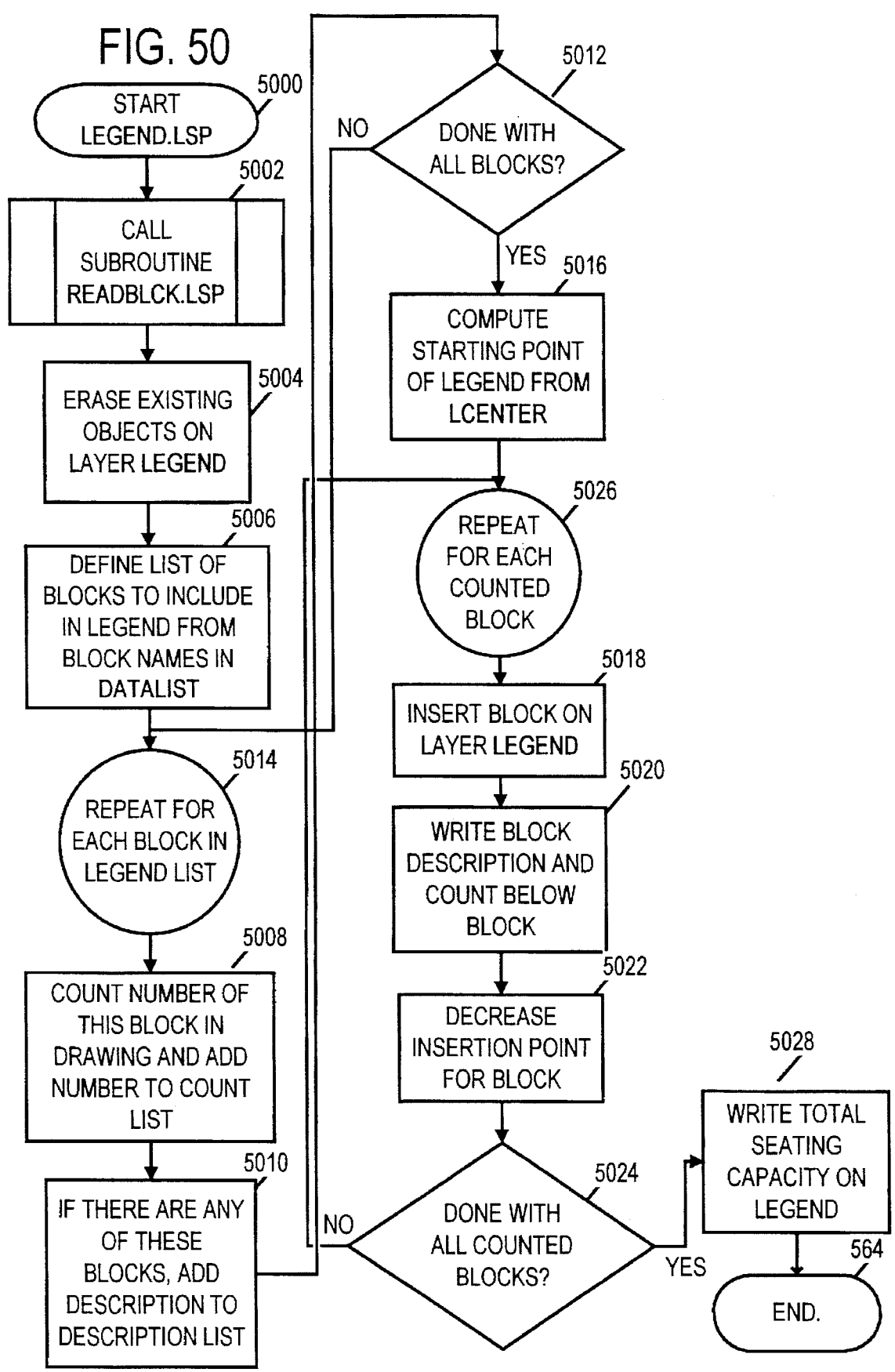
Figure 66:
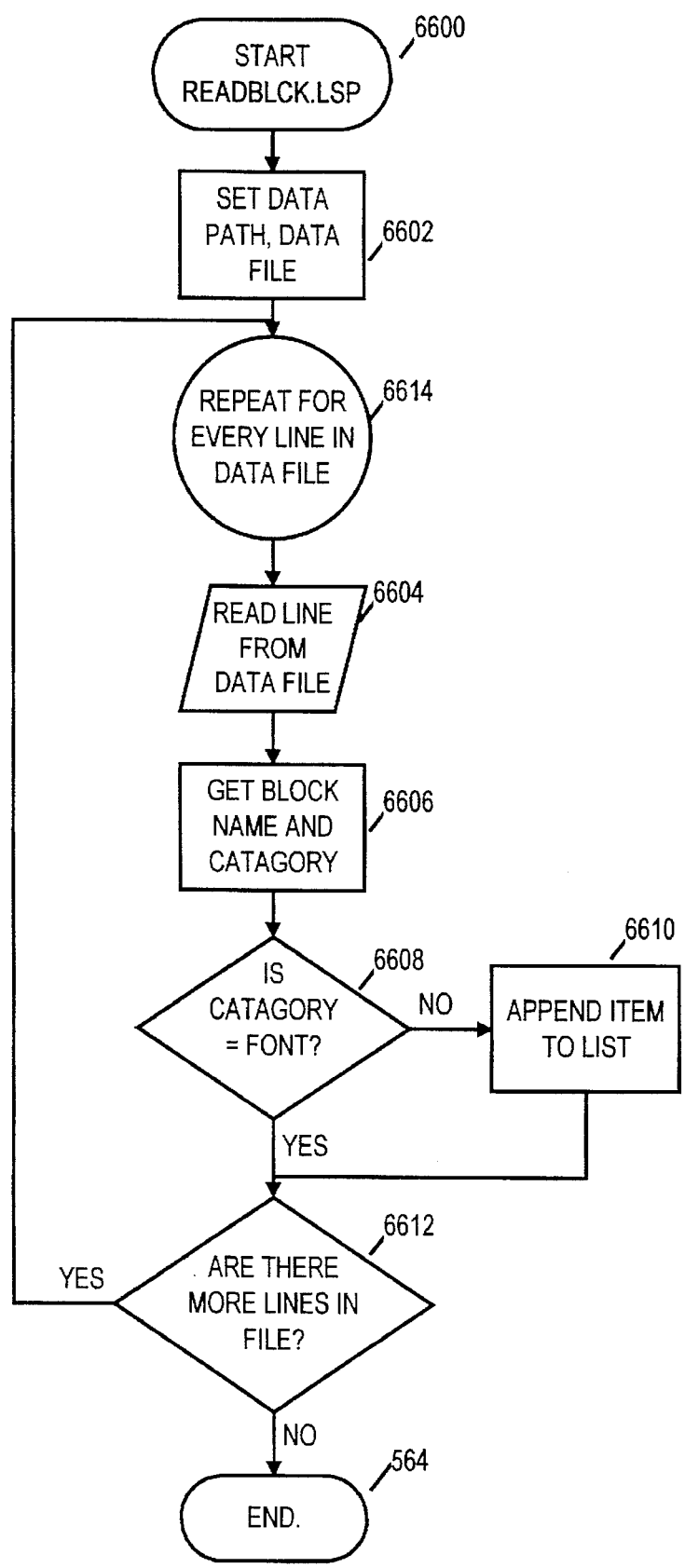

If the user selects the Update Legend item under the Utilities main menu selection, the LEGEND.LSP subroutine, a diagram of the flowchart of which is shown in FIG. 50, is called. That subroutine is used to construct a drawing legend. The program calls the READBLCK.LSP subroutine, a diagram of the flowchart of which is shown in FIG. 66 to get a search list and the descriptions of drawing blocks.

The READBLK.LSP subroutine opens the BLOCKS.LST file in the facility's blocks directory, as specified by FAC NO. It then reads the names of the blocks in the drawing and combines them with their descriptions as a dotted-pair association list. All of those association lists are stored in a global list called DATALIST.

After getting a search list and the descriptions of the drawing blocks from the READBLCK.LSP subroutine, the LEGEND.LSP subroutine then scans the drawing table, counting how many times each block is used, and saving the counts in a list. It then uses the list to construct a table, showing the user what each block is and how many are used. The LEGEND.LSP subroutine also prints the seating capacity of the room. It uses the global variable LCENTER to control the placement of the legend in Pspace. The size of the legend is controlled by the value of the variable SFACTOR.

When the LEGEND.LSP subroutine is called, it starts at step 5000, and then calls the READBLK.LSP subroutine at step 5002. It then erases the existing objects on the legend layer at step 5004, and then defines the list of blocks to include in the legend from the block names contained in the DATALIST list at step 5006. The LEGEND.LSP subroutine then counts the number of the first listed blocks in the drawing and adds the number to the counting list at step 5008. If any of those blocks are found, the description is added to the description list at step 5010. A description list is the list that has the text description of each inventory item. For example, the description list may read ("10TOP72" "72-inch table with 10 chairs"). At step 5012, a determination is made of whether a search has been made of all the blocks in the list. If a negative determination is made at step 5012, then the subroutine goes to step 5014 and repeats each of the steps 5008–5012 until an affirmative determination is made at step 5012, meaning that a search has been made for all of the blocks in the drawing.

After an affirmative determination at step 5012, the LEGEND.LSP subroutine computes the starting point of the legend from the variable LCENTER at step 5016. A block is inserted on the legend layer at step 5018, and then the block description and count are written on the drawing below the block at step 5020.

The insertion point for the block is then decreased at step 5022, and a determination is then made at step 5024 of whether all of the counted blocks have been inserted on the legend layer. If a negative determination is made at step 5024, then the subroutine goes to step 5026 and repeats the steps 5018–5024 until all of the counted blocks have been inserted on the legend layer and an affirmative determination of such has been made at step 5024. The subroutine then writes the total seating capacity on the legend at step 5028, and then ends at step 564.

If the user selects the Assign Names option under the Utilities main menu selection, then, as shown in Table 4, a simple AutoCAD command sequence is executed which functions to assign the names.

Figure 51:
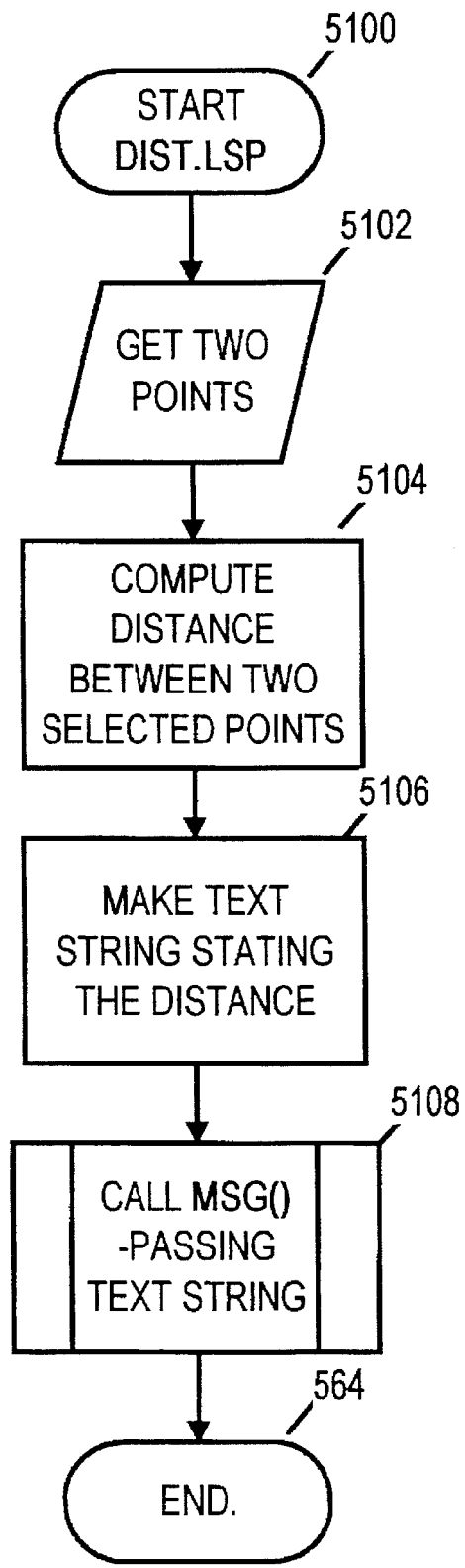

If the user selects the Measure Distance option under the Utilities main menu selection, then the DIST.LSP subroutine, a diagram of the flowchart of which is shown in FIG. 51, is called. The subroutine tells the user the distance between two points. The user picks the two points, and the distance between them is then displayed in a dialog box.

Once the DIST.LSP subroutine is called at step 5100, it obtains the two points between which the user desires the distance to be calculated at step 5102, and then computes the distance between those two selected points at step 5104.

The subroutine then makes a text string stating the calculated distance at step 5106, and then calls the MSG() subroutine at step 5108. The DIST.LSP subroutine then ends at step 564.

Figure 75S:
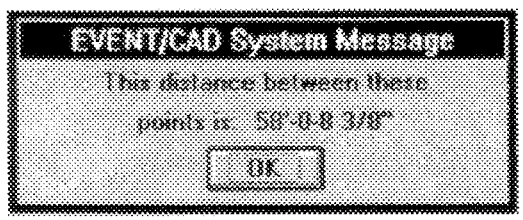

The MSG.LSP subroutine is passed a text list that it displays in a dialog box (such as FIG. 75S). It writes a file named MESSAGE.DCL that contains a sequentially numbered text block for each element in the text list. It then calls the dialog box and writes each element in the list to a text block. The dialog is displayed until the user picks the OKAY button. A diagram of the flowchart of the MSG.LSP subroutine is shown and described in connection with FIG. 67.

Figure 52:
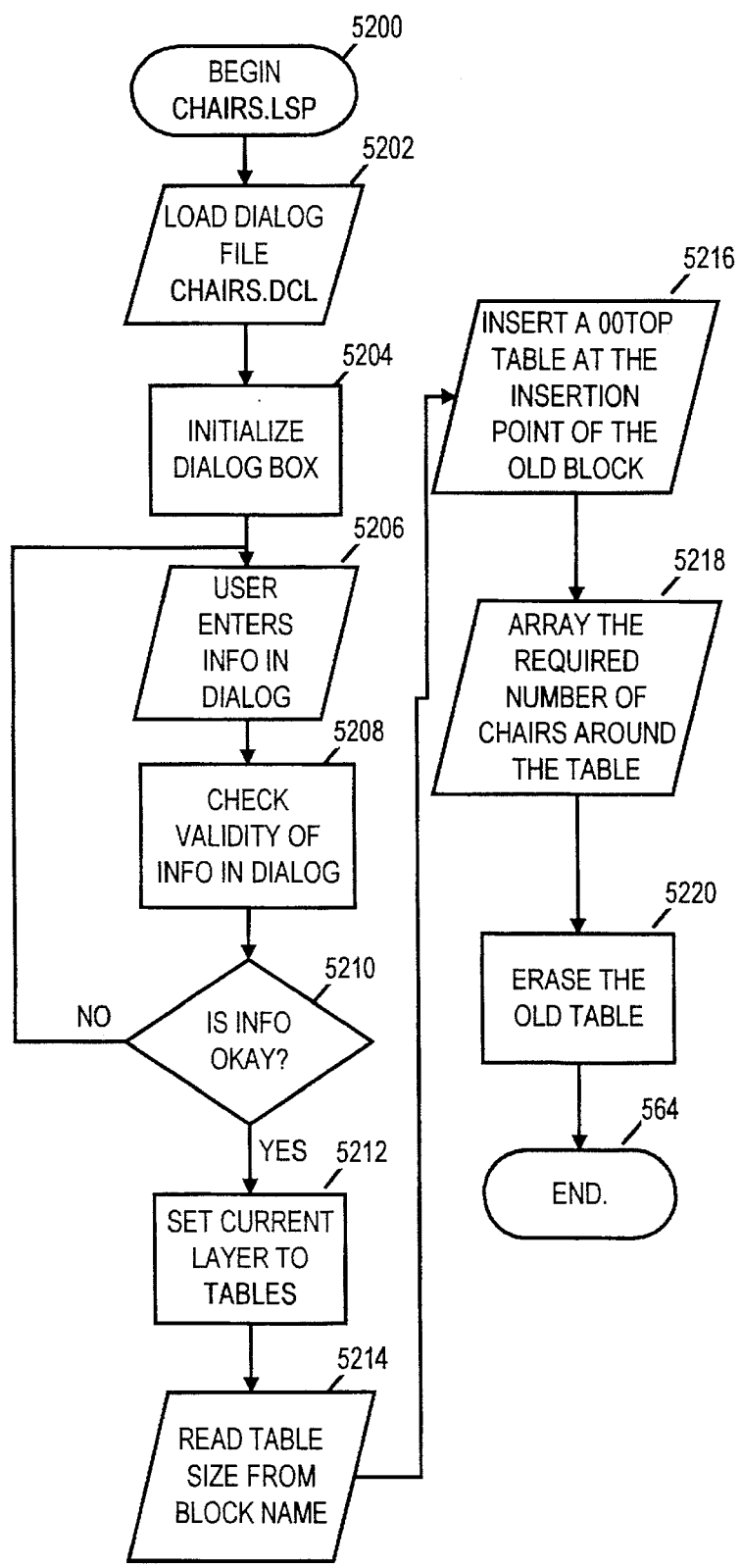

The final option available to the user under the Utilities main menu selection is the Chair Maintenance option. When that option is selected by the user, the CHAIRS.LSP subroutine, a diagram of the flowchart of which is shown in FIG. 52, is called. That program allows the user to change the number of chairs around a table. It displays a dialog box, such as that shown in FIG. 75Q, that shows the current chair count and lets the user add or subtract a chair. The subroutine erases the original table and replaces it with a chairless table. It then arrays the desired number of chairs around the table.

When the CHAIRS.LSP subroutine is called, it begins at step 5200 and then loads the dialog file which displays the dialog box shown, for example, in FIG. 75Q, at step 5202. That dialog box is then initialized at step 5204, and the user then enters the chair count information at step 5206. The validity of the information entered in the dialog box is checked at steps 5208 and 5210. If a determination is made at step 5210 that the inputted information is invalid, then the subroutine goes to step 5206 and again waits for the user to enter information in the dialog box.

If an affirmative determination is made at step 5210, then the current layer is set to TABLES at step 5212, the table size is read from the block name at step 5214, and then a 00 TOPtable is inserted at the insertion point of the old block at step 5216. The required number of chairs are then arrayed around the table at step 5218, and the old table is erased at step 5220. The CHAIRS.LSP subroutine then ends at step 564.

In order to assist the reader in understanding the operation of the computer-aided-design/event management (CAD/EM) system of the present invention, a glossary of some of the terms used herein is provided as Table 6.

TABLE 6

CAD/EM GLOSSARY

| | |
|---|---|
| ASCII file | A file stored as straight text. |
| Block | A collection of drawing items grouped together and given a name. |
| CAD | Computer Aided Design |
| CDF | Comma Delimited Format; An ASCII file format where data fields are delimited by commas. |
| Column | The SQL equivalent of a database field. |
| Dialog | The graphical equivalent of a window. (spelling used by MicroSoft) |
| Dialogue | Same as Dialog (spelling used by Autodesk) |
| Dictionary | A file that contains field names and their position in the corresponding data file. |
| DXF | Standard CAD ASCII file format able to be read by most CAD packages. |
| DXF Code | The DXF file format has codes for every conceivable part of a graphical entity. For example; the X, Y, and Z coordinates are stored in DXF codes 10, 20, and 30, respectively. |
| Entity Name | Within AutoCAD, each drawing element has a unique name assigned to it. Programs typically manipulate these items using the entity's name. Entity names are reset every time a drawing is loaded into AutoCAD. |
| Fast Access | Refers to a drawing which is saved in both database and CAD formats to speed up access. This type of file uses more disk space (approximately 10 times the space), but frees EM/DATA from transferring the complete drawing to EVENT/CAD each time that module is started. |
| Field Mark | (or @FM) A character that delimits fields in a record. |
| Handle | A permanent entity name that does not ever change within a drawing, even if the drawing is reloaded |
| Layer | This refers to an AutoCAD layer. This layer is a group of objects that can be controlled as one. This allows the user to easily change the color or visibility (on or off) of an entire group of objects at the same time. There are EVENT/CAD layers for TABLES, STAGING, TEXT, AIRWALLS, etc. |
| Multi-Value | A type of field that can contain multiple values. For instance, a multi-value phone_number field may contain several phone numbers relating to one person. Standard single-value fields can only contain one phone number per record. |
| Menu | Displayed choices used to navigate throughout the system. |
| Normal Access | Refers to a drawing which is stored only in the database format. This is the type of drawing that is output by WRITE.DXF whenever the EVENT/CAD module is called. |
| Popup | A displayed list from which the user can make a selection. |
| Row | The SQL equivalent of a database record. |
| Subroutine | Used in the same context as a program. EM/DATA does not differentiate between programs and subroutines. |
| SQL | Structured Query Language, a common language used in database processing. |
| Table | The SQL equivalent of a database file. |
| Value Mark | (or @VM) A character that delimits values in a multi-value field. |
| Volume | A reference to the location of a group of tables. |
| Window | A data entry or display screen. |
| Xlate | A function returning the data of a specified field of a record with a given key. |

Throughout the description of the EVENT/CAD program module, various subroutines called from within other subroutines have been discussed. A description of the subroutines follows.

FIG. 53 is a diagram of the flowchart of the INIT() subroutine which performs the function of preparing the drawing for animation by storing the initial AutoCAD state and opening files. The current state is stored because during the animation process various modes are turned on and the viewports will display three-dimensional views. When the animation is completed, these modes are restored.

Once called, the INIT() subroutine starts at step 5300 and then stores the current drawing variables and sets them to animation values at step 5302. A determination is then made at step 5304 of whether the animation is going to be sent to video. If an affirmative determination is made at step 5304, then the room name is retrieved from the $IDATA$ block and then the RS2HEAD.LSP subroutine is run at step 5308.

The RS2HEAD.LSP subroutine is a program that writes out the header of the CADEM.RC1 file. It is called with the parameters specifying a name for the animation, the current ballroom or other event room and the smooth-mode mode. The information necessary for the RenderStar program to operate is written out to a DOS file. A diagram of the flowchart of the RS2HEAD.LSP subroutine is shown in FIG. 54.

If a negative determination is made at step 5304, then a .MVI file is opened to store the list of animation slides selected by the user, at step 5310. After steps 5308 and 5310, the INIT() subroutine ends at step 564.

A diagram of the flowchart of the RS2HEAD.LSP subroutine is shown in FIG. 54. Once that subroutine is called, it starts with the parameters specifying the movie name, the ballroom or other event room to be depicted, and the smooth-mode option at step 5400. The parameter list is then set to equal all of the parameter names needed to form a RENDERSTAR.RC1 file at step 5402. Then, at step 5404, the subroutine sets the value list equal to the value of the parameters, inserts the movie name where the file name is needed, and the ballroom or other event name where the default template is needed.

A .RC1 file is then opened with the name MOV_NAME.RC1 at step 5406. The parameter value is then written to the .RC1 file at step 5408, and then a determination is made at step 5410 of whether the parameter just written is the last parameter. If it is not, then steps 5408 and 5410 are repeated, beginning at step 5412, for each parameter.

If it is determined at step 5410 that the last parameter has been written to the .RC1 file, then the RS2HEAD.LSP subroutine ends and echoes back its file handle at step 5414.

A diagram of the flowchart of the GET_PATHS() subroutine is shown in FIG. 55. That function retrieves the path of a polyline or determines the target and camera points, depending on the option, to be used in an animation. That subroutine is called from the EMANIM.LSP subroutine. Once the GET_PATHS() subroutine is called, it starts at step 5500 and then queries whether the camera is to be fixed at step 5502. If a negative determination is made at step 5502, then the GET_POINTS() function is called at step 5504. The GET_POINTS() function retrieves the coordinates for an animation by dividing a polyline into an equal number of pieces based on the number of frames in an animation. This function, as is the GET_PATHS() function, is defined in the EMANIMSUP.LSP subroutine.

If an affirmative determination is made at step 5502 or after the GET_POINTS() subroutine ends, a determination is made at step 5506 of whether the target has been selected to be fixed. If the target has not been selected to be fixed, then the GET_POINTS() subroutine is called with the target path at step 5508.

If an affirmative determination is made at step 5506 or after the end of the called GET_POINTS() subroutine at step 5508, the GET_PATHS() subroutine then ends at step 564.

Figure 56:
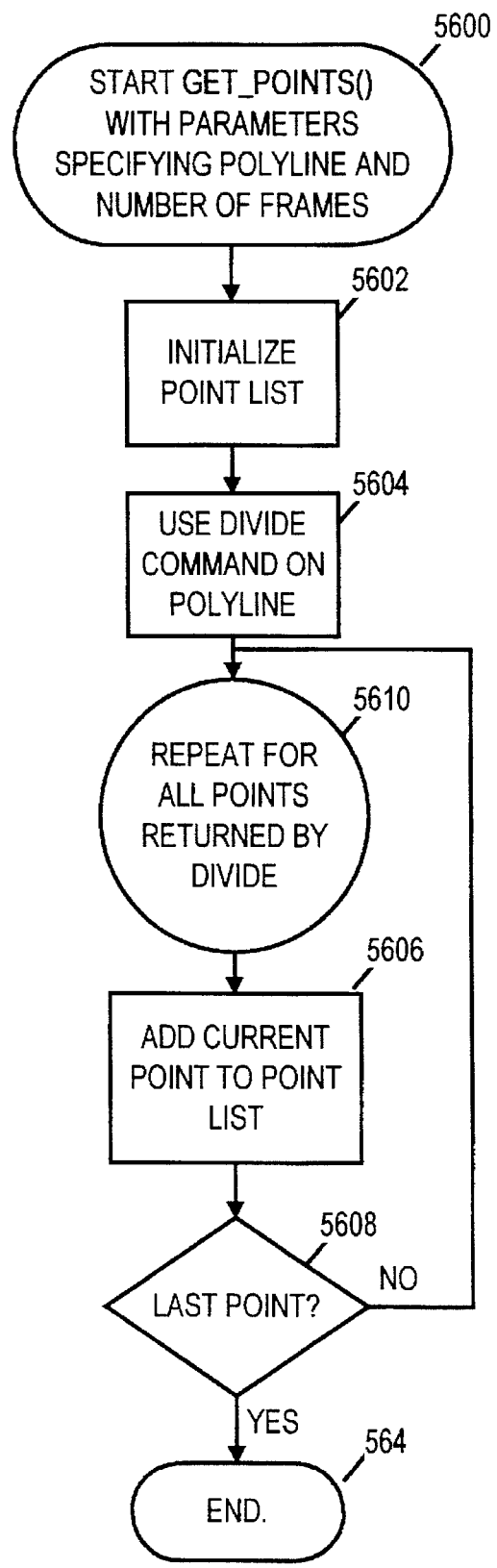
Figure 1:
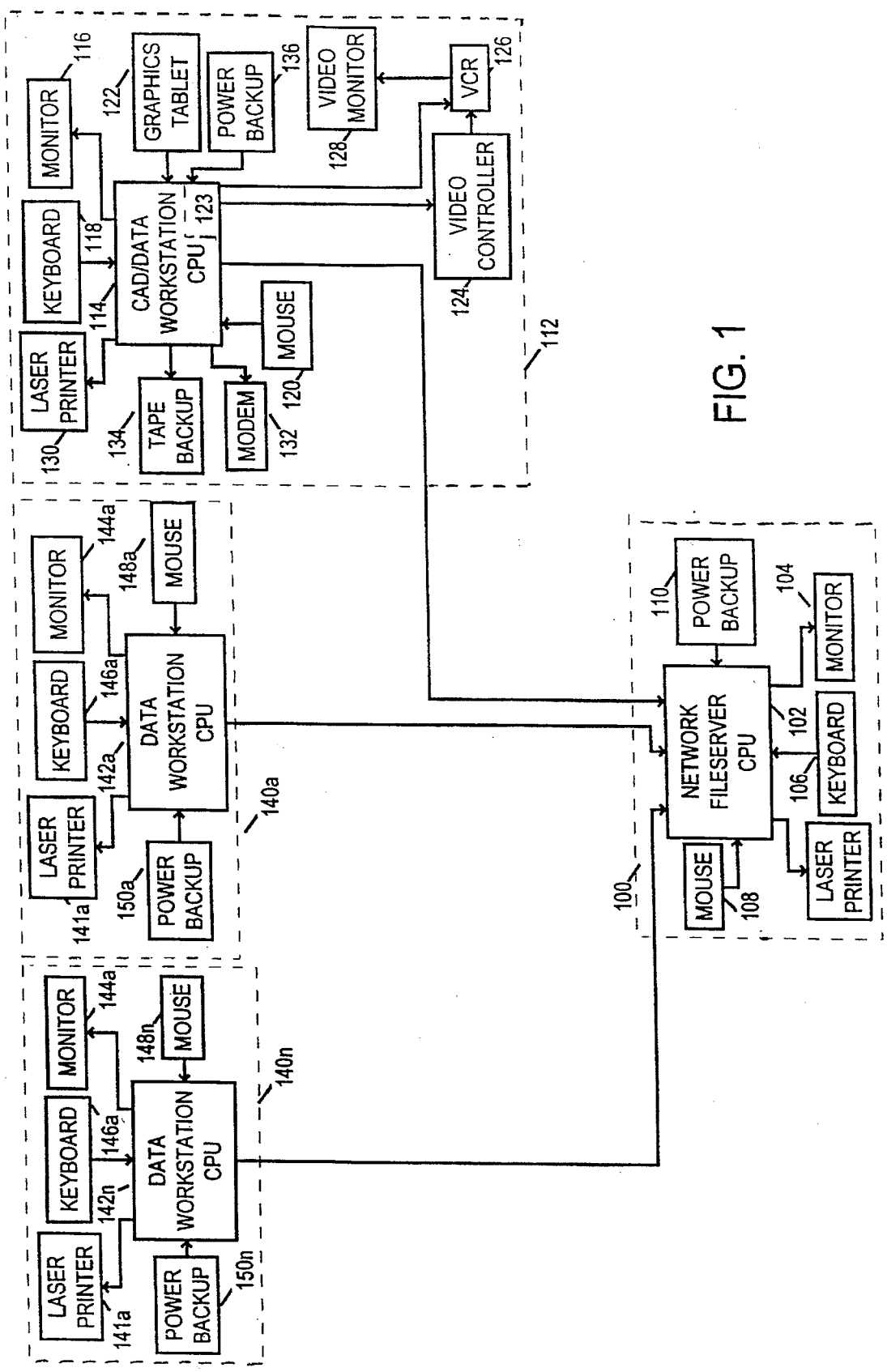

A diagram of the flowchart of the GET_POINTS() subroutine is shown in FIG. 56. Once the GET_POINTS() subroutine is called, it starts at step 5600 with the parameters specifying the polyline and the number of frames and then initializes a point list at step 5602. It then uses the AutoCAD DIVIDE command on the polyline at step 5604. The current point is then added to the point list at step 5606, and then a determination is made at step 5608 of whether the last point has been processed. If a negative determination is made at step 5608, the subroutine then goes to step 5610 and repeats steps 5606–5608 for all of the points returned by the DIVIDE command. If an affirmative determination is made at step 5608, the subroutine then ends at step 564.

A diagram of the flowchart of the ANIMATE() subroutine is shown in FIGS. 57A–57B. That function is also defined in the EMANIMSUP.LSP subroutine and is used to generate the coordinate information to generate one frame of an animation. If the animation is generated to a disk, the view is first displayed on the screen for the user. Hidden lines are then removed from the view or the view may be shaded, depending upon the options selected by the user. A slide is then made. If the view is to be generated to videotape, a control file (.RC1 file) is generated, and an ANIMATION-.DXF file is also generated to be used by the RenderStar program to render the video to tape.

Once the ANIMATE() subroutine is called, it starts at step 5700 and turns off the path layer at step 5702. A determination is then made of whether the camera is to be fixed at step 5704. If it is determined at step 5704 that the camera is not to be fixed, then the next point from the camera polyline which is to be used as the camera location is obtained at step 5706. If an affirmative determination is made at step 5704, then a fixed camera point is used for the camera location at step 5708.

After steps 5706 and 5708, a determination is made of whether the target is fixed at step 5710. If a negative determination is made at step 5710, then a determination is made at step 5712 of whether the target path is the same as the camera's. If the target path is determined to be the same as the camera's, then the target point is set equal to the next point on the camera polyline at step 5714.

If an affirmative determination is made at step 5710, then the camera uses a fixed target point for the target location at step 5716. If a negative determination is made at step 5712, then the subroutine gets the next point from the target polyline to be used as the target location at step 5718. After steps 5714–5718, a determination is made at step 5720 of whether the output generated to that point is to go to video. If an affirmative determination is made at step 5720, then the camera and target locations are written to a .RC1 file at step 5722, and a determination is made of whether the user desires the output to go to video immediately at step 5724.

If an affirmative determination is made at step 5724, a command is written to the .RC1 file to execute the animation command immediately at step 5728. After step 5728, a determination is made at step 5726 of whether the last frame has been sent to video. If a negative determination is made at step 5726 or at step 5724, then the subroutine goes to step 5734 and begins repeating step 5704 and the steps thereafter again.

If an affirmative determination is made at step 5726, then a batch file to start the video rendering is written at step 5730, a .DXF file is written for the rendering at step 5732, and then the ANIMATE() subroutine ends at step 564.

If a negative determination is made at step 5720, then a perspective command is generated from the camera and target points using the AutoCAD DVIEW command at step 5736. A determination is then made at step 5738 of whether the user desires the Wireframe Mode. If a negative determination is made at step 5738, then a second determination is made at step 5740 of whether the user desires the Shaded Mode. If a negative determination is made at step 5740, then a Hide command is executed at step 5746.

If an affirmative determination is made at step 5740, then a Shade command is executed at step 5742. If an affirmative determination is made at step 5738 and after steps 5742 and 5746, the slide of the room is saved at step 5744. The slide is then written to a .MVI file at step 5748, and a determination is then made of whether the last frame has been processed at step 5750. If it is determined that the last frame has not been processed at step 5750, the subroutine goes to step 5734 and then begins repeating the steps thereafter.

If an affirmative determination is made at step 5750, then all of the slides are compiled with the AFEGA command using the .MVI file at step 5752. The subroutine then closes the open files at step 5754 and ends at step 564.

FIG. 62 is a drawing of a diagram of the flowchart for the PLACE.LSP subroutine. That subroutine is used to insert blocks in the drawing, in the proper layer, based on the global variable MODE and a parameter that gives the rotation angle. The PLACE.LSP program is passed the rotation angle and the AutoCAD entity name of the block to add. It allows the user to position the block in the drawing. If the current MODE is Path, then the user selects an existing path in the drawing and then specifies the distance between successive blocks. If the MODE is Group, then the user positions the first block and the subroutine then calls the ARRAY.LSP subroutine, passing it the object.

When the PLACE.LSP subroutine is called, it starts at step 6200 with the parameters for the block name and rotation. A determination is then made at step 6202 of whether the MODE is set to single or group. If it is determined that the MODE is not set to single or group, then a determination is made of whether the block is pipe-and-drape at step 6206. If the block is set to pipe-and-drape at step 6206, then the PIPEHT.LSP subroutine is called at step 6208. A diagram of the flowchart of the PIPEHT.LSP subroutine is shown and described in connection with FIG. 68.

After the PIPEHT.LSP subroutine is called and ends, the PLACE.LSP subroutine measures the PIPEXX variable along the indicated path at step 6212, and then replaces the pipe-and-drape blocks with ones of the right height at step 6218. The current path is then erased at step 6228, and the PLACE.LSP subroutine ends at step 564.

If it is determined at step 6202 that the MODE is set to single or group, then a determination is made at step 6204 of whether the block is a pipe-and-drape block. If an affirmative determination is made at step 6204, then the PIPEHT.LSP subroutine is called at step 6208. If a negative determination is made at step 6204, then a block is inserted on the appropriate layer at step 6214, and a determination is made at step 6220 of whether the mode is set to group. If a negative determination is made at step 6220, the PLACE.LSP subroutine then ends at step 564.

If an affirmative determination is made at step 6220, then the MODE is set to single at step 6224, and then a determination is made at step 6230 of whether the block is a staging module. If it is determined at step 6230 that the block is a staging module, then the STAGE.LSP subroutine is called at step 6234, and it is passed the block name and rotation. A diagram of the flowchart of the STAGE.LSP subroutine is shown and described in connection with FIG. 69.

If the determination at step 6230 is that the current module is not a staging module, the ARRAY.LSP subroutine is called, and it is passed the block name. A diagram of the flowchart of the ARRAY.LSP subroutine is shown and has been previously described in connection with FIG. 35. After calling the ARRAY.LSP or STAGE.LSP subroutines, the PLACE.LSP subroutine ends at step 564.

Figure 75T:
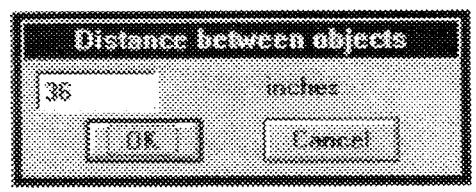

If a negative determination is made at step 6206, then the dialog file, such as that shown in FIG. 75T, for the distance between objects is loaded at step 6210, initialized at step 6216, and then the user-specified distance is saved at step 6222. A new block is measured along the path at the user-specified distance at step 6226, and the current path is erased at step 6228. The PLACE.LSP subroutine then ends at step 564.

A diagram of the flowchart of the CENTER.LSP subroutine is shown in FIG. 63. Once called, the CENTER.LSP subroutine starts with the parameters for mode, centering point and objects at step 6300. A determination is then made at step 6302 of whether the mode is "automatic". If an affirmative determination is made at step 6302, then the objects with a window are gotten at step 6304, the center is calculated from the variables LL and UR at step 6306, and then the mode is set to vertical or horizontal according to the value of the variable ROT at step 6308.

If a negative determination is made at step 6302 or after the execution of step 6308, the objects on the locked layers are removed from the selection set at step 6310. A determination is then made at step 6312 of whether the current mode is horizontal. If a negative determination is made at step 6312, then the CENTER.LSP subroutine finds the maximum and minimum Y values in the selection set at step 6314, and then calculates the distance from the center of the selection set to the Y-centering value at step 6316. The selection set is then moved vertically to the centering point at step 6318.

If an affirmative determination is made at step 6312 or after step 6318, a determination is then made at step 6320 of whether the current mode is vertical. If it is determined that the current mode is vertical at step 6320, the CENTER.LSP subroutine ends at step 564.

If a negative determination is made at step 6320, then the maximum and minimum X values are found in the selection set at step 6322, the distance from the center of the selection set to the X-centering value is calculated at step 6324, and then the selection set is moved vertically to the centering point at step 6326. The subroutine then ends at step 564.

The SETSIZE() subroutine will now be described with reference to FIG. 64, which is a diagram of the flowchart of that subroutine. When called, the SETSIZE() subroutine starts with the parameters specifying the plot size and title block size at step 6400. If the title block is on, the title block size is set to plot size at step 6402. A determination is then made of whether the plot size is equal to "LEGAL". If a negative determination is made at step 6404, then the legal viewports are turned off and the letter viewports are turned on at step 6406.

If an affirmative determination is made at step 6404, then the letter viewports are turned off and the legal viewports are turned on at step 6408. After steps 6406 or 6408, a determination is made at step 6410 of whether the title block size is letter. If a negative determination is made at step 6410, then the legal title block and text is turned on at step 6412, the letter title block and text is turned off at step 6414, and then the plot size is stored in USERS1 at step 6420.

If an affirmative determination is made at step 6410, then the letter title block and text is turned on at step 6416, the legal title block and text iS turned off at step 6418, and then the plot size is stored in USERS1. After step 6420, the title block size is stored in USERS2 at step 6422, and then the subroutine ends at step 564.

Figure 65:
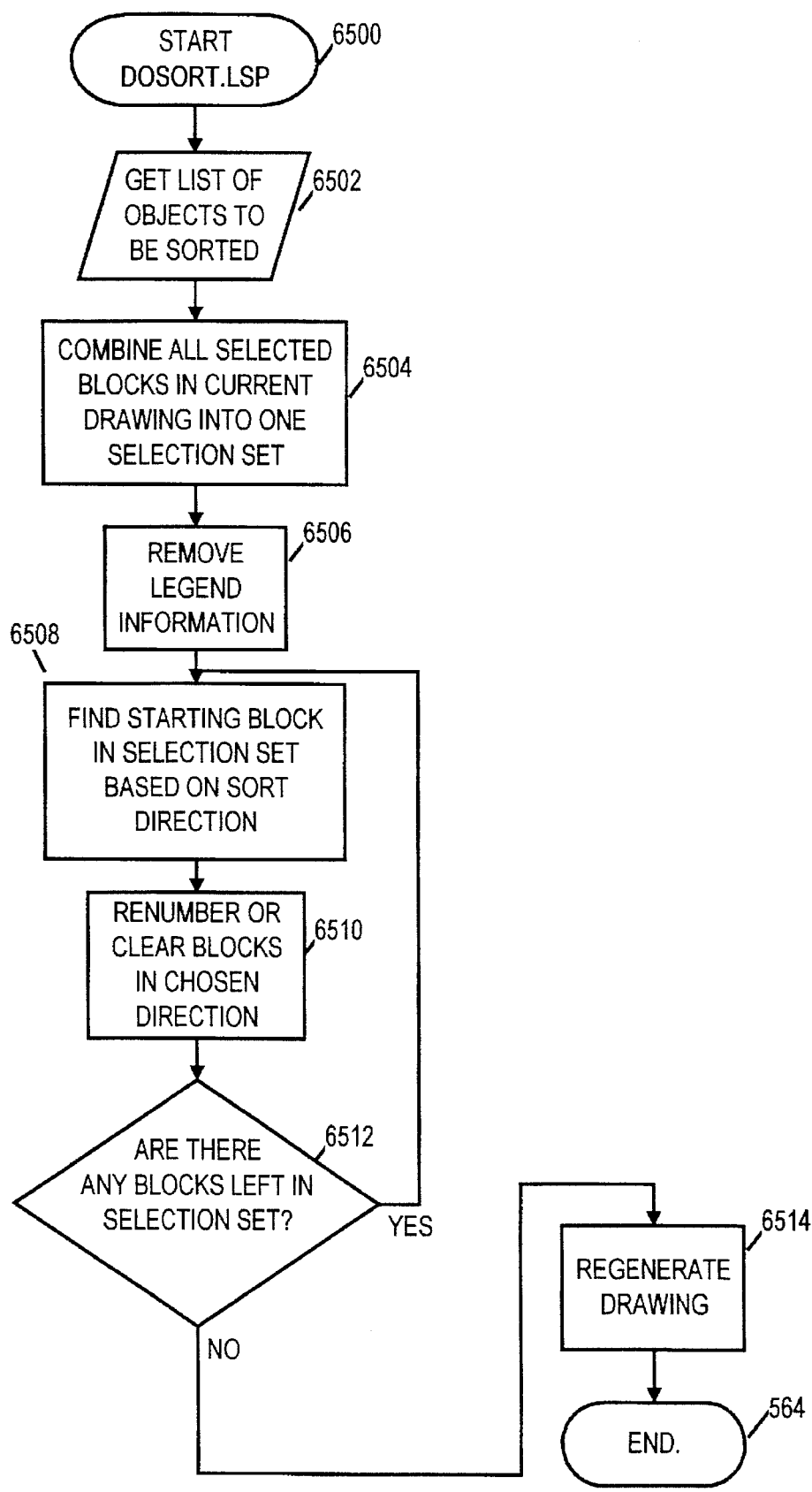

A diagram of the flowchart of the DOSORT.LSP subroutine is shown in FIG. 65. Once the DOSORT.LSP subroutine is called, it starts at step 6500, and then gets a list of the objects to be sorted at step 6502. It then combines all selected blocks in the current drawing into one selection set at step 6504.

At step 6506, the subroutine removes the legend information and then finds the starting block in the selection set based on the sort direction at step 6508. The DOSORT.LSP subroutine then renumbers or clears the blocks in the chosen direction at step 6510. A determination of whether there are any blocks left in the selection set is made at step 6512. If there are blocks left in the selection set, then the subroutine goes to step 6508 and executes steps 6508–6512 until a negative determination is made at step 6512.

After a negative determination is made at step 6512, the drawing is regenerated at step 6514, and the DOSORT.LSP subroutine ends at step 564

The READBLCK.LSP subroutine is described in connection with a diagram of its flowchart, which is shown in FIG. 66. Once called, the READBLCK.LSP subroutine starts at step 6600 and then sets the data path and data file at step 6602. It then reads a line from the data file at step 6604, and then gets a block name and category at step 6606. At step 6608, a determination is made of whether the current category is equal to FONT.

If a negative determination is made at step 6608, then the current item is appended to the current list at step 6610. After step 6610 or if an affirmative determination is made at step 6608, a determination is then made at step 6612 of whether there are any more lines in the file. If it is determined that there are more lines in the file at step 6612, the subroutine goes to step 6614 and repeats steps 6604–6612 until there are no longer any lines left in the data file. After a negative determination is obtained at step 6612, the READBLCK.LSP subroutine ends at step 564.

Figure 67:
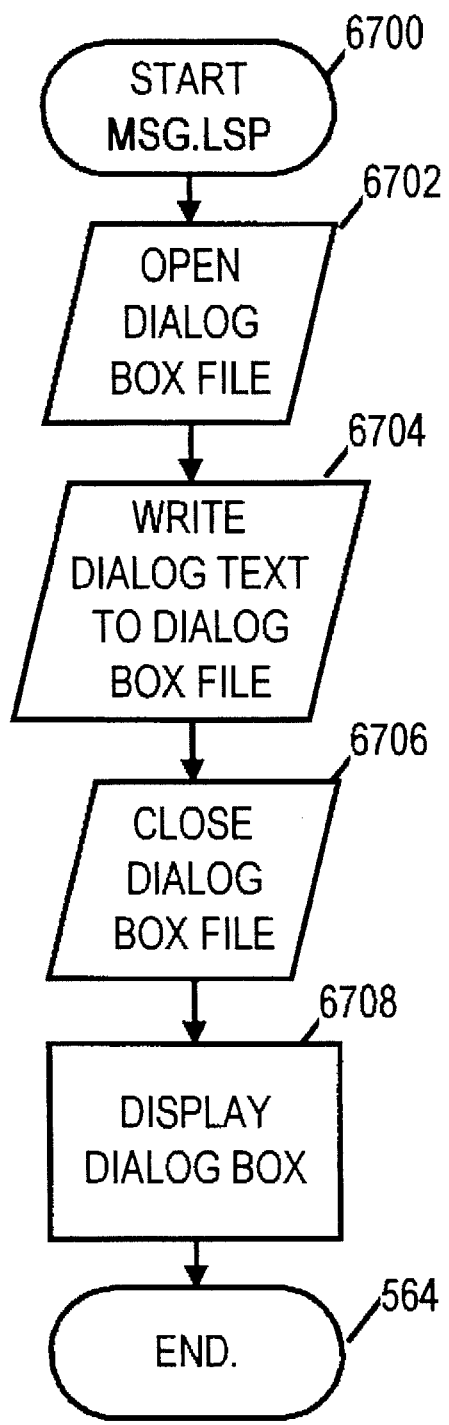

A diagram of the flowchart of the MSG.LSP subroutine is shown in FIG. 67. Once called, the MSG.LSP subroutine starts at step 6700 and then opens a dialog box file at step 6702. Dialog text is then written to the dialog box file at step 6704, and then the dialog box file is closed at step 6706. An appropriate dialog box is then displayed for the user at step 6708. An example of such a dialog box is shown in FIG. 75S. The MSG.LSP subroutine then ends at step 564.

Figure 68:
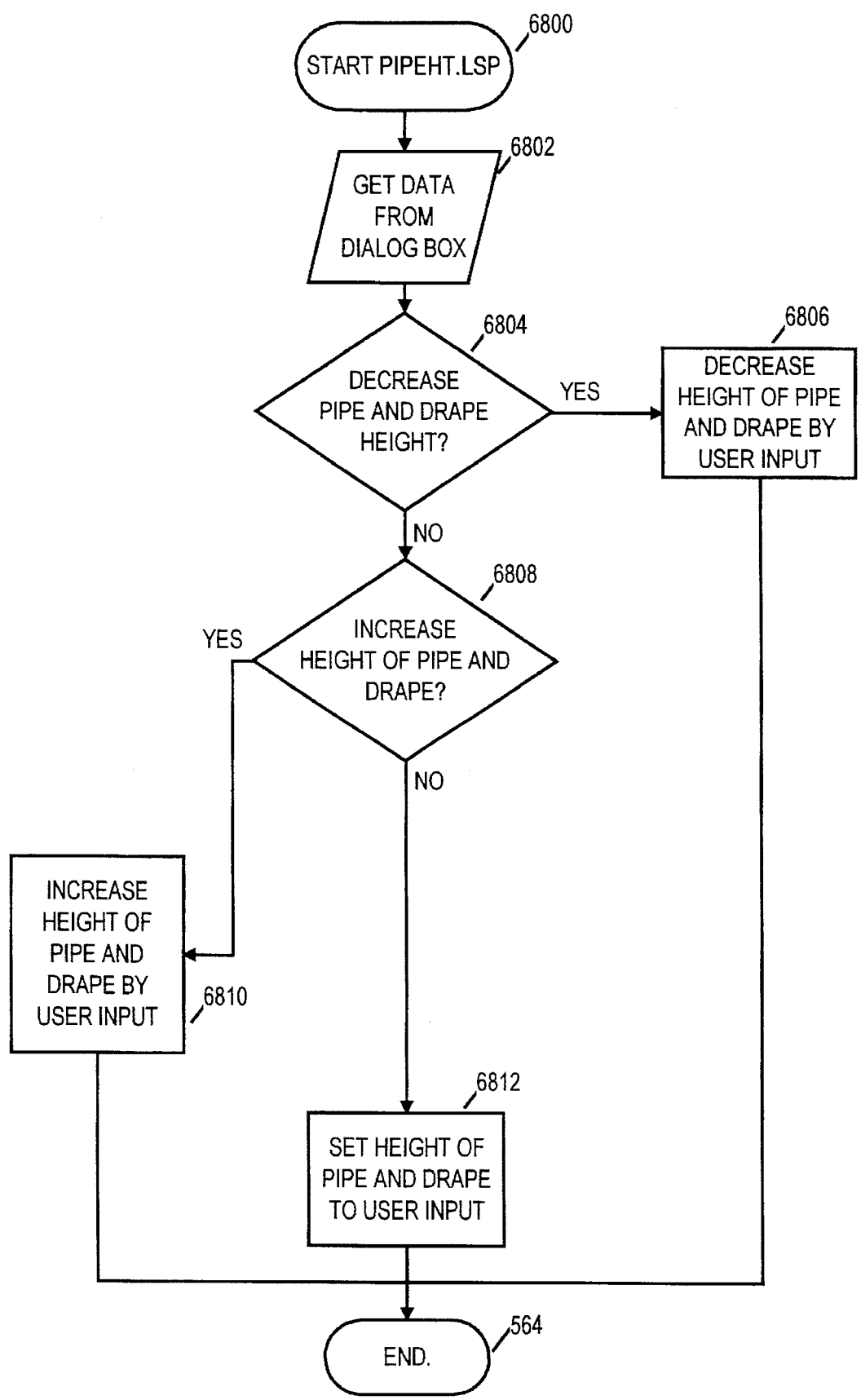

A diagram of the flowchart of the PIPEHT.LSP subroutine is shown in FIG. 68. This program is a Lisp routine which is used to let the user specify the height of pipe-and-drape blocks. It uses a dialog box where the user can specify the height in inches, feet in inches, or decimal feet. The values entered by the user are checked for validity by this program. If the entered values are not integers, or are an improper height, an error message is displayed for the user and an Edit box highlighted. The corrected number is converted to decimal inches and stored in a global variable PHEIGHT.

Once called, the PIPEHT.LSP subroutine starts at step 6800 and then gets data from an appropriate dialog box (not shown) at step 6802. A determination is then made at step 6804 of whether the user had entered decreased pipe-and-drape height. If the user has entered a decreased pipe-and-drape height at step 6804, then the height of the pipe-and-drape is decreased to that input by the user at step 6806, and the program then ends at step 564.

If a negative determination is made at step 6804, then a determination is made at step 6808 of whether the user has requested an increase in the height of the pipe-and-drape. If it is determined that the user has requested an increase at step 6808, then the height of the pipe-and-drape is increased to that specified by the user at step 6810, and the program then ends at step 564.

If a negative determination is made at step 6808, then the height of the pipe-and-drape is set to that specified by the user at step 6812, and the PIPEHT.LSP then ends at step 564.

Figure 69:
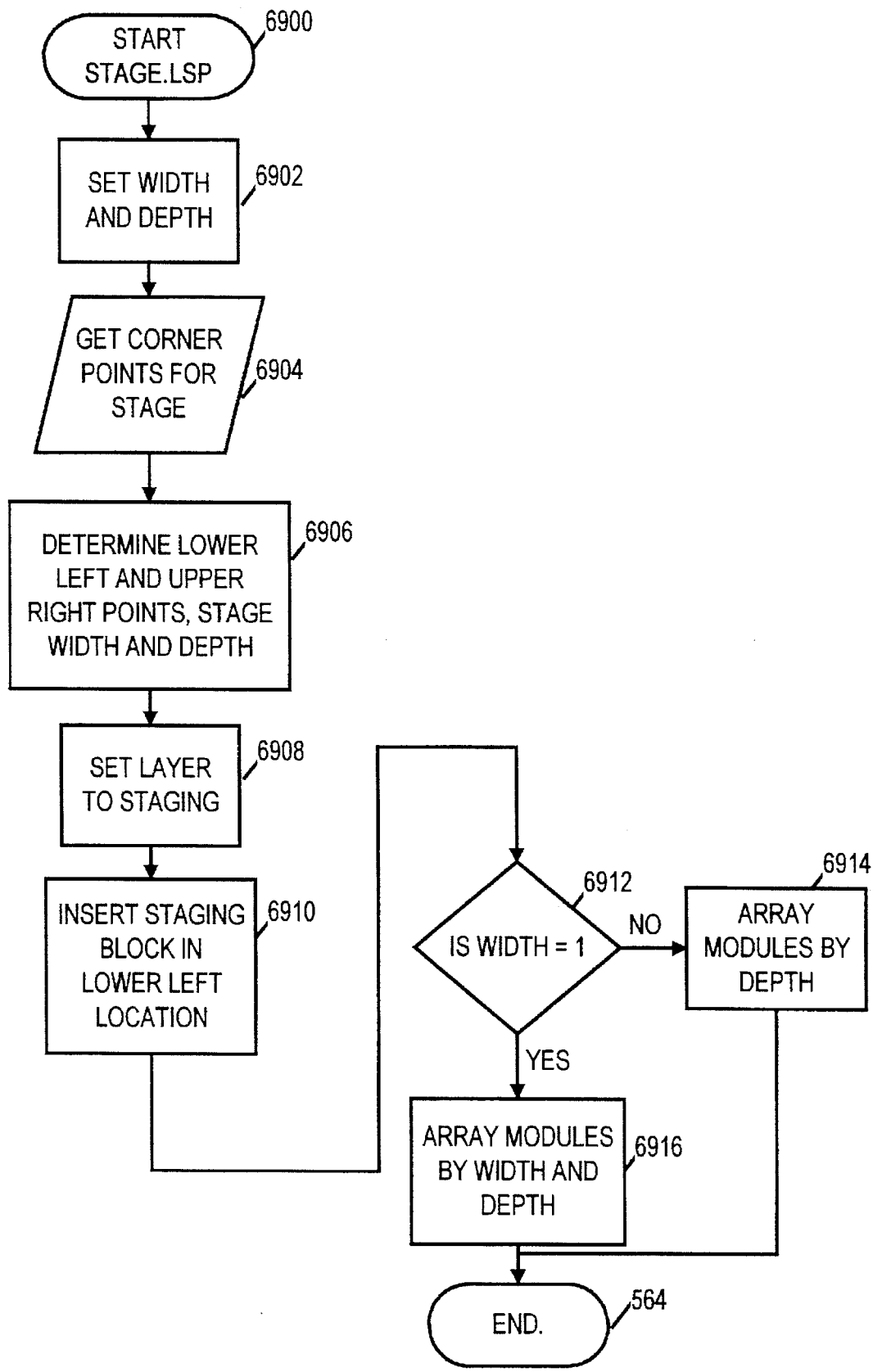

The STAGE.LSP subroutine will now be described in connection with the diagram of the flowchart of that subroutine which is shown in FIG. 69. The STAGE.LSP subroutine is a program used to construct a stage in the drawing. It is supplied with parameters specifying the type of stage (height) and the rotation angle. The snaps are set to match the dimensions of the staging block. The user then indicates the desired location of the stage with a window. The number of stage modules and insert coordinates are computed from the coordinates of the window, and the STAGE.LSP program inserts the staging blocks to fill the space.

Once called, the STAGE.LSP subroutine starts at step 6900 and then sets the width and depth of the stage at step 6902. It then gets the corner points for the stage at step 6904 and determines the lower left and upper right points, and the stage width and depth at step 6906.

The STAGE.LSP subroutine then sets the current layer to staging at step 6908 and inserts the staging block in the lower left location at step 6910. A determination is then made at step 6912 of whether the width of the stage is equal to 1, meaning eight feet. If a negative determination is made at step 6912, then the staging modules are arrayed by the depth of the stage at step 6914, and the subroutine then ends at step 564.

If an affirmative determination is made at step 6912, then the stage modules are arrayed by both the specified width and depth at step 6916, and the subroutine then ends at step 564.

The RS2TARGA.C subroutine, a diagram of the flow chart of which is shown in FIGS. 70A and 70B, is a subroutine written in the C language, which is called from the RenderStar program. It is used for converting the graphic information in the EVENT/CAD environment to data which can be read by the Targa video board 123 of the CAD/DATA CPU 114. The RS2TARGA.C subroutine is formed from the RS2TARGA.C subroutine and the DISPLAY IMAGE subroutine, shown respectively in FIGS. 70A and 70B.

Once called, the RS2TARGA.C subroutine starts at step 7000 and then determines whether the Targa board 123 is connected at step 7002. If a negative determination is made at step 7002, an error is displayed for the user on the CAD/DATA monitor 116, and the subroutine ends at step 564.

If it is determined at step 7002 that a Targa board is connected, then that Targa board 123 is initialized at step 7004, and the Line Command Arguments are parsed at step 7006. A determination is then made at step 7008 of whether the counting function is turned on. If a negative determination is made at step 7008, then a file is opened at step 7010. After step 7010 or if an affirmative determination is made at step 7008, then a determination is made at step 7012 of whether the file is open.

If the file is determined to be open at step 7012, then the file name is rebuilt at step 7014. After step 7014 or if a negative determination is made at step 7012, the DISPLAY_IMAGE subroutine shown in FIG. 70B is called at step 7016. When the DISPLAY_IMAGE subroutine is called, it starts at step 7108 and determines whether the file exists at step 7020. If a negative determination is made at step 7020, the DISPLAY_IMAGE subroutine ends at step 564.

If an affirmative determination is made at step 7020, then the file is read and the image dimensions obtained at step 7022, and the image is then displayed centered on the screen at step 7024. The DISPLAY_IMAGE subroutine then ends at step 564.

After the initial calling of the DISPLAY_IMAGE subroutine at step 7016, a determination is made at step 7026 of whether the current file being processed is the last in the sequence. If it is, then the RS2TARGA.C subroutine ends at step 564.

If a negative determination is made at step 7026, then the next file name in the sequence is obtained at step 7028, and the DISPLAY_IMAGE subroutine is then called at step 7016.

Figure 71:
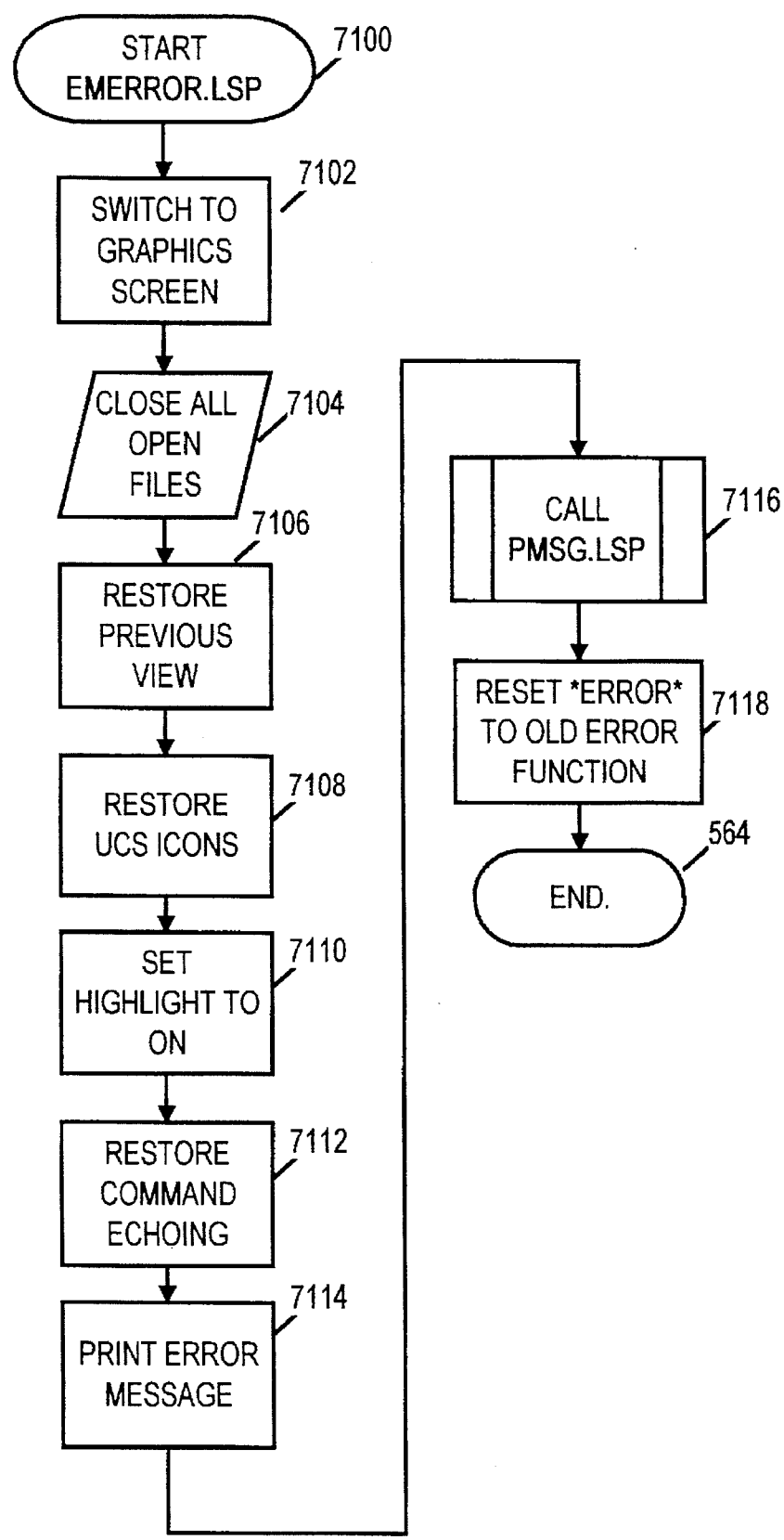
FIGS. 71–73 are diagrams of the flowcharts of still further subroutines used in connection with the EVENT/CAD program module of the present invention.

A diagram of the flowchart of the EMERROR.LSP subroutine is shown in FIG. 71. That subroutine is executed whenever an AutoCAD error condition exists. First, it switches to the graphics screen, then it frees up any unused nodes, returns to the root menu, and closes any open files. Next, the system settings are reset to their original values. The EMERROR.LSP function also prints the error to the command line.

When executed, the EMERROR.LSP subroutine starts at step 7100, switches to a graphics screen at step 7102, and then closes all open files at step 7104. It then restores the previous view at step 7106, as well as restoring the UCS icons at step 7108. UCS refers to an AutoCAD User Coordinate System. When generating 3-D views of an object, the program may switch coordinate systems to display the views on the screen. Restoring the UCS will take the user to the previous mode (such as an XY coordinate system that looks like a standard blueprint).

The EMERROR.LSP subroutine then sets the highlight function to on at step 7110, restores the command echoing at step 7112, and prints an error message for the user step 7114.

Figure 72:
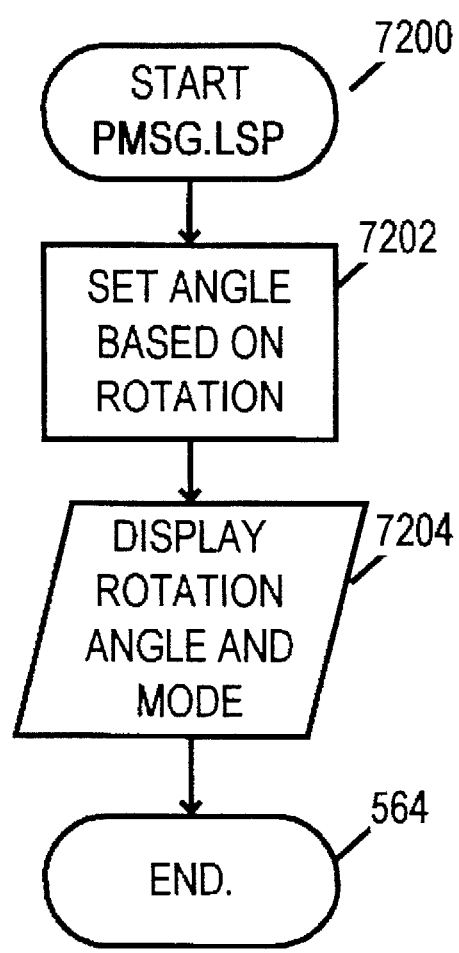

The PMSG.LSP subroutine is then called at step 7116. That subroutine provides the user with a constant status report of certain significant parameters when the user is in the EVENT/CAD environment. The PMSG.LSP function prints the current mode, rotation angle, snap setting, and grid size on the status line for the user. It is called each time the user changes one of those settings and also each time the user returns to the main screen menu. A diagram of the flowchart of the PMSG.LSP subroutine is shown in FIG. 72.

After step 7116, the EMERROR.LSP subroutine resets the *error* to the old error function at step 7118, and then ends at step 564.

When the PMSG.LSP subroutine is called, it starts at step 7200, and then sets the angle based on the rotation at step 7202. It then displays the current rotation angle and mode at step 7204, and then ends at step 564.

A diagram of the flowchart of the EMANIMSUP.LSP subroutine is shown in FIG. 73. That subroutine contains support functions for the EMANIM.LSP subroutine. Once called, the EMANIMSUP.LSP subroutine begins at step 7300 and then defines GET_PATHS() at step 7302, GET_PATHS() at step 7304, INIT() at step 7306, and ANIMATE() at step 7308. That subroutine then ends at step 564.

FIG. 74 is a diagram of a digitizer input template which may be used in connection with the graphics tablet 122 and the CAD/DATA workstation CPU 114.

Figure 76:
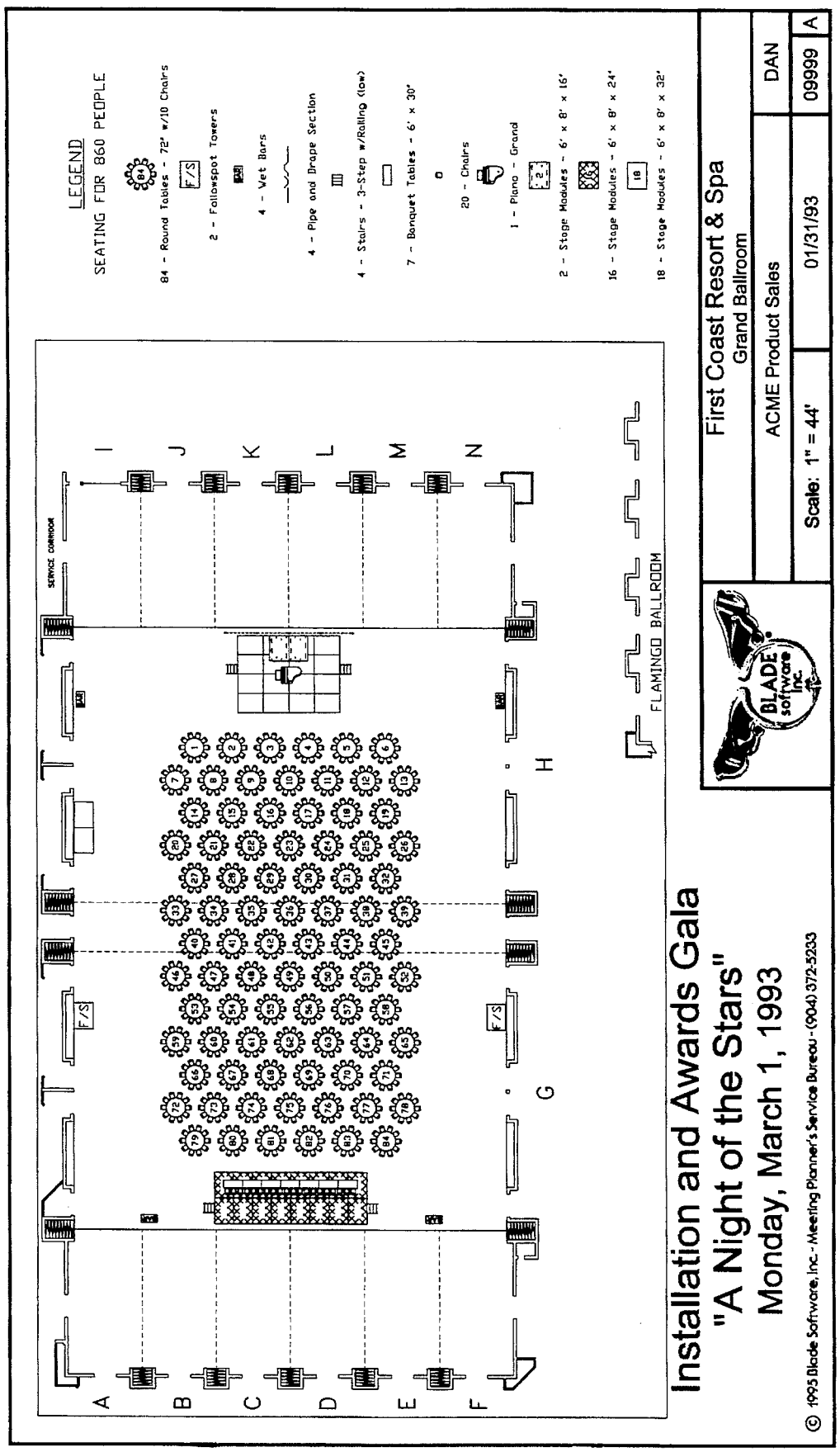
FIGS. 76–77 and 78A–78D are drawings of event layouts giving examples of drawings which may be produced by the event management system of the present invention.
Figure 77:
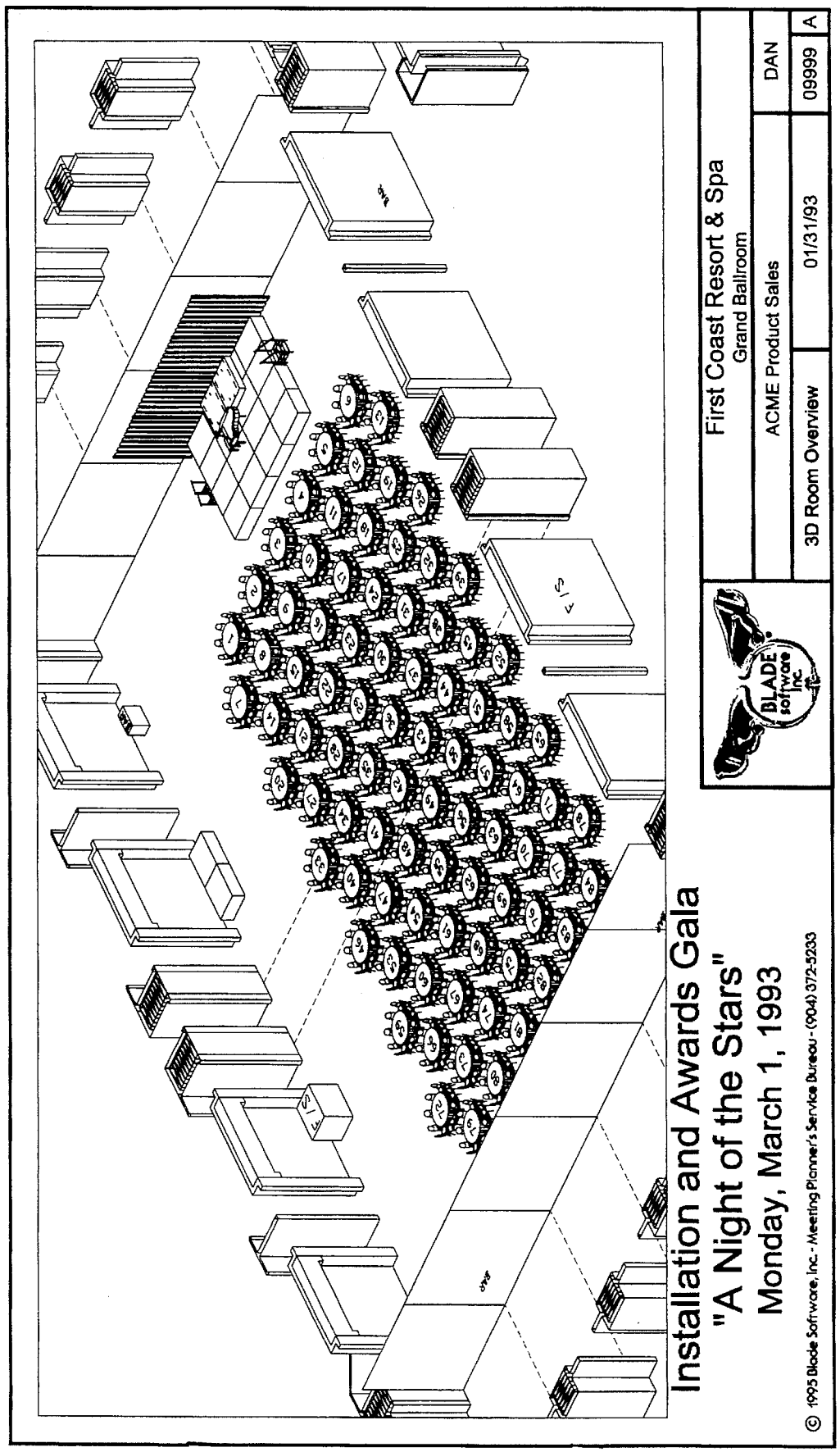
Figure 78:
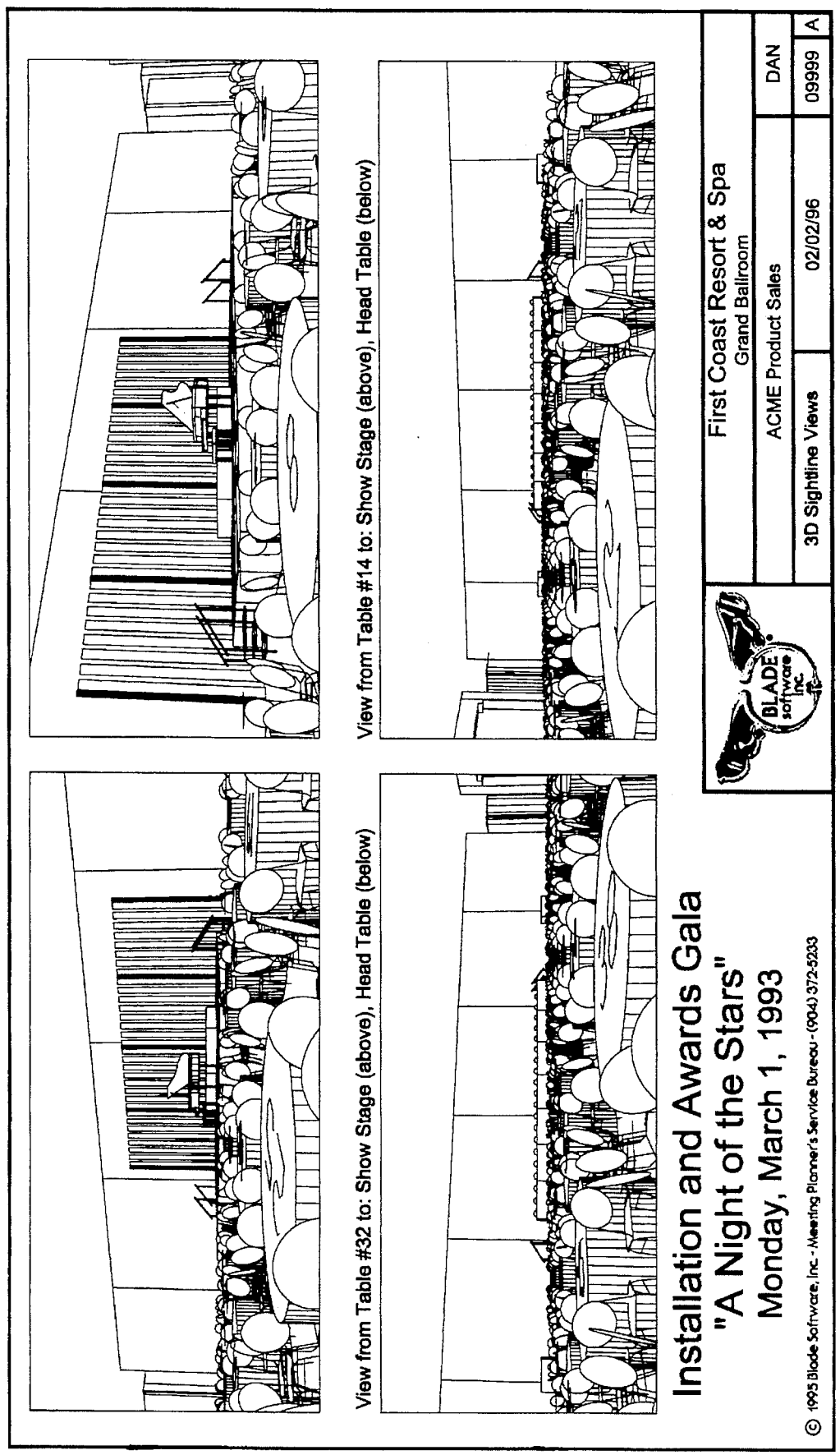

FIGS. 76, 77 and 78A–78D are diagrams of the output which can be generated using the event management system of the present invention. FIG. 76 shows a two-dimensional drawing of an event room set for a banquet for 1800 people. FIG. 77 shows a three-dimensional view of the same room for that same banquet. FIGS. 78A–78D show views from various tables within the banquet room shown in FIGS. 76 and 77.

The penultimate resultant output of the system of the present invention is a video tape representation of the life cycle of an event from its proposal through its simulated implementation. In addition to all the benefits detailed above, this Computer-Aided-Design/Event Management System provides the user with a definitive planning and production tool.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A facility and event management system for use by hotels and entertainment producers in hotels and other facilities, comprising:

a first digital data processor for storing text information relating to the facility and the events to be held at that facility for which said facility and event management system is used;

a second digital data processor which is in communication with said first digital data processor for producing and storing computer aided design drawings using the text information stored in said first digital data processor; and wherein said first and second digital data processors contain connecting means for translating changes to either of said stored text information and said computer aided design drawings whenever said computer aided design drawings or said stored text information are altered.

2. The system of claim 1, wherein said second digital processor produces computer aided design drawings automatically to a predetermined scale using said stored text information.

3. The system of claim 1, further including communication means for at least one of electronically storing and transmitting said computer aided design drawings for viewing at a location remote from said facility and event management system.

4. The system of claim 1, wherein said computer aided design drawings depict said events to be held at a facility from different viewing positions within said facility.

5. The system of claim 1, wherein said first digital data processor includes a relational database for managing said text information relating to said facility and the events to be held at said facility.

6. The system of claim 5, wherein text information relating to said facility and the events to be held at said facility comprises information relating to event facilities, guests, vendors, inventory, food and beverage, decor, entertainment and production schedules.

7. The system of claim 6, wherein said computer aided design drawings comprise drawings of said event facilities as well as inventory required for each event.

8. The system of claim 3, wherein said communication means includes a transportable video signal storage device having an animated display of said event stored thereon.

9. The system of claim 8, wherein said communication means generates a walk-through viewing of at least one event to be held at said facility.

10. An integrated event management system, comprising:

a management device for receiving and automatically storing textual data concerning an event;

a drawing device for automatically producing and storing computer aided design drawings from said stored textual data concerning an event; and a connecting device connected between said management device and said drawing device for communicating changes to said computer aided design drawings in response to changes to said stored textual data and changes to said stored textual data in response to changes to said stored computer aided design drawings.

11. The system of claim 10, wherein said drawing device produces computer aided design drawings automatically drawn to a predetermined scale using stored textual data from architectural plans.

12. The system of claim 10, wherein said computer aided design drawings include pictorial layout diagrams of an event.

13. The system of claim 12, further including communication means for at least one of electrically storing and transmitting said pictorial layout diagrams for viewing at a location remote from said integrated event management system.

14. The system of claim 13, wherein said communication means includes a transportable video signal storage device having an animated display of said event.

15. The system of claim 12, wherein said pictorial layout diagram computer aided design drawings depict said event from different viewpoints.

16. The system of claim 10, wherein said management device includes a relational database for managing relevant event information.

17. The system of claim 16, wherein said relevant event information comprises information relating to event facilities, guests, vendors, inventory, food and beverage, decor, entertainment and production schedules.

18. The system of claim 15, wherein said computer aided design drawings comprise drawings of event facilities as well as inventory required for each event.

19. A method of operating an integrated event management system, comprising the steps of:

receiving and automatically storing textual data concerning an event;

automatically producing and storing computer aided design drawings using said stored textual data concerning an event; and communicating changes to said stored textual data in response to changes to said stored computer aided design drawings and changes to said stored drawings in response to changes to said stored textual data.

20. A facility and event management system for use by hotels and entertainment producers in hotel and other facilities, comprising:

at least one digital data processor for storing text information relating to the facility and the events to be held at that facility for which said facility and event management system is used;

said at least one digital data processor including means for producing and storing computer aided design drawings using the text information stored in said at least one digital data processor; and wherein said at least one digital data processor contains connecting means for communicating changes to both said stored text information and to said computer aided design drawings whenever said computer aided design drawings or said stored text information are altered.

\* \* \* \* \*

UNITED STATES PATENT AND TRADEMARK OFFICE
CERTIFICATE OF CORRECTION

PATENT NO. : 5,634,016
DATED : May 27, 1997
INVENTOR(S) : Charles V. Steadham, Jr., It is certified that error appears in the above-indentified patent and that said Letters Patent is hereby corrected as shown below:

Title page, item [54], and col. 1, in the title, should read as following:

: "EVENT MANAGEMENT SYSTEM" to --EVENT MANAGEMENT SYSTEM WHICH PROCESSES COMPUTER AIDED DESIGN AND TEXT DATA--.

Item [57] Abstract: line 6: change "CAD/DATA" to --computer aided design/data--;

lines 8, 13 and 15: change "CAD" to --computer aided design--.

Signed and Sealed this

Eighteenth Day of November 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,634,016

DATED : May 27, 1997

INVENTOR(S) : Charles V. STEADHAM, JR. et al.

It is certified that error appears in the above-identified patent and that said Letters Patent is hereby corrected as shown below:

Column 4, line 65: change "3A-3HH" to --3A-3Z8--.

Column 17, line 64: change "3AA" to --3Z1--;
        line 66: change "3BB" to --3Z2--.

Column 18, line 2: change "3CC" to --3Z3--;
        line 5: change "3DD" to --3Z4--;
        line 7: change "3EE" to --3Z5--;
        line 12: change "3FF" to --3Z6--.

Column 19, line 38: change "3HH" to --3Z8--.

Column 23, line 26: change "3GG" to --3Z7--.

UNITED STATES PATENT AND TRADEMARK OFFICE
CERTIFICATE OF CORRECTION

PATENT NO. : 5,634,016
DATED : May 27, 1997
INVENTOR(S) : Charles V. STEADHAM, JR. et al.

It is certified that error appears in the above-identified patent and that said Letters Patent is hereby corrected as shown below:

Column 29, line 39: change "3GG" to --3Z7--.

Signed and Sealed this

Fourteenth Day of April, 1998

Attest:

BRUCE LEHMAN

Attesting Officer

Commissioner of Patents and Trademarks